(12) United States Patent
Kaminsky

(10) Patent No.: US 8,087,460 B2
(45) Date of Patent: Jan. 3, 2012

(54) GRANULAR ELECTRICAL CONNECTIONS FOR IN SITU FORMATION HEATING

(75) Inventor: Robert D. Kaminsky, Houston, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 18 days.

(21) Appl. No.: 12/074,899

(22) Filed: Mar. 7, 2008

(65) Prior Publication Data

US 2008/0271885 A1 Nov. 6, 2008

Related U.S. Application Data

(60) Provisional application No. 60/919,391, filed on Mar. 22, 2007.

(51) Int. Cl.
*E21B 43/24* (2006.01)
(52) U.S. Cl. ............... 166/245; 166/248; 166/302
(58) Field of Classification Search ............ 166/57, 166/60, 248
See application file for complete search history.

(56) References Cited

U.S. PATENT DOCUMENTS

| | | | |
|---|---|---|---|
| 363,419 A | 5/1887 | Poetsch | |
| 895,612 A | 8/1908 | Baker | |
| 1,342,780 A | 6/1920 | Vedder | |
| 1,422,204 A | 7/1922 | Hoover et al. | |
| 1,666,488 A | 4/1928 | Crawshaw | |
| 1,701,884 A | 2/1929 | Hoglc | |
| 1,872,906 A | 8/1932 | Doherty | |
| 2,033,560 A | 3/1936 | Wells | |
| 2,033,561 A | 3/1936 | Wells | |
| 2,118,669 A * | 5/1938 | Grebe | 166/248 |
| 2,534,737 A | 12/1950 | Rose | |
| 2,584,605 A | 2/1952 | Merriam et al. | |
| 2,634,961 A | 4/1953 | Ljungstrom | |
| 2,732,195 A | 1/1956 | Ljungstrom | |
| 2,777,679 A | 1/1957 | Ljungstrom | |
| 2,780,450 A | 2/1957 | Ljungstrom | |
| 2,795,279 A | 6/1957 | Sarapuu | |
| 2,799,641 A * | 7/1957 | Bell | 166/248 |
| 2,812,160 A | 11/1957 | West et al. | |
| 2,813,583 A | 11/1957 | Marx et al. | |

(Continued)

FOREIGN PATENT DOCUMENTS

CA 994694 8/1976

(Continued)

OTHER PUBLICATIONS

EP Search Report RS 115341 dated Jul. 4, 2007.

(Continued)

*Primary Examiner* — Shane Bomar
*Assistant Examiner* — Blake Michener

(57) ABSTRACT

A method for heating a subsurface formation using electrical resistance heating is provided. In one aspect, the method includes creating a passage in the subsurface formation between a first wellbore located at least partially within the subsurface formation, and a second wellbore also located at least partially within the subsurface formation. An electrically conductive granular material is placed into the passage so as to provide electrical communication between the first wellbore and the second wellbore. Electrically conductive members are provided in the first wellbore and second wellbore so as to form an electrically conductive flow path comprised of the electrically conductive members, the granular material, and a power source. An electrical current is established through the electrically conductive flow path, thereby resistively heating at least a portion of the conductive members which in turn heats the subsurface formation.

18 Claims, 32 Drawing Sheets

U.S. PATENT DOCUMENTS

| | | | |
|---|---|---|---|
| 2,847,071 A | 8/1958 | De Priester | |
| 2,887,160 A | 5/1959 | De Priester | |
| 2,895,555 A | 7/1959 | De Priester | |
| 2,923,535 A | 2/1960 | Ljungstrom | |
| 2,944,803 A | 7/1960 | Hanson | |
| 2,952,450 A | 9/1960 | Purre | |
| 2,974,937 A | 3/1961 | Kiel | |
| 3,004,601 A | 10/1961 | Bodine | |
| 3,013,609 A | 12/1961 | Brink | |
| 3,095,031 A | 6/1963 | Eurenius et al. | |
| 3,106,244 A | 10/1963 | Parker | |
| 3,109,482 A | 11/1963 | O'Brien | |
| 3,127,936 A | 4/1964 | Eurenius | |
| 3,137,347 A | 6/1964 | Parker | |
| 3,149,672 A | 9/1964 | Orkiszewski et al. | |
| 3,170,815 A | 2/1965 | White | |
| 3,180,411 A | 4/1965 | Parker | |
| 3,183,675 A | 5/1965 | Schroeder | |
| 3,183,971 A | 5/1965 | McEver et al. | |
| 3,194,315 A | 7/1965 | Rogers | |
| 3,205,942 A | 9/1965 | Sandberg | |
| 3,225,829 A | 12/1965 | Chown et al. | |
| 3,228,869 A | 1/1966 | Irish | |
| 3,241,611 A | 3/1966 | Dougan | |
| 3,241,615 A | 3/1966 | Brandt et al. | |
| 3,254,721 A | 6/1966 | Smith et al. | |
| 3,256,935 A | 6/1966 | Nabor et al. | |
| 3,263,211 A | 7/1966 | Heidman | |
| 3,267,680 A | 8/1966 | Schlumberger | |
| 3,271,962 A | 9/1966 | Dahms et al. | |
| 3,284,281 A | 11/1966 | Thomas | |
| 3,285,335 A | 11/1966 | Reistle, Jr. | |
| 3,288,648 A * | 11/1966 | Jones | 429/13 |
| 3,294,167 A | 12/1966 | Vogel | |
| 3,295,328 A | 1/1967 | Bishop | |
| 3,323,840 A * | 6/1967 | Mason et al. | 406/91 |
| 3,358,756 A | 12/1967 | Vogel | |
| 3,372,550 A | 3/1968 | Schroeder | |
| 3,376,403 A | 4/1968 | Mircea | |
| 3,382,922 A | 5/1968 | Needham | |
| 3,400,762 A | 9/1968 | Peacock et al. | |
| 3,436,919 A | 4/1969 | Shock et al. | |
| 3,439,744 A | 4/1969 | Bradley | |
| 3,468,376 A | 9/1969 | Slusser et al. | |
| 3,500,913 A | 3/1970 | Nordgren et al. | |
| 3,501,201 A | 3/1970 | Closmann et al. | |
| 3,502,372 A | 3/1970 | Prats | |
| 3,513,914 A | 5/1970 | Vogel | |
| 3,515,213 A | 6/1970 | Prats | |
| 3,516,495 A | 6/1970 | Patton | |
| 3,521,709 A | 7/1970 | Needham | |
| 3,528,252 A | 9/1970 | Gail | |
| 3,528,501 A | 9/1970 | Parker | |
| 3,547,193 A | 12/1970 | Gill | |
| 3,559,737 A | 2/1971 | Ralstin | |
| 3,572,838 A | 3/1971 | Templeton | |
| 3,599,714 A | 8/1971 | Messman | |
| 3,602,310 A | 8/1971 | Halbert | |
| 3,613,785 A | 10/1971 | Closmann et al. | |
| 3,620,300 A * | 11/1971 | Crowson | 166/248 |
| 3,642,066 A * | 2/1972 | Gill | 166/248 |
| 3,661,423 A | 5/1972 | Garret | |
| 3,692,111 A | 9/1972 | Breithaupt et al. | |
| 3,695,354 A | 10/1972 | Dilgren et al. | |
| 3,700,280 A | 10/1972 | Papadopoulos et al. | |
| 3,724,225 A | 4/1973 | Mancini et al. | |
| 3,729,965 A | 5/1973 | Gartner | |
| 3,730,270 A | 5/1973 | Allred | |
| 3,739,851 A | 6/1973 | Beard | |
| 3,741,306 A | 6/1973 | Papadopoulos | |
| 3,759,328 A | 9/1973 | Ueber et al. | |
| 3,759,329 A | 9/1973 | Ross | |
| 3,759,574 A | 9/1973 | Beard | |
| 3,779,601 A | 12/1973 | Beard | |
| 3,880,238 A | 4/1975 | Tham et al. | |
| 3,882,937 A | 5/1975 | Robinson | |
| 3,882,941 A | 5/1975 | Pelofsky | |
| 3,888,307 A | 6/1975 | Closmann | |
| 3,924,680 A | 12/1975 | Terry | |
| 3,943,722 A | 3/1976 | Ross | |
| 3,948,319 A * | 4/1976 | Pritchett | 166/248 |
| 3,950,029 A | 4/1976 | Timmins | |
| 3,958,636 A | 5/1976 | Perkins | |
| 3,967,853 A | 7/1976 | Closmann et al. | |
| 3,978,920 A | 9/1976 | Bandyopadhyay | |
| 3,999,607 A | 12/1976 | Pennington et al. | |
| 4,003,432 A | 1/1977 | Paull et al. | |
| 4,005,750 A | 2/1977 | Shuck | |
| 4,007,786 A | 2/1977 | Schlinger | |
| 4,008,762 A | 2/1977 | Fisher et al. | |
| 4,008,769 A | 2/1977 | Chang | |
| 4,014,575 A | 3/1977 | French et al. | |
| 4,030,549 A * | 6/1977 | Bouck | 166/280.1 |
| 4,037,655 A | 7/1977 | Carpenter | |
| 4,043,393 A | 8/1977 | Fisher et al. | |
| 4,047,760 A | 9/1977 | Ridley | |
| 4,057,510 A | 11/1977 | Crouch et al. | |
| 4,065,183 A | 12/1977 | Hill et al. | |
| 4,067,390 A | 1/1978 | Camacho et al. | |
| 4,069,868 A | 1/1978 | Terry | |
| 4,071,278 A | 1/1978 | Carpenter et al. | |
| 4,093,025 A | 6/1978 | Terry | |
| 4,096,034 A | 6/1978 | Anthony | |
| 4,125,159 A | 11/1978 | Vann | |
| 4,140,180 A | 2/1979 | Bridges et al. | |
| 4,149,595 A | 4/1979 | Cha | |
| 4,160,479 A | 7/1979 | Richardson et al. | |
| 4,163,475 A | 8/1979 | Cha et al. | |
| 4,167,291 A | 9/1979 | Ridley | |
| 4,169,506 A | 10/1979 | Berry | |
| 4,185,693 A | 1/1980 | Crumb et al. | |
| 4,186,801 A | 2/1980 | Madgavkar et al. | |
| 4,199,025 A * | 4/1980 | Carpenter | 166/248 |
| 4,202,168 A | 5/1980 | Acheson et al. | |
| 4,239,283 A | 12/1980 | Ridley | |
| 4,246,966 A | 1/1981 | Stoddard et al. | |
| 4,250,230 A | 2/1981 | Terry | |
| 4,265,310 A | 5/1981 | Britton et al. | |
| 4,271,905 A | 6/1981 | Redford et al. | |
| 4,272,127 A | 6/1981 | Hutchins | |
| 4,285,401 A | 8/1981 | Erickson | |
| 4,318,723 A | 3/1982 | Holmes et al. | |
| 4,319,635 A | 3/1982 | Jones | |
| 4,320,801 A | 3/1982 | Rowland et al. | |
| 4,324,291 A | 4/1982 | Wong et al. | |
| 4,340,934 A | 7/1982 | Segesman | |
| 4,344,485 A | 8/1982 | Butler | |
| 4,358,222 A | 11/1982 | Landau | |
| 4,362,213 A | 12/1982 | Tabor | |
| 4,368,921 A | 1/1983 | Hutchins | |
| 4,369,842 A | 1/1983 | Cha | |
| 4,372,615 A | 2/1983 | Ricketts | |
| 4,375,302 A | 3/1983 | Kalmar | |
| 4,384,614 A | 5/1983 | Justheim | |
| 4,397,502 A | 8/1983 | Hines | |
| 4,401,162 A | 8/1983 | Osborne | |
| 4,412,585 A | 11/1983 | Bouck | |
| 4,417,449 A | 11/1983 | Hegarty et al. | |
| 4,473,114 A | 9/1984 | Bell et al. | |
| 4,474,238 A | 10/1984 | Gentry et al. | |
| 4,483,398 A | 11/1984 | Peters et al. | |
| 4,485,869 A | 12/1984 | Sresty et al. | |
| 4,487,257 A | 12/1984 | Dauphine | |
| 4,487,260 A | 12/1984 | Pittman et al. | |
| 4,511,382 A | 4/1985 | Valencia et al. | |
| 4,533,372 A | 8/1985 | Valencia et al. | |
| 4,537,067 A | 8/1985 | Sharp et al. | |
| 4,545,435 A | 10/1985 | Bridges et al. | |
| 4,546,829 A | 10/1985 | Martin et al. | |
| 4,550,779 A | 11/1985 | Zakiewicz | |
| 4,567,945 A * | 2/1986 | Segalman | 166/248 |
| 4,570,715 A * | 2/1986 | Van Meurs et al. | 166/302 |
| 4,589,491 A | 5/1986 | Perkins | |
| 4,589,973 A | 5/1986 | Minden | |
| 4,602,144 A | 7/1986 | Vogel | |
| 4,607,488 A | 8/1986 | Karinthi et al. | |
| 4,626,665 A | 12/1986 | Fort, III | |

| | | | |
|---|---|---|---|
| 4,633,948 A | 1/1987 | Closmann | |
| 4,634,315 A | 1/1987 | Owen et al. | |
| 4,637,464 A | 1/1987 | Forgac et al. | |
| 4,640,352 A | 2/1987 | Vanmeurs et al. | |
| 4,645,004 A * | 2/1987 | Bridges et al. | 166/248 |
| 4,671,863 A | 6/1987 | Tejeda | |
| 4,694,907 A | 9/1987 | Stahl et al. | |
| 4,704,514 A | 11/1987 | Van Egmond et al. | |
| 4,705,108 A | 11/1987 | Little et al. | |
| 4,706,751 A | 11/1987 | Gondouin | |
| 4,730,671 A | 3/1988 | Perkins | |
| 4,737,267 A | 4/1988 | Pao et al. | |
| 4,747,642 A | 5/1988 | Gash et al. | |
| 4,754,808 A | 7/1988 | Harmon et al. | |
| 4,776,638 A | 10/1988 | Hahn | |
| 4,779,680 A | 10/1988 | Sydansk | |
| 4,815,790 A | 3/1989 | Rosar et al. | |
| 4,817,711 A | 4/1989 | Jeambey | |
| 4,828,031 A | 5/1989 | Davis | |
| 4,860,544 A | 8/1989 | Krieg et al. | |
| 4,886,118 A | 12/1989 | Van Meurs et al. | |
| 4,923,493 A | 5/1990 | Valencia et al. | |
| 4,926,941 A | 5/1990 | Glandt et al. | |
| 4,928,765 A | 5/1990 | Nielson | |
| 4,929,341 A | 5/1990 | Thirumalachar et al. | |
| 4,974,425 A | 12/1990 | Krieg et al. | |
| 5,016,709 A | 5/1991 | Combe et al. | |
| 5,036,918 A | 8/1991 | Jennings et al. | |
| 5,050,386 A | 9/1991 | Krieg et al. | |
| 5,055,030 A | 10/1991 | Schirmer | |
| 5,055,180 A | 10/1991 | Klaila | |
| 5,082,055 A | 1/1992 | Hemsath | |
| 5,085,276 A | 2/1992 | Rivas et al. | |
| 5,117,908 A | 6/1992 | Hofmann | |
| 5,120,338 A | 6/1992 | Potts, Jr. et al. | |
| 5,217,076 A | 6/1993 | Masek | |
| 5,236,039 A | 8/1993 | Edelstein et al. | |
| 5,255,742 A | 10/1993 | Mikus | |
| 5,275,063 A | 1/1994 | Steiger et al. | |
| 5,297,626 A | 3/1994 | Vinegar et al. | |
| 5,305,829 A | 4/1994 | Kumar | |
| 5,372,708 A | 12/1994 | Gewertz | |
| 5,377,756 A | 1/1995 | Northrop et al. | |
| 5,392,854 A | 2/1995 | Vinegar et al. | |
| 5,411,089 A | 5/1995 | Vinegar et al. | |
| 5,416,257 A | 5/1995 | Peters | |
| 5,620,049 A | 4/1997 | Gipson et al. | |
| 5,621,844 A | 4/1997 | Bridges | |
| 5,661,977 A | 9/1997 | Shnell | |
| 5,730,550 A | 3/1998 | Andersland et al. | |
| 5,838,634 A | 11/1998 | Jones et al. | |
| 5,844,799 A | 12/1998 | Joseph et al. | |
| 5,868,202 A | 2/1999 | Hsu | |
| 5,899,269 A | 5/1999 | Wellington et al. | |
| 5,905,657 A | 5/1999 | Celniker | |
| 5,907,662 A | 5/1999 | Buettner et al. | |
| 5,956,971 A | 9/1999 | Cole et al. | |
| 6,015,015 A | 1/2000 | Luft et al. | |
| 6,016,867 A | 1/2000 | Gregoli et al. | |
| 6,023,554 A | 2/2000 | Vinegar et al. | |
| 6,055,803 A | 5/2000 | Mastronarde | |
| 6,056,057 A | 5/2000 | Vinegar et al. | |
| 6,079,499 A | 6/2000 | Mikus et al. | |
| 6,148,911 A | 11/2000 | Gipson et al. | |
| 6,158,517 A | 12/2000 | Hsu | |
| 6,246,963 B1 | 6/2001 | Cross et al. | |
| 6,247,358 B1 | 6/2001 | Dos Santos | |
| 6,328,104 B1 | 12/2001 | Graue | |
| 6,434,436 B1 | 8/2002 | Adamy et al. | |
| 6,480,790 B1 | 11/2002 | Calvert et al. | |
| 6,540,018 B1 | 4/2003 | Vinegar et al. | |
| 6,581,684 B2 | 6/2003 | Wellington et al. | |
| 6,585,046 B2 | 7/2003 | Neuroth et al. | |
| 6,589,303 B1 | 7/2003 | Lokhandwala et al. | |
| 6,591,906 B2 | 7/2003 | Wellington et al. | |
| 6,607,036 B2 | 8/2003 | Ranson et al. | |
| 6,609,761 B1 | 8/2003 | Ramey et al. | |
| 6,668,922 B2 | 12/2003 | Ziauddin et al. | |
| 6,684,644 B2 | 2/2004 | Mittricker et al. | |
| 6,684,948 B1 | 2/2004 | Savage | |
| 6,708,758 B2 | 3/2004 | de Rouffignac et al. | |
| 6,709,573 B2 | 3/2004 | Smith | |
| 6,712,136 B2 | 3/2004 | de Rouffignac et al. | |
| 6,715,546 B2 | 4/2004 | Vinegar et al. | |
| 6,722,429 B2 | 4/2004 | de Rouffignac et al. | |
| 6,742,588 B2 | 6/2004 | Wellington et al. | |
| 6,745,831 B2 | 6/2004 | De Rouffignac et al. | |
| 6,745,832 B2 | 6/2004 | Wellington et al. | |
| 6,752,210 B2 | 6/2004 | De Rouffignac et al. | |
| 6,754,588 B2 | 6/2004 | Cross et al. | |
| 6,764,108 B2 | 7/2004 | Ernst et al. | |
| 6,782,947 B2 | 8/2004 | de Rouffignac et al. | |
| 6,796,139 B2 | 9/2004 | Briley et al. | |
| 6,820,689 B2 | 11/2004 | Sarada | |
| 6,832,485 B2 | 12/2004 | Sugarmen et al. | |
| 6,854,929 B2 | 2/2005 | Vinegar et al. | |
| 6,858,049 B2 | 2/2005 | Mittricker | |
| 6,877,555 B2 | 4/2005 | Karanikas et al. | |
| 6,880,633 B2 | 4/2005 | Wellington et al. | |
| 6,887,369 B2 | 5/2005 | Moulton et al. | |
| 6,896,053 B2 | 5/2005 | Berchenko et al. | |
| 6,896,707 B2 | 5/2005 | O'Rear et al. | |
| 6,913,078 B2 | 7/2005 | Shahin et al. | |
| 6,918,444 B2 | 7/2005 | Passey et al. | |
| 6,923,258 B2 | 8/2005 | Wellington et al. | |
| 6,932,155 B2 | 8/2005 | Vinegar et al. | |
| 6,948,562 B2 | 9/2005 | Wellington et al. | |
| 6,951,247 B2 | 10/2005 | De Rouffignac et al. | |
| 6,953,087 B2 | 10/2005 | de Rouffignac et al. | |
| 6,964,300 B2 | 11/2005 | Vinegar et al. | |
| 6,969,123 B2 | 11/2005 | Vinegar et al. | |
| 6,988,549 B1 | 1/2006 | Babcock | |
| 6,994,160 B2 | 2/2006 | Wellington et al. | |
| 6,997,518 B2 | 2/2006 | Vinegar et al. | |
| 7,001,519 B2 | 2/2006 | Linden et al. | |
| 7,004,247 B2 | 2/2006 | Cole et al. | |
| 7,004,251 B2 | 2/2006 | Ward et al. | |
| 7,011,154 B2 | 3/2006 | Maher et al. | |
| 7,032,660 B2 | 4/2006 | Vinegar et al. | |
| 7,036,583 B2 | 5/2006 | de Rouffignac et al. | |
| 7,048,051 B2 | 5/2006 | McQueen | |
| 7,051,807 B2 | 5/2006 | Vinegar et al. | |
| 7,055,600 B2 | 6/2006 | Messier et al. | |
| 7,063,145 B2 | 6/2006 | Veenstra et al. | |
| 7,066,254 B2 | 6/2006 | Vinegar et al. | |
| 7,073,578 B2 | 7/2006 | Vinegar et al. | |
| 7,077,198 B2 | 7/2006 | Vinegar et al. | |
| 7,077,199 B2 | 7/2006 | Vinegar et al. | |
| 7,093,655 B2 | 8/2006 | Atkinson | |
| 7,096,942 B1 | 8/2006 | de Rouffignac et al. | |
| 7,096,953 B2 | 8/2006 | de Rouffignac et al. | |
| 7,100,994 B2 | 9/2006 | Vinegar et al. | |
| 7,104,319 B2 | 9/2006 | Vinegar et al. | |
| 7,121,342 B2 | 10/2006 | Vinegar et al. | |
| 7,124,029 B2 | 10/2006 | Jammes et al. | |
| 7,165,615 B2 | 1/2007 | Vinegar et al. | |
| 7,181,380 B2 | 2/2007 | Dusterhoft et al. | |
| 7,198,107 B2 | 4/2007 | Maguire | |
| 7,219,734 B2 | 5/2007 | Bai et al. | |
| 7,225,866 B2 | 6/2007 | Berchenko et al. | |
| 7,243,618 B2 | 7/2007 | Gurevich | |
| 7,322,415 B2 | 1/2008 | de St. Remey | |
| 7,331,385 B2 * | 2/2008 | Symington et al. | 166/248 |
| 7,353,872 B2 | 4/2008 | Sandberg | |
| 7,357,180 B2 | 4/2008 | Vinegar et al. | |
| 7,441,603 B2 | 10/2008 | Kaminsky et al. | |
| 7,461,691 B2 | 12/2008 | Vinegar et al. | |
| 7,484,561 B2 | 2/2009 | Bridges | |
| 7,516,785 B2 | 4/2009 | Kaminsky | |
| 7,516,786 B2 | 4/2009 | Dallas et al. | |
| 7,516,787 B2 | 4/2009 | Kaminsky | |
| 7,546,873 B2 | 6/2009 | Kim et al. | |
| 7,549,470 B2 | 6/2009 | Vinegar et al. | |
| 7,556,095 B2 | 7/2009 | Vinegar | |
| 7,617,869 B2 * | 11/2009 | Carney et al. | 166/248 |
| 7,631,691 B2 * | 12/2009 | Symington et al. | 166/248 |
| 7,644,993 B2 | 1/2010 | Kaminsky et al. | |
| 7,647,971 B2 | 1/2010 | Kaminsky | |

| | | |
|---|---|---|
| 7,647,972 B2 | 1/2010 | Kaminsky |
| 7,654,320 B2 | 2/2010 | Payton |
| 7,669,657 B2 | 3/2010 | Symington et al. |
| 7,743,826 B2 | 6/2010 | Harris et al. |
| 7,798,221 B2 | 9/2010 | Vinegar et al. |
| 7,857,056 B2 | 12/2010 | Kaminsky et al. |
| 7,860,377 B2 | 12/2010 | Vinegar et al. |
| 7,905,288 B2 | 3/2011 | Kinkead |
| 2001/0049342 A1 | 12/2001 | Passey et al. |
| 2002/0013687 A1 | 1/2002 | Ortoleva |
| 2002/0023751 A1* | 2/2002 | Neuroth et al. ............... 166/302 |
| 2002/0029882 A1 | 3/2002 | Rouffignac et al. |
| 2002/0049360 A1 | 4/2002 | Wellington et al. |
| 2002/0077515 A1 | 6/2002 | Wellington et al. |
| 2002/0099504 A1 | 7/2002 | Cross et al. |
| 2003/0080604 A1 | 5/2003 | Vinegar et al. |
| 2003/0085570 A1 | 5/2003 | Ernst et al. |
| 2003/0111223 A1 | 6/2003 | Rouffignac et al. |
| 2003/0131994 A1 | 7/2003 | Vinegar et al. |
| 2003/0131995 A1 | 7/2003 | de Rouffignac et al. |
| 2003/0178195 A1 | 9/2003 | Agee et al. |
| 2003/0183390 A1 | 10/2003 | Veenstra et al. |
| 2003/0192691 A1 | 10/2003 | Vinegar et al. |
| 2003/0196788 A1 | 10/2003 | Vinegar et al. |
| 2003/0196789 A1 | 10/2003 | Wellington et al. |
| 2003/0209348 A1 | 11/2003 | Ward et al. |
| 2003/0213594 A1 | 11/2003 | Wellington et al. |
| 2004/0020642 A1 | 2/2004 | Vinegar et al. |
| 2004/0140095 A1 | 7/2004 | Vinegar et al. |
| 2004/0198611 A1 | 10/2004 | Atkinson |
| 2004/0211557 A1 | 10/2004 | Cole et al. |
| 2005/0051327 A1 | 3/2005 | Vinegar et al. |
| 2005/0252656 A1 | 11/2005 | Maguire |
| 2005/0252832 A1 | 11/2005 | Doyle et al. |
| 2005/0252833 A1 | 11/2005 | Doyle et al. |
| 2005/0269077 A1 | 12/2005 | Sandberg |
| 2005/0269088 A1 | 12/2005 | Vinegar et al. |
| 2006/0021752 A1 | 2/2006 | de St. Remey |
| 2006/0100837 A1 | 5/2006 | Symington et al. |
| 2006/0213657 A1 | 9/2006 | Berchenko et al. |
| 2007/0000662 A1 | 1/2007 | Symington et al. |
| 2007/0023186 A1 | 2/2007 | Kaminsky et al. |
| 2007/0045265 A1 | 3/2007 | McKinzie, II |
| 2007/0045267 A1* | 3/2007 | Vinegar et al. ............... 219/207 |
| 2007/0084418 A1 | 4/2007 | Gurevich |
| 2007/0095537 A1 | 5/2007 | Vinegar |
| 2007/0102359 A1 | 5/2007 | Lombardi et al. |
| 2007/0131415 A1 | 6/2007 | Vinegar et al. |
| 2007/0144732 A1 | 6/2007 | Kim et al. |
| 2007/0209799 A1 | 9/2007 | Vinegar et al. |
| 2007/0246994 A1 | 10/2007 | Kaminsky et al. |
| 2008/0087420 A1 | 4/2008 | Kaminsky et al. |
| 2008/0087421 A1 | 4/2008 | Kaminsky |
| 2008/0087426 A1 | 4/2008 | Kaminsky |
| 2008/0087427 A1 | 4/2008 | Kaminsky et al. |
| 2008/0087428 A1 | 4/2008 | Symington et al. |
| 2008/0173443 A1 | 7/2008 | Symington et al. |
| 2008/0185145 A1 | 8/2008 | Carney et al. |
| 2008/0207970 A1 | 8/2008 | Meurer et al. |
| 2008/0230219 A1 | 9/2008 | Kaminsky |
| 2008/0271885 A1 | 11/2008 | Kaminsky |
| 2008/0283241 A1 | 11/2008 | Kaminsky et al. |
| 2008/0289819 A1 | 11/2008 | Kaminsky et al. |
| 2008/0290719 A1 | 11/2008 | Kaminsky et al. |
| 2009/0038795 A1 | 2/2009 | Kaminsky et al. |
| 2009/0050319 A1 | 2/2009 | Kaminsky et al. |
| 2009/0101346 A1 | 4/2009 | Vinegar et al. |
| 2009/0101348 A1 | 4/2009 | Kaminsky |
| 2009/0107679 A1 | 4/2009 | Kaminsky |
| 2009/0133935 A1 | 5/2009 | Kinkead |
| 2009/0145598 A1 | 6/2009 | Symington et al. |
| 2009/0308608 A1 | 12/2009 | Kaminsky et al. |
| 2010/0078169 A1 | 4/2010 | Symington et al. |
| 2010/0089575 A1 | 4/2010 | Kaminsky et al. |
| 2010/0089585 A1 | 4/2010 | Kaminsky |
| 2010/0095742 A1 | 4/2010 | Symington et al. |
| 2010/0101793 A1* | 4/2010 | Symington et al. ............ 166/302 |
| 2010/0218946 A1 | 9/2010 | Symington et al. |
| 2010/0282460 A1 | 11/2010 | Stone et al. |
| 2010/0319909 A1 | 12/2010 | Symington et al. |

FOREIGN PATENT DOCUMENTS

| | | |
|---|---|---|
| CA | 1288043 | 8/1991 |
| CA | 2 560 223 | 3/2007 |
| EP | 0387846 | 9/1990 |
| EP | 0866212 | 9/1998 |
| GB | 855408 | 11/1960 |
| GB | 1454324 | 11/1976 |
| GB | 1463444 | 2/1977 |
| GB | 1 478 880 | 7/1977 |
| GB | 1501310 | 2/1978 |
| GB | 1559948 | 1/1980 |
| GB | 1595082 | 8/1981 |
| WO | WO 82/01408 | 4/1982 |
| WO | WO 90/06480 | 6/1990 |
| WO | WO 99/67504 | 12/1999 |
| WO | WO 01/78914 | 10/2001 |
| WO | WO 01/81505 | 11/2001 |
| WO | WO 02/085821 | 10/2002 |
| WO | WO 2005/010320 | 2/2005 |
| WO | WO 2005/045192 | 5/2005 |
| WO | WO 2006/115943 | 2/2006 |
| WO | WO 2007/033371 | 3/2007 |
| WO | WO 2007/050445 | 5/2007 |
| WO | WO 2007/050479 | 5/2007 |
| WO | WO 2010/047859 | 4/2010 |

OTHER PUBLICATIONS

International Search Report dated Jun. 9, 2008, for PCT/US08/03069 filed Mar. 7, 2008, 12 pages.
Katz, D.L. and A Firoozabadi (1978) "Predicting Phase Behavior of Condensate/Crude-Oil Systems Using Methane Interaction Coefficients, *J. Petroleum Technology*", pp. 1649-1655.
Salomonsson, G. (1951) "The Ljunstrom In-Situ Method for Shale-Oil Recovery" *Oil Shale and Cannel Coal* (vol. 2), *Proceedings of the 2nd Oil Shale and Cannel Coal Conference*, Glasgow, Jul. 1951, pp. 260-280.
Sierra, R. et al. (2001) "Promising Progress in Field Application of Reservoir Electrical Heating Methods," *SPE Paper* 69709.
Yen, T. F. et al. (1976) *Oil Shale*, Amsterdam, Elsevier, p. 292. (Historical Reference only).
U.S. Appl. No. 12/074,899, filed Mar. 7, 2008.
Ali, A.H.A, et al, (2003) "Watching Rocks Change-Mechanical Earth Modeling", *Oilfield Review*, pp. 22-39.
Allred, (1964) "Some Characteristic Properties of Colorado Oil Shale Which May Influence in Situ Processing," *Quarterly Colo. School Of Mines*, 1st Symposium Oil Shale, v.59. No. 3, pp. 47-75.
Asquith, G., et al., (2004) *Basic Well Log Analysis*, Second Ed., Chapter 1, pp. 1-20.
Ball, J.S., et al. (1949) "Composition of Colorado Shale-Oil Naphtha", *Industrial and Engineering Chemistry*, vol. 41, No. 3 pp. 581-587.
Barnes, A. L. et al. (1968) "Quarterly of the Colorado School of Mines" *Fifth Symposium on Oil Shale*, v. 63(4), Oct. 1968, pp. 827-852.
Bastow, T.P., (1998) Sedimentary Processes Involving Aromatic Hydrocarbons >>. Thesis (PhD in Applied Chemistry) Curtin University of Technology (Australia), December.
Baugman, G. L. (1978) *Synthetic Fuels Data Handbook*, Second Edition, Cameron Engineers Inc.
Berry, K. L., et al. (1982) "Modified in situ retorting results of two field retorts", Gary, J. H., ed., 15th Oil Shale Symp., CSM, pp. 385-396.
Blanton, T. L. et al, (1999) "Stress Magnitudes from Logs: Effects of Tectonic Strains and Temperature", *SPE Reservoir Eval. & Eng. 2*, vol. 1, February, pp. 62-68.
Boyer, H. E. et al. (1985) "Chapter 16: Heat-Resistant Materials," *Metals Handbook*, American Society for Metals, 16 pages.
Brandt, A. R., "*Converting Oil Shale to Liquid Fuels: Energy Inputs and Greenhouse Gas Emissions of the Shell in Situ Conversion Process,*" Environ. Sci. Technol. 2008, 42, pp. 7489-7495.

Brandt, H. et al. (1965) "Stimulating Heavy Oil Reservoirs With Downhole Air-Gas Burners," *World Oil*, (Sep. 1965), pp. 91-95.

Bridges, J. E., et al. (1983) "The IITRI in situ fuel recovery process", *J. Microwave Power*, v. 18, pp. 3-14.

Burnham, A. K. et al. (1983) "High-Pressure Pyrolysis of Green River Oil Shale" in Geochemistry and Chemistry of Oil Shales: ACS Symposium Series.

Burwell, E. L. et al. (1970) "Shale Oil Recovery by In-Situ Retorting—A Pilot Study" Journal of Petroleum Engr., Dec. 1970, pp. 1520-1524.

Charlier, R. et al, (2002) "Numerical Simulation of the Coupled Behavior of Faults During the Depletion of a High-Pressure/High-Temperature Reservoir", *Society of Petroleum Engineers*, SPE 78199, pp. 1-12.

Chute, F. S., and Vermeulen, F. E., (1988) "Present and potential applications of electromagnetic heating in the in situ recovery of oil", AOSTRA J. Res., v. 4, pp. 19-33.

Chute, F. S. and Vermeulen, F.E., (1989) "Electrical heating of reservoirs", Hepler, L., and Hsi, C., eds., AOSTRA Technical Handbook on Oil Sands, Bitumens, and Heavy Oils, Chapt. 13, pp. 339-376.

Cipolla, C.L., et al. (1994), "Practical Application of in-situ Stress Profiles", *Society of Petroleum Engineers*, SPE 28607, pp. 487-499.

Cook, G. L. et al. (1968) "The Composition of Green River Shale Oils" United Nations Symposium of the Development and Utilization of Oil Shale Resources, 23 pgs.

Covell, J. R., et al. (1984) "Indirect in situ retorting of oil shale using the TREE process", Gary, J. H., ed., 17th Oil Shale Symposium Proceedings, Colorado School of Mines, pp. 46-58.

Cummins, J. J. et al. (1972) "Thermal Degradation of Green River Kerogen at 150 to 350C: Rate of Product Formation, Report of Investigation 7620," *US Bureau of Mines*, 1972.

Day, R. L., (1998) "Solution Mining of Colorado Nahcolite, Wyoming State Geological Survey Public Information Circular 40," *Proceedings of the First International Soda Ash Conference*, V.11 (Rock Springs, Wyoming, Jun. 10-12) pp. 121-130.

DePriester, C. et al. (1963) "Well Stimulation by Downhole Gas-Air Burner," *Jrnl. Petro. Tech.*, (Dec. 1963), pp. 1297-1302.

Domine, F. et al. (2002) "Up to What Temperature is Petroleum Stable? New Insights from a 5200 Free Radical Reactions Model", *Organic Chemistry*, 33, pp. 1487-1499.

Dougan, P. M. et al. (1981) "BX in Situ Oil Shale Project," *Colorado School of Mines; Fourteenth Oil Shale Symposium Proceedings*, 1981, pp. 118-127.

Dougan, P. M. (1979) "The BX in Situ Oil Shale Project," *Chem. Engr. Progress*, pp. 81-84.

Duncan, D. C., (1967) "Geologic Setting of Oil Shale Deposits and World Prospects," *in Proceedings of the Seventh World Petroleum Congress*, v.3, Elsevier Publishing, pp. 659-667.

Dunks, G. et al. (1983) "Electrochemical Studies of Molten Sodium Carbonate," *Inorg. Chem.*, 22, pp. 2168-2177.

Dusseault, M.B. (1998) "Casing Shear: Causes, Cases, Cures", Society of Petroleum Engineers, SPE 48,864 pp. 337-349.

Dyni, J. R., (1974) "Stratigraphy and Nahcolite Resources of the Saline Facies of the Green River Formation in Northwest Colorado," in D.K. Murray (ed.), *Guidebook to the Energy Resources of the Piceance Creek Basin Colorado, Rocky Mountain Association of Geologists*, Guidebook, pp. 111-122.

Fainberg, V. et al. (1998) "Integrated Oil Shale Processing Into Energy and Chemicals Using Combined-Cycle Technology," *Energy Sources*, v.20.6, Abstract, 1 page.

Farouq Ali, S. M., (1994), "Redeeming features of in situ combustion", DOE/NIPER *Symposium on in Situ Combustion Practices-Past, Present, and Future Application*, Tulsa, Ok, Apr. 21-22, No. ISC 1, p. 3-8.

Fisher, S. T. (1980) "A Comparison of Eleven Processes for Production of Energy from the Solid Fossil Fuels of North America," SPE 9098, pp. 1-27.

Fox, J. P, (1980) "Water-related Impacts of In-Situ Oil Shale Processing," California Univ., Berkeley, Lawrence Berkeley Lab, Chapters 6-7.

Fredrich, J. T. et al, (1996) "Three-Dimensional Geomechanical Simulation of Reservoir Compaction and Implications for Well Failures in the Belridge Diatomite", *Society of Petroleum Engineers* SPE 36698, pp. 195-210.

Fredrich, J. T. et al, (2000) "Geomechanical Modeling of Reservoir Compaction, Surface Subsidence, and Casing Damage at the Belridge Diatomite Field", *SPE Reservoir Eval. & Eng.3*, vol. 4, August, pp. 348-359.

Fredrich, J. T. et al, (2003) "Stress Perturbations Adjacent to Salt Bodies in the Deepwater Gulf of Mexico", *Society of Petroleum Engineers* SPE 84554, pp. 1-14.

Frederiksen, S. et al, (2000) "A Numerical Dynamic Model for the Norwegian-Danish Basin", *Tectonophysics*, 343, 2001, pp. 165-183.

Freund, H. et al., (1989) "Low-Temperature Pyrolysis of Green River Kerogen", *The American Association of Petroleum Geologists Bulletin*, v. 73, No. 8 (Aug.) pp. 1011-1017.

Gatens III, J. M. et al, (1990) "In-Situ Stress Tests and Acoustic Logs Determine Mechanical Properties and Stress Profiles in the Devonian Shales", *SPE Formation Evaluation* SPE 18523, pp. 248-254.

Garthoffner, E. H., (1998), "Combustion front and burned zone growth in successful California ISC projects", SPE 46244, pp. 1-11.

Greaves, M., et al. (1994) "In situ combustion (ISC) processes: 3D studies of vertical and horizontal wells", *Europe Comm. Heavy Oil Technology in a Wider Europe Symposium*, Berlin, Jun. 7-8, p. 89-112.

Hansen, K. S. et al, (1989) "Earth Stress Measurements in the South Belridge Oil Field, Kern County, California", *SPE Formation Evaluation*, Dec. pp. 541-549.

Hansen, K. S. et al, (1993) "Finite-Element Modeling of Depletion-Induced Reservoir Compaction and Surface Subsidence in the South Belridge Oil Field, California", SPE 26074, pp. 437-452.

Hansen, K. S. et al, (1995) "Modeling of Reservoir Compaction and Surface Subsidence at South Belridge", *SPE Production & Facilities*, August pp. 134-143.

Hardy, M. et al. (2003) "Solution Mining of Nahcolite at the American Soda Project, Piceance Creek, Colorado," *SME Annual Mtg.*, Feb. 24-26, Cincinnati, Ohio, Preprint 03-105.

Hardy, M., et al. (2003) "Solution Mining of Nahcolite at American Soda's Yankee Gulch Project," *Mining Engineering*, Oct. 2003, pp. 23-31.

Henderson, W, et al. (1968) "Thermal Alteration as a Contributory Process to the Genesis of Petroleum", *Nature* vol. 219, pp. 1012-1016.

Hilbert, L. B. et al, (1999) "Field-Scale and Wellbore Modeling of Compaction-Induced Casing Failures", *SPE Drill. & Completion*, 14(2), June pp. 92-101.

Hill, G.R. et al. (1967) "The Characteristics of a Low Temperature in Situ Shale Oil," $4^{th}$ *Symposium on Oil Shale, Quarterly of the Colorado School of Mines*, v.62(3), pp. 641-656.

Hill, G. R. et al. (1967) "Direct Production of a Low Pour Point High Gravity Shale Oil", *I&EC Product Research and Development*, 6(1), March pp. 52-59.

Holditch, S. A., (1989) "Pretreatment Formation Evaluation", *Recent Advances in Hydraulic Fracturing*, SPE Monograph vol. 12, Chapter 2 (Henry L. Doherty Series), pp. 39-56.

Holmes, A. S. et al. (1982) "Process Improves Acid Gas Separation," *Hydrocarbon Processing*, pp. 131-136.

Holmes, A. S. et al. (1983) "Pilot Tests Prove Out Cryogenic Acid-Gas/Hydrocarbon Separation Processes," *Oil & Gas Journal*, pp. 85-91.

Humphrey, J. P. (1978) "Energy from in situ processing of Antrim oil shale", *DOE Report FE-2346-29*.

Ingram, L. L. et al. (1983) "Comparative Study of Oil Shales and Shale Oils from the Mahogany Zone, Green River Formation (USA) and Kerosene Creek Seam, Rundle Formation (Australia)," *Chemical Geology*, 38, pp. 185-212.

Ireson, A. T. (1990) "Review of the Soluble Salt Process for In-Situ Recovery of Hydrocarbons from Oil Shale with Emphasis on Leaching and Possible Beneficiation," *23rd Colorado School of Mines Oil Shale Symposium* (Golden, Colorado), 152-161.

Jacobs, H. R. (1983) "Analysis of the Effectiveness of Steam Retorting of Oil Shale", *AIChE Symposium Series—Heat Transfer—*Seattle 1983 pp. 373-382.

Johnson, D. J. (1966) "Decomposition Studies of Oil Shale," *University of Utah*, May 1966.

Kenter, C. J. et al, (2004) "Geomechanics and 4D: Evaluation of Reservoir Characteristics from Timeshifts in the Overburden", *Gulf Rocks 2004, 6th North America Rock Mechanics Symposium (NARMS): Rock Mechanics Across Borders and Disciplines*, Houston, Texas, Jun. 5-9, ARMA/NARMS 04-627.

Kuo, M. C. T. et al (1979) "Inorganics leaching of spent shale from modified in situ processing," J. H. Gary (ed.) *Twelfth Oil Shale Symposium Proceedings*, Colorado School of Mines, Golden Co., Apr. 18-20, pp. 81-93.

Laughrey, C. D. et al. (2003) "Some Applications of Isotope Geochemistry for Determining Sources of Stray Carbon Dioxide Gas," *Environmental Geosciences*, 10(3), pp. 107-122.

Lekas, M. A. et al. (1991) "Initial evaluation of fracturing oil shale with propellants for in situ retorting—Phase 2", *DOE Report DOE/MC/11076-3064*.

Le Pourhiet, L. et al, (2003) "Initial Crustal Thickness Geometry Controls on the Extension in a Back Arc Domain: Case of the Gulf of Corinth", *Tectonics*, vol. 22, No. 4, pp. 6-1-6-14.

Lundquist, L. (1951) "Refining of Swedish Shale Oil", *Oil Shale Cannel Coal Conference*, vol./Issue: 2, pp. 621-627.

Marotta, A. M. et al, (2003) "Numerical Models of Tectonic Deformation at the Baltica-Avalonia Transition Zone During the Paleocene Phase of Inversion", *Tectonophysics*, 373, pp. 25-37.

Miknis, F.P, et al (1985) "Isothermal Decomposition of Colorado Oil Shale", DOE/FE/60177-2288 (DE87009043) May 1985.

Mohammed, Y.A., et al (2001) "A Mathematical Algorithm for Modeling Geomechanical Rock Properties of the Khuff and PreKhuff Reservoirs in Ghawar Field", *Society of Petroleum Engineers* SPE 68194, pp. 1-8.

Molenaar, M. M. et al, (2004) "Applying Geo-Mechanics and 4D: '4D In-Situ Stress' as a Complementary Tool for Optimizing Field Management", *Gulf Rocks 2004, 6th North America Rock Mechanics Symposium (NARMS): Rock Mechanics Across Boniers and Disciplines*, Houston, Texas, Jun. 5-9, ARMA/NARMS 04-639, pp. 1-7.

Moschovidis, Z. (1989) "Interwell Communication by Concurrent Fracturing—a New Stimulation Technique", *Journ. of Canadian Petro. Tech*. 28(5), pp. 42-48.

Motzfeldt, K. (1954) "The Thermal Decomposition of Sodium Carbonate by the Effusion Method," *Jml. Phys. Chem.*, v. LIX, pp. 139-147.

Mut, Stephen (2005) "The Potential of Oil Shale," *Shell Oil Presentation at National Academies, Trends in Oil Supply Demand*, in Washington, DC, Oct. 20-21, 2005, 11 pages.

Needham, et al (1976) "Oil Yield and Quality from Simulated In-Situ Retorting of Green River Oil Shale", Society of Petroleum Engineers of American Institute of Mining, Metallurgical and Petroleum Engineers, Inc. SPE 6069.

Newkirk, A. E. et al. (1958) "Drying and Decomposition of Sodium Carbonate," *Anal. Chem.*, 30(5), pp. 982-984.

Nielsen, K. R., (1995) "Colorado Nahcolite: A Low Cost Source of Sodium Chemicals," *7th Annual Canadian Conference on Markets for Industrial Minerals*, (Vancouver, Canada, Oct. 17-18) pp. 1-9.

Nottenburg, R.N. et al. (1979) "Temperature and stress dependence of electrical and mechanical properties of Green River oil shale," *Fuel*, 58, pp. 144-148.

Nowacki, P. (ed.), (1981) *Oil Shale Technical Handbook*, Noyes Data Corp.

Pattillo, P. D. et al, (1998) "Reservoir Compaction and Seafloor Subsidence at Valhall", SPE 47274, 1998, pp. 377-386.

Pattillo, P. D. et al, (2002) "Analysis of Horizontal Casing Integrity in the Valhall Field", SPE 78204, pp. 1-10.

Persoff, P. et al. (1979) "Control strategies for abandoned in situ oil shale retorts," J. H. Gary (ed.), *12th Oil Shale Symposium Proceedings*, Colorado School of Mines, Golden, CO., Apr. 18-20, pp. 72-80.

Peters, G., (1990) "The Beneficiation of Oil Shale by the Solution Mining of Nahcolite," *23rd Colorado School of Mines Oil Shale Symposium* (Golden, Co) pp. 142-151.

Plischke, B., (1994) "Finite Element Analysis of Compaction and Subsidence—Experience Gained from Several Chalk Fields", *Society of Petroleum Engineers*, SPE 28129, 1994, pp. 795-802.

Prats, M. et al. (1975) "The Thermal Conductivity and Diffusivity of Green River Oil Shales", *Journal of Petroleum Technology*, pp. 97-106, Jan. 1975.

Prats, M., et al. (1977) "Soluble-Salt Processes for In-Situ Recovery of Hydrocarbons from Oil Shale," *Journal of Petrol. Technol.*, pp. 1078-1088.

Rajeshwar, K. et al. (1979) "Review: Thermophysical Properties of Oil Shales", *Journal of Materials Science*, v.14, pp. 2025-2052.

Ramey, M. et al. (2004) "The History and Performance of Vertical Well Solution Mining of Nahcolite ($NaHCO_3$) in the Piceance Basin, Northwestern, Colorado, USA," *Solution Mining Research Institute: Fall 2004 Technical Meeting* (Berlin, Germany).

Reade Advanced Materials; 2006 About.com Electrical resistivity of materials. [Retrieved On Oct. 15, 2009] Retrieved from internet: URL: http://www.reade.com/Particle%5FBriefings/elec%5Fres.html. Entire Document.

Riva, D. et al. (1998) "Suncor down under: the Stuart Oil Shale Project", Annual Meeting of the *Canadian Inst. of Mining, Metallurgy, and Petroleum*, Montreal, May 3-7.

Rupprecht, R. (1979) "Application of the Ground-Freezing Method to Penetrate a Sequence of Water-Bearing and Dry Formations—Three Construction Cases," *Engineering.Geology*, 13, pp. 541-546.

Ruzicka, D.J. et al. (1987) "Modified Method Measures Bromine Number of Heavy Fuel Oils", *Oil & Gas Journal*, 85(31), Aug. 3, pp. 48-50.

Sahu, D. et al. (1988) "Effect of Benzene and Thiophene on Rate of Coke Formation During Naphtha Pyrolysis", *Canadian Journ. of Chem. Eng.*, 66, Oct. pp. 808-816.

Sandberg, C. R. et al. (1962) "In-Situ Recovery of Oil from Oil Shale—A Review and Summary of Field and Laboratory Studies," RR62.039FR, Nov. 1962.

Siskin, M. et al. (1995) "Detailed Structural Characterization of the Organic Material in Rundel Ramsay Crossing and Green River Oil Shales," Kluwer Academic Publishers, pp. 143-158.

Smart, K. J. et al, (2004) "Integrated Structural Analysis and Geomechanical Modeling: an Aid to Reservoir Exploration and Development", *Gulf Rocks 2004, 6th North America Rock Mechanics Symposium (NARMS): Rock Mechanics Across Borders and Disciplines*, Houston, Texas, Jun. 5-9, ARMA/NARMS 04-470.

Smith, F. M. (1966) "A Down-hole Burner—Versatile Tool for Well Heating," *25th Tech Conf. on Petroleum Production*, Pennsylvania State Univ., pp. 275-285.

Sresty, G. C.; et al. (1982) "Kinetics of Low-Temperature Pyrolysis of Oil Shale by the IITRI RF Process," *Colorado School of Mines; Fifteenth Oil Shale Symposium Proceedings*, Aug. 1982, pp. 411-423.

Stevens, A. L., and Zahradnik, R. L. (1983) "Results from the simultaneous processing of modified in situ retorts 7& 8", Gary, J. H., ed., *16th Oil Shale Symp.*, CSM, p. 267-280.

Stoss, K. et al. (1979) "Uses and Limitations of Ground Freezing With Liquid Nitrogen," *Engineering Geology*, 13, pp. 485-494.

Symington, W.A., et al (2006) ExxonMobil's electrofrac process for in situ oil shale conversion *26th Oil Shale Symposium*, Colorado School of Mines.

Syunyaev, Z.I. et al. (1965) "Change in the Resistivity of Petroleum Coke on Calcination," Chemistry and Technology of Fuels and Oils, 1(4), pp. 292-295.

Templeton, C. C. (1978) "Pressure-Temperature Relationship for Decomposition of Sodium Bicarbonate from 200 to 600° F," *J. of Chem. and Eng. Data*, 23(1), pp. 7-8.

Thomas, A. M. (1963) "Thermal Decomposition of Sodium Carbonate Solutions," *J. of Chem. And Eng. Data*, 8(1), pp. 51-54.

Thomas, G. W. (1964) "A Simplified Model of Conduction Heating in Systems of Limited Permeability," *Soc.Pet. Engineering Journal*, Dec. 1964, pp. 335-344.

Thomas, G. W. (1966) "Some Effects of Overburden Pressure on Oil Shale During Underground Retorting," *Society of Petroleum Engineers Journal*, pp. 1-8, Mar. 1966.

Tihen, S. S. Et al. (1967) "Thermal Conductivity and Thermal Diffusivity of Green River Oil Shale," Thermal Conductivity: Proceedings of the Seventh Conference (Nov. 13-16, 1967), *NBS Special Publication* 302, pp. 529-535, 1968.

Tisot, P. R. et al. (1970) "Structural Response of Rich Green River Oil Shales to Heat and Stress and Its Relationship to Induced Permeability," *Journal of Chemical Engineering Data*, v. 15(3), pp. 425-434.

Tisot, P. R. et al. (1971) "Structural Deformation of Green River Oil Shale as It Relates to In Situ Retorting," *US Bureau of Mines Report of Investigations* 7576, 1971.

Tisot, P. R. (1975) "Structural Response of Propped Fractures in Green River Oil Shale as It Relates to Underground Retorting," *US Bureau of Mines Report of Investigations* 8021.

Tissot, B. P., and Welte, D. H. (1984) *Petroleum Formation and Occurrence*, New York, Springer-Verlag, p. 160-174, 175-198 and 254-266.

Tissot, B. P., and Welte, D. H. (1984) *Petroleum Formation and Occurrence*, New York, Springer-Verlag, p. 267-289 and 470-492.

Turta, A., (1994), "In situ combustion—from pilot to commercial application", *DOE/NIPER Symposium on In Situ Combustion Practices-Past, Present, and Future Application*, Tulsa, OK, Apr. 21-22, No. ISC 3, p. 15-39.

Tyner, C. E. et al. (1982) "Sandia/Geokinetics Retort 23: a horizontal in situ retorting experiment", Gary, J. H., ed., *15th Oil Shale Symp.*, CSM, p. 370-384.

Tzanco, E. T., et al. (1990), "Laboratory Combustion Behavior of Countess B Light Oil", Petroleum Soc. of CIM and SPE, Calgary, Jun. 10-13, No. CIM/SPE 90-63, p. 63.1-63.16.

Veatch, Jr. R.W. And Martinez, S.J., et al. (1990) "Hydraulic Fracturing: Reprint Series No. 28", *Soc. of Petroleum Engineers SPE* 14085, Part I, Overview.

Warpinski, n. R., (1989) "Elastic and Viscoelastic Calculations of Stresses in Sedimentary Basins", *SPE Formation Evaluation*, vol. 4, pp. 522-530.

Yoon, E. et al. (1996) "High-Temperature Stabilizers for Jet Fuels and Similar Hydrocarbon Mixtures. 1. Comparative Studies of Hydrogen Donors", *Energy & Fuels*, 10, pp. 806-811.

Oil & Gas Journal, 1998, "Aussie oil shale project moves to Stage 2", Oct. 26, p. 42.

"Encyclopedia of Chemical Technology" (4$^{th}$ ed.), Alkali and Chlorine Products, pp. 1025-1039 (1998).

EP Search Report dated Dec. 29, 2003 (RS 110243, Corresponding to US Pat 7,331,385).

EP Search Report dated Mar. 17, 2004 (RS 110686, Corresponding to U.S. Patent 7,441,603).

EP Search Report, Supplementary dated Apr. 10, 2007 (EP 04 77 9878 Corresponding to U.S. Patent 7,441,603).

EP Search Report dated Apr. 29, 2005 (RS 112183, Corresponding to U.S. Appl. No. 11/250,804, Published as US 2006/0100837 on May 11, 2008).

EP Search Report dated Jun. 2, 2006 (RS113865, corresponding to U.S. Appl. No. 11/726,651).

EP Search Report dated Feb. 16, 2007 (RS 114808, Corresponding to U.S. Appl. No. 11/973,746, Published as US 2008/0087420 on May 17, 2008).

EP Search Report dated Feb. 16, 2007 (RS 114804, Corresponding to U.S. Appl. No. 11/973,750, Published as US 2008/0087427 on Apr. 17, 2008).

EP Search Report dated Mar. 21, 2007 (RS 114890, Corresponding to U.S. Patent 7,516,787).

EP Search Report dated Feb. 16, 2007 (RS 114807, Corresponding to U.S. Patent 7,669,657).

EP Search Report dated Nov. 13, 2007 (RS 115479, Corresponding to U.S. Appl. No. 12/148,414).

EP Search Report dated Aug. 29, 2007 (No. RS115553, Corresponding to U.S. Appl. No. 12/148,388).

EP Search Report dated Jul. 5, 2007 (RS 115432 Corresponding to U.S. Appl. No. 12/075,087).

EP Search Report dated Mar. 12, 2009 (EP 08 00 3956,-Corresponding to U.S. Appl. No. 12/271,521).

EP Search Report dated Aug. 29, 2007 (RS 1155554, Corresponding to U.S. Appl. No. 12/154,238).

EP Search Report dated Aug. 28, 2007 (RS 1155555, Corresponding to U.S. Appl. No. 12/154,256).

International Search Report for PCT/US01/09247 Jun. 20, 2001.
International Search Report for PCT/US04/11508, Jan. 5, 2005.
International Search Report for PCT/US08/88045, Feb. 12, 2009.
International Search Report for PCT/US04/24947 Mar. 10, 2005.
International Search Report for PCT/US07/07133, Jan. 4, 2008.
International Search Report for PCT/US07/21673 Jun. 24, 2008.
International Search Report for PCT/US07/21668 Apr. 29, 2008.
International Search Report for PCT/US07/21666 Apr. 4, 2008.
International Search Report for PCT/US07/21669, Apr. 29, 2008.
International Search Report for PCT/US07/21660 Apr. 4, 2008.
International Search Report for PCT/US07/021968, May 14, 2008.
International Search Report for PCT/US07/021968, May 21, 2008.
International Search Report for PCT/US08/005008, Aug. 29, 2008.
International Search Report for PCT/US08/05056, Aug. 25, 2008.
International Search Report for PCT/US08/003043, Jul. 2, 2008.
International Search Report for PCT/US08/083815, Mar. 20, 2009.
International Search Report for PCT/US08/006462 Sep. 22, 2008.
International Search Report for PCT/US08/006463 Aug. 22, 2008.
International Search Report for PCT/US07/21645 Apr. 21, 2008.
International Search Report for PCT/US09/037419 Jul. 7, 2009.
International Search Report for PCT/US09/055403, Oct. 22, 2009.
International Search Report for PCT/US10/20342 Feb. 26, 2010.
International Search Report for PCT/US10/031910 Aug. 3, 2010.
International Search Report for PCT/US10/057204 Jan. 27, 2011.
U.S. Appl. No. 12/630,636 Office Action mailed Oct. 27, 2010.
U.S. Appl. No. 11/250,804 Office Action mailed Oct. 16, 2008.
U.S. Appl. No. 11/250,804 Office Action mailed Jun. 11, 2009.
U.S. Appl. No. 11/973,746 Office Action mailed Jun. 25, 2009.
U.S. Appl. No. 11/973,746 Office Action mailed Nov. 8, 2010.
U.S. Appl. No. 11/973,750 Office Action mailed Dec. 4, 2008.
U.S. Appl. No. 11/973,750 Office Action mailed Jul. 22, 2009.
U.S. Appl. No. 12/638,630 Office Action mailed Mar. 16, 2011.
U.S. Appl. No. 12/712,904 Office Action mailed Nov. 10, 2010.
U.S. Appl. No. 12/148,414 Office Action mailed May 19, 2010.
U.S. Appl. No. 12/148,414 Office Action mailed Oct. 22, 2010.
U.S. Appl. No. 12/148,388 Office Action mailed Jun. 10, 2010.
U.S. Appl. No. 12/148,388 Office Action mailed Nov. 19, 2010.
U.S. Appl. No. 12/074,899 Office Action mailed Dec. 16, 2009.
U.S. Appl. No. 12/074,899 Office Action mailed Jul. 26, 2010.
U.S. Appl. No. 12/074,899 Office Action mailed Jan. 4, 2011.
U.S. Appl. No. 12/075,087 Office Action mailed Oct. 12, 2010.
U.S. Appl. No. 12/075,087 Office Action mailed Mar. 7, 2011.
U.S. Appl. No. 12/271,521 Office Action mailed Nov. 2, 2010.
U.S. Appl. No. 11/973,898 Office Action mailed May 6, 2010.
U.S. Appl. No. 11/973,898 Office Action mailed Dec. 20, 2010.
U.S. Appl. No. 12/405,901 Office Action mailed Feb. 14, 2011.
U.S. Appl. No. 12/154,238 Office Action mailed Apr. 22, 2011.
U.S. Appl. No. 12/154,256 Office Action mailed May 09, 2011.
U.S. Appl. No. 12/148,414 Office Action mailed May 17, 2011.
U.S. Appl. No. 12/443,680 Office Action mailed Jun. 23, 2011.
U.S. Pat No. 6,918,444—Office Action mailed Sep. 16, 2004.
US Pat No. 7,331,385—Office Action mailed Jul. 12, 2007.
U.S. Pat No. 7,631,691—Office Action mailed Mar. 18, 2009.
U.S. Pat No. 7,441,603—Office Action mailed Feb. 25, 2008.
U.S. Pat No. 7,857,056—Office Action mailed Mar. 19, 2010.
US Pat No. 7,516,785—Office Action mailed Apr. 2, 2008.
US Pat No. 7,516,787—Office Action mailed Apr. 3, 2008.
U.S. Pat No. 7,647,972—Office Action mailed May 19, 2009.
U.S. Pat No. 7,647,971—Office Action mailed May 21, 2009.
U.S. Pat No. 7,669,657—Office Action mailed Jun. 26, 2008.
U.S. Pat No. 7,669,657—Office Action mailed Dec. 15, 2008.
U.S. Pat No. 7,669,657—Office Action mailed Sep. 15, 2009.
US Pat No. 7,644,993—Office Action mailed Jun. 24, 2009.

* cited by examiner

GRANULAR ELECTRICAL CONNECTIONS FOR IN SITU FORMATION HEATING

CROSS-REFERENCE TO RELATED APPLICATIONS

This application claims the benefit of pending U.S. provisional patent application Ser. No. 60/919,391, which was filed on Mar. 22, 2007. That application is titled "Granular Electrical Connections for In Situ Formation Heating" and is incorporated herein in its entirety by reference.

BACKGROUND OF THE INVENTION

1. Field of the Invention

The present invention relates to the field of hydrocarbon recovery from subsurface formations. More specifically, the present invention relates to the in situ recovery of hydrocarbon fluids from organic-rich rock formations including, for example, oil shale formations, coal formations and tar sands formations. The present invention also relates to methods for heating a subsurface formation using electrical energy.

2. Background of the Invention

Certain geological formations are known to contain an organic matter known as "kerogen." Kerogen is a solid, carbonaceous material. When kerogen is imbedded in rock formations, the mixture is referred to as oil shale. This is true whether or not the mineral is, in fact, technically shale, that is, a rock formed from compacted clay.

Kerogen is subject to decomposing upon exposure to heat over a period of time. Upon heating, kerogen molecularly decomposes to produce oil, gas, and carbonaceous coke. Small amounts of water may also be generated. The oil, gas and water fluids become mobile within the rock matrix, while the carbonaceous coke remains essentially immobile.

Oil shale formations are found in various areas worldwide, including the United States. Such formations are notably found in Wyoming, Colorado, and Utah. Oil shale formations tend to reside at relatively shallow depths and are often characterized by limited permeability. Some consider oil shale formations to be hydrocarbon deposits which have not yet experienced the years of heat and pressure thought to be required to create conventional oil and gas reserves.

The decomposition rate of kerogen to produce mobile hydrocarbons is temperature dependent. Temperatures generally in excess of 270° C. (518° F.) over the course of many months may be required for substantial conversion. At higher temperatures substantial conversion may occur within shorter times. When kerogen is heated to the necessary temperature, chemical reactions break the larger molecules forming the solid kerogen into smaller molecules of oil and gas. The thermal conversion process is referred to as pyrolysis or retorting.

Attempts have been made for many years to extract oil from oil shale formations. Near-surface oil shales have been mined and retorted at the surface for over a century. In 1862, James Young began processing Scottish oil shales. The industry lasted for about 100 years. Commercial oil shale retorting through surface mining has been conducted in other countries as well. Such countries include Australia, Brazil, China, Estonia, France, Russia, South Africa, Spain, and Sweden. However, the practice has been mostly discontinued in recent years because it has proved to be uneconomical or because of environmental constraints on spent shale disposal. (See T. F. Yen, and G. V. Chilingarian, "*Oil Shale*," Amsterdam, Elsevier, p. 292, the entire disclosure of which is incorporated herein by reference.) Further, surface retorting requires mining of the oil shale, which limits application to very shallow formations.

In the United States, the existence of oil shale deposits in northwestern Colorado has been known since the early 1900's. While research projects have been conducted in this area from time to time, no serious commercial development has been undertaken. Most research on oil shale production has been carried out in the latter half of the 1900's. The majority of this research was on shale oil geology, geochemistry, and retorting in surface facilities.

In 1947, U.S. Pat. No. 2,732,195 issued to Ljungstrom. That patent, entitled "Method of Treating Oil Shale and Recovery of Oil and Other Mineral Products Therefrom," proposed the application of heat at high temperatures to the oil shale formation in situ. The purpose of such in situ heating was to distill hydrocarbons and produce them to the surface. The '195 Ljungstrom patent is incorporated herein by reference.

Ljungstrom coined the phrase "heat supply channels" to describe bore holes drilled into the formation. The bore holes received an electrical heat conductor which transferred heat to the surrounding oil shale. Thus, the heat supply channels served as early heat injection wells. The electrical heating elements in the heat injection wells were placed within sand or cement or other heat-conductive material to permit the heat injection wells to transmit heat into the surrounding oil shale while preventing the inflow of fluid. According to Ljungstrom, the "aggregate" was heated to between 500° and 1,000° C. in some applications.

Along with the heat injection wells, fluid producing wells were also completed in near proximity to the heat injection wells. As kerogen was pyrolyzed upon heat conduction into the rock matrix, the resulting oil and gas would be recovered through the adjacent production wells.

Ljungstrom applied his approach of thermal conduction from heated wellbores through the Swedish Shale Oil Company. A full scale plant was developed that operated from 1944 into the 1950's. (See G. Salamonsson, "The Ljungstrom In Situ Method for Shale-Oil Recovery," $2^{nd}$ Oil Shale and Cannel Coal Conference, v. 2, Glasgow, Scotland, Institute of Petroleum, London, p. 260-280 (1951), the entire disclosure of which is incorporated herein by reference.)

Additional in situ methods have been proposed. These methods generally involve the injection of heat and/or solvent into a subsurface oil shale formation. Heat may be in the form of heated methane (see U.S. Pat. No. 3,241,611 to J. L. Dougan), flue gas, or superheated steam (see U.S. Pat. No. 3,400,762 to D. W. Peacock). Heat may also be in the form of electric resistive heating, dielectric heating, radio frequency (RF) heating (U.S. Pat. No. 4,140,180, assigned to the ITT Research Institute in Chicago, Ill.) or oxidant injection to support in situ combustion. In some instances, artificial permeability has been created in the matrix to aid the movement of pyrolyzed fluids. Permeability generation methods include mining, rubblization, hydraulic fracturing (see U.S. Pat. No. 3,468,376 to M. L. Slusser and U.S. Pat. No. 3,513,914 to J. V. Vogel), explosive fracturing (see U.S. Pat. No. 1,422,204 to W. W. Hoover, et al.), heat fracturing (see U.S. Pat. No. 3,284,281 to R. W. Thomas), and steam fracturing (see U.S. Pat. No. 2,952,450 to H. Purre).

In 1989, U.S. Pat. No. 4,886,118 issued to Shell Oil Company, the entire disclosure of which is incorporated herein by reference. That patent, entitled "Conductively Heating a Subterranean Oil Shale to Create Permeability and Subsequently Produce Oil," declared that "[c]ontrary to the implications of . . . prior teachings and beliefs . . . the presently described conductive heating process is economically feasible for use even in a substantially impermeable subterranean oil shale." (col. 6, ln. 50-54). Despite this declaration, it is noted that few, if any, commercial in situ shale oil operations have occurred other than Ljungstrom's enterprise. The '118 patent proposed controlling the rate of heat conduction within the rock surrounding each heat injection well to provide a uniform heat front.

Additional history behind oil shale retorting and shale oil recovery can be found in co-owned patent publication WO 2005/010320 entitled "Methods of Treating a Subterranean Formation to Convert Organic Matter into Producible Hydrocarbons," and in patent publication WO 2005/045192 entitled "Hydrocarbon Recovery from Impermeable Oil Shales." The Background and technical disclosures of these two patent publications are incorporated herein by reference.

A need exists for improved processes for the production of shale oil. In addition, a need exists for improved methods for heating a subsurface formation. Still further, a need exists for methods that facilitate an expeditious and effective subsurface heater well arrangement using an electrically conductive granular material placed within an organic-rich rock formation.

SUMMARY OF THE INVENTION

In one embodiment, a method for heating a subsurface formation using electrical resistance heating is provided. The method may include creating a passage in the subsurface between a first wellbore located at least partially within the subsurface formation and a second wellbore also located at least partially within the subsurface formation. The method may further include placing an electrically conductive granular material into the passage to form a granular electrical connection where the granular electrical connection provides electrical communication between the first wellbore and the second wellbore. The method may further include providing a first electrically conductive member in the first wellbore so that the first electrically conductive member is in electrical communication with the granular electrical connection, and providing a second electrically conductive member in a second wellbore so that the second electrically conductive member is also in electrical communication with the granular electrical connection. In this way an electrically conductive flow path is formed from the first electrically conductive member, the granular electrical connection and the second electrically conductive member. The method may further include establishing an electrical current through the electrically conductive flow path, thereby generating heat within the electrically conductive flow path due to electrical resistive heating. At least a portion of the generated heat may thermally conduct into the subsurface formation. The generated heat may be comprised of first heat generated from the first electrically conductive member, second heat generated from the second electrically conductive member, and third heat generated from the electrically conductive granular material, with the first heat, the second heat, or both being significantly greater than the third heat.

Another embodiment of the invention includes a method for heating a subsurface formation using electrical resistance heating. The method may include providing a first substantially vertical wellbore located at least partially in the subsurface formation, and providing a second substantially vertical wellbore located at least partially in the subsurface formation adjacent the first wellbore. The method may also include hydraulically fracturing the subsurface from the first wellbore to form a first fracture, and hydraulically fracturing the subsurface from the second wellbore to form a second fracture. The method may further include injecting an electrically conductive granular material into the first fracture and the second fracture to form a first electrically conductive fracture and a second electrically conductive fracture. The method may further include providing a first electrically conductive member in the first wellbore, and a second electrically conductive member in the second wellbore. In this manner the first electrically conductive member is in electrical communication with the first electrically conductive fracture, and the second electrically conductive member is in electrical communication with the second electrically conductive fracture. The method may further include providing a fourth wellbore having a substantially horizontal bottom portion that intersects the first fracture and the second fracture. In this embodiment, a fourth electrically conductive member is provided in the fourth wellbore so that an electrical flow path is formed between the first electrically conductive member, the first electrically conductive fracture, the fourth electrically conductive member, the second electrically conductive fracture, and the second electrically conductive member. The method may then include establishing an electrical current through the electrical flow path in order to generate heat due to electrical resistive heating primarily from the first electrically conductive member and the second electrically conductive member. At least a portion of the generated heat thermally conducts into the subsurface formation so as to cause at least partial conversion of solid hydrocarbons into hydrocarbon fluids.

Another embodiment of the invention includes a method for heating a subsurface formation using electrical resistance heating. The method may include providing a substantially vertical first wellbore located at least partially in the subsurface formation, and providing a substantially vertical second wellbore located at least partially in the subsurface formation and adjacent the first wellbore. The method may also include hydraulically fracturing the subsurface from the first wellbore to form a first fracture, and hydraulically fracturing the subsurface from the second wellbore to form a second fracture, the result being that the first fracture and the second fracture intersect. The method may further include injecting an electrically conductive granular material into the first fracture and the second fracture such that the electrically conductive granular material forms a granular electrical connection providing electrical communication between the first wellbore and the second wellbore. The method may further include providing a first electrically conductive member in the first wellbore so that the first electrically conductive member is in electrical communication with the granular electrical connection, and providing a second electrically conductive member in the second wellbore so that the second electrically conductive member is in electrical communication with the granular electrical connection. In this manner an electrical flow path is formed from the first electrically conductive member, the granular electrical connection, and the second electrically conductive member. The method may then include establishing an electrical current through the electrical flow path in order to generate heat due to electrical resistive heating primarily from the first electrically conductive member and the second electrically conductive member. At least a portion of the generated heat thermally conducts into the subsurface formation so as to cause at least partial conversion of solid hydrocarbons into hydrocarbon fluids.

Another embodiment of the invention includes a method for heating a subsurface formation using electrical resistance heating. The method may include providing a substantially vertical first wellbore having a bottom portion within the subsurface formation, and providing a second wellbore having a bottom portion that intersects the bottom portion of the first wellbore. In this manner a point of convergence is formed. The method may further include providing an electrically conductive member in each of the first and second wellbores. The method may further include injecting an electrically conductive granular material into at least one of the first and second wellbores and into the point of convergence so as to cause granules comprised of the granular material to contact each of the electrically conductive members and to form a granular connection. The method may further include providing a power source, whereby an electrical circuit is formed within the power source, the electrically conductive members in the first and second wellbores, and the granular material.

Another embodiment of the invention includes a method of producing a hydrocarbon fluid. The method may include heating an organic-rich rock formation in situ using an electrical resistance heater and producing a hydrocarbon fluid from the organic-rich rock formation, where the hydrocarbon fluid is at least partially generated as a result of pyrolysis of formation hydrocarbons located in the organic-rich rock formation. The method may include using an electrical resistance heater that is formed by creating a passage in the subsurface between a first wellbore located at least partially within the organic-rich rock formation and a second wellbore also located at least partially within the organic-rich rock formation. In this arrangement, an electrically conductive granular material is placed into the passage to form a granular electrical connection. The granular electrical connection provides electrical communication between the first wellbore and the second wellbore. The heater may further be formed by providing a first electrically conductive member in the first wellbore so that the first electrically conductive member is in electrical communication with the granular electrical connection, and providing a second electrically conductive member in a second wellbore so that the second electrically conductive member is also in electrical communication with the granular electrical connection. In this manner an electrically conductive flow path is formed, comprised of the first electrically conductive member, the granular electrical connection and the second electrically conductive member. The electrical resistance heater may further be formed by establishing an electrical current through the electrically conductive flow path, thereby generating heat within the electrically conductive flow path due to electrical resistive heating. The generated heat is comprised of first heat generated from the first electrically conductive member, second heat generated from the second electrically conductive member, and third heat generated from the electrically conductive granular material. The first heat, the second heat, or both is significantly greater than the third heat.

BRIEF DESCRIPTION OF THE DRAWINGS

So that the present invention can be better understood, certain drawings, charts, graphs and flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
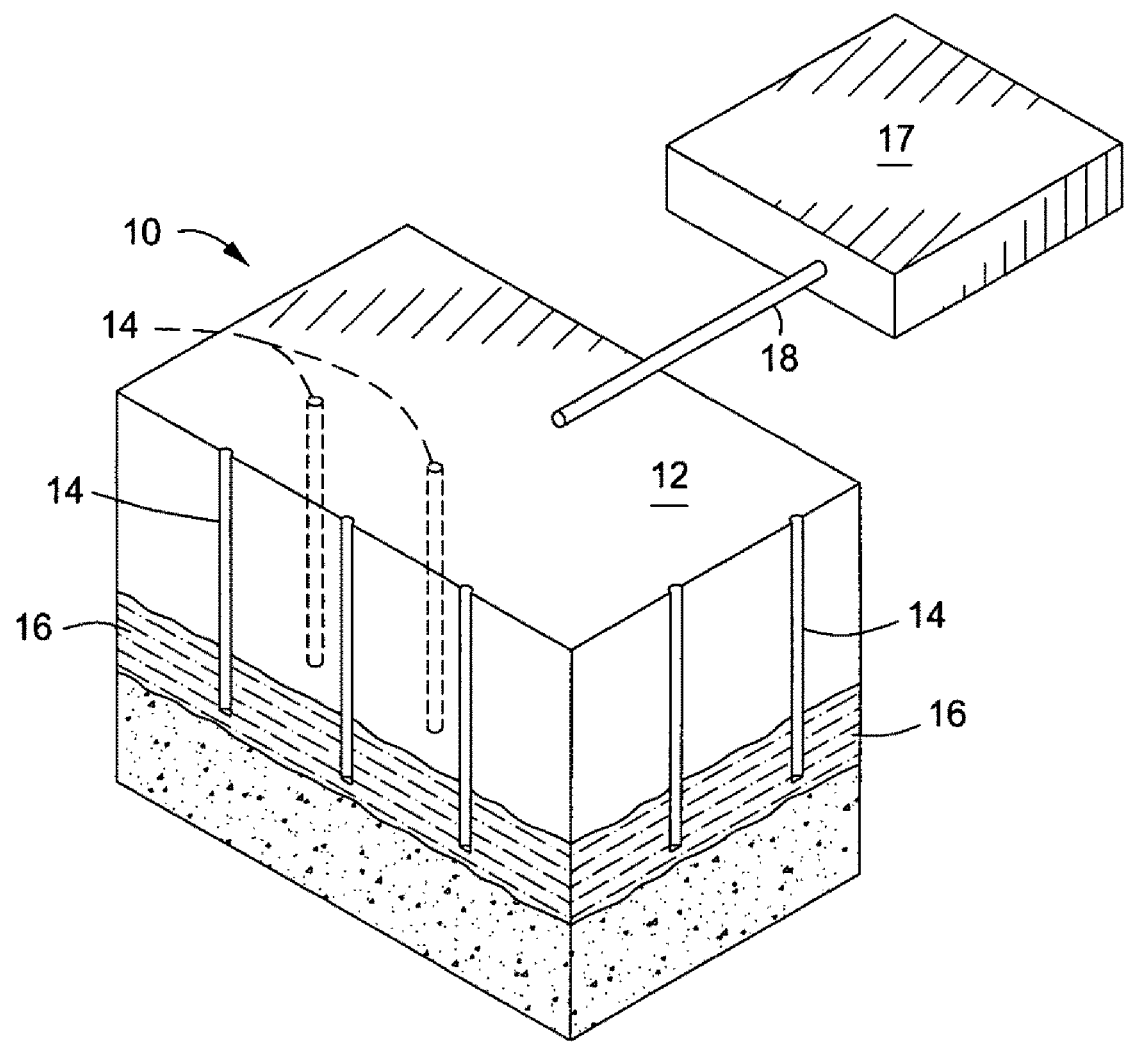
FIG. 1 is a cross-sectional isometric view of an illustrative subsurface area. The subsurface area includes an organic-rich rock matrix that defines a subsurface formation.

As used herein, the term "hydrocarbon(s)" refers to organic material with molecular structures containing carbon bonded to hydrogen. Hydrocarbons may also include other elements, such as, but not limited to, halogens, metallic elements, nitrogen, oxygen, and/or sulfur.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions or at ambient conditions (15° C. and 1 atm pressure). Hydrocarbon fluids may include, for example, oil, natural gas, coal bed methane, shale oil, pyrolysis oil, pyrolysis gas, a pyrolysis product of coal, and other hydrocarbons that are in a gaseous or liquid state.

As used herein, the terms "produced fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, pyrolyzed shale oil, synthesis gas, a pyrolysis product of coal, carbon dioxide, hydrogen sulfide and water (including steam). Produced fluids may include both hydrocarbon fluids and non-hydrocarbon fluids.

As used herein, the term "condensable hydrocarbons" means those hydrocarbons that condense at 25° C. and one atmosphere absolute pressure. Condensable hydrocarbons may include a mixture of hydrocarbons having carbon numbers greater than 4.

As used herein, the term "non-condensable hydrocarbons" means those hydrocarbons that do not condense at 25° C. and one atmosphere absolute pressure. Non-condensable hydrocarbons may include hydrocarbons having carbon numbers less than 5.

As used herein, the term "heavy hydrocarbons" refers to hydrocarbon fluids that are highly viscous at ambient conditions (15° C. and 1 atm pressure). Heavy hydrocarbons may include highly viscous hydrocarbon fluids such as heavy oil, tar, and/or asphalt. Heavy hydrocarbons may include carbon and hydrogen, as well as smaller concentrations of sulfur, oxygen, and nitrogen. Additional elements may also be present in heavy hydrocarbons in trace amounts. Heavy hydrocarbons may be classified by API gravity. Heavy hydrocarbons generally have an API gravity below about 20 degrees. Heavy oil, for example, generally has an API gravity of about 10-20 degrees, whereas tar generally has an API gravity below about 10 degrees. The viscosity of heavy hydrocarbons is generally greater than about 100 centipoise at 15° C.

As used herein, the term "solid hydrocarbons" refers to any hydrocarbon material that is found naturally in substantially solid form at formation conditions. Non-limiting examples include kerogen, coal, shungites, asphaltites, and natural mineral waxes.

As used herein, the term "formation hydrocarbons" refers to both heavy hydrocarbons and solid hydrocarbons that are contained in an organic-rich rock formation. Formation hydrocarbons may be, but are not limited to, kerogen, oil shale, coal, bitumen, tar, natural mineral waxes, and asphaltites.

As used herein, the term "tar" refers to a viscous hydrocarbon that generally has a viscosity greater than about 10,000 centipoise at 15° C. The specific gravity of tar generally is greater than 1.000. Tar may have an API gravity less than 10 degrees.

As used herein, the term "kerogen" refers to a solid, insoluble hydrocarbon that principally contains carbon, hydrogen, nitrogen, oxygen, and sulfur. Oil shale contains kerogen.

As used herein, the term "bitumen" refers to a non-crystalline solid or viscous hydrocarbon material that is substantially soluble in carbon disulfide.

As used herein, the term "oil" refers to a hydrocarbon fluid containing a mixture of condensable hydrocarbons.

As used herein, the term "subsurface" refers to geologic strata occurring below the earth's surface.

As used herein, the term "hydrocarbon-rich formation" refers to any formation that contains more than trace amounts of hydrocarbons. For example, a hydrocarbon-rich formation may include portions that contain hydrocarbons at a level of greater than 5 volume percent. The hydrocarbons located in a hydrocarbon-rich formation may include, for example, oil, natural gas, heavy hydrocarbons, and solid hydrocarbons.

As used herein, the term "organic-rich rock" refers to any rock matrix holding solid hydrocarbons and/or heavy hydrocarbons. Rock matrices may include, but are not limited to, sedimentary rocks, shales, siltstones, sands, silicilytes, carbonates, and diatomites.

As used herein, the term "formation" refers to any finite subsurface region. The formation may contain one or more hydrocarbon-containing layers, one or more non-hydrocarbon containing layers, an overburden, and/or an underburden of any subsurface geologic formation. An "overburden" and/or an "underburden" is geological material above or below the formation of interest. An overburden or underburden may include one or more different types of substantially impermeable materials. For example, overburden and/or underburden may include rock, shale, mudstone, or wet/tight carbonate (i.e., an impermeable carbonate without hydrocarbons). An overburden and/or an underburden may include a hydrocarbon-containing layer that is relatively impermeable. In some cases, the overburden and/or underburden may be permeable.

As used herein, the term "organic-rich rock formation" refers to any formation containing organic-rich rock. Organic-rich rock formations include, for example, oil shale formations, coal formations, and tar sands formations.

As used herein, the term "pyrolysis" refers to the breaking of chemical bonds through the application of heat. For example, pyrolysis may include transforming a compound into one or more other substances by heat alone or by heat in combination with an oxidant. Pyrolysis may include modifying the nature of the compound by addition of hydrogen atoms which may be obtained from molecular hydrogen, water, carbon dioxide, or carbon monoxide. Heat may be transferred to a section of the formation to cause pyrolysis.

As used herein, the term "water-soluble minerals" refers to minerals that are soluble in water. Water-soluble minerals include, for example, nahcolite (sodium bicarbonate), soda ash (sodium carbonate), dawsonite ($NaAl(CO_3)(OH)_2$), or combinations thereof. Substantial solubility may require heated water and/or a non-neutral pH solution.

As used herein, the term "formation water-soluble minerals" refers to water-soluble minerals that are found naturally in a formation.

As used herein, the term "migratory contaminant species" refers to species that are soluble or moveable in water or an aqueous fluid, and are considered to be potentially harmful or of concern to human health or the environment. Migratory contaminant species may include inorganic and organic contaminants. Organic contaminants may include saturated hydrocarbons, aromatic hydrocarbons, and oxygenated hydrocarbons. Inorganic contaminants may include metal contaminants, and ionic contaminants of various types that may significantly alter pH or the formation fluid chemistry. Aromatic hydrocarbons may include, for example, benzene, toluene, xylene, ethylbenzene, and tri-methylbenzene, and various types of polyaromatic hydrocarbons such as anthracenes, naphthalenes, chrysenes and pyrenes. Oxygenated hydrocarbons may include, for example, alcohols, ketones, phenols, and organic acids such as carboxylic acid. Metal contaminants may include, for example, arsenic, boron, chromium, cobalt, molybdenum, mercury, selenium, lead, vanadium, nickel or zinc. Ionic contaminants include, for example, sulfides, sulfates, chlorides, fluorides, ammonia, nitrates, calcium, iron, magnesium, potassium, lithium, boron, and strontium.

As used herein, the term "sequestration" refers to the storing of a fluid that is a by-product of a process rather than discharging the fluid to the atmosphere or open environment.

As used herein, the term "subsidence" refers to a downward movement of a surface relative to an initial elevation of the surface.

As used herein, the term "thickness" of a layer refers to the distance between the upper and lower boundaries of a cross section of a layer, wherein the distance is measured normal to the average tilt of the cross section.

As used herein, the term "thermal fracture" refers to fractures created in a formation caused directly or indirectly by expansion or contraction of a portion of the formation and/or fluids within the formation, which in turn is caused by increasing/decreasing the temperature of the formation and/or fluids within the formation, and/or by increasing/decreasing a pressure of fluids within the formation due to heating. Thermal fractures may propagate into or form in neighboring regions significantly cooler than the heated zone.

As used herein, the term "hydraulic fracture" refers to a fracture at least partially propagated into a formation, wherein the fracture is created through injection of pressurized fluids into the formation. The fracture may be artificially held open by injection of a proppant material. Hydraulic fractures may be substantially horizontal in orientation, substantially vertical in orientation, or oriented along any other plane.

As used herein, the term "wellbore" refers to a hole in the subsurface made by drilling or insertion of a conduit into the subsurface. A wellbore may have a substantially circular cross section, or other cross-sectional shapes (e.g., circles, ovals, squares, rectangles, triangles, slits, or other regular or irregular shapes). As used herein, the term "well", when referring to an opening in the formation, may be used interchangeably with the term "wellbore."

Description of Specific Embodiments

The inventions are described herein in connection with certain specific embodiments. However, to the extent that the following detailed description is specific to a particular embodiment or a particular use, such is intended to be illustrative only and is not to be construed as limiting the scope of the invention.

As discussed herein, some embodiments of the invention include or have application related to an in situ method of recovering natural resources. The natural resources may be recovered from an organic-rich rock formation including, for example, an oil shale formation. The organic-rich rock formation may include formation hydrocarbons including, for example, kerogen, coal, and heavy hydrocarbons. In some embodiments of the invention the natural resources may include hydrocarbon fluids, including, for example, products of the pyrolysis of formation hydrocarbons such as shale oil. In some embodiments of the invention the natural resources may also include water-soluble minerals including, for example, nahcolite (sodium bicarbonate, or $2NaHCO_3$), soda ash (sodium carbonate, or $Na_2CO_3$) and dawsonite ($NaAl(CO_3)(OH)_2$).

FIG. 1 presents a perspective view of an illustrative oil shale development area 10. A surface 12 of the development area 10 is indicated. Below the surface is an organic-rich rock formation 16. The illustrative subsurface formation 16 contains formation hydrocarbons (such as, for example, kerogen) and possibly valuable water-soluble minerals (such as, for example, nahcolite). It is understood that the representative formation 16 may be any organic-rich rock formation, including a rock matrix containing coal or tar sands, for example. In addition, the rock matrix making up the formation 16 may be permeable, semi-permeable or non-permeable. The present inventions are particularly advantageous in oil shale development areas initially having very limited or effectively no fluid permeability.

In order to access formation 16 and recover natural resources therefrom, a plurality of wellbores is formed. Wellbores are shown at 14 in FIG. 1. The representative wellbores 14 are essentially vertical in orientation relative to the surface 12. However, it is understood that some or all of the wellbores 14 could deviate into an obtuse or even horizontal orientation. In the arrangement of FIG. 1, each of the wellbores 14 is completed in the oil shale formation 16. The completions may be either open or cased hole. The well completions may also include propped or unpropped hydraulic fractures emanating therefrom.

In the view of FIG. 1, only seven wellbores 14 are shown. However, it is understood that in an oil shale development project, numerous additional wellbores 14 will most likely be drilled. The wellbores 14 may be located in relatively close proximity, being from 10 feet to up to 300 feet in separation. In some embodiments, a well spacing of 15 to 25 feet is provided. Typically, the wellbores 14 are also completed at shallow depths, being from 200 to 5,000 feet at total depth. In some embodiments the oil shale formation targeted for in situ retorting is at a depth greater than 200 feet below the surface or alternatively 400 feet below the surface. Alternatively, conversion and production occur at depths between 500 and 2,500 feet.

The wellbores 14 will be selected for certain functions and may be designated as heat injection wells, water injection wells, oil production wells and/or water-soluble mineral solution production wells. In one aspect, the wellbores 14 are dimensioned to serve two, three, or all four of these purposes. Suitable tools and equipment may be sequentially run into and removed from the wellbores 14 to serve the various purposes.

A fluid processing facility 17 is also shown schematically. The fluid processing facility 17 is equipped to receive fluids produced from the organic-rich rock formation 16 through one or more pipelines or flow lines 18. The fluid processing facility 17 may include equipment suitable for receiving and separating oil, gas, and water produced from the heated formation. The fluid processing facility 17 may further include equipment for separating out dissolved water-soluble minerals and/or migratory contaminant species, including, for example, dissolved organic contaminants, metal contaminants, or ionic contaminants in the produced water recovered from the organic-rich rock formation 16. The contaminants may include, for example, aromatic hydrocarbons such as benzene, toluene, xylene, and tri-methylbenzene. The contaminants may also include polyaromatic hydrocarbons such as anthracene, naphthalene, chrysene and pyrene. Metal contaminants may include species containing arsenic, boron, chromium, mercury, selenium, lead, vanadium, nickel, cobalt, molybdenum, or zinc. Ionic contaminant species may include, for example, sulfates, chlorides, fluorides, lithium, potassium, aluminum, ammonia, and nitrates.

Figure 2:
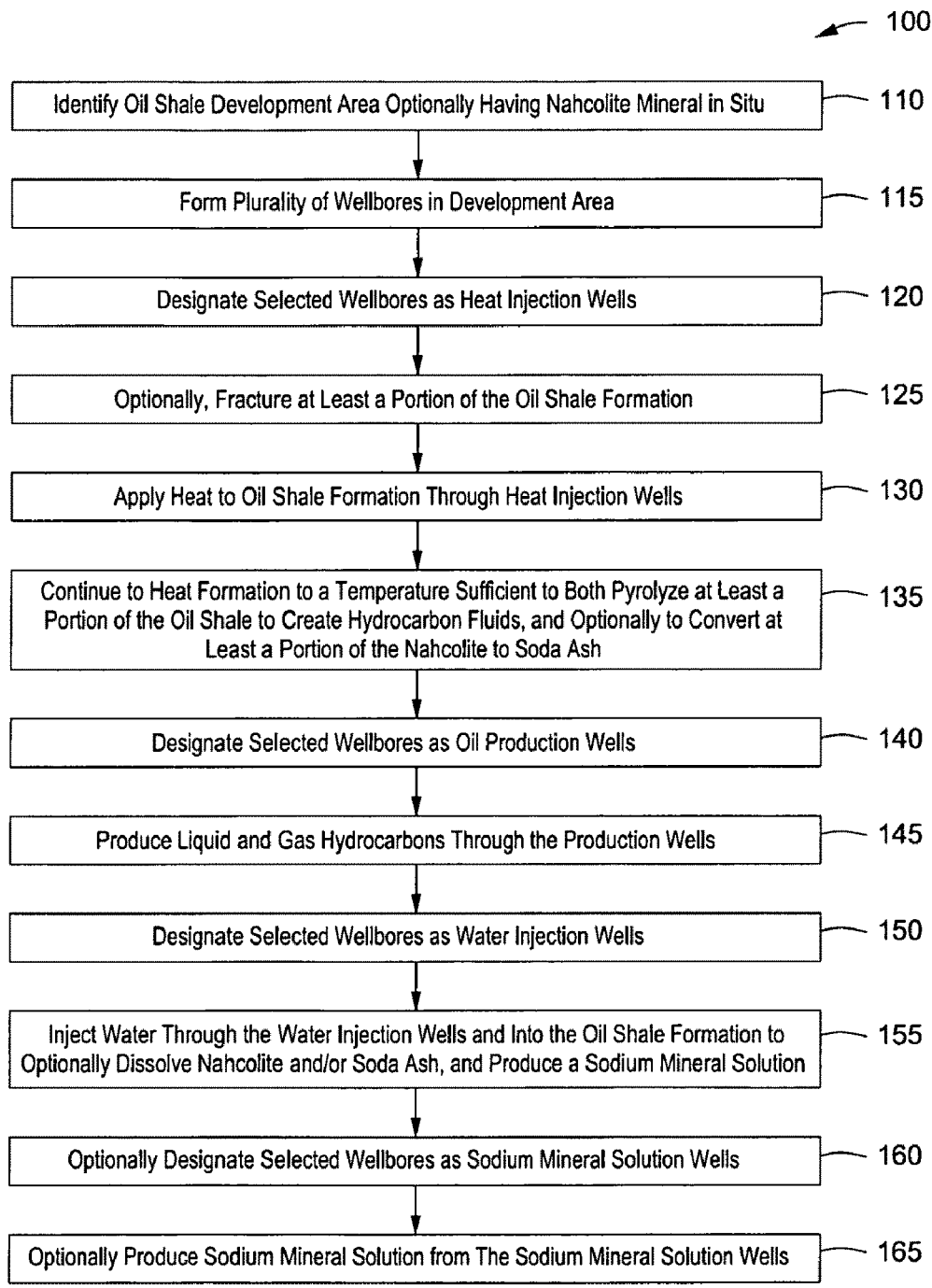
FIG. 2 is a flow chart demonstrating a general method of in situ thermal recovery of oil and gas from an organic-rich rock formation, in one embodiment.

In order to recover oil, gas, and sodium (or other) water-soluble minerals, a series of steps may be undertaken. FIG. 2 presents a flow chart demonstrating a method of in situ thermal recovery of oil and gas from an organic-rich rock formation 100, in one embodiment. It is understood that the order of some of the steps from FIG. 2 may be changed, and that the sequence of steps is merely for illustration.

First, the oil shale (or other organic-rich rock) formation 16 is identified within the development area 10. This step is shown in box 110. Optionally, the oil shale formation may contain nahcolite or other sodium minerals. The targeted development area within the oil shale formation may be identified by measuring or modeling the depth, thickness and organic richness of the oil shale as well as evaluating the position of the organic-rich rock formation relative to other rock types, structural features (e.g. faults, anticlines or synclines), or hydrogeological units (i.e. aquifers). This is accomplished by creating and interpreting maps and/or models of depth, thickness, organic richness and other data from available tests and sources. This may involve performing geological surface surveys, studying outcrops, performing seismic surveys, and/or drilling boreholes to obtain core samples from subsurface rock. Rock samples may be analyzed to assess kerogen content and hydrocarbon fluid generating capability.

The kerogen content of the organic-rich rock formation may be ascertained from outcrop or core samples using a variety of data. Such data may include organic carbon content, hydrogen index, and modified Fischer assay analyses. Subsurface permeability may also be assessed via rock samples, outcrops, or studies of ground water flow. Furthermore the connectivity of the development area to ground water sources may be assessed.

Next, a plurality of wellbores 14 is formed across the targeted development area 10. This step is shown schematically in box 115. The purposes of the wellbores 14 are set forth above and need not be repeated. However, it is noted that for purposes of the wellbore formation step of box 115, only a portion of the wells need be completed initially. For instance, at the beginning of the project heat injection wells are needed, while a majority of the hydrocarbon production wells are not yet needed. Production wells may be brought in once conversion begins, such as after 4 to 12 months of heating.

It is understood that petroleum engineers will develop a strategy for the best depth and arrangement for the wellbores 14, depending upon anticipated reservoir characteristics, economic constraints, and work scheduling constraints. In addition, engineering staff will determine what wellbores 14 shall be used for initial formation 16 heating. This selection step is represented by box 120.

Concerning heat injection wells, there are various methods for applying heat to the organic-rich rock formation 16. The present methods are not limited to the heating technique employed unless specifically so stated in the claims. The heating step is represented generally by box 130. Preferably, for in situ processes the heating of a production zone takes place over a period of months, or even four or more years.

The formation 16 is heated to a temperature sufficient to pyrolyze at least a portion of the oil shale in order to convert the kerogen to hydrocarbon fluids. The bulk of the target zone of the formation may be heated to between 270° C. to 800° C. Alternatively, the targeted volume of the organic-rich formation is heated to at least 350° C. to create production fluids. The conversion step is represented in FIG. 2 by box 135. The resulting liquids and hydrocarbon gases may be refined into products which resemble common commercial petroleum products. Such liquid products include transportation fuels such as diesel, jet fuel and naphtha. Generated gases include light alkanes, light alkenes, $H_2$, $CO_2$, $CO$, and $NH_3$.

Conversion of the oil shale will create permeability in the oil shale section in rocks that were originally impermeable. Preferably, the heating and conversion processes of boxes 130 and 135, occur over a lengthy period of time. In one aspect, the heating period is from three months to four or more years. Also as an optional part of box 135, the formation 16 may be heated to a temperature sufficient to convert at least a portion of nahcolite, if present, to soda ash. Heat applied to mature the oil shale and recover oil and gas will also convert nahcolite to sodium carbonate (soda ash), a related sodium mineral. The process of converting nahcolite (sodium bicarbonate) to soda ash (sodium carbonate) is described herein.

In connection with the heating step 130, the rock formation 16 may optionally be fractured to aid heat transfer or later hydrocarbon fluid production. The optional fracturing step is shown in box 125. Fracturing may be accomplished by creating thermal fractures within the formation through application of heat. By heating the organic-rich rock and transforming the kerogen to oil and gas, the permeability of portions of the formation are increased via thermal fracture formation and subsequent production of a portion of the hydrocarbon fluids generated from the kerogen. Alternatively, a process known as hydraulic fracturing may be used. Hydraulic fracturing is a process known in the art of oil and gas recovery where a fracture fluid is pressurized within the wellbore above the fracture pressure of the formation, thus developing fracture planes within the formation to relieve the pressure generated within the wellbore. Hydraulic fractures may be used to create additional permeability in portions of the formation and/or be used to provide a planar source for heating. The WO 2005/010320 patent publication incorporated above describes one use of hydraulic fracturing.

As part of the hydrocarbon fluid production process 100, certain wells 14 may be designated as oil and gas production wells. This step is depicted by box 140. Oil and gas production might not be initiated until it is determined that the kerogen has been sufficiently retorted to allow maximum recovery of oil and gas from the formation 16. In some instances, dedicated production wells are not drilled until after heat injection wells (box 130) have been in operation for a period of several weeks or months. Thus, box 140 may include the formation of additional wellbores 14. In other instances, selected heater wells are converted to production wells.

After certain wellbores 14 have been designated as oil and gas production wells, oil and/or gas is produced from the wellbores 14. The oil and/or gas production process is shown at box 145. At this stage (box 145), any water-soluble minerals, such as nahcolite and converted soda ash may remain substantially trapped in the rock formation 16 as finely disseminated crystals or nodules within the oil shale beds, and are not produced. However, some nahcolite and/or soda ash may be dissolved in the water created during heat conversion (box 135) within the formation.

Box 150 presents an optional next step in the oil and gas recovery method 100. Here, certain wellbores 14 are designated as water or aqueous fluid injection wells. Aqueous fluids are solutions of water with other species. The water may constitute "brine," and may include dissolved inorganic salts of chloride, sulfates and carbonates of Group I and II elements of The Periodic Table of Elements. Organic salts can also be present in the aqueous fluid. The water may alternatively be fresh water containing other species. The other species may be present to alter the pH. Alternatively, the other species may reflect the availability of brackish water not saturated in the species wished to be leached from the subsurface. Preferably, the water injection wells are selected from some or all of the wellbores used for heat injection or for oil and/or gas production. However, the scope of the step of box 150 may include the drilling of yet additional wellbores 14 for use as dedicated water injection wells. In this respect, it may be desirable to complete water injection wells along a periphery of the development area 10 in order to create a boundary of high pressure.

Next, optionally water or an aqueous fluid is injected through the water injection wells and into the oil shale formation 16. This step is shown at box 155. The water may be in the form of steam or pressurized hot water. Alternatively the injected water may be cool and becomes heated as it contacts the previously heated formation. The injection process may further induce fracturing. This process may create fingered caverns and brecciated zones in the nahcolite-bearing intervals some distance, for example up to 200 feet out, from the water injection wellbores. In one aspect, a gas cap, such as nitrogen, may be maintained at the top of each "cavern" to prevent vertical growth.

Along with the designation of certain wellbores 14 as water injection wells, the design engineers may also designate certain wellbores 14 as water or water-soluble mineral solution production wells. This step is shown in box 160. These wells may be the same as wells used to previously produce hydrocarbons or inject heat. These recovery wells may be used to produce an aqueous solution of dissolved water-soluble minerals and other species, including, for example, migratory contaminant species. For example, the solution may be one primarily of dissolved soda ash. This step is shown in box 165. Alternatively, single wellbores may be used to both inject water and then to recover a sodium mineral solution. Thus, box 165 includes the option of using the same wellbores 14 for both water injection and solution production (Box 165).

Temporary control of the migration of the migratory contaminant species, especially during the pyrolysis process, can be obtained via placement of the injection and production wells 14 such that fluid flow out of the heated zone is minimized. Typically, this involves placing injection wells at the periphery of the heated zone so as to cause pressure gradients which prevent flow inside the heated zone from leaving the zone.

Figure 3:
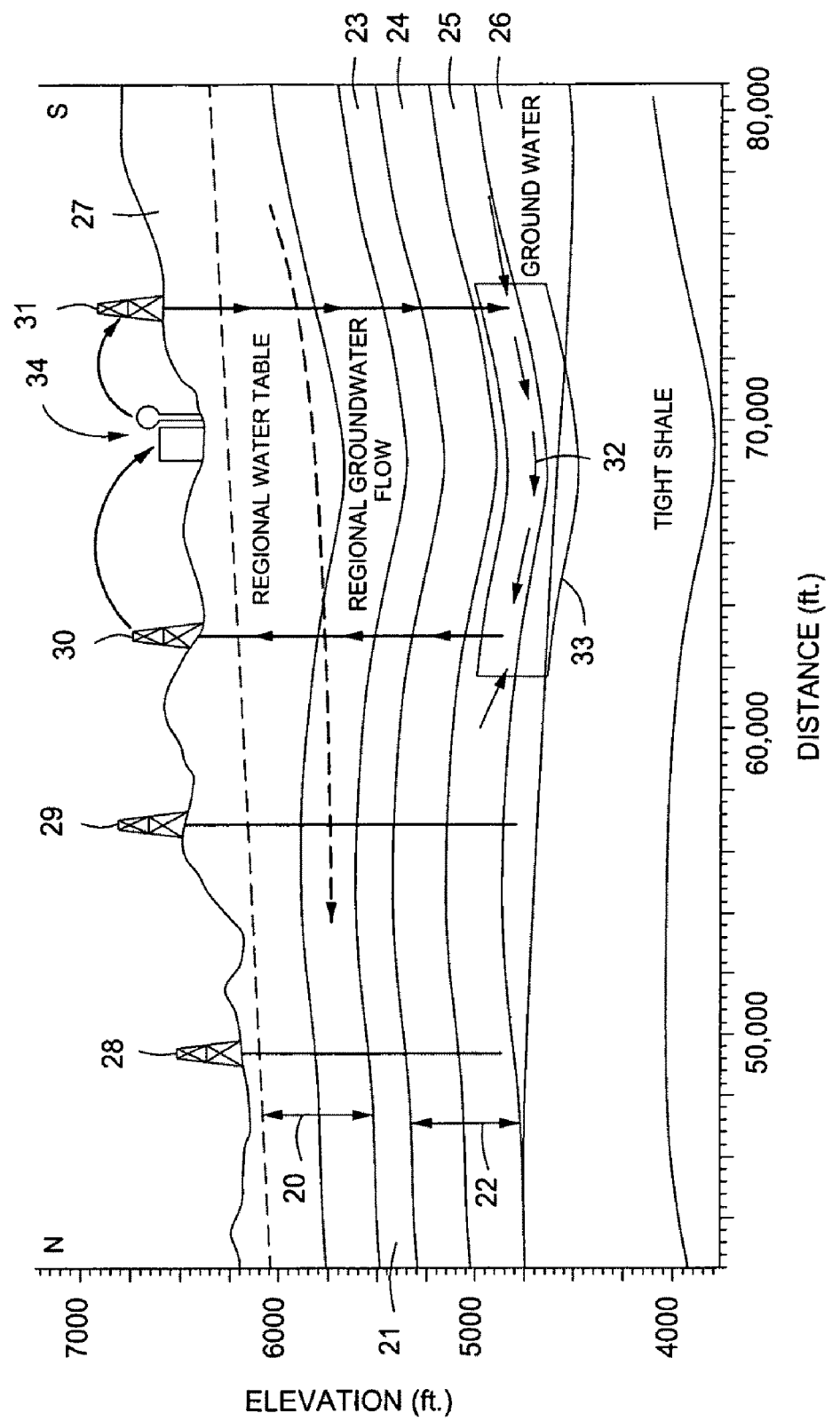
FIG. 3 is a cross-sectional side view of an illustrative oil shale formation that is within or connected to groundwater aquifers and a formation leaching operation.

FIG. 3 is a cross-sectional view of an illustrative oil shale formation that is within or connected to ground water aquifers and a formation leaching operation. Four separate oil shale formation zones are depicted (23, 24, 25 and 26) within the oil shale formation. The water aquifers are below the ground surface 27, and are categorized as an upper aquifer 20 and a lower aquifer 22. Intermediate the upper and lower aquifers is an aquitard 21. It can be seen that certain zones of the formation are both aquifers or aquitards and oil shale zones. A plurality of wells (28, 29, 30 and 31) is shown traversing vertically downward through the aquifers. One of the wells is serving as a water injection well 31, while another is serving as a water production well 30. In this way, water is circulated 32 through at least the lower aquifer 22.

FIG. 3 shows diagrammatically water circulating 32 through an oil shale volume that was heated 33, that resides within or is connected to an aquifer 22, and from which hydrocarbon fluids were previously recovered. Introduction of water via the water injection well 31 forces water into the previously heated oil shale 33 and water-soluble minerals and migratory contaminants species are swept to the water production well 30. The water may then be processed in a facility 34 wherein the water-soluble minerals (e.g. nahcolite or soda ash) and the migratory contaminants may be substantially removed from the water stream. Water is then reinjected into the oil shale volume 33 and the formation leaching is repeated. This leaching with water is intended to continue until levels of migratory contaminant species are at environmentally acceptable levels within the previously heated oil shale zone 33. This may require 1 cycle, 2 cycles, 5 cycles 10 cycles or more cycles of formation leaching, where a single cycle indicates injection and production of approximately one pore volume of water. It is understood that there may be numerous water injection and water production wells in an actual oil shale development. Moreover, the system may include monitoring wells (28 and 29) which can be utilized during the oil shale heating phase, the shale oil production phase, the leaching phase, or during any combination of these phases to monitor for migratory contaminant species and/or water-soluble minerals.

In some fields, formation hydrocarbons, such as oil shale, may exist in more than one subsurface formation. In some instances, the organic-rich rock formations may be separated by rock layers that are hydrocarbon-free or that otherwise have little or no commercial value. Therefore, it may be desirable for the operator of a field under hydrocarbon development to undertake an analysis as to which of the subsurface, organic-rich rock formations to target or in which order they should be developed.

The organic-rich rock formation may be selected for development based on various factors. One such factor is the thickness of the hydrocarbon containing layer within the formation. Greater pay zone thickness may indicate a greater potential volumetric production of hydrocarbon fluids. Each of the hydrocarbon containing layers may have a thickness that varies depending on, for example, conditions under which the formation hydrocarbon containing layer was formed. Therefore, an organic-rich rock formation will typically be selected for treatment if that formation includes at least one formation hydrocarbon-containing layer having a thickness sufficient for economical production of produced fluids.

An organic-rich rock formation may also be chosen if the thickness of several layers that are closely spaced together is sufficient for economical production of produced fluids. For example, an in situ conversion process for formation hydrocarbons may include selecting and treating a layer within an organic-rich rock formation having a thickness of greater than about 5 meters, 10 meters, 50 meters, or even 100 meters. In this manner, heat losses (as a fraction of total injected heat) to layers formed above and below an organic-rich rock formation may be less than such heat losses from a thin layer of formation hydrocarbons. A process as described herein, however, may also include selecting and treating layers that may include layers substantially free of formation hydrocarbons or thin layers of formation hydrocarbons.

The richness of one or more organic-rich rock formations may also be considered. Richness may depend on many factors including the conditions under which the formation hydrocarbon containing layer was formed, an amount of formation hydrocarbons in the layer, and/or a composition of formation hydrocarbons in the layer. A thin and rich formation hydrocarbon layer may be able to produce significantly more valuable hydrocarbons than a much thicker, less rich formation hydrocarbon layer. Of course, producing hydrocarbons from a formation that is both thick and rich is desirable.

The kerogen content of an organic-rich rock formation may be ascertained from outcrop or core samples using a variety of data. Such data may include organic carbon content, hydrogen index, and modified Fischer assay analyses. The Fischer Assay is a standard method which involves heating a sample of a formation hydrocarbon containing layer to approximately 500° C. in one hour, collecting fluids produced from the heated sample, and quantifying the amount of fluids produced.

Subsurface formation permeability may also be assessed via rock samples, outcrops, or studies of ground water flow. Furthermore the connectivity of the development area to ground water sources may be assessed. Thus, an organic-rich rock formation may be chosen for development based on the permeability or porosity of the formation matrix even if the thickness of the formation is relatively thin.

Other factors known to petroleum engineers may be taken into consideration when selecting a formation for development. Such factors include depth of the perceived pay zone, stratigraphic proximity of fresh ground water to kerogen-containing zones, continuity of thickness, and other factors. For instance, the assessed fluid production content within a formation will also effect eventual volumetric production.

In producing hydrocarbon fluids from an oil shale field, it may be desirable to control the migration of pyrolyzed fluids. In some instances, this includes the use of injection wells, particularly around the periphery of the field. Such wells may inject water, steam, $CO_2$, heated methane, or other fluids to drive cracked kerogen fluids inwardly towards production wells. In some embodiments, physical barriers may be placed around the area of the organic-rich rock formation under development. One example of a physical barrier involves the creation of freeze walls. Freeze walls are formed by circulating refrigerant through peripheral wells to substantially reduce the temperature of the rock formation. This, in turn, prevents the pyrolyzation of kerogen present at the periphery of the field and the outward migration of oil and gas. Freeze walls will also cause native water in the formation along the periphery to freeze.

The use of subsurface freezing to stabilize poorly consolidated soils or to provide a barrier to fluid flow is known in the art. Shell Exploration and Production Company has discussed the use of freeze walls for oil shale production in several patents, including U.S. Pat. Nos. 6,880,633 and 7,032,660. Shell's '660 patent uses subsurface freezing to protect against groundwater flow and groundwater contamination during in situ shale oil production. Additional patents that disclose the use of so-called freeze walls are U.S. Pat. Nos. 3,528,252, 3,943,722, 3,729,965, 4,358,222, 4,607,488, and WO Pat. No. 98996480.

As noted above, several different types of wells may be used in the development of an organic-rich rock formation, including, for example, an oil shale field. For example, the heating of the organic-rich rock formation may be accomplished through the use of heater wells. The heater wells may include, for example, electrical resistance heating elements. The production of hydrocarbon fluids from the formation may be accomplished through the use of wells completed for the production of fluids. The injection of an aqueous fluid may be accomplished through the use of injection wells. Finally, the production of an aqueous solution may be accomplished through use of solution production wells.

The different wells listed above may be used for more than one purpose. Stated another way, wells initially completed for one purpose may later be used for another purpose, thereby lowering project costs and/or decreasing the time required to perform certain tasks. For example, one or more of the production wells may also be used as injection wells for later injecting water into the organic-rich rock formation. Alternatively, one or more of the production wells may also be used as solution production wells for later producing an aqueous solution from the organic-rich rock formation.

In other aspects, production wells (and in some circumstances heater wells) may initially be used as dewatering wells (e.g., before heating is begun and/or when heating is initially started). In addition, in some circumstances dewatering wells can later be used as production wells (and in some circumstances heater wells). As such, the dewatering wells may be placed and/or designed so that such wells can be later used as production wells and/or heater wells. The heater wells may be placed and/or designed so that such wells can be later used as production wells and/or dewatering wells. The production wells may be placed and/or designed so that such wells can be later used as dewatering wells and/or heater wells. Similarly, injection wells may be wells that initially were used for other purposes (e.g., heating, production, dewatering, monitoring, etc.), and injection wells may later be used for other purposes. Similarly, monitoring wells may be wells that initially were used for other purposes (e.g., heating, production, dewatering, injection, etc.). Finally, monitoring wells may later be used for other purposes such as water production.

The wellbores for the various wells may be located in relatively close proximity, being from 10 feet to up to 300 feet in separation. Alternatively, the wellbores may be spaced from 30 to 200 feet, or 50 to 100 feet. Typically, the wellbores are also completed at shallow depths, being from 200 to 5,000 feet at total depth. Alternatively, the wellbores may be completed at depths from 1,000 to 4,000 feet, or 1,500 to 3,500 feet. In some embodiments, the oil shale formation targeted for in situ retorting is at a depth greater than 200 feet below the surface. In alternative embodiments, the oil shale formation targeted for in situ retorting is at a depth greater than 500, 1,000, or 1,500 feet below the surface. In alternative embodiments, the oil shale formation targeted for in situ retorting is at a depth between 200 and 5,000 feet, alternatively between 1,000 and 4,000 feet, 1,200 and 3,700 feet, or 1,500 and 3,500 feet below the surface.

It is desirable to arrange the various wells for an oil shale field in a pre-planned pattern. For instance, heater wells may be arranged in a variety of patterns including, but not limited to triangles, squares, hexagons, and other polygons. The pattern may include a regular polygon to promote uniform heating through at least the portion of the formation in which the heater wells are placed. The pattern may also be a line drive pattern. A line drive pattern generally includes a first linear array of heater wells, a second linear array of heater wells, and a production well or a linear array of production wells between the first and second linear array of heater wells. Interspersed among the heater wells are typically one or more production wells. The injection wells may likewise be disposed within a repetitive pattern of units, which may be similar to or different from that used for the heater wells.

One method to reduce the number of wells is to use a single well as both a heater well and a production well. Reduction of the number of wells by using single wells for sequential purposes can reduce project costs. One or more monitoring wells may be disposed at selected points in the field. The monitoring wells may be configured with one or more devices that measure a temperature, a pressure, and/or a property of a fluid in the wellbore. In some instances, a heater well may also serve as a monitoring well, or otherwise be instrumented.

Another method for reducing the number of heater wells is to use well patterns. Regular patterns of heater wells equidistantly spaced from a production well may be used. The patterns may form equilateral triangular arrays, hexagonal arrays, or other array patterns. The arrays of heater wells may be disposed such that a distance between each heater well is less than about 70 feet (21 meters). A portion of the formation may be heated with heater wells disposed substantially parallel to a boundary of the hydrocarbon formation.

In alternative embodiments, the array of heater wells may be disposed such that a distance between each heater well may be less than about 100 feet, or 50 feet, or 30 feet. Regardless of the arrangement of or distance between the heater wells, in certain embodiments, a ratio of heater wells to production wells disposed within a organic-rich rock formation may be greater than about 5, 8, 10, 20, or more.

In one embodiment, individual production wells are surrounded by at most one layer of heater wells. This may include arrangements such as 5-spot, 7-spot, or 9-spot arrays, with alternating rows of production and heater wells. In another embodiment, two layers of heater wells may surround a production well, but with the heater wells staggered so that a clear pathway exists for the majority of flow away from the further heater wells. Flow and reservoir simulations may be employed to assess the pathways and temperature history of hydrocarbon fluids generated in situ as they migrate from their points of origin to production wells.

Figure 4:
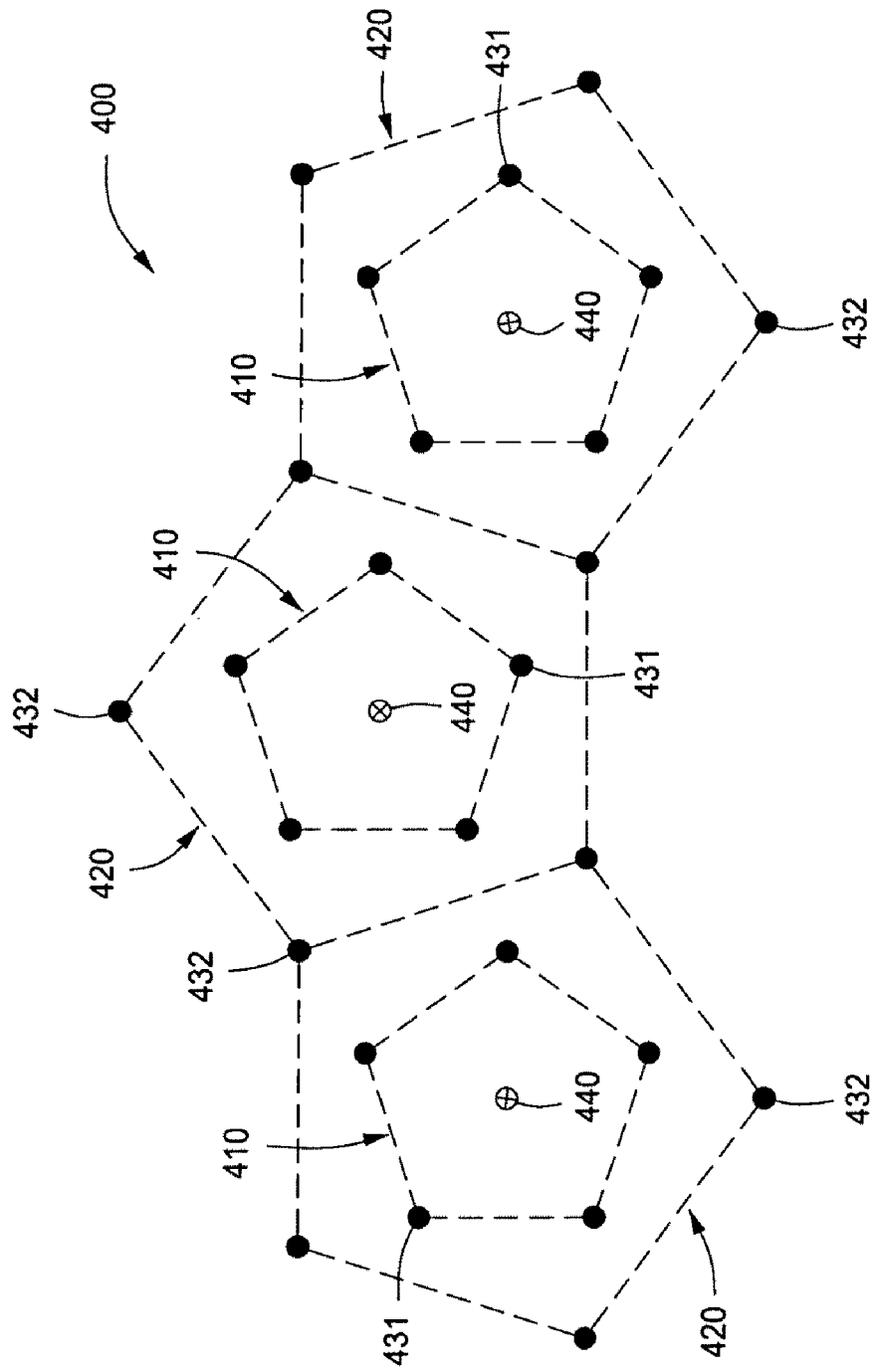
FIG. 4 is a plan view of an illustrative heater well pattern, around production wells. Two layers of heater wells are shown.

FIG. 4 provides a plan view of an illustrative heater well arrangement using more than one layer of heater wells. The heater well arrangement is used in connection with the production of hydrocarbons from a shale oil development area 400. In FIG. 4, the heater well arrangement employs a first layer of heater wells 410, surrounded by a second layer of heater wells 420. The heater wells in the first layer 410 are referenced at 431, while the heater wells in the second layer 420 are referenced at 432.

A production well 440 is shown central to the well layers 410 and 420. It is noted that the heater wells 432 in the second layer 420 of wells are offset from the heater wells 431 in the first layer 410 of wells, relative to the production well 440. The purpose is to provide a flowpath for converted hydrocarbons that minimizes travel near a heater well in the first layer 410 of heater wells. This, in turn, minimizes secondary cracking of hydrocarbons converted from kerogen as hydrocarbons flow from the second layer of wells 420 to the production wells 440.

In the illustrative arrangement of FIG. 4, the first layer 410 and the second layer 420 each defines a 5-spot pattern. However, it is understood that other patterns may be employed, such as 3-spot or 6-spot patterns. In any instance, a plurality of heater wells 431 comprising a first layer of heater wells 410 is placed around a production well 440, with a second plurality of heater wells 432 comprising a second layer of heater wells 420 placed around the first layer 410.

The heater wells in the two layers also may be arranged such that the majority of hydrocarbons generated by heat from each heater well 432 in the second layer 420 are able to migrate to a production well 440 without passing substantially near a heater well 431 in the first layer 410. The heater wells 431, 432 in the two layers 410, 420 further may be arranged such that the majority of hydrocarbons generated by heat from each heater well 432 in the second layer 420 are able to migrate to the production well 440 without passing through a zone of substantially increasing formation temperature.

Another method for reducing the number of heater wells is to use well patterns that are elongated in a particular direction, particularly in a direction determined to provide the most efficient thermal conductivity. Heat convection may be affected by various factors such as bedding planes and stresses within the formation. For instance, heat convection may be more efficient in the direction perpendicular to the least horizontal principal stress on the formation. In some instanced, heat convection may be more efficient in the direction parallel to the least horizontal principal stress.

In connection with the development of a shale oil field, it may be desirable that the progression of heat through the subsurface in accordance with steps 130 and 135 be uniform.

However, for various reasons the heating and maturation of formation hydrocarbons in a subsurface formation may not proceed uniformly despite a regular arrangement of heater and production wells. Heterogeneities in the oil shale properties and formation structure may cause certain local areas to be more or less productive. Moreover, formation fracturing which occurs due to the heating and maturation of the oil shale can lead to an uneven distribution of preferred pathways and, thus, increase flow to certain production wells and reduce flow to others. Uneven fluid maturation may be an undesirable condition since certain subsurface regions may receive more heat energy than necessary where other regions receive less than desired. This, in turn, leads to the uneven flow and recovery of production fluids. Produced oil quality, overall production rate, and/or ultimate recoveries may be reduced.

To detect uneven flow conditions, production and heater wells may be instrumented with sensors. Sensors may include equipment to measure temperature, pressure, flow rates, and/or compositional information. Data from these sensors can be processed via simple rules or input to detailed simulations to reach decisions on how to adjust heater and production wells to improve subsurface performance. Production well performance may be adjusted by controlling backpressure or throttling on the well. Heater well performance may also be adjusted by controlling energy input. Sensor readings may also sometimes imply mechanical problems with a well or downhole equipment which requires repair, replacement, or abandonment.

In one embodiment, flow rate, compositional, temperature and/or pressure data are utilized from two or more wells as inputs to a computer algorithm to control heating rate and/or production rates. Unmeasured conditions at or in the neighborhood of the well are then estimated and used to control the well. For example, in situ fracturing behavior and kerogen maturation are estimated based on thermal, flow, and compositional data from a set of wells. In another example, well integrity is evaluated based on pressure data, well temperature data, and estimated in situ stresses. In a related embodiment the number of sensors is reduced by equipping only a subset of the wells with instruments, and using the results to interpolate, calculate, or estimate conditions at uninstrumented wells. Certain wells may have only a limited set of sensors (e.g., wellhead temperature and pressure only) where others have a much larger set of sensors (e.g., wellhead temperature and pressure, bottomhole temperature and pressure, production composition, flow rate, electrical signature, casing strain, etc.).

As noted above, there are various methods for applying heat to an organic-rich rock formation. For example, one method may include electrical resistance heaters disposed in a wellbore or outside of a wellbore. One such method involves the use of electrical resistive heating elements in a cased or uncased wellbore. Electrical resistance heating involves directly passing electricity through a conductive material such that resistive losses cause it to heat the conductive material. Other heating methods include the use of downhole combustors, in situ combustion, radio-frequency (RF) electrical energy, or microwave energy. Still others include injecting a hot fluid into the oil shale formation to directly heat it. The hot fluid may or may not be circulated.

One method for formation heating involves the use of electrical resistors in which an electrical current is passed through a resistive material which dissipates the electrical energy as heat. This method is distinguished from dielectric heating in which a high-frequency oscillating electric current induces electrical currents in nearby materials and causes them to heat. The electric heater may include an insulated conductor, an elongated member disposed in the opening, and/or a conductor disposed in a conduit. An early patent disclosing the use of electrical resistance heaters to produce oil shale in situ is U.S. Pat. No. 1,666,488. The '488 patent issued to Crawshaw in 1928. Since 1928, various designs for downhole electrical heaters have been proposed. Illustrative designs are presented in U.S. Pat. Nos. 1,701,884, 3,376,403, 4,626,665, 4,704,514, and 6,023,554).

A review of application of electrical heating methods for heavy oil reservoirs is given by R. Sierra and S. M. Farouq Ali, "Promising Progress in Field Application of Reservoir Electrical Heating Methods", Society of Petroleum Engineers Paper 69709, 2001. The entire disclosure of this reference is hereby incorporated by reference.

Certain previous designs for in situ electrical resistance heaters utilized solid, continuous heating elements (e.g., metal wires or strips). However, such elements may lack the necessary robustness for long-term, high temperature applications such as oil shale maturation. As the formation heats and the oil shale matures, significant expansion of the rock occurs. This leads to high stresses on wells intersecting the formation. These stresses can lead to bending and stretching of the wellbore pipe and internal components. Cementing (e.g., U.S. Pat. No. 4,886,118) or packing (e.g., U.S. Pat. No. 2,732,195) a heating element in place may provide some protection against stresses, but some stresses may still be transmitted to the heating element.

As an alternative, international patent publication WO 2005/010320 teaches the use of electrically conductive fractures to heat the oil shale. A heating element is constructed by forming wellbores and then hydraulically fracturing the oil shale formation around the wellbores. The fractures are filled with an electrically conductive material which forms the heating element. Calcined petroleum coke is an exemplary suitable conductant material. Preferably, the fractures are created in a vertical orientation extending from horizontal wellbores. Electricity may be conducted through the conductive fractures from the heel to the toe of each well. The electrical circuit may be completed by an additional horizontal well that intersects one or more of the vertical fractures near the toe to supply the opposite electrical polarity. The WO 2005/010320 process creates an "in situ toaster" that artificially matures oil shale through the application of electric heat. Thermal conduction heats the oil shale to conversion temperatures in excess of 300° C., causing artificial maturation.

In the current disclosure, it is envisioned that heating elements may be electrically connected through use of a granular material. By using a granular material, the heating element will be much less susceptible to failure due to stresses and bending as the granular material can readily change shape as needed. Moreover the heater wells may be simpler, faster and cheaper to construct than actually intersecting the wellbores of the heater wells. In this respect, intersecting wellbores themselves via directional drilling is very challenging. Such a procedure requires steering a drill bit to a position within a few inches of a target many hundreds of feet below the surface. Such procedures would need to be followed up with the installation and connection of hardware downhole to create or complete an in situ electrical circuit. Such operations would need to be repeated hundreds of times to effectuate heating across a significant portion of an oil shale formation. For in situ shale oil field development, the difficulty and time it would take for such operations renders this concept cost prohibitive. Thus, methods are provided herein for applying heat to a subsurface formation wherein a granular material provides a conductive pathway between electrically conductive members within adjacent wellbores.

It is noted that U.S. Pat. No. 3,137,347 describes the use of granular conductive materials to connect subsurface electrodes for the in situ heating of oil shales. The '347 patent envisions the granular material being a primary source of heat until the oil shale undergoes pyrolysis. At that point, the oil shale itself is said to become electrically conductive. Heat generated within the formation and heat conducted into the surrounding formation due to the passing of current through the shale oil material itself generates hydrocarbon fluids for production. Also, Symington, et al. in international patent application WO2005/010320 describes using granular conductive materials within hydraulic fractures as heating elements.

In the present disclosure, methods for heating a subsurface formation using electrical resistance heating are provided. In the present methods, resistive heat is generated primarily from conductive members disposed within adjacent wellbores and not significantly from the granular material itself. In one aspect, the method includes creating a passage in the subsurface between a first wellbore located at least partially within the subsurface formation, and a second wellbore also located at least partially within the subsurface formation. The subsurface may be within the formation, or outside of the formation such as below the subsurface formation. An electrically conductive granular material is placed into the passage so as to provide electrical communication between the first wellbore and the second wellbore. The granular material thus forms a conductive pathway or connection between the wellbores.

Electrically conductive members are provided in the first and second wellbores. An electrical circuit comprised of the electrically conductive members, the granular material, and a power source is thereby formed. The first electrically conductive member, the second electrically conductive member, or both, have an electrical resistance sufficient to generate substantial heat with the subsurface formation upon application of a voltage.

The method may also include the step of establishing an electrical current through the electrical connection provided by the granular material. A voltage is applied across the first electrically conductive member in the first wellbore, the granular material, and the second electrically conductive member in the second wellbore, thereby causing an electrical current to flow. In this way resistive heat is generated. The generated heat is comprised of first heat generated from the first electrically conductive member, second heat generated from the second electrically conductive member, and third heat generated from the electrically conductive granular material. The first heat, the second heat, or both is greater than the third heat.

The method may also include the step of continuing to generate the electrical current so as to conduct heat from the first electrically conductive member, the second electrically conductive member, or both into the subsurface formation. In this way pyrolysis of solid hydrocarbons occurs within at least a portion of the subsurface formation.

In one aspect, the subsurface formation is an organic-rich rock formation. In one aspect, the subsurface formation contains heavy hydrocarbons and/or solid hydrocarbons such as kerogen. In one aspect, the formation hydrocarbons comprise at least one of oil shale, coal or tar sands.

It is preferred that the electrical resistance of the granular electrical connection formed by the granular material is less than the resistance of the first electrically conductive member and the second electrically conductive member. In one aspect, the resistivity of the material comprising the granular electrical connection is less than 0.0001 Ohm-meters.

The first electrically conductive member has a first heat rate, the second electrically conductive member has a second heat rate, and the granular electrical connection has a third heat rate. The first heat rate, the second heat rate, or both is greater than the third heat rate. In one example, the first heat rate, the second heat rate, or both is greater than 25,000 Watts. More preferably, the first heat rate, the second heat rate, or both is greater than 100,000 Watts.

In addition, the first electrically conductive member has a first heat rate per length, the second electrically conductive member has a second heat rate per length, and the granular electrical connection has a third heat rate per length. The first heat rate per length, the second heat rate per length, or both is greater than the third heat rate per length. For example, the first heat rate per length, the second heat rate per length, or both is greater than 100 Watts per meter. More preferably, the first heat rate per length, the second heat rate per length, or both is greater than 400 Watts per meter. In one example, the first heat rate per length, the second heat rate per length, or both is greater than 1,000 Watts per meter.

Preferably, the electrical current is established by applying a voltage across the electrically conductive pathway formed by the first conductive member, the second conductive member and the intermediate granular material. The electrical current may be a direct current. Alternately, the electrical current may be an alternating current.

In one embodiment, the material comprising the granular material has a substantially low electrical resistivity, thereby providing electrical conduction without substantial generation of heat. In one aspect, the heat generation from the granular electrical connection is less than 300 Watts per meter. Alternatively, the heat generation from the granular electrical connection is less than 100 Watts per meter.

In one aspect, the material comprising the granular material has an electrical resistivity of less than 0.0001 Ohm-meters. More preferably, the material comprising the granular material has an electrical resistivity of less than 0.000001 Ohm-meters. The electrically conductive granular material may include metal, metal coated particles, coke or graphite. In one embodiment, the granular material is comprised of a mixture of granular materials of differing electrical conductivity.

In one embodiment, the method further comprises evaluating the total electrical resistance of an electrical circuit formed by the first electrically conductive member, the granular material, and the second electrically conductive member.

The first wellbore may be completed in such a manner that it is substantially vertical. In this embodiment, the second wellbore may be deviated within the formation. Alternatively, at least a portion of the first wellbore within the subsurface formation may be substantially horizontal. In one aspect herein, both the first wellbore and the second wellbore are deviated.

The first wellbore may comprise an overburden casing located above the subsurface formation. Similarly, the second wellbore may comprise an overburden casing located above the subsurface formation. Preferably, the overburden casing in the first wellbore, the second wellbore, or both is not electrified.

In one embodiment, the first electrically conductive member, the second electrically conductive member, or both freely hangs within the wellbore. Preferably, the step of providing a first electrically conductive member in the first wellbore comprises providing a weight proximate the bottom of the first electrically conductive member so as to maintain the first electrically conductive member in tension. This helps to maintain the electrically conductive members in a more vertical orientation.

The first electrically conductive member and the second electrically conductive member may define a metal rod, metal bar, metal pipe or metal tube. In one aspect, the first electrically conductive member, the second electrically conductive member, or both is an elongated wire or a braided wire. In one aspect, the first electrically conductive member has a sharpened bottom end so as to facilitate downward movement through the granular material during thermal expansion. In another aspect, the conductive members are themselves granular materials.

In one aspect, the first electrically conductive member, the second electrically conductive member, or both has an electrical resistance of greater than 0.01 Ohms. Alternatively, the first electrically conductive member, the second electrically conductive member, or both has an electrical resistance of greater than 1.0 Ohms.

The material comprising at least a portion of the first electrically conductive member, the second electrically conductive member, or both may have an electrical resistivity of less than 0.0001 Ohm-meters. Alternatively, the material comprising at least a portion of the first electrically conductive member, the second electrically conductive member, or both has an electrical resistivity of less than 0.001 Ohm-meters. In either instance, the resistance of the first electrically conductive member and the second electrically conductive member may be lower above the subsurface formation than adjacent the subsurface formation so that resistive heating is primarily applied at the depth of the subsurface formation.

The step of placing electrically conductive granular material into the passage may comprise placing granular material into at least a portion of each of the first and second wellbores. In one embodiment, electrically conductive granular material is also placed into a third wellbore. In this embodiment, the method further comprises providing a third electrically conductive member in a third wellbore located at least partially within the subsurface formation. In such an embodiment, creating a passage in the subsurface includes creating the passage between the first wellbore, the second wellbore and the third wellbore. Similarly, the step of placing electrically conductive granular material into the passage comprises forming the granular electrical connection by placing the electrically conductive granular material into the passage so as to provide electrical communication between the first wellbore, the second wellbore, and the third wellbore. In this way, the electrically conductive flow path comprises the first electrically conductive member, the granular conductive pathway, the second electrically conductive member, and the third electrically conductive member.

In this embodiment, the step of establishing an electrical current through the electrically conductive flow path includes establishing the electrical current through the first electrically conductive member, the second electrically conductive member, the third electrically conductive member, and the granular material making up the conductive pathway. In this way, one or more of the electrically conductive members are resistively heated. Continuing to generate the electrical current causes heat to be conducted from the first electrically conductive member, the second electrically conductive member, the third electrically conductive member, or all three, into the surrounding subsurface formation. This, in turn, causes pyrolysis of solid hydrocarbons within at least a portion of the subsurface formation.

As noted, the method includes the step of creating a passage in the subsurface formation between the first wellbore and the second wellbore. In one aspect, this step comprises forming the passage via directional drilling. In another aspect, forming the passage comprises creating a convergence point between the first wellbore and the second wellbore. In this embodiment, the step of placing electrically conductive granular material into the passage comprises placing the granular material into the convergence point so as to provide electrical communication between the first electrically conductive member and the second electrically conductive member. The convergence point may be created by drilling. Alternatively, the convergence point may be created by rubblizing. In one aspect, the convergence point is enlarged after drilling by reaming, rubblizing or dissolution.

Another method for heating a subsurface formation using electrical resistance heating is also provided. In one aspect, the method includes providing a first substantially vertical wellbore, and providing a second substantially vertical wellbore adjacent the first wellbore. Each of the first and second vertical wellbores is hydraulically fractured in order to form fractures in the subsurface formation. Then, electrically conductive granular material is injected into the fractures from the first and second wellbores.

An electrically conductive member is provided in each of the first and second wellbores. Still further, a power source is provided. An electrical circuit is thus formed from the power source, the electrically conductive members in the first and second wellbores, and the intermediate granular material. The purpose is to generate resistive heat from the conductive members. This, in turn, warms the oil shale in the formation so as to pyrolyze at a least a portion of the oil shale into hydrocarbon fluids.

In one aspect the method may further include the step of providing a third substantially vertical wellbore. The subsurface formation is hydraulically fractured from the third wellbore to form yet additional fractures. Electrically conductive granular material is injected into the additional fractures from the third wellbore.

An electrically conductive member is also placed in the third wellbore. The electrically conductive member is in electrical communication with the power source. In this way, an electrical circuit is formed between the electrically conductive members in the first, second and third wellbores, the power source, and the electrically conductive granular material. The granular material is injected into the heater well arrangement such that the granular material from the first, second and third wellbores contacts the electrically conductive members to provide a conductive pathway.

It is preferred that the resistance of the granular connection is lower than the resistance of the electrically conductive members in the first, second and optional third wellbores. In this way, heat is generated primarily from the electrically conductive members and not from the granular material. In one aspect, the granular material comprises metal, metal coated particles, coke or graphite.

The method is ideally suited for use in heating an oil shale formation. Preferably, the formation is at a depth of 1,000 feet or less, that is, more shallow than 1,000 feet. It is expected at such depths that the fractures will form horizontally, thereby facilitating the intersection of the fractures with the wellbores.

In operation, a current is applied through the electrical circuit in order to resistively heat the conductive members. This, in turn, causes the surrounding oil shale to be warmed. The current may be a three-phase current to permit a circuit using three-phase power where one pole is connected to each wellbore. Alternatively, the power source may provide a two-phase current, such as an alternating current. Heat continues to be applied in order to resistively heat the oil shale formation so as to pyrolyze at least a portion of the oil shale into hydrocarbon fluids.

Still another method for heating a subsurface formation using electrical resistance heating is taught herein. In one aspect, the method includes providing a first substantially vertical wellbore, and providing a second substantially vertical wellbore adjacent the first wellbore. Each of the first and second wellbores is hydraulically fractured in order to form fractures in the subsurface formation. Then, the electrically conductive granular material is injected into the fractures from the first and second wellbores.

A fourth wellbore having a substantially horizontal bottom portion is also provided. That fourth wellbore is formed such that the bottom portion intersects the fractures from the first and second wellbores.

An electrically conductive member is provided in each of the first and second wellbores. In addition, an electrically conductive member is provided in the fourth wellbore. Still further, a power source is provided. An electrical circuit is thus formed from the power source, the electrically conductive members in the first and second wellbores, the granular material, and the electrically conductive member in the fourth wellbore.

In one aspect, the method may further include the step of providing a substantially vertical third wellbore. The subsurface formation is hydraulically fractured from the third wellbore to form additional fractures. An electrically conductive granular material is then injected into the additional fractures from the third wellbore.

An electrically conductive member is also placed in the third wellbore. The bottom portion of the fourth wellbore also intersects the additional fractures from the third wellbore. In this way, the electrical circuit further comprises the electrically conductive member in the third wellbore.

It is preferred that the resistance of the granular connection is lower than the resistance of the electrically conductive members in the first, second and third wellbores. In this way, heat is generated primarily from the electrically conductive members and not from the granular material. In one aspect, the electrically conductive granular material comprises metals, metal coated particles, or graphite. The power source is also preferably a three-phase current.

In operation, a current is applied through the electrical circuit in order to resistively heat the electrically conductive members. Heat continues to be applied in order to warm the surrounding oil shale formation so as to pyrolyze at least a portion of the oil shale into hydrocarbon fluids.

Yet another method for heating a subsurface formation using electrical resistance heating is disclosed herein. In one aspect, the method includes providing a first substantially vertical wellbore having a bottom portion within the subsurface formation. The method also includes providing a second wellbore having a bottom portion that intersects the bottom portion of the first wellbore, and providing a third wellbore having a bottom portion that also intersects the bottom portion of the first wellbore. These bottom portions thereby form a point of convergence. In one aspect, the point of convergence is reamed or rubblized in order to further open up a void at the point of convergence. Alternatively, a chemical or fluid dissolution process may be employed to further open up a void.

An electrically conductive member is provided in each of the first, second and third wellbores. An electrically conductive granular material is also provided. The granular material is injected into the point of convergence and into at least one of the first, second and third wellbores. Granular material is injected in such a way that the granules contact the electrically conductive members in each of the wellbores. A power source is provided, and an electrical circuit is thus formed from the power source, the electrically conductive members in the first, second and third wellbores, and the granular material.

It is preferred that the resistance of the granular connection is lower than the resistance of the electrically conductive members in the first, second and third wellbores. In this way, heat is generated primarily from the electrically conductive members and not from the granular material. In one aspect, the electrically conductive granular material comprises metals, metal coated particles, or graphite. The power source may be either a three-phase current or a two-phase current.

Figure 29:
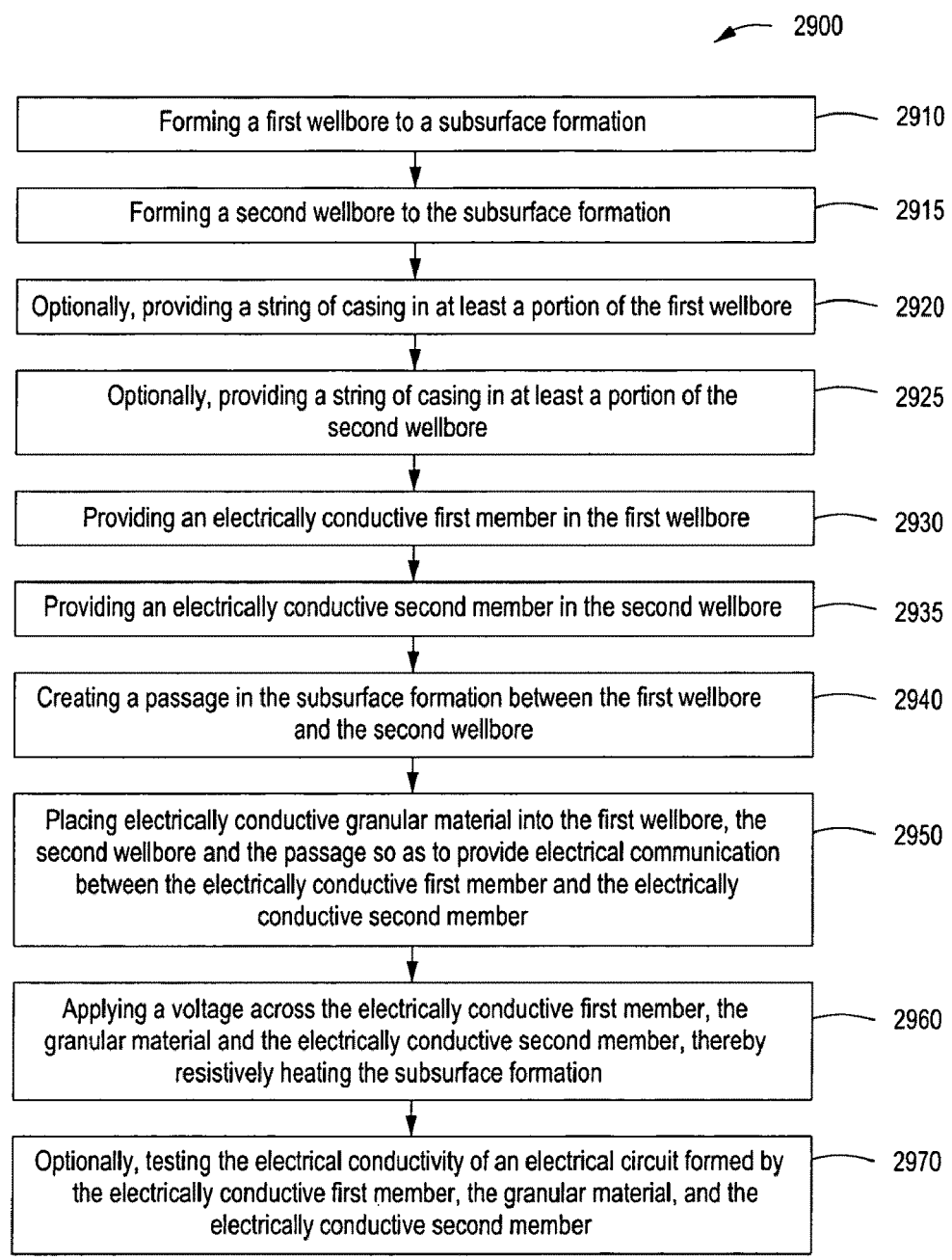
FIG. 29 is a flow chart showing steps that may be performed in connection with one embodiment of heating a subsurface formation using electrical resistance heating.

FIG. 29 provides a flow chart showing certain steps that may be performed in connection with one embodiment 2900 of the present inventions. In the method 2900, a first wellbore is formed to a subsurface formation. This is shown at Box 2910. In addition, a second wellbore is formed to the subsurface formation. This is shown at Box 2915. The two wellbores are adjacent to each other, and together form a downhole heater arrangement.

The two wellbores may optionally be cased. Thus, the method 2900 may include the step of providing a string of casing in at least a portion of the first wellbore. The method 2900 may also include the step of providing a string of casing in at least a portion of the second wellbore. These optional steps are shown at Box 2920 and Box 2925, respectively. Preferably, the near surface casing is electrically isolated and not energized when electricity is passed through the wells. Electrically isolating the casing can aid safety and can also prevent electricity leakage through conductive overburden layers, that is, layers saturated with brines.

Each of the wellbores includes a conductive member. Therefore, the method 2900 includes the step of providing a first electrically conductive member in the first wellbore, and a second electrically conductive member in the second wellbore. These steps are shown at Box 2930 and Box 2935, respectively.

In accordance with the method 2900, electrical communication is provided between the first wellbore and the second wellbore. More specifically, electrical communication is provided between a first electrically conductive member in the first wellbore and a second electrically conductive member in the second wellbore. To provide the desired electrical conductivity, a passage is created in the subsurface formation between the first wellbore and the second wellbore. This may be done through, for example, hydraulic fracturing or directional drilling. This step is shown at Box 2940.

In one embodiment for the method, the step of creating a passage in the subsurface comprises hydraulically fracturing. In this way, a fracture is formed between the first wellbore and the second wellbore. The hydraulic fracture may be horizontal or vertical. In the case of vertical fractures, the wells should be aligned with the direction of fracturing. The process of using horizontally connecting fractures is ideally suited for use in heating a relatively shallow oil shale formation, preferably at a depth of 1,000 feet or less. At such depths fracture wings will most likely form horizontally, thereby facilitating the intersection of the fractures with the wellbores. In this instance, the wells can be arbitrarily arranged so long as they are spaced within the fracture length. More than one horizontal fracture may be used to connect the wells.

An electrically conductive granular material is placed into the first wellbore, the second wellbore, and the passage. This provides electrical communication between the first electrically conductive member and the second electrically conductive member. This step is shown at Box 2950. Although the passage is largely filled with electrically conductive granular material, the wellbores are not necessarily filled. Preferably, only the lower portions of the wells are filled with granular material.

In accordance with certain embodiments of the present invention, an electrically conductive flow path is created between the first electrically conductive member and the second electrically conductive member. The flowpath includes the granular material that provides electrical communication between the first and second wellbores. The step of placing electrically conductive granular material into the passage may comprise injecting the granular material into the fracture so as to provide electrical communication between the first electrically conductive member and the second electrically conductive member.

The granular material may be placed into the wellbores in various ways. In one aspect, the step of placing electrically conductive granular material into the passage is performed by pouring the granular material into the first wellbore, the second wellbore, or both. Alternatively, the step of placing electrically conductive granular material into the passage is performed by blowing the granular material into the first wellbore, the second wellbore, or both. Alternatively still, the step of placing electrically conductive granular material into the passage is performed by slurrying the granular material into the first wellbore, the second wellbore, or both.

In one preferred embodiment, the step of placing electrically conductive granular material into the passage is performed first by inserting a flexible working string into the first wellbore, the second wellbore, or both. Granular material is inserted into the flexible working string. The flexible working string is then pulled, thereby leaving the granular material in place. The working string may optionally be reciprocated or vibrated in order to aid the settling and packing of the granular material.

In one aspect, a mass of nonconducting granular material may be inserted on top of the electrically conductive granular material within the first wellbore, the second wellbore, or both. This serves to provide weight to compact the electrically conductive granular material in the wellbores.

In one embodiment of the methods, the step of creating a passage in the subsurface again comprises creating a hydraulic fracture in the subsurface between the first wellbore and the second wellbore. The hydraulic fracture may be created by hydraulically fracturing the first wellbore, the second wellbore, or both. The electrically conductive granular material may include granules adapted to serve as proppant for the hydraulic fracture. The electrically conductive granular material is left in place within the fracture wings to create an electrically conductive propped fracture in the subsurface. This also serves to provide electrical communication between the first electrically conductive member and the second electrically conductive member.

In one embodiment, the step of creating a passage in the subsurface formation comprises creating a first hydraulic fracture that intersects the first wellbore, creating a second hydraulic fracture that intersects the second wellbore, and providing a third wellbore intersecting the first hydraulic fracture and the second hydraulic fracture. Here, the third wellbore has a third electrically conductive member. The third electrically conductive member may be a metal rod, a metal bar, a wire, or a tubular body. The step of placing electrically conductive granular material into the passage comprises placing the granular material into the first hydraulic fracture so as to create a first electrically conductive fracture, and placing the granular material into the second hydraulic fracture so as to create a second electrically conductive fracture. The step may also comprise placing the granular material into the third wellbore. What matters is that a granular connection is made with the first, second, and third electrically conductive members.

In one aspect, the first wellbore is substantially vertical, the second wellbore is substantially vertical, but the third wellbore is deviated.

In order to heat the subsurface formation, an electrical current is sent through the first electrically conductive member and the second electrically conductive member. The electrical current is established by applying a voltage across the electrically conductive flow path, including the granular material. This step is shown at Box 2960. The electrically conductive granular material preferably has lower resistance relative to the first electrically conductive member and the second electrically conductive member. In this way, the resistive heating is primarily applied by the first electrically conductive member, the second electrically conductive member, or both, rather than the granular material. Stated another way, the first electrically conductive member, the second electrically conductive member, or both produce substantially greater heat generation from the resistive heating than does the granular electrical connection.

It may be desirable to test the circuit created by the first electrically conductive member, the granular material, and the second electrically conductive member prior to moving drilling or fracturing equipment to another location. Therefore, an optional additional step is to test the electrical conductivity of an electrical circuit formed by the first electrically conductive member, the granular material and the second electrically conductive member. This optional step is shown at Box 2970.

It is desirable to continue to generate the electrical current through the electrically conductive flowpath so that resistive heat increases. The heat warms the surrounding subsurface formation, causing pyrolysis of solid hydrocarbons within at least a portion of the subsurface formation.

It is understood that the method 2900 may be carried out using multiple wellbores, each having a separate electrically conductive member. The multiple wellbores may be placed in a pattern such as a linear array (not shown) for heating across an organic-rich formation. Passageways are provided between selected groups of wellbores to form multiple heater well arrangements. The groups preferably comprise groups of two, three or four adjacent wellbores. Thus, in one aspect, the steps 2910 through 2970 are repeated for multiple heater well arrangements.

The flowchart of FIG. 29 is intended to be a general representation of methods provide herein for heating an organic-rich formation. However, various heater well arrangements may be employed for implementing the method 2900. Examples of such arrangements are described below.

Figure 30A:
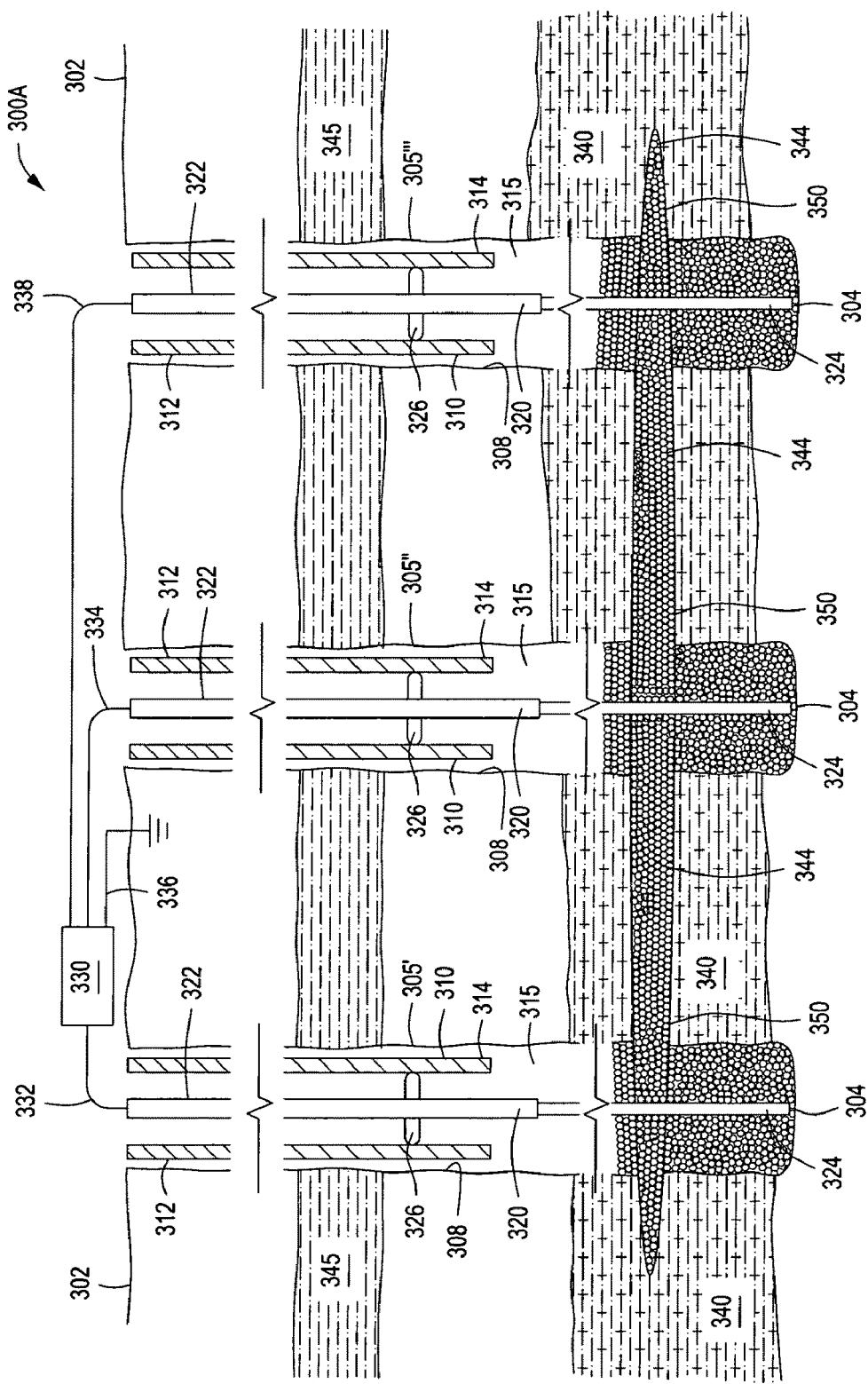
FIG. 30A is a cross-sectional view of a heater well arrangement, in one embodiment. Here, three wellbores are formed with a subsurface connection provided in a targeted formation via hydraulic fracturing. Granular material is used to provide an electrically conductive pathway between the wellbores.

FIG. 30A is a cross-sectional view of a heater well arrangement 300A, in one embodiment. Here, three wellbores 305', 305", and 305''' are completed within a subsurface formation 340. The subsurface formation 340 is an organic-rich formation. Preferably, the organic-rich formation 340 comprises heavy hydrocarbons or solid hydrocarbons such as coal, tar sands or kerogen. In one aspect, the subsurface formation 340 is an oil shale formation.

Each of the respective wellbores 305', 305", 305''' defines a bore 315 through the earth. Each bore 315, in turn, has a wall 308 that defines a radius. Each bore 315 also has an upper end at an earth surface 302, and a lower end 304 proximate the bottom of the oil shale formation 340.

Each wellbore 305', 305", 305''' receives an electrically conductive member 320. The conductive members 320 each have an upper end 322 proximate the earth surface 302, and a lower end 324 proximate the organic-rich subsurface formation 340. The conductive members 320 shown in FIG. 30A are solid rods. However, the conductive members 320 may alternatively be tubular members such as coiled metal alloy tubing. Alternatively, the conductive members 320 may be another type of solid body such as a wire, an insulated cable, a metal ribbon or a braided wire. What is preferred is that the conductive members 320 be fabricated from a material that is electrically conductive at temperatures in excess of 270° C., and preferably in excess of 600° C.

The conductive members 320 may be fabricated from any conductive material. In one aspect, the material is a metal. In one aspect, the conductive members 320 are ferromagnetic and have a Curie temperature of between 400° C. and 850° C.

It is noted that the configuration of the conductive members 320 is preferably different proximate the subsurface formation 340 than above the subsurface formation 340. In this respect, the conductivity of the conductive members 320 may be higher above the subsurface formation 340 than adjacent the subsurface formation 340. The heater well arrangement 300A of FIG. 30A demonstrates that each conductive member 320 has an upper portion 322 and a lower portion 324. The upper portion 322 has a high relative conductivity (or lower resistance), while the lower portion 324 has a low relative conductivity (or higher resistance).

Varying the conductivity of the conductive members 320 may be accomplished in different ways. For example, the upper portion 322 may be fabricated from a material having a lower resistivity than the material of the lower portion 324. Alternatively, the thickness of the conductive members 320 may change with depth so as to alter the linear resistivity. In the arrangement 300A of FIG. 30A, the upper portion 322 has a greater diameter or thickness than the lower portion 324. In this way the upper portion 322 may carry the current without substantial heating. In either embodiment, resistive heat is applied primarily at the depth of the subsurface formation 340.

The heat generation from the electrically conductive members 320, particularly the lower portions 324 thereof, may be greater than 100 Watts per meter. Alternatively, the heat generation from the lower portions 324 of the electrically conductive members 320 may be greater than 400 Watts per meter, or even greater than 1,000 Watts per meter.

Each wellbore 305', 305", 305''' also may include a string of casing 310. The respective casing strings 310 have an upper portion 312 proximate the earth surface 302, and a lower portion 314 that terminates above the targeted subsurface formation 340. In the heater well arrangement 300A, the casing strings 310 do not carry a current and play no role in resistively heating the subsurface formation 340. Rather, the primary purpose of the strings of casing 310 is to isolate any subsurface aquifers, such as a salt water aquifer represented at 345. The casing strings 310 prevent an electric current from being sent into the formation 345 that will carry an electrical current due to the presence of brines. The casing strings 310 also protect groundwater from any hydrocarbon fluids that might migrate upward from the formation 340 during pyrolysis. In alternate embodiments, portions of the casing string 310 may carry electrical current.

When the wellbores 305', 305", 305''' are cased, it is desirable to prevent a short circuit in the heater well 300A. This means that the strings of casing 310 should not come into contact with the electrically conductive members 320. To prevent such an occurrence, centralizers 326 may be placed in the wellbores 305', 305", 305'''. The centralizers 326 are substantially nonconductive.

As an alternative to the use of centralizers 326, or in addition, an insulative coating (not shown) may be provided around each of the conductive members 320, at least at the depth where the casing 310 exists. The insulative coating may be a ceramic coating, a cement coating, or other protective and nonconductive material.

In order to practice the method 2900 using heater well arrangement 300A, it is desirable to provide electrical communication between the conductive members 320 within the respective wellbores 305', 305", 305'''. Thus, in one aspect the central wellbore 305" is first hydraulically fractured at one or more selected depths within the organic-rich formation 340. An elongated fracture 350 is seen extending from the central wellbore 305" into each of the adjacent wellbores 305' and 305'''. During the hydraulic fracturing process, pressure is preferably maintained in the adjacent wellbores 305' and 305''' so as not to leak off the fracturing fluids as the fracture hits the bores 315. In FIG. 30A, the fracture 350 is shown located within the formation 340; however, the fracture 350 may alternatively be located outside of the formation 340 in another region of the subterranean earth, such as below the formation 340.

After one or more fractures 350 are established, the granular material 344 is injected into the fracture 350 within the formation 340. The granular material 344 is injected into one wellbore (such as central wellbore 305") in such a manner as to cause the granular material 344 to extend into and through the adjacent wellbores (such as wellbores 305' and 305'''). In one aspect, granular material 344 is also injected directly into the bores 305 of the adjacent wellbores 305', 305'''. This increases the area of contact between the electrically conductive granular material 344 with the resistive portions 324 of the conductive members 320. In either instance a granular electrical connection between the wellbores 305', 305", 305''' is made to form an electrically conductive flowpath.

The granular material 344 may be placed in the wellbores 305', 305", 305''' by pouring it in dry, by blowing it in through moveable and removable tubing (e.g., coiled tubing or other flexible working string), or by slurrying it in. Slurrying the material with a liquid is not the preferred method since the liquid will then need to be removed if the heater well 300A is to be heated above its boiling point. Heating the wellbores 305', 305", 305''' to vaporize the liquid may result in void spaces forming in the granular material 344 and interfere with the electrical properties. Whatever the method of placing the granular material 325 in the wellbores 305', 305", 305''', reciprocating the flexible working string and/or the conductive members 320 can aid the settling and packing of the granular material 344. Additionally, a mass of nonconducting granular material (not shown) may be placed on top of the granular material 344 to provide weight for compaction.

The granular material 344 preferably creates a layer that is only a few millimeters in thickness but extends horizontally from several meters to, for example, 10 to 75 meters. Extended horizontal fractures typically only arise in more shallow formations. In the Piceance Basin where much oil shale is know to exist, fractures will open up horizontally generally at depths more shallow than about 1,000 feet. Thus, the heater well arrangement 300A will typically be employed at more shallow depths.

Suitable granular material 344 may include metal, coke, or graphite. The granular material 325 may be hollow, solid, porous, sintered, or agglomerated, so long as the material conducts electricity. In one aspect, the material making up the granular material 344 has a resistivity less than about 0.00001 (1×10$^{-5}$) ohm-meters. The bulk granular material forms a conductive pathway that defines a granular connection. In one aspect, the resistivity of the granular connection is less than 0.001 Ohm-meters, or even less than 0.00001 Ohm-meters.

It is desirable to increase the surface area contact of the particles making up the granular material 344. In one aspect, the granular material 344 comprises irregularly shaped particles or flakes. Small rods or filings may also be used. The granular particles may be less than about 10 mm, 1 mm, or 0.1 mm in width or diameter. The particles may have a distribution of sizes or be faceted to improve particle-to-particle contact. This, in turn, enhances bulk conductivity.

In the heater well arrangement 300A of FIG. 30A, the wellbores 305', 305", 305''' are at least partially cased. However, it is understood that the wellbores 305', 305", 305''' may optionally be fully cased through the subsurface formation 340. In this instance, the casing strings 310 would preferably be densely perforated to facilitate the electrically conductive pathway formed by the granular material 344.

In order to practice the method 2900 using heater well arrangement 300A, it is desirable to complete or form an electrical circuit comprised of the conductive members 320 within each wellbore 305', 305", 305''' and the electrically conductive granular material 344. Therefore, a power source 330 is employed. The power source 330 delivers an electrical current to each of the conductive member 320. Conductive wire 332 provides electrical communication between the power source 330 and the conductive member 320 in the first wellbore 305'; conductive wire 334 provides electrical communication between the power source 330 and the conductive member 320 in the second wellbore 305"; and conductive wire 338 provides electrical communication between the power source 330 and the conductive member 320 in the third wellbore 305'''. A fourth wire 336 optionally goes to ground.

In the heater well arrangement 300A, three-phase electrical power may be employed. Preferably, the current is an alternating current. Current flows down each electrically conductive member 320 within each respective wellbore 305', 305", 305'''. The current further travels through the electrically conductive granular material 344 to complete the circuit.

It is understood that the heater well arrangement 300A may utilize only two wellbores rather than three. Where only two wellbores are used, a two-phase alternating current may be used, with one wellbore representing a positive pole and the other wellbore defining a negative pole. A two-phase direct current may alternatively be used with two wellbores. A two-wellbore heater well arrangement is shown at 300B in FIG. 30B, which utilizes a drilled connection pathway.

In operation, the three-phase power source 330 is activated. A voltage is applied across the conductive members 330 in each wellbore 305', 305", 305''' and through the electrically conductive granular material 344. The power delivered through the wellbores 305', 305", 305''' is dependent on a number of factors such as well spacing and desired heating rate. In one aspect, the power is 300 Watts to 3,000 Watts per meter of heated length.

The process of operating the heater well 300A causes heat to be conducted from the conductive members 320 into the surrounding subsurface formation 340. This is due to the resistivity of the conductive members 320 being greater than the resistivity in the granular connection. The resistive heat from the conductive members 320 pyrolyzes solid hydrocarbons making up the formation 340 into hydrocarbon fluids.

Based upon the heater well arrangement 300A of FIG. 30A, a method for heating a subsurface formation 340 using electrical resistance heating may be practiced. In one aspect, the method includes providing a first substantially vertical wellbore 305', and providing a second substantially vertical wellbore 305" adjacent the first wellbore 305'. At least one of the first 305' and second 305" vertical wellbores is hydraulically fractured in order to form one or more fractures 350 in the subsurface formation 340. The one or more fractures 350 intersect the wellbores 305', 305". Electrically conductive granular material 344 is injected into the fractures 350 from at least one of the first 305' and second 305" wellbores.

An electrically conductive member 320 is provided in each of the first 305' and second 305" wellbores. A power source 330 is also provided. An electrical circuit is thus formed from the power source 330, the electrically conductive members 320 in the first 305' and second 305" wellbores, and the granular material 344.

In one aspect, and more closely in form to the heater well arrangement 300A, the method may further include the step of providing a third substantially vertical wellbore 305'''. The subsurface formation 340 is hydraulically fractured from the second wellbore 305" to intersect the first 305" and third 305''' wellbores. The electrically conductive granular material 344 is then injected into the fracture 350 from the second wellbore 305". In one aspect, the granular material 344 includes a proppant such as metal shot that is injected as the fracturing fluid. Alternatively, the proppant may comprise metal, graphite, or coke. Alternatively still, the proppant may comprise a low-density metal such as aluminum or magnesium.

An electrically conductive member 320 is also placed in the third wellbore 305'''. The power source 330 is used so that an electrical circuit is formed between the electrically conductive members in the first 305', second 305" and third 305''' wellbores, the power source 330, and the electrically conductive granular material 344. The electrically conductive granular material 344 is injected into the heater well arrangement 300A such that the granular material 344 contacts the electrically conductive members 320. In one aspect, additional granular material 344 is deposited directly into the bores 315 of each of the three wellbores 305', 305", 305'''.

It is preferred that the resistance of the granular connection defined by the fractures 350 is lower than the resistance of the electrically conductive members in the first 305', second 305" and third 305''' wellbores. In this way, heat is generated primarily from the electrically conductive members 320 and not from the granular material 344. In one aspect, the electrically conductive granular material 344 comprises metal, metal coated particles, coke or graphite. The power source 330 is also preferably a three-phase source. In this instance, an electrical current is established.

In operation, a current is applied through the electrical circuit in order to resistively heat conductive members 320. This process would include applying a three-phase voltage across the electrically conductive flowpath. A first-phase of the three-phase voltage is applied to the first electrically conductive member in the first wellbore 305'; a second-phase of the three-phase voltage is applied to the second electrically conductive member in the second wellbore 305"; and a third-phase of the three-phase voltage is applied to the third electrically conductive member in the third wellbore 305'''. This causes the surrounding oil shale formation 340 to be heated. Heat continues to be applied in order to pyrolyze at least a portion of the oil shale 340 into hydrocarbon fluids.

The method is ideally suited for use in heating an oil shale formation. Preferably, the formation 340 is at a depth above about 1,000 feet, or more shallow. It is expected at such depths that the fractures 350 will form horizontally, thereby facilitating the intersection of the bores 315 by the fractures 350.

Figure 30B:
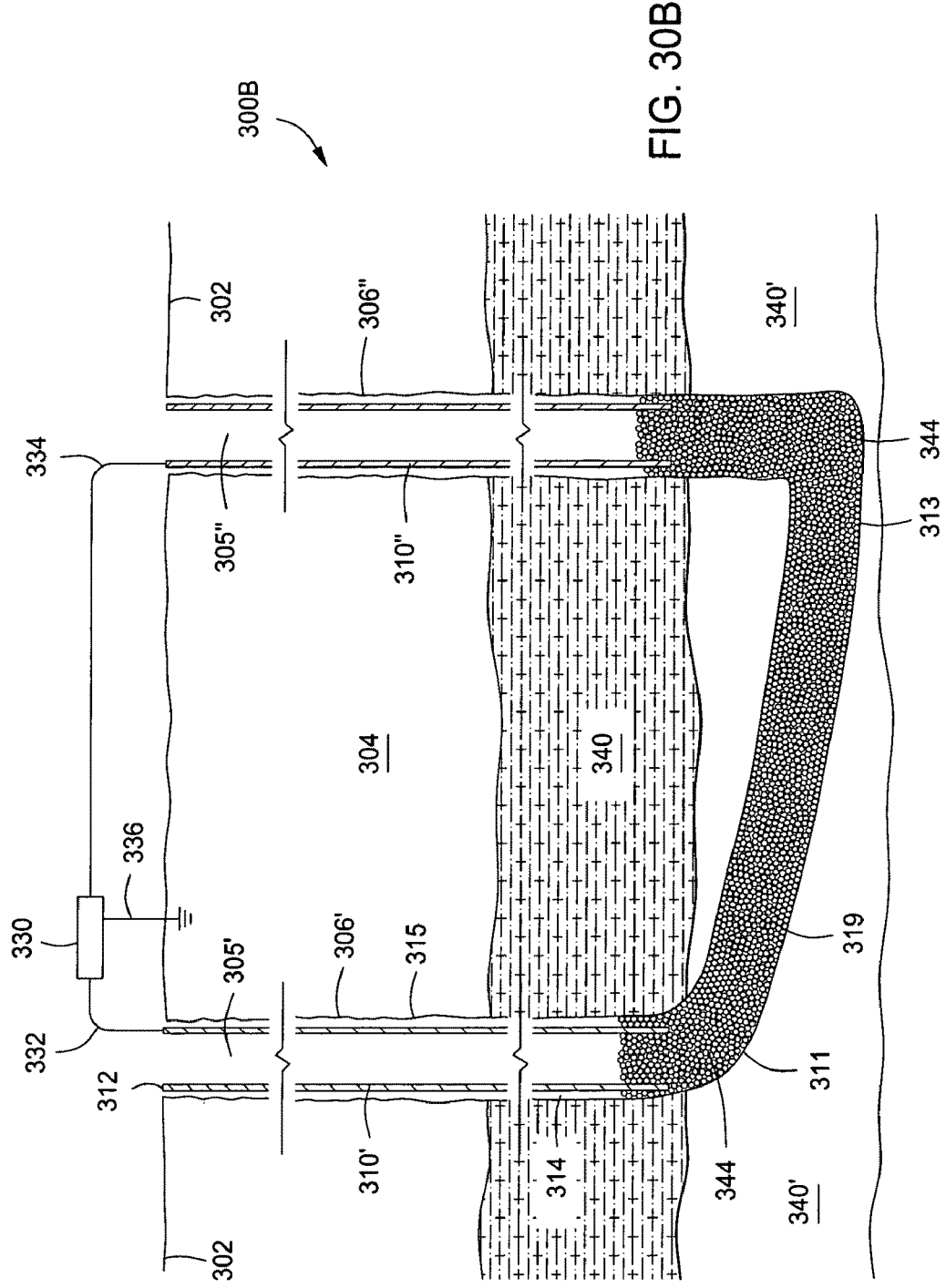
FIG. 30B is another cross-sectional view of a heater well arrangement, in an alternate embodiment. Here, two wellbores are formed with a subsurface connection provided below a targeted formation through directional drilling. Granular material is used to provide an electrical connection between the wellbores, with resistive heat being generated by conductive members in the respective wellbores.

FIG. 30B is another cross-sectional view of a heater well arrangement 300B, in an alternate embodiment. Here, two adjacent wellbores 305', 305" are formed, with each wellbore being completed through a targeted subsurface formation 340. Granular material 344 is again placed through a passage partially within and partially below the subsurface formation 340 in order to provide a conductive pathway between two wellbores 305' and 305".

The first wellbore is designated as 305'. Wellbore 305' is completed from an earth surface 302, through subterranean earth or overburden 304, and through the subsurface formation 340. The first wellbore 305' has a wall 306' that defines a radius. The first wellbore 305' is preferably, though not necessarily, completed as an open hole at the level of the targeted formation 340. Preferably, the formation 340 comprises solid hydrocarbons such as kerogen.

In the illustrative heater well arrangement 300B, the first wellbore 305' is completed with a vertical portion 315 and a deviated (or substantially horizontal) portion 319. The deviated portion 319 has a heel 311 and a toe 313. The deviated portion 319 extends below the targeted formation 340 into an underburden 340' and intersects the second wellbore below the target formation 340 within the underburden 340'. This means that the first wellbore 305' is directionally drilled. Alternatively the deviated portion could be located mostly or completely within the targeted formation and could intersect the second wellbore within or below the target formation 340.

The first wellbore 305' comprises a first electrically conductive member 310'. In the illustrative heater well arrangement 300B, the first electrically conductive member 310' is a tubular body such as a string of casing. The string of casing 310' has a top end 312 adjacent the earth surface 302, and a lower end 314. The lower end 314 is preferably terminated within the targeted formation 320 and, more preferably, near the beginning of the deviated portion 319 of the first wellbore 305'. The string of casing 310' may be fabricated from any conductive material, such as metal.

As noted, the heater well 300B also comprises a second wellbore 305". Wellbore 305" is also completed from an earth surface 302, through the subterranean earth 304, and into the targeted subsurface formation 340. The second wellbore 305" has a wall 306" that defines a radius. The second wellbore 305" is preferably completed with casing 310" at the level of the subsurface formation 340. The casing 310" serves as a second electrically conductive member for the heater well 300B. The second wellbore 305" may be vertical, directional, or horizontal. In this illustrative heater well 300B, the second wellbore 305" is substantially vertical.

The first wellbore 305' and the second wellbore 305" meet below the subsurface formation 340. The wellbores 305', 305" meet at a point of convergence which, in FIG. 30B, is at the toe 313.

The resistance of the conductive members 310' and 310" is higher than the resistance of the granular material 344. In this way, resistive heat is generated primarily from the electrically conductive members 310', 310". In one aspect, an electrical current is established by an electrically conductive flow path defined by the electrically conductive member 310' in the first wellbore 305', the intermediate granular material 344, and the electrically conductive member 310" in the second wellbore 305". Resistive heat is generated as a result of the electrical current through the electrically conductive members 310', 310". The generated heat is comprised of a first heat generated from the first electrically conductive member 310', a second heat generated from the second electrically conductive member 310", and a third heat generated from the granular material 344. The first heat and the second heat are each greater than the third heat.

It is once again desirable to provide electrical power to the heater well arrangement 300B. Therefore, a power source 330 is employed. The power source 330 delivers an electrical current to either the first electrically conductive member 310' or the second electrically conductive member 310". Conductive wire 332 provides electrical communication between the power source 330 and the top 312 of the first electrically conductive member 310', while conductive wire 334 provides electrical communication between the power source 330 and the second electrically conductive member 310".

In one aspect, a positive pole is set up at conductive wire 334 and a negative pole is set up at conductive wire 332. Current flows down the wellbore 305' through the first string of casing 310', and then up the wellbore 305" through the second string of casing 310". Of course, the polarities could be reversed.

It is necessary to provide a form of electrical communication between the strings of casing 310', 310". In accordance with method 2900, the electrically conductive granular material 344 is used. The electrically conductive granular material 344 is placed in the wellbores 305', 305", including deviated portion 319, so as to form a conductive pathway between the first 310' and second 310" electrically conductive members. To aid in this, the deviated portion 319 of the first wellbore 305' is filled with the electrically conductive granular material 344. The granular material 344 may be placed in the wellbores 305', 305" in the same manner as it is placed in wellbore 300A. In one aspect, the granular material 344 is comprised of calcined coke, graphite, metal oxides, ceramic particles coated with thin metal layers, or combinations thereof. A mass of nonconductive granular material (not shown) may be placed on top of the electrically conductive granular material 344 so as to compact it and to ensure surface-to-surface contact.

It is noted that the use of intersecting wellbores 305' and 305" permits the operator to pull a string of heating elements. In this instance, the heating elements could alternatively be electrically conductive members (not shown) other than the depicted string of casing. In one aspect for the heater well 300B, the heating elements may be pulled through the first wellbore 305' and, possibly, into the second wellbore 305". This method of pulling a string of heating elements is particularly beneficial for installing heating elements in long deviated or horizontal wells such as wellbore portion 319.

In order to limit heating to the depth of the formation 320, the conductive members 310', 310" may optionally be fabricated from materials of different resistivities. Thus, for example, an upper portion 312 of the conductive members 310', 310" may be fabricated from a metal having a high conductivity such as a high conductivity metal alloy, while the portion 314 of the conductive members 310', 310" adjacent to the formation 320 is fabricated from a low conductivity metal such as steel alloy. Alternatively, the thicknesses of the conductive members 310', 310" may change with depth so to alter the linear resistivity (i.e., ohms per meter). Thicker elements may be used adjacent the overburden 304 so as to carry current without substantial heating, whereas thinner elements may be used closer or along to the subsurface formation 340.

Figure 31:
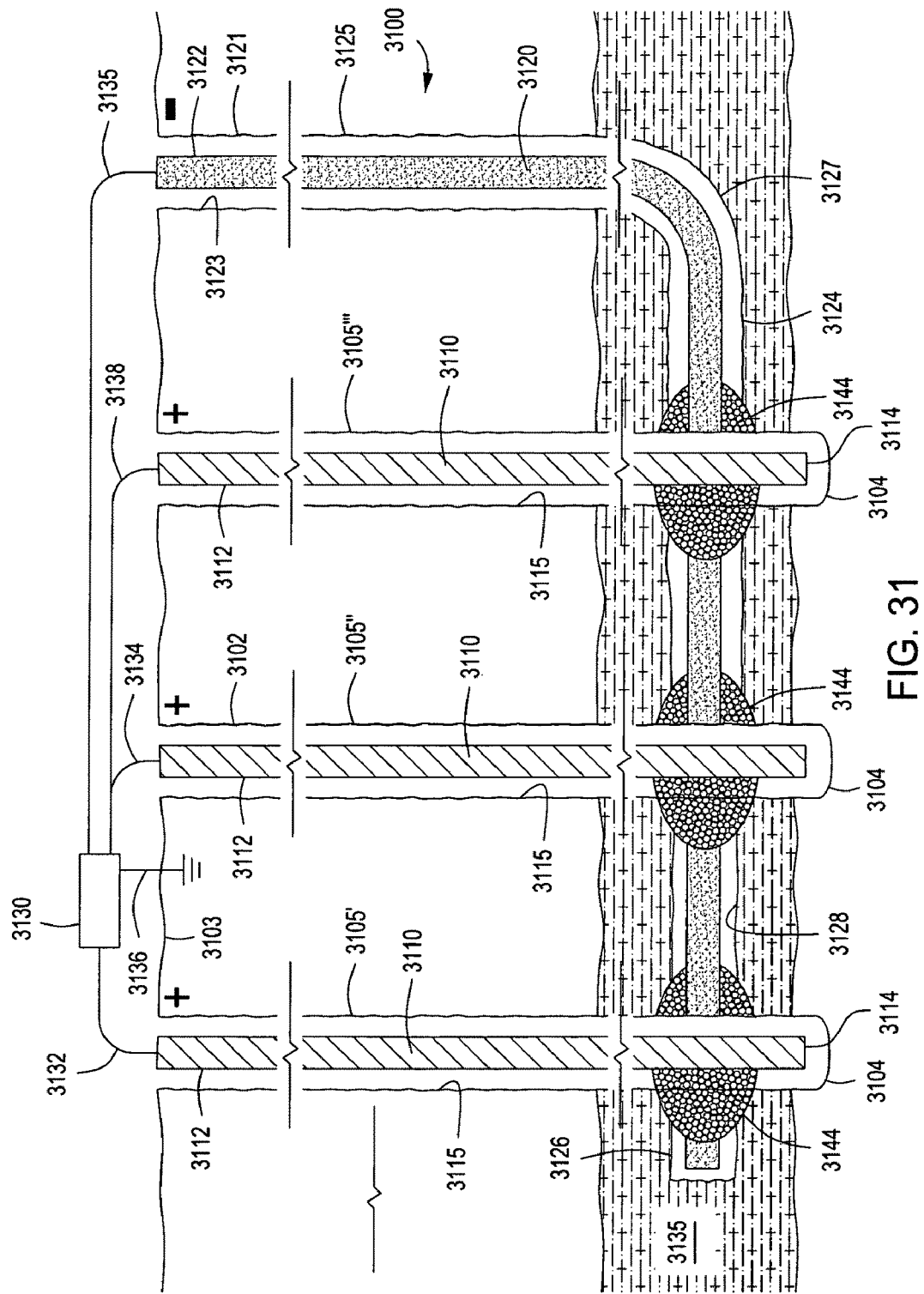
FIG. 31 is a cross-sectional view of a heater well arrangement, in another alternate embodiment. Here, four wellbores are formed within a subsurface formation, with one of the wellbores horizontally intersecting relatively small fractures emanating from each of the other three wellbores. Conductive granular material in the fractures is used to provide an electrical connection between the wellbores.

The inventors have conceived of other ways of forming a heater well for resistively heating a subsurface formation. FIG. 31 is a cross-sectional view of a heater well arrangement 3100, in an alternate embodiment. Here, four wellbores 3105', 3105", 3105''', 3125 are formed, with each wellbore 3105', 3105", 3105''', 3125 being completed within a subsurface formation 3135.

Wellbores 3105', 3105", 3105''' are completed substantially vertically. Each wellbore 3105', 3105", 3105''' has a wall 3115 that defines a radius. Each wellbore 3105', 3105", 3105''' has an upper end 3102 at an earth surface 3103, and a lower end 3104 proximate the organic-rich subsurface formation 3135. In addition, each wellbore 3105', 3105", 3105''' has an electrically conductive member 3110. The conductive members 3110 also each have an upper end 3112 proximate the earth surface 3103, and a lower end 3114 proximate the subsurface formation 3135.

In the heater well arrangement 3100 of FIG. 31, the conductive members 3110 are shown as solid bodies. However, they may also be tubular bodies such as conductive members 310', 310" of FIG. 30B. The conductive members 3110 may be fabricated from any material having a resistivity sufficient to generate resistive heating when a current is passed through the conductive member 3110. In one aspect, the conductive members 3110 are ferromagnetic and have a Curie temperature of between 400° C. and 850° C.

In one aspect, the resistivity of the conductive members 3110 varies along its length. In this embodiment, the linear resistivity of conductive members 3110 would be greater at a depth of the organic-rich formation 3135 than above the organic-rich formation 3135. In this way, the greatest resistive heat would be generated from the conductive members 3110 at the depth of the organic-rich formation 3135. Preferably, linear resistivity is varied by providing a greater radius or thickness in the upper portion 3112 of the conductive members 3110 than in the lower portion 3114 within the formation 3135.

The fourth wellbore, wellbore 3125, is also completed within the organic-rich formation 3135. However, wellbore 3125 is completed substantially horizontally. The wellbore 3125 has a wall 3123 that defines a radius. The wellbore 3125 has an upper end 3121 at an earth surface 3103, and a lower end 3124 completed within the organic-rich formation 3135. The upper end 3121 is substantially vertical, while the lower end 3124 is substantially horizontal. The lower end 3124 includes a heel 3127 and a toe 3126. Thus, the fourth wellbore 3125 is directionally drilled.

The fourth wellbore 3125 also includes a conductive member 3120. The conductive member 3120 preferably has a conductivity that is greater than the conductivity of conductive members 3110. The reason is that, in one aspect, conductive member 3120 is used to conduct electricity between the conductive members 3110, rather than to resistively heat the organic-rich formation 3135. In one aspect, the conductive member 3120 is ferromagnetic and has a Curie temperature of between 400° C. and 850° C.

In heater well arrangement 3100, the lower horizontal end 3124 of wellbore 3125 is drilled to closely pass the substantially vertical wellbores 3105', 3105", 3105'''. It is not necessary that an actual intersection of the wellbores take place; rather, the lower horizontal end 3124 of wellbore 3125 need only pass within a few meters of the substantially vertical wellbores 3105', 3105", 3105''' within the subsurface formation 3135. While not shown, the lower horizontal end 3124 of wellbore 3125 may alternatively be located outside of the formation 3135, for example, below the formation 3135. In either instance, less precision is needed in directionally drilling the lower horizontal end 3124 of the wellbore 3125 as wellbore 3125 need not directly intersect wellbores 3105', 3105" or 3105'''.

In order to practice the method 2900 using heater well arrangement 3100, it is desirable to provide electrical communication between the conductive members 3110 within each vertical wellbore 3105', 3105", 3105'''. This is done by forming an electrical circuit wherein the vertical wellbores 3105', 3105", 3105''' are in electrical communication with the horizontal wellbore 3125. Thus, horizontal wellbore 3125 carries current to each of the vertical wellbores 3105', 3105", 3105'''.

To make the desired electrical connections, granular material 3144 is once again used. Granular material 3144 is injected into hydraulic fractures created from each vertical wellbore 3105', 3105", 3105''' and into the surrounding formation 3135. The granular material 3144 is injected away from the respective wellbores 3105', 3105", 3105''' a distance sufficient to intersect the lower end 3124 of the horizontal wellbore 3125. In one aspect, granular material 3135 is injected a distance of one to five meters from each of the vertical wellbores 3105', 3105", 3105'''. While not shown, the hydraulic fractures may alternatively be located outside of the formation 3135, for example, below the formation 3135.

Hydraulic fracturing preferably takes place before the conductive members 3110 are run into the vertical wellbores 3105', 3105", 3105''', but after conductive member 3120 is run into horizontal wellbore 3125. However, the horizontal wellbore 3125 may be completed after the hydraulic fractures are completed and the granular material 3144 is injected. The sequence is not significant as long as an electrical connection is ultimately made between the horizontal wellbores 3105', 3105", 3105'''.

The hydraulic fracturing preferably creates vertical fractures. Extended vertical fractures typically only arise in deeper formations. In the Piceance Basin where much oil shale is know to exist, fractures will open up vertically generally at depths below about 1,000 feet. Thus, the heater well arrangement 3100 will typically be employed at depths greater than 1,000 feet.

Suitable granular material 3144 may include metal, metal coated particles, coke, graphite, or combinations thereof. The granular material 3144 may be hollow, solid, porous, sintered, or agglomerated, so long as the material 3144 conducts electricity. In one aspect, an electrical current is established by an electrically conductive flow path defined by the electrically conductive members 3110 in the vertical wellbores 3105', 3105", 3105''', the granular material 3144, and the electrically conductive member 3120 in the horizontal wellbore 3125. Resistive heat is generated as a result of the electrical current that is conducted into the subsurface formation 3135. The generated heat is comprised of a first heat generated from the electrically conductive member 3110, a second heat generated from the electrically conductive member 3120, and a third heat generated from the granular material 3144. The first heat and the second heat are each greater than the third heat.

The granular material 3144 is preferably placed in the formation 3135 as part of the hydraulic fracturing process. In one aspect, the granular material 3144 also serves as a proppant. In this instance, the granular material 3144 is preferably fabricated from metal shot.

In the heater well arrangement 3100 of FIG. 31, the wellbores 3105', 3105", 3105''' are uncased. This means that only a single body 3110 resides in each wellbore 3105', 3105", 3105'''. However, it is understood that the wellbores 3105', 3105", 3105''' may optionally be at least partially cased. Casing would serve to isolate and protect zones surrounding the wellbores 3105', 3105", 3105''' such as near-surface aquifers. Preferably, casing (not shown) would only extend down a few hundred feet from the surface 3002.

When the wellbores 3105', 3105", 3105''' are cased, it is desirable to prevent a short circuit in the heater well 3100. To inhibit shorting, an insulative coating (not shown) may be provided around each of the conductive members 3110, at least at the depth where the casing exists. The insulative coating may be a ceramic coating, a cement coating, or other protective and nonconductive material. Alternatively, non-conductive centralizers may be used.

In order to practice the method 2900 using heater well arrangement 3100, it is desirable to complete or form an electrical circuit comprise of the conductive members 3110 within each wellbore 3105', 3105", 3105''' and the electrically conductive granular material 3144. To provide the electrical power, a power source 3130 is employed. The power source 3130 delivers an electrical current to either each of the conductive members 3110. Conductive wire 3132 provides electrical communication between the power source 3130 and the conductive member 3110 in the first wellbore 3105'; conductive wire 3134 provides electrical communication between the power source 3130 and the conductive member 3110 in the second wellbore 3105"; and conductive wire 3138 provides electrical communication between the power source 3130 and the conductive member 3110 in the third wellbore 3105'''.

In the heater well arrangement 3100, two-phase electrical power may be employed. Preferably, the current is an alternating current, with the conductive members 3110 in the vertical wellbores 3105', 3105", 3105''' representing a positive pole, and the conductive member 3120 in the horizontal wellbore 3125 representing a negative pole. Current flows down the each electrically conductive members 3110 within each vertical wellbore 3105', 3105", 3105'''. The current further travels through the electrically conductive granular material 3144 within the formation 3135, and to conductive member 3120 within the horizontal wellbore 3125 to complete the circuit.

It is understood that the heater well arrangement 3100 may utilize only two vertical wellbores rather than three. Alternatively, the heater well 3100 may utilize four or five vertical wellbores. However, it will be appreciated that making an intersection of more than three wells with the horizontal wellbore creates a technical challenge.

In operation, the power supply 3130 is activated. A voltage is applied across the conductive members 3110 in each vertical wellbore 3105', 3105", 3105'''. Current travels down the wellbores 3105', 3105", 3105''', through the electrically conductive granular material 3144, and through the conductive member 3120 in the horizontal wellbore 3125. The process of operating the heater well 3100 causes heat to be conducted from the conductive members 3110 and into the surrounding formation 3135. This, in turn, pyrolyzes solid hydrocarbons in the formation 3135 into hydrocarbon fluids.

Based upon the heater well arrangement 3100 of FIG. 31, a method for heating a subsurface formation using electrical resistance heating may be practiced. In one aspect, the method includes providing a first substantially vertical wellbore 3105', and providing a second substantially vertical wellbore 3105" adjacent the first wellbore 3105'. Each of the first 3105' and second 3105" vertical wellbores is hydraulically fractured in order to form fractures in the subsurface formation 3135. The fractures are vertically oriented. Thereafter, electrically conductive granular material 3144 is injected into the fractures from the first 3105' and second 3105" wellbores.

A fourth wellbore 3125 having a substantially horizontal bottom portion 3124 is also provided. That fourth wellbore 3125 is formed such that the bottom portion 3124 intersects the fractures from the first 3105' and second 3105' wellbores.

An electrically conductive member 3110 is provided in each of the first 3105' and second 3105' wellbores. In addition, an electrically conductive member 3120 is provided in the fourth 3125 wellbore. Still further, a power source 3130 is provided. An electrical circuit is thus formed from the power source 3130, the electrically conductive members 3110 in the first 3105' and second 3105" wellbores, the granular material 3144, and the electrically conductive member 3120 in the fourth wellbore 3125.

In one aspect, and more closely in form to the heater well arrangement 3100, the method may further include the step of providing a third substantially vertical wellbore 3105'''. The subsurface formation 3135 is hydraulically fractured from the third wellbore 3105''' to form one or more additional fractures. The electrically conductive granular material 3144 is then injected into the additional fractures from the third wellbore 3105'''.

An electrically conductive member 3110 is also placed in the third wellbore 3105'''. The bottom portion 3124 of the fourth wellbore 3125 also intersects the additional fractures from the third wellbore 3105'''. In this way, the electrical circuit further comprises the electrically conductive member 3110 in the third wellbore 3105'''.

The granular material 3144 is fabricated from a material that is highly conductive relative to the conductivity of the conductive members 3110. In this way, heat is generated primarily from the electrically conductive members 3110 and not from the granular material 3144. In one aspect, the electrically conductive granular material 3144 comprises metal, metal coated particles, coke or graphite.

The method is ideally suited for use in heating an oil shale formation. Preferably, the formation is at or below a depth of 1,000 feet. It is expected at such depths that the fractures will form vertically, thereby facilitating the intersection of the bottom portion of the fourth wellbore with the fractures.

In operation, a current is applied through the electrical circuit in order to resistively heat the oil shale. Heat continues to be applied in order to resistively heat the oil shale formation so as to pyrolyze at least a portion of the oil shale into hydrocarbon fluids.

Figure 32:
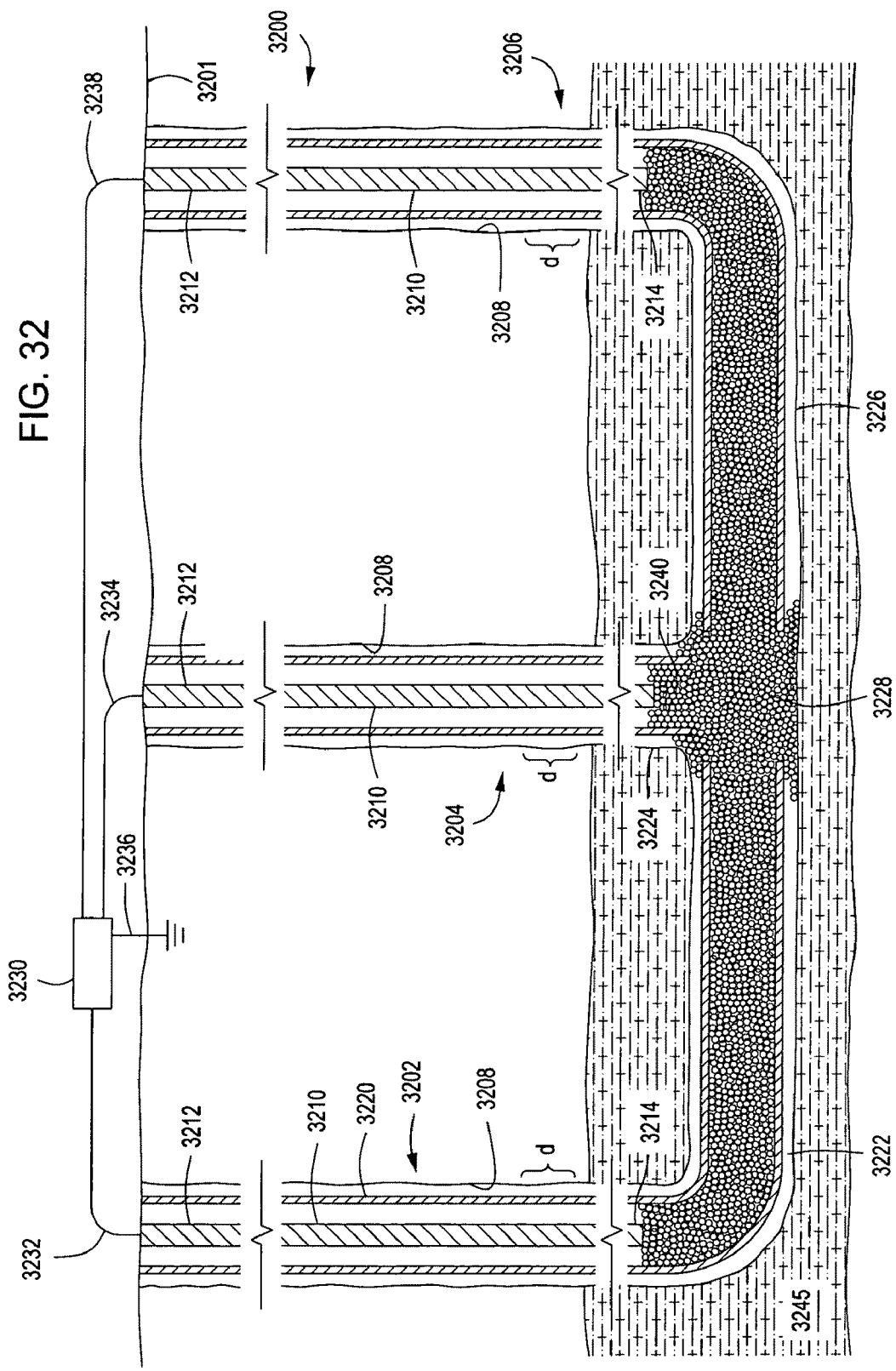
FIG. 32 is a cross-sectional view of a heater well arrangement, in another alternate embodiment. Here, three wellbores are formed which intersect at a point of convergence within a subsurface formation. Granular material is used to provide an electrical connection between the wellbores at the point of convergence.

FIG. 32 is a cross-sectional view of a heater well arrangement 3200, in yet an additional alternate embodiment. Here, three wellbores 3202, 3204, 3206 are formed. Each of the three wellbores 3202, 3204, 3206 is completed within a subsurface formation 3245. The subsurface formation 3245 is again an organic-rich formation. Preferably, the organic-rich formation 3245 comprises heavy hydrocarbons such as kerogen. In one aspect, the subsurface formation 3245 is an oil shale formation.

Each wellbore 3202, 3204, and 3206 has a wall 3208 that defines a radius. Each wellbore 3202, 3204, 3206 has an upper end at an earth surface 3201, and a lower end proximate the organic-rich formation 3245. The lower end of the first wellbore 3202 is shown at 3222; the lower end of the second wellbore 3204 is shown at 3224; and the lower end of the third wellbore 3206 is shown at 3226. Of note, the lower ends 3222, 3224, 3226 of the respective wellbores 3202, 3204, 3206 converge to a point 3228 in the organic-rich formation 3245.

Within each wellbore 3202, 3204, 3206 is disposed an electrically conductive member 3210. Each of the conductive members 3210 also has an upper end 3212 proximate the earth surface 3201, and a lower end 3214 proximate the organic-rich subsurface formation 3245.

The conductive members 3210 shown in FIG. 32 are solid bodies. Such conductive members 3210 are preferably metal rods, but may alternatively be thick wires. However, the conductive members 3210 may be tubular bodies such as coiled tubing. In any embodiment, it is preferred that the conductive members 3210 be fabricated from a material that is electrically conductive at temperatures in excess of 270° C., and preferably in excess of 500° C.

In one aspect, the conductive members 3210 are ferromagnetic and have a Curie temperature of between 400° C. and 850° C. In one aspect, the conductive members 3210 are fabricated of metals having different resistivities. The upper portion 3212 of the conductive members 3210 is conductive so that resistive heat is largely not generated as current flows therethrough. However, the lower portion 3214 of the conductive members 3210 is sufficiently resistive so that resistive heat is generated as current flows therethrough. In this way resistive heating is primarily applied at the depth of the subsurface formation 3245.

The upper portion 3212 of the conductive members 3210 is nonconductive. In one aspect, an insulated electric wire (not shown) or other electrical connection member is run into the first 3202, second 3204 and third 3206 wellbores and connects to the lower portions 3214 of the conductive members 3210 having a low conductivity, or high resistivity. The electric wire provides current directly to the lower portions 3214 of the respective conductive members 3210.

In order to practice the method 2900 using heater well arrangement 3200, it is desirable to provide electrical communication between the lower portions 3214 of the conductive members 3210 within each wellbore 3202, 3204, 3206. To provide for this, the wellbores 3202, 3204, 3206 are completed such that the lower ends 3222, 3224, 3226 of the respective wellbores 3202, 3204, 3206 meet at a convergence point 3228. In the illustrative arrangement of FIG. 32, the lower end 3224 of the second wellbore 3204 is vertical. At the same time, the lower end 3222 of the first wellbore 3202 and the lower end 3226 of the third wellbore 3206 are both deviated into the lower end 3224 of the second wellbore 3204. It is understood that the deviation leading to convergence may be much less than the substantially horizontal bend shown in FIG. 32.

To further facilitate electrical communication between the conductive members 3210, a granular material 3240 is once again used. The granular material 3240 is placed within the three wellbores 3202, 3204, 3206 around the conductive members 3210. In addition, the lower ends 3222, 3224, 3226 of the respective wellbores 3202, 3204, 3206 are loaded with granular material 3240. Still further, granular material 3240 is filled within the convergence point 3228 of the heater well arrangement 3200.

Preferably, some degree of rubblizing may be conducted at the convergence point 3228. The rubblized material is then removed in order to create a void for the placement of granular material 3240 at the convergence point 3228. Alternatively, hydraulic fracturing may be coordinated at the lower ends 3222, 3224, 3226 of the respective wellbores 3202, 3204, 3206 in order to create the necessary void. Thereafter, the granular material 3240 is injected into the convergence point 3228 and up the respective wellbores 3203, 3204, 3206.

Suitable granular material 3240 may include metals and graphite. The granular material 3240 may be hollow, solid, porous, sintered, or agglomerated, so long as the material conducts electricity. Preferably, the granular connection 3240 has a high conductivity. In one aspect, the materials comprising the granular material 3240 have a resistivity less than about 0.0001 ohm-meters.

The granular material 3240 may be placed in the wellbores 3202, 3204, 3206 by pouring it in dry, by blowing it in through moveable and removable tubing (e.g., coiled tubing), or by slurrying it in. Whatever the method of placing the granular material 3240 in the wellbores 3202, 3204, 3206, reciprocating the conductive members 3210 can aid the settling and packing of the granular material 3240. Alternatively, or in addition, the granular material 3240 itself may be vibrated to aid settling and packing. Additionally, a mass of nonconducting granular material (not shown) may be placed on top of the granular material 3240 so to provide weight for compaction.

It is noted that in the heater well arrangement 3200 of FIG. 32, the wellbores 3202, 3204, 3206 are cased. Casing string 3220 is seen in each of wellbores 3202, 3204, 3206. The casing strings 3220 are optional, but help to support the wellbores 3202, 3204, 3206, particularly at their lower ends 3222, 3224, 3226. The casing strings 3220 also serve to isolate near-surface aquifers. The casing string 3210 may comprise a combination of two or more separate strings such as surface casing or overburden casing extending from the earth surface 3201 and formation casing at or near the completion depth.

Where a casing string is used, it is preferred that a conductivity break be provided in the casing string 3220 to prevent current from flowing to the tops of the respective wellbores 3202, 3204, 3206. In one aspect, a joint of casing is provided at a depth "d" above the organic-rich formation 3245 that is essentially non-conductive. Examples of non-conductive casing would be fiberglass or ceramic casing joints. This arrangement also prevents undesirable heating of the surrounding rock above the organic-rich formation 3245.

When the wellbores 3202, 3204, 3206 are cased, it is desirable to prevent a short circuit in the heater well 3200. To inhibit shorting, an insulative coating (not shown) is optionally placed around each of the conductive members 3210. The insulative coating may be a ceramic coating, a cement coating, or other protective and nonconductive material. Alternatively, nonconductive centralizers (not shown) may be placed around the lower portions 3214 of the conductive members 3210.

In order to practice the method 2900 using heater well arrangement 300, a power source is needed to generate current. A power source is shown at 3230. The power source 3230 delivers an electrical current to each of the conductive members 3210. Conductive wire 3232 provides electrical communication between the power source 3230 and the conductive member 3210 in the first wellbore 3202; conductive wire 3234 provides electrical communication between the power source 3230 and the conductive member 3210 in the second wellbore 3204; and conductive wire 3238 provides electrical communication between the power source 3230 and the conductive member 3210 in the third wellbore 3206.

In the heater well arrangement 3200, three-phase electrical power is employed. Current flows down each electrically conductive member 3210 within each respective wellbore 3202, 3204, 3206. Alternatively, and as mentioned above, each of wires 3232, 3234, 3238 may be insulated wires that run down the respective wellbores 3202, 3204, 3206 to a less conductive lower portion 3214 of the conductive members. In either event, the current further travels through the electrically conductive granular material 3245 to complete the circuit.

It is understood that the heater well arrangement 3200 may utilize only two wellbores rather than three. Where only two wellbores are used, a two-phase alternating current may be used, with one wellbore representing a positive pole and the other wellbore defining a negative pole. A two-phase direct current may alternatively be used with two wellbores.

In operation, the power supply 3230 is activated. A voltage is applied across the conductive members 3210 in each wellbore 3202, 3204, 3206 and through the electrically conductive granular material 3240 to form a conductive flowpath. The process of operating the heater well 3200 causes heat to be conducted from the conductive members 3210 and into the surrounding formation 3245. This, in turn, pyrolyzes solid hydrocarbons into hydrocarbon fluids.

Based upon the heater well arrangement 3200 of FIG. 32, another method for heating a subsurface formation 3245 using electrical resistance heating may be practiced. In one aspect, the method includes providing a first substantially vertical wellbore 3202 having a bottom portion 3224 within the subsurface formation 3245. The method also includes providing a second wellbore 3204 having a bottom portion 3224 that intersects the bottom portion 3222 of the first wellbore 3202, and providing a third wellbore 3206 having a bottom portion 3226 that also intersects the bottom portion 3222 of the first wellbore 3202. These bottom portions 3222, 3224, 3226 thereby form a point of convergence 3228. In one aspect, the point of convergence 3228 is reamed or rubblized in order to further open up a void at the point of convergence. Alternatively, a dissolution process may be employed to further open up a void.

An electrically conductive member 3210 is provided in each of the first 3202, second 3204 and third 3206 wellbores. An electrically conductive granular material 3240 is also provided. The granular material 3240 is injected into the point of convergence 3228 and into at least one of the first 3202, second 3204 and third 3206 wellbores. Granular material 3240 is injected in such a way that the granules contact each of the electrically conductive members 3210. A power source 3230 is provided. An electrical circuit is thus formed from the power source 3230, the electrically conductive members 3210 in the first 3202, second 3204 and third 3206 wellbores, and the granular material 3240.

It is preferred that the resistance of the electrical connection formed by the granular material 3240 is lower than the resistance of the electrically conductive members 3210 in the first 3202, second 3204 and third 3206 wellbores. In this way, heat is generated primarily from the electrically conductive members 3210 and not from the granular material 3240. In one aspect, the electrically conductive granular material 3240 comprises metal, metal coated particles, coke, graphite, or combinations thereof.

The method is ideally suited for use in heating an oil shale formation. Preferably, the formation is at or below a depth of 1,000 feet. In operation, a current is applied through the electrical circuit in order to resistively heat the oil shale. Heat continues to be applied in order to resistively heat the oil shale formation so as to pyrolyze at least a portion of the oil shale into hydrocarbon fluids.

Figure 33:
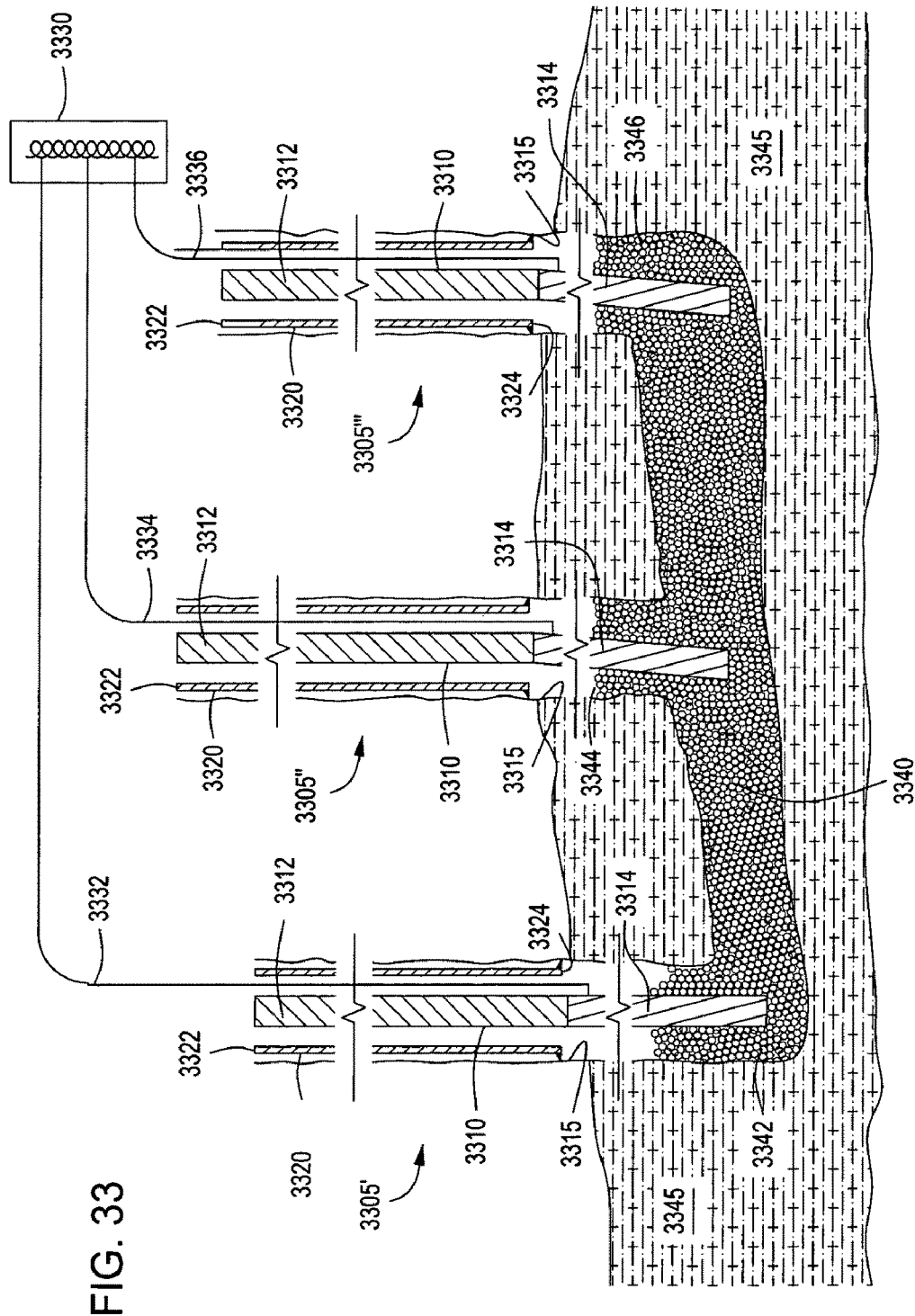
FIG. 33 provides a cross-sectional heater well arrangement, in yet another alternate embodiment. Here, three wellbores are formed which intersect within a subsurface formation. Granular material is again used to provide an electrical connection between the wellbores.

FIG. 33 provides a cross-sectional heater well arrangement 3300, in another alternate embodiment. Here, three wellbores 3305', 3305", 3305''' are formed. The three wellbores 3305', 3305", 3305''' are completed within a subsurface formation 3345. The subsurface formation 3345 is again an organic-rich formation. Preferably, the organic-rich formation 3345 comprises heavy hydrocarbons such as kerogen. In one aspect, the subsurface formation 3345 is an oil shale formation.

Each wellbore 3305', 3305", and 3305''' has a string of casing 3320 hung from the surface. The casing 3320 has an upper end 3322 and a lower end 3324. The lower end 3324 of the casing 3320 does not extend down to the subsurface formation 3345. This leaves an open hole portion 3315 in the wellbores 3305', 3305", 3305'''.

Each wellbore 3305', 3305", 3305''' also has a conductive member 3310 hung therein. Each conductive member 3310 has an upper portion 3312 extending from an earth surface. Each conductive member 3310 also has a lower portion 3314 extending down to the subsurface formation 3345. Preferably, the upper portion 3312 and the lower portion 3314 meet proximate the lower end 3324 of the casing 3320. The upper portions 3312 of the conductive members 3310 may be placed in additional tension by means of a weight (not shown) disposed adjacent the bottoms 3324 of the casings 3320 so that they hang within the respective wellbores 3305', 3305", 3305'''.

The three wellbores 3305', 3305", 3305''' are drilled in order to converge at a point. In this respect, the first wellbore 3305' has a lower end 3342; the second wellbore 3305" has a lower end 3344 that intersects with the lower end 3342 of the first wellbore 3305'; and the third wellbore 3305''' has a lower end 3346 that also intersects with the lower end 3342 of the first wellbore 3305'. In this instance, the convergence point becomes the bottom of the first wellbore 3305'. In one aspect, the convergence point is enlarged after drilling by reaming, rubblizing, hydraulic fracturing, or formation dissolution.

The conductive members 3310 shown in FIG. 33 are solid bodies. Such conductive members 3310 are preferably metal rods, but may alternatively be thick wires. However, the conductive members 3310 may alternatively be tubular bodies such as coiled metallic tubing. In any embodiment, what is shown in the heater well arrangement 3300 is that the conductive members 3310 are fabricated from materials having different electrical or physical properties. The upper portion 3312 is fabricated from a material having low resistivity, and is dimensioned to have a low linear resistivity. An example is a thick copper rod. The upper portion 3312 of each of the members 3310 may also have an insulating sheath (not shown).

The lower portion 3314, on the other hand, is fabricated from a different material than the upper portion 3312. The upper portion 3312 of each of the members 3310 is fabricated from a material having a high relative resistivity. In this way, the lower portion 3312 generates the majority of the electrical resistive heat when an electrical current is passed through the two portions 3312, 3314. In addition, the material making up the lower portion 3312 of the conductive members 3310 maintains mechanical integrity at high temperatures, that is, greater than 400° C. or, more preferably, greater than 600° C. Moreover, the material may be ferromagnetic and exhibit a Curie temperature. An example is a stainless steel alloy.

In order to practice the method 2900 using heater well arrangement 3300, it is desirable to provide electrical communication between the conductive members 3310 within each wellbore 3305', 3305", 3305'''. To provide for this, a granular material 3340 is once again used. The granular material 3340 is placed within the three wellbores 3305', 3305", 3305''' around the conductive members 3310. In addition, the lower ends 3342, 3344, 3446 of the respective wellbores 3305', 3305", 3305''' are filled with granular material 3340.

A power source is provided to establish a current. A power source is shown at 3330. The power source 3330 represents a three-phase transformer, and delivers an electrical current to each of the conductive members 3310. Conductive wire 3332 provides electrical communication between the transformer 3330 and the conductive member 3310 in the first wellbore 3305'; conductive wire 3334 provides electrical communication between the power transformer 3330 and the conductive member 3310 in the second wellbore 3305"; and conductive wire 3338 provides electrical communication between the transformer 3330 and the conductive member 3310 in the third wellbore 3305'''. The conductive wires 3332, 3334, 3336 are heavily insulated, and connect to the upper resistive portions 3312 of the conductive members.

In the heater well arrangement 3300, three-phase electrical power is employed. Current flows down each electrically conductive member 3314 within each respective wellbore 3305', 3305" 3305'''. Current further travels through the electrically conductive granular material 3340 to complete the circuit. Preferably, the resistivity of the granular material 3340 is low, allowing it to efficiently conduct electricity between the conductive members 3310.

The heat generation from the connection formed by the granular material 3340 is less than that from the lower portions 3314 of the respective conductive members 3310. The heat generation from the granular material 3340 may be less than 500 Watts per meter. Alternatively, the heat generation from the electrical connection provided by the granular material 3340 is less than 100 Watts per meter.

Although the above processes are applied in these examples to generate hydrocarbons from oil shale, the idea may also be applicable to heavy oil reservoirs, tar sands, or gas hydrates. In these instances, the electrical heat supplied would serve to reduce hydrocarbon viscosity or to melt hydrates. U.S. Pat. No. 6,148,911 discusses the use of an electrically conductive proppant to release gas from a hydrate formation. It is also known to apply a voltage across a formation using brine as the electrical conductor and heating element. However, it is believed that the use of formation brine as a heating element is inadequate for shale conversion as it is limited to temperatures below the in situ boiling point of water. Thus, the circuit fails when the water vaporizes.

The purpose for heating the organic-rich rock formation is to pyrolyze at least a portion of the solid formation hydrocarbons to create hydrocarbon fluids. The solid formation hydrocarbons may be pyrolyzed in situ by raising the organic-rich rock formation, (or zones within the formation), to a pyrolyzation temperature. In certain embodiments, the temperature of the formation may be slowly raised through the pyrolysis temperature range. For example, an in situ conversion process may include heating at least a portion of the organic-rich rock formation to raise the average temperature of the zone above about 270° C. at a rate less than a selected amount (e.g., about 10° C., 5° C.; 3° C., 1° C., 0.5° C., or 0.1° C.) per day. In a further embodiment, the portion may be heated such that an average temperature of the selected zone may be less than about 375° C. or, in some embodiments, less than about 400° C. The formation may be heated such that a temperature within the formation reaches (at least) an initial pyrolyzation temperature (e.g., a temperature at the lower end of the temperature range where pyrolyzation begins to occur.

The pyrolysis temperature range may vary depending on the types of formation hydrocarbons within the formation, the heating methodology, and the distribution of heating sources. For example, a pyrolysis temperature range may include temperatures between about 270° C. and about 900° C. Alternatively, the bulk of the target zone of the formation may be heated to between 300° to 600° C. In an alternative embodiment, a pyrolysis temperature range may include temperatures between about 270° C. to about 500° C.

Preferably, for in situ processes the heating of a production zone takes place over a period of months, or even four or more years. Alternatively, the formation may be heated for one to fifteen years, alternatively, 3 to 10 years, 1.5 to 7 years, or 2 to 5 years. The bulk of the target zone of the formation may be heated to between 270° to 800° C. Preferably, the bulk of the target zone of the formation is heated to between 300° to 600° C. Alternatively, the bulk of the target zone is ultimately heated to a temperature below 400° C. (752° F.).

In the production of oil and gas resources, it may be desirable to use the produced hydrocarbons as a source of power for ongoing operations. This may be applied to the development of oil and gas resources from oil shale. In this respect, when electrically resistive heaters are used in connection with in situ shale oil recovery, large amounts of power are required.

Electrical power may be obtained from turbines that turn generators. It may be economically advantageous to power the gas turbines by utilizing produced gas from the field. However, such produced gas must be carefully controlled so not to damage the turbine, cause the turbine to misfire, or generate excessive pollutants (e.g., $NO_x$).

One source of problems for gas turbines is the presence of contaminants within the fuel. Contaminants include solids, water, heavy components present as liquids, and hydrogen sulfide. Additionally, the combustion behavior of the fuel is important. Combustion parameters to consider include heating value, specific gravity, adiabatic flame temperature, flammability limits, autoignition temperature, autoignition delay time, and flame velocity. Wobbe Index (WI) is often used as a key measure of fuel quality. WI is equal to the ratio of the lower heating value to the square root of the gas specific gravity. Control of the fuel's Wobbe Index to a target value and range of, for example, ±10% or ±20% can allow simplified turbine design and increased optimization of performance.

Fuel quality control may be useful for shale oil developments where the produced gas composition may change over the life of the field and where the gas typically has significant amounts of $CO_2$, CO, and $H_2$ in addition to light hydrocarbons. Commercial scale oil shale retorting is expected to produce a gas composition that changes with time.

Inert gases in the turbine fuel can increase power generation by increasing mass flow while maintaining a flame temperature in a desirable range. Moreover inert gases can lower flame temperature and thus reduce $NO_x$ pollutant generation. Gas generated from oil shale maturation may have significant $CO_2$ content. Therefore, in certain embodiments of the production processes, the $CO_2$ content of the fuel gas is adjusted via separation or addition in the surface facilities to optimize turbine performance.

Achieving a certain hydrogen content for low-BTU fuels may also be desirable to achieve appropriate burn properties. In certain embodiments of the processes herein, the $H_2$ content of the fuel gas is adjusted via separation or addition in the surface facilities to optimize turbine performance. Adjustment of $H_2$ content in non-shale oil surface facilities utilizing low BTU fuels has been discussed in the patent literature (e.g., U.S. Pat. Nos. 6,684,644 and 6,858,049, the entire disclosures of which are hereby incorporated by reference).

The process of heating formation hydrocarbons within an organic-rich rock formation, for example, by pyrolysis, may generate fluids. The heat-generated fluids may include water which is vaporized within the formation. In addition, the action of heating kerogen produces pyrolysis fluids which tend to expand upon heating. The produced pyrolysis fluids may include not only water, but also, for example, hydrocarbons, oxides of carbon, ammonia, molecular nitrogen, and molecular hydrogen. Therefore, as temperatures within a heated portion of the formation increase, a pressure within the heated portion may also increase as a result of increased fluid generation, molecular expansion, and vaporization of water. Thus, some corollary exists between subsurface pressure in an oil shale formation and the fluid pressure generated during pyrolysis. This, in turn, indicates that formation pressure may be monitored to detect the progress of a kerogen conversion process.

The pressure within a heated portion of an organic-rich rock formation depends on other reservoir characteristics.

These may include, for example, formation depth, distance from a heater well, a richness of the formation hydrocarbons within the organic-rich rock formation, the degree of heating, and/or a distance from a producer well.

It may be desirable for the developer of an oil shale field to monitor formation pressure during development. Pressure within a formation may be determined at a number of different locations. Such locations may include, but may not be limited to, at a wellhead and at varying depths within a wellbore. In some embodiments, pressure may be measured at a producer well. In an alternate embodiment, pressure may be measured at a heater well. In still another embodiment, pressure may be measured downhole of a dedicated monitoring well.

The process of heating an organic-rich rock formation to a pyrolysis temperature range not only will increase formation pressure, but will also increase formation permeability. The pyrolysis temperature range should be reached before substantial permeability has been generated within the organic-rich rock formation. An initial lack of permeability may prevent the transport of generated fluids from a pyrolysis zone within the formation. In this manner, as heat is initially transferred from a heater well to an organic-rich rock formation, a fluid pressure within the organic-rich rock formation may increase proximate to that heater well. Such an increase in fluid pressure may be caused by, for example, the generation of fluids during pyrolysis of at least some formation hydrocarbons in the formation.

Alternatively, pressure generated by expansion of pyrolysis fluids or other fluids generated in the formation may be allowed to increase. This assumes that an open path to a production well or other pressure sink does not yet exist in the formation. In one aspect, a fluid pressure may be allowed to increase to or above a lithostatic stress. In this instance, fractures in the hydrocarbon containing formation may form when the fluid pressure equals or exceeds the lithostatic stress. For example, fractures may form from a heater well to a production well. The generation of fractures within the heated portion may reduce pressure within the portion due to the production of produced fluids through a production well.

Once pyrolysis has begun within an organic-rich rock formation, fluid pressure may vary depending upon various factors. These include, for example, thermal expansion of hydrocarbons, generation of pyrolysis fluids, rate of conversion, and withdrawal of generated fluids from the formation. For example, as fluids are generated within the formation, fluid pressure within the pores may increase. Removal of generated fluids from the formation may then decrease the fluid pressure within the near wellbore region of the formation.

In certain embodiments, a mass of at least a portion of an organic-rich rock formation may be reduced due, for example, to pyrolysis of formation hydrocarbons and the production of hydrocarbon fluids from the formation. As such, the permeability and porosity of at least a portion of the formation may increase. Any in situ method that effectively produces oil and gas from oil shale will create permeability in what was originally a very low permeability rock. The extent to which this will occur is illustrated by the large amount of expansion that must be accommodated if fluids generated from kerogen are unable to flow. The concept is illustrated in FIG. 5.

Figure 5:
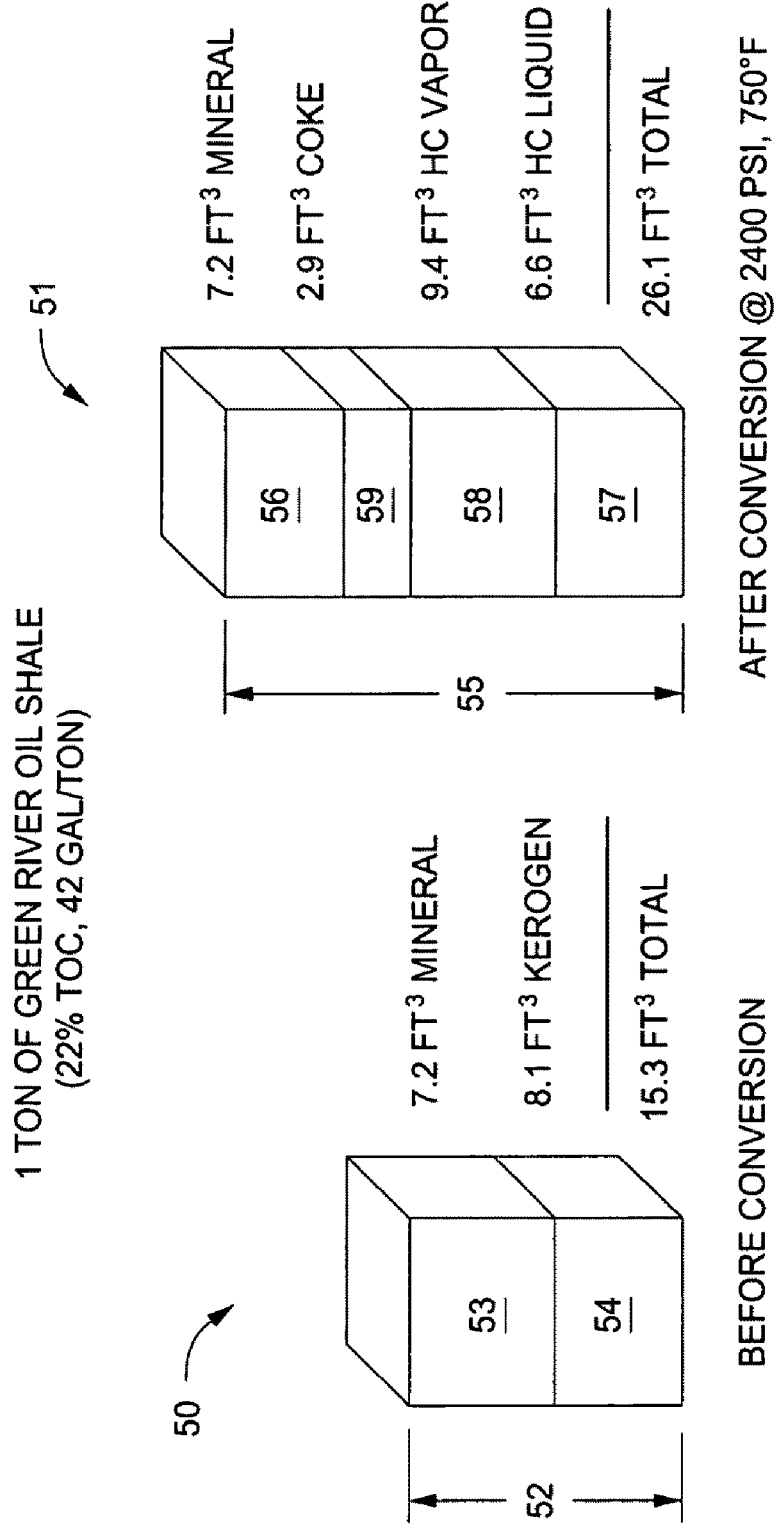
FIG. 5 is a bar chart comparing one ton of Green River oil shale before and after a simulated in situ, retorting process.

FIG. 5 provides a bar chart comparing one ton of Green River oil shale before 50 and after 51 a simulated in situ, retorting process. The simulated process was carried out at 2,400 psi and 750° F. on oil shale having a total organic carbon content of 22 wt. % and a Fisher assay of 42 gallons/ton. Before the conversion, a total of 15.3 ft$^3$ of rock matrix 52 existed. This matrix comprised 7.2 ft$^3$ of mineral 53, i.e., dolomite, limestone, etc., and 8.1 ft$^3$ of kerogen 54 imbedded within the shale. As a result of the conversion the material expanded to 26.1 ft$^3$ 55. This represented 7.2 ft$^3$ of mineral 56 (the same number as before the conversion), 6.6 ft$^3$ of hydrocarbon liquid 57, 9.4 ft$^3$ of hydrocarbon vapor 58, and 2.9 ft$^3$ of coke 59. It can be seen that substantial volume expansion occurred during the conversion process. This, in turn, increases permeability of the rock structure.

In an embodiment, heating a portion of an organic-rich rock formation in situ to a pyrolysis temperature may increase permeability of the heated portion. For example, permeability may increase due to formation of thermal fractures within the heated portion caused by application of heat. As the temperature of the heated portion increases, water may be removed due to vaporization. The vaporized water may escape and/or be removed from the formation. In addition, permeability of the heated portion may also increase as a result of production of hydrocarbon fluids from pyrolysis of at least some of the formation hydrocarbons within the heated portion on a macroscopic scale.

Certain systems and methods described herein may be used to treat formation hydrocarbons in at least a portion of a relatively low permeability formation (e.g., in "tight" formations that contain formation hydrocarbons). Such formation hydrocarbons may be heated to pyrolyze at least some of the formation hydrocarbons in a selected zone of the formation. Heating may also increase the permeability of at least a portion of the selected zone. Hydrocarbon fluids generated from pyrolysis may be produced from the formation, thereby further increasing the formation permeability.

Permeability of a selected zone within the heated portion of the organic-rich rock formation may also rapidly increase while the selected zone is heated by conduction. For example, permeability of an impermeable organic-rich rock formation may be less than about 0.1 millidarcy before heating. In some embodiments, pyrolyzing at least a portion of organic-rich rock formation may increase permeability within a selected zone of the portion to greater than about 10 millidarcies, 100 millidarcies, 1 Darcy, 10 Darcies, 20 Darcies, or 50 Darcies. Therefore, a permeability of a selected zone of the portion may increase by a factor of more than about 10, 100, 1,000, 10,000, or 100,000. In one embodiment, the organic-rich rock formation has an initial total permeability less than 1 millidarcy, alternatively less than 0.1 or 0.01 millidarcies, before heating the organic-rich rock formation. In one embodiment, the organic-rich rock formation has a post heating total permeability of greater than 1 millidarcy, alternatively, greater than 10, 50 or 100 millidarcies, after heating the organic-rich rock formation.

In connection with heating the organic-rich rock formation, the organic-rich rock formation may optionally be fractured to aid heat transfer or hydrocarbon fluid production. In one instance, fracturing may be accomplished naturally by creating thermal fractures within the formation through application of heat. Thermal fracture formation is caused by thermal expansion of the rock and fluids and by chemical expansion of kerogen transforming into oil and gas. Thermal fracturing can occur both in the immediate region undergoing heating, and in cooler neighboring regions. The thermal fracturing in the neighboring regions is due to propagation of fractures and tension stresses developed due to the expansion in the hotter zones. Thus, by both heating the organic-rich rock and transforming the kerogen to oil and gas, the permeability is increased not only from fluid formation and vaporization, but also via thermal fracture formation. The increased permeability aids fluid flow within the formation and production of the hydrocarbon fluids generated from the kerogen.

In connection with the production of hydrocarbons from a rock matrix, particularly those of shallow depth, a concern may exist with respect to earth subsidence. This is particularly true in the in situ heating of organic-rich rock where a portion of the matrix itself is thermally converted and removed. Initially, the formation may contain formation hydrocarbons in solid form, such as, for example, kerogen. The formation may also initially contain water-soluble minerals. Initially, the formation may also be substantially impermeable to fluid flow.

The in situ heating of the matrix pyrolyzes at least a portion of the formation hydrocarbons to create hydrocarbon fluids. This, in turn, creates permeability within a matured (pyrolyzed) organic-rich rock zone in the organic-rich rock formation. The combination of pyrolyzation and increased permeability permits hydrocarbon fluids to be produced from the formation. At the same time, the loss of supporting matrix material also creates the potential for subsidence relative to the earth surface.

In some instances, subsidence is sought to be minimized in order to avoid environmental or hydrogeological impact. In this respect, changing the contour and relief of the earth surface, even by a few inches, can change runoff patterns, affect vegetation patterns, and impact watersheds. In addition, subsidence has the potential of damaging production or heater wells formed in a production area. Such subsidence can create damaging hoop and compressional stresses on wellbore casings, cement jobs, and equipment downhole.

In order to avoid or minimize subsidence, it is proposed to leave selected portions of the formation hydrocarbons substantially unpyrolyzed. This serves to preserve one or more unmatured, organic-rich rock zones. In some embodiments, the unmatured organic-rich rock zones may be shaped as substantially vertical pillars extending through a substantial portion of the thickness of the organic-rich rock formation.

The heating rate and distribution of heat within the formation may be designed and implemented to leave sufficient unmatured pillars to prevent subsidence. In one aspect, heat injection wellbores are formed in a pattern such that untreated pillars of oil shale are left therebetween to support the overburden and prevent subsidence.

It is preferred that thermal recovery of oil and gas be conducted before any solution mining of nahcolite or other water-soluble minerals present in the formation. Solution mining can generate large voids in a rock formation and collapse breccias in an oil shale development area. These voids and brecciated zones may pose problems for in situ and mining recovery of oil shale, further increasing the utility of supporting pillars.

In some embodiments, compositions and properties of the hydrocarbon fluids produced by an in situ conversion process may vary depending on, for example, conditions within an organic-rich rock formation. Controlling heat and/or heating rates of a selected section in an organic-rich rock formation may increase or decrease production of selected produced fluids.

In one embodiment, operating conditions may be determined by measuring at least one property of the organic-rich rock formation. The measured properties may be input into a computer executable program. At least one property of the produced fluids selected to be produced from the formation may also be input into the computer executable program. The program may be operable to determine a set of operating conditions from at least the one or more measured properties. The program may also be configured to determine the set of operating conditions from at least one property of the selected produced fluids. In this manner, the determined set of operating conditions may be configured to increase production of selected produced fluids from the formation.

Certain heater well embodiments may include an operating system that is coupled to any of the heater wells such as by insulated conductors or other types of wiring. The operating system may be configured to interface with the heater well. The operating system may receive a signal (e.g., an electromagnetic signal) from a heater that is representative of a temperature distribution of the heater well. Additionally, the operating system may be further configured to control the heater well, either locally or remotely. For example, the operating system may alter a temperature of the heater well by altering a parameter of equipment coupled to the heater well. Therefore, the operating system may monitor, alter, and/or control the heating of at least a portion of the formation.

In some embodiments, a heater well may be turned down and/or off after an average temperature in a formation may have reached a selected temperature. Turning down and/or off the heater well may reduce input energy costs, substantially inhibit overheating of the formation, and allow heat to substantially transfer into colder regions of the formation.

Temperature (and average temperatures) within a heated organic-rich rock formation may vary, depending on, for example, proximity to a heater well, thermal conductivity and thermal diffusivity of the formation, type of reaction occurring, type of formation hydrocarbon, and the presence of water within the organic-rich rock formation. At points in the field where monitoring wells are established, temperature measurements may be taken directly in the wellbore. Further, at heater wells the temperature of the immediately surrounding formation is fairly well understood. However, it is desirable to interpolate temperatures to points in the formation intermediate temperature sensors and heater wells.

In accordance with one aspect of the production processes of the present inventions, a temperature distribution within the organic-rich rock formation may be computed using a numerical simulation model. The numerical simulation model may calculate a subsurface temperature distribution through interpolation of known data points and assumptions of formation conductivity. In addition, the numerical simulation model may be used to determine other properties of the formation under the assessed temperature distribution. For example, the various properties of the formation may include, but are not limited to, permeability of the formation.

The numerical simulation model may also include assessing various properties of a fluid formed within an organic-rich rock formation under the assessed temperature distribution. For example, the various properties of a formed fluid may include, but are not limited to, a cumulative volume of a fluid formed in the formation, fluid viscosity, fluid density, and a composition of the fluid formed in the formation. Such a simulation may be used to assess the performance of a commercial-scale operation or small-scale field experiment. For example, a performance of a commercial-scale development may be assessed based on, but not limited to, a total volume of product that may be produced from a research-scale operation.

Some embodiments include producing at least a portion of the hydrocarbon fluids from the organic-rich rock formation. The hydrocarbon fluids may be produced through production wells. Production wells may be cased or uncased wells and drilled and completed through methods known in the art.

Some embodiments further include producing a production fluid from the organic-rich rock formation where the production fluid contains the hydrocarbon fluids and an aqueous fluid. The aqueous fluid may contain water-soluble minerals and/or migratory contaminant species. In such case, the production fluid may be separated into a hydrocarbon stream and an aqueous stream at a surface facility. Thereafter the water-soluble minerals and/or migratory contaminant species may be recovered from the aqueous stream. This embodiment may be combined with any of the other aspects of the invention discussed herein.

The produced hydrocarbon fluids may include a pyrolysis oil component (or condensable component) and a pyrolysis gas component (or non-condensable component). Condensable hydrocarbons produced from the formation will typically include paraffins, cycloalkanes, mono-aromatics, and di-aromatics as components. Such condensable hydrocarbons may also include other components such as tri-aromatics and other hydrocarbon species.

In certain embodiments, a majority of the hydrocarbons in the produced fluid may have a carbon number of less than approximately 25. Alternatively, less than about 15 weight % of the hydrocarbons in the fluid may have a carbon number greater than approximately 25. The non-condensable hydrocarbons may include, but are not limited to, hydrocarbons having carbon numbers less than 5.

In certain embodiments, the API gravity of the condensable hydrocarbons in the produced fluid may be approximately 20 or above (e.g., 25, 30, 40, 50, etc.). In certain embodiments, the hydrogen to carbon atomic ratio in produced fluid may be at least approximately 1.7 (e.g., 1.8, 1.9, etc.).

One embodiment of the invention includes an in situ method of producing hydrocarbon fluids with improved properties from an organic-rich rock formation. Applicants have surprisingly discovered that the quality of the hydrocarbon fluids produced from in situ heating and pyrolysis of an organic-rich rock formation may be improved by selecting sections of the organic-rich rock formation with higher lithostatic stress for in situ heating and pyrolysis.

The method may include in situ heating of a section of the organic-rich rock formation that has a high lithostatic stress to form hydrocarbon fluids with improved properties. The method may include creating the hydrocarbon fluid by pyrolysis of a solid hydrocarbon and/or a heavy hydrocarbon present in the organic-rich rock formation. Embodiments may include the hydrocarbon fluid being partially, predominantly or substantially completely created by pyrolysis of the solid hydrocarbon and/or heavy hydrocarbon present in the organic-rich rock formation. The method may include heating the section of the organic-rich rock formation by any method, including any of the methods described herein. For example, the method may include heating the section of the organic-rich rock formation by electrical resistance heating. Further, the method may include heating the section of the organic-rich rock formation through use of a heated heat transfer fluid. The method may include heating the section of the organic-rich rock formation to above 270° C. Alternatively, the method may include heating the section of the organic-rich rock formation between 270° C. and 500° C.

The method may include heating in situ a section of the organic-rich rock formation having a lithostatic stress greater than 200 psi and producing a hydrocarbon fluid from the heated section of the organic-rich rock formation. In alternative embodiments, the heated section of the organic-rich rock formation may have a lithostatic stress greater than 400 psi. In alternative embodiments, the heated section of the organic-rich rock formation may have a lithostatic stress greater than 800 psi, greater than 1,000 psi, greater than 1,200 psi, greater than 1,500 psi or greater than 2,000 psi. Applicants have found that in situ heating and pyrolysis of organic-rich rock formations with increasing amounts of stress lead to the production of hydrocarbon fluids with improved properties.

The lithostatic stress of a section of an organic-rich formation can normally be estimated by recognizing that it will generally be equal to the weight of the rocks overlying the formation. The density of the overlying rocks can be expressed in units of psi/ft. Generally, this value will fall between 0.8 and 1.1 psi/ft and can often be approximated as 0.9 psi/ft. As a result the lithostatic stress of a section of an organic-rich formation can be estimated by multiplying the depth of the organic-rich rock formation interval by 0.9 psi/ft. Thus the lithostatic stress of a section of an organic-rich formation occurring at about 1,000 ft can be estimated to be about (0.9 psi/ft) multiplied by (1,000 ft) or about 900 psi. If a more precise estimate of lithostatic stress is desired the density of overlying rocks can be measured using wireline logging techniques or by making laboratory measurements on samples recovered from coreholes. The method may include heating a section of the organic-rich rock formation that is located at a depth greater than 200 ft below the earth's surface. Alternatively, the method may include heating a section of the organic-rich rock formation that is located at a depth greater than 500 ft below the earth's surface, greater than 1,000 ft below the earth's surface, greater than 1,200 ft below the earth's surface, greater than 1,500 ft below the earth's surface, or greater than 2,000 ft below the earth's surface.

The organic-rich rock formation may be, for example, a heavy hydrocarbon formation or a solid hydrocarbon formation. Particular examples of such formations may include an oil shale formation, a tar sands formation or a coal formation. Particular formation hydrocarbons present in such formations may include oil shale, kerogen, coal, and/or bitumen.

The hydrocarbon fluid produced from the organic-rich rock formation may include both a condensable hydrocarbon portion (e.g. liquid) and a non-condensable hydrocarbon portion (e.g. gas). The hydrocarbon fluid may additionally be produced together with non-hydrocarbon fluids. Exemplary non-hydrocarbon fluids include, for example, water, carbon dioxide, hydrogen sulfide, hydrogen, ammonia, and/or carbon monoxide.

The condensable hydrocarbon portion of the hydrocarbon fluid may be a fluid present within different locations associated with an organic-rich rock development project. For example, the condensable hydrocarbon portion of the hydrocarbon fluid may be a fluid present within a production well that is in fluid communication with the organic-rich rock formation. The production well may serve as a device for withdrawing the produced hydrocarbon fluids from the organic-rich rock formation. Alternatively, the condensable hydrocarbon portion may be a fluid present within processing equipment adapted to process hydrocarbon fluids produced from the organic-rich rock formation. Exemplary processing equipment is described herein. Alternatively, the condensable hydrocarbon portion may be a fluid present within a fluid storage vessel. Fluid storage vessels may include, for example, fluid storage tanks with fixed or floating roofs, knock-out vessels, and other intermediate, temporary or product storage vessels. Alternatively, the condensable hydrocarbon portion may be a fluid present within a fluid transportation pipeline. A fluid transportation pipeline may include, for example, piping from production wells to processing equipment or fluid storage vessels, piping from processing equipment to fluid storage vessels, or pipelines associated with collection or transportation of fluids to or from intermediate or centralized storage locations.

The following discussion of FIGS. 7-16 concerns data obtained in Examples 1-5 which are discussed below in the section labeled "Experiments". The data was obtained through experimental procedures, gas and liquid sample collection procedures, hydrocarbon gas sample gas chromatography (GC) analysis methodology, gas sample GC peak integration methodology, gas sample GC peak identification methodology, whole oil gas chromatography (WOGC) analysis methodology, whole oil gas chromatography (WOGC) peak integration methodology, whole oil gas chromatography (WOGC) peak identification methodology, and pseudo component analysis methodology discussed in the Experiments section. For clarity, when referring to gas chromatography chromatograms of hydrocarbon gas samples, graphical data is provided for one unstressed experiment through Example 1, two 400 psi stressed experiments through Examples 2 and 3, and two 1,000 psi stressed experiments through Examples 4 and 5. When referring to whole oil gas chromatography (WOGC) chromatograms of liquid hydrocarbon samples, graphical data is provided for one unstressed experiment through Example 1, one 400 psi stressed experiments through Example 3, and one 1,000 psi stressed experiment through Example 4.

Figure 7:
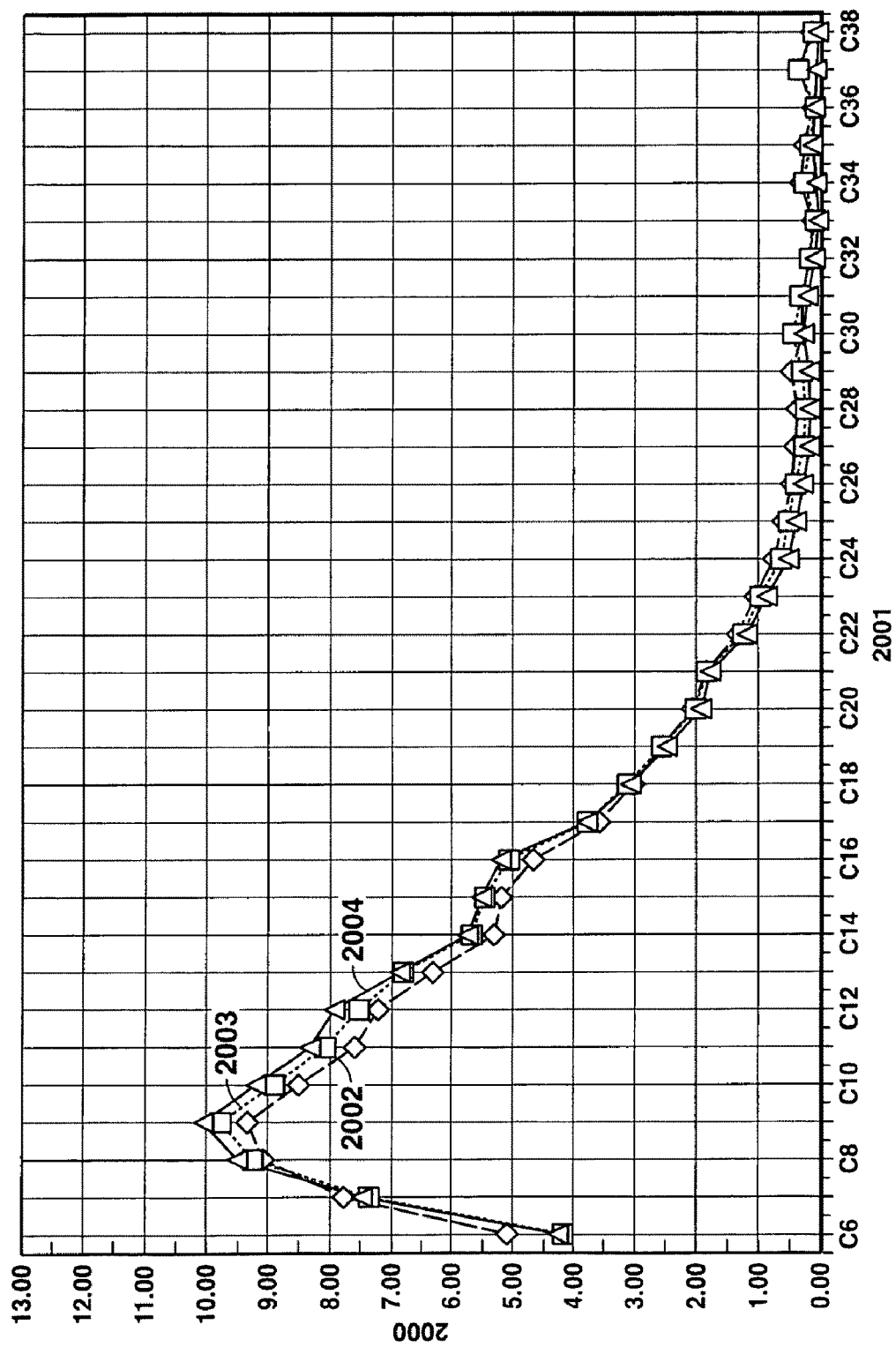
FIG. 7 is a graph of the weight percent of each carbon number pseudo component occurring from C6 to C38 for laboratory experiments conducted at three different stress levels.

FIG. 7 is a graph of the weight percent of each carbon number pseudo component occurring from C6 to C38 for each of the three stress levels tested and analyzed in the laboratory experiments discussed herein. The pseudo component weight percentages were obtained through the experimental procedures, liquid sample collection procedures, whole oil gas chromatography (WOGC) analysis methodology, whole oil gas chromatography (WOGC) peak identification and integration methodology, and pseudo component analysis methodology discussed in the Experiments section. For clarity, the pseudo component weight percentages are taken as a percentage of the entire C3 to pseudo C38 whole oil gas chromatography areas and calculated weights. Thus the graphed C6 to C38 weight percentages do not include the weight contribution of the associated gas phase product from any of the experiments which was separately treated. Further, the graphed weight percentages do not include the weight contribution of any liquid hydrocarbon compounds heavier than (i.e. having a longer retention time than) the C38 pseudo component. The y-axis 2000 represents the concentration in terms of weight percent of each C6 to C38 pseudo component in the liquid phase. The x-axis 2001 contains the identity of each hydrocarbon pseudo component from C6 to C38. The data points occurring on line 2002 represent the weight percent of each C6 to C38 pseudo component for the unstressed experiment of Example 1. The data points occurring on line 2003 represent the weight percent of each C6 to C38 pseudo component for the 400 psi stressed experiment of Example 3. While the data points occurring on line 2004 represent the weight percent of each C6 to C38 pseudo component for the 1,000 psi stressed experiment of Example 4. From FIG. 7 it can be seen that the hydrocarbon liquid produced in the unstressed experiment, represented by data points on line 2002, contains a lower weight percentage of lighter hydrocarbon components in the C8 to C17 pseudo component range and a greater weight percentage of heavier hydrocarbon components in the C20 to C29 pseudo component range, both as compared to the 400 psi stress experiment hydrocarbon liquid and the 1,000 psi stress experiment hydrocarbon liquid. Looking now at the data points occurring on line 2003, it is apparent that the intermediate level 400 psi stress experiment produced a hydrocarbon liquid having C8 to C17 pseudo component concentrations between the unstressed experiment represented by line 2002 and the 1,000 psi stressed experiment represented by line 2004. It is noted that the C17 pseudo component data for both the 400 psi and 1,000 psi stressed experiments are about equal. Further, it is apparent that the weight percentage of heavier hydrocarbon components in the C20 to C29 pseudo component range for the intermediate stress level experiment represented by line 2003 falls between the unstressed experiment (Line 2002) hydrocarbon liquid and the 1,000 psi stress experiment (Line 2004) hydrocarbon liquid. Lastly, it is apparent that the high level 1,000 psi stress experiment produced a hydrocarbon liquid having C8 to C17 pseudo component concentrations greater than both the unstressed experiment represented by line 2002 and the 400 psi stressed experiment represented by line 2003. Further, it is apparent that the weight percentage of heavier hydrocarbon components in the C20 to C29 pseudo component range for the high level stress experiment represented by line 2004 are less than both the unstressed experiment (Line 2002) hydrocarbon liquid and the 400 psi stress experiment (Line 2003) hydrocarbon liquid. Thus pyrolyzing oil shale under increasing levels of lithostatic stress appears to produce hydrocarbon liquids having increasingly lighter carbon number distributions.

Figure 8:
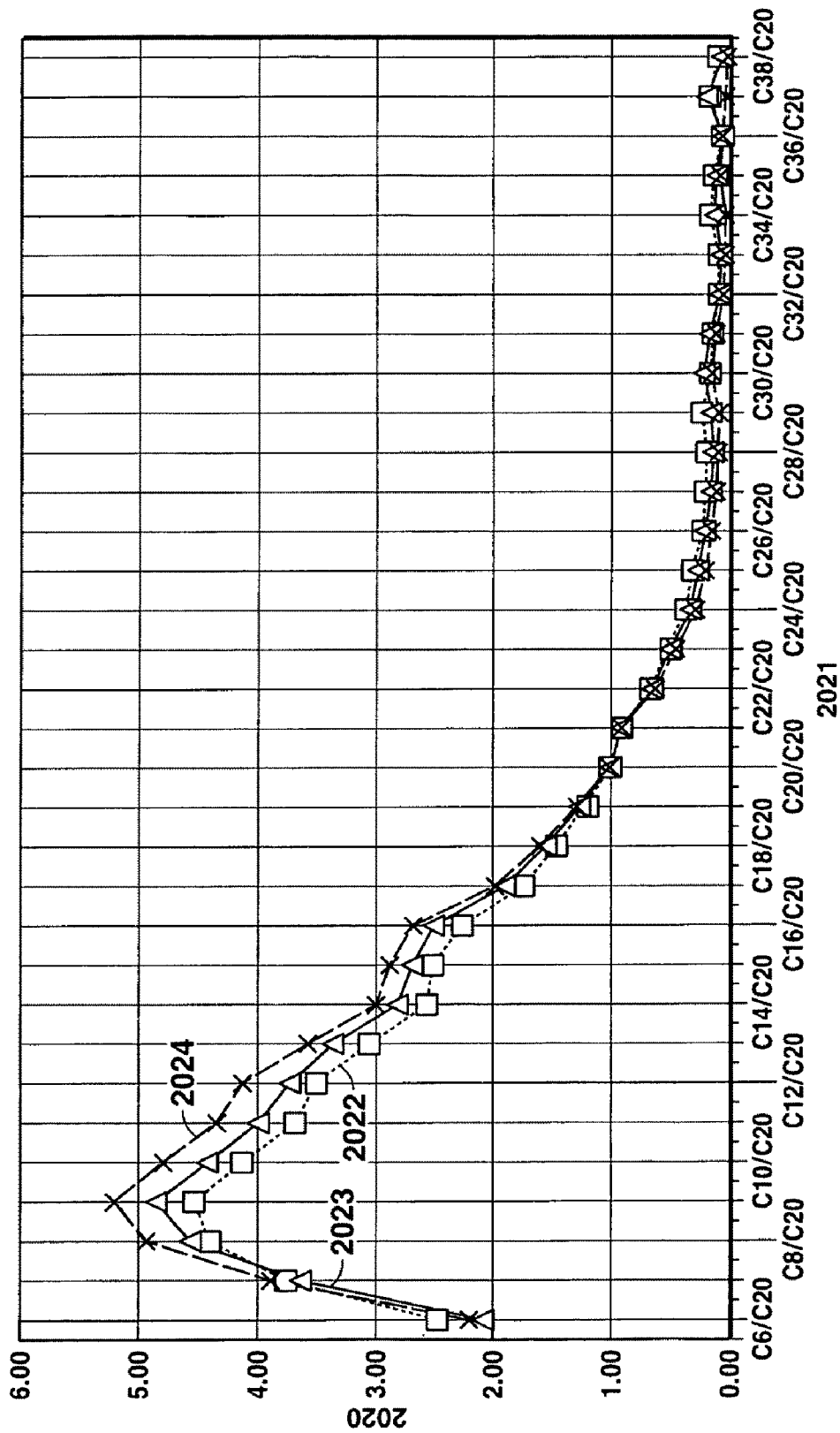
FIG. 8 is a graph of the weight percent ratios of each carbon number pseudo component occurring from C6 to C38 as compared to the C20 pseudo component for laboratory experiments conducted at three different stress levels.

FIG. 8 is a graph of the weight percent ratios of each carbon number pseudo component occurring from C6 to C38 as compared to the C20 pseudo component for each of the three stress levels tested and analyzed in the laboratory experiments discussed herein. The pseudo component weight percentages were obtained as described for FIG. 7. The y-axis 2020 represents the weight ratio of each C6 to C38 pseudo component compared to the C20 pseudo component in the liquid phase. The x-axis 2021 contains the identity of each hydrocarbon pseudo component ratio from C6/C20 to C38/C20. The data points occurring on line 2022 represent the weight ratio of each C6 to C38 pseudo component to C20 pseudo component for the unstressed experiment of Example 1. The data points occurring on line 2023 represent the weight ratio of each C6 to C38 pseudo component to C20 pseudo component for the 400 psi stressed experiment of Example 3. While the data points occurring on line 2024 represent the weight ratio of each C6 to C38 pseudo component to C20 pseudo component for the 1,000 psi stressed experiment of Example 4. From FIG. 8 it can be seen that the hydrocarbon liquid produced in the unstressed experiment, represented by data points on line 2022, contains a lower weight percentage of lighter hydrocarbon components in the C8 to C18 pseudo component range as compared to the C20 pseudo component and a greater weight percentage of heavier hydrocarbon components in the C22 to C29 pseudo component range as compared to the C20 pseudo component, both as compared to the 400 psi stress experiment hydrocarbon liquid and the 1,000 psi stress experiment hydrocarbon liquid. Looking now at the data points occurring on line 2023, it is apparent that the intermediate level 400 psi stress experiment produced a hydrocarbon liquid having C8 to C18 pseudo component concentrations as compared to the C20 pseudo component between the unstressed experiment represented by line 2022 and the 1,000 psi stressed experiment represented by line 2024. Further, it is apparent that the weight percentage of heavier hydrocarbon components in the C22 to C29 pseudo component range as compared to the C20 pseudo component for the intermediate stress level experiment represented by line 2023 falls between the unstressed experiment (Line 2022) hydrocarbon liquid and the 1,000 psi stress experiment (Line 2024) hydrocarbon liquid. Lastly, it is apparent that the high level 1,000 psi stress experiment produced a hydrocarbon liquid having C8 to C18 pseudo component concentrations as compared to the C20 pseudo component greater than both the unstressed experiment represented by line 2022 and the 400 psi stressed experiment represented by line 2023. Further, it is apparent that the weight percentage of heavier hydrocarbon components in the C22 to C29 pseudo component range as compared to the C20 pseudo component for the high level stress experiment represented by line 2024 are less than both the unstressed experiment (Line 2022) hydrocarbon liquid and the 400 psi stress experiment (Line 2023) hydrocarbon liquid. This analysis further supports the relationship that pyrolyzing oil shale under increasing levels of lithostatic stress produces hydrocarbon liquids having increasingly lighter carbon number distributions.

Figure 9:
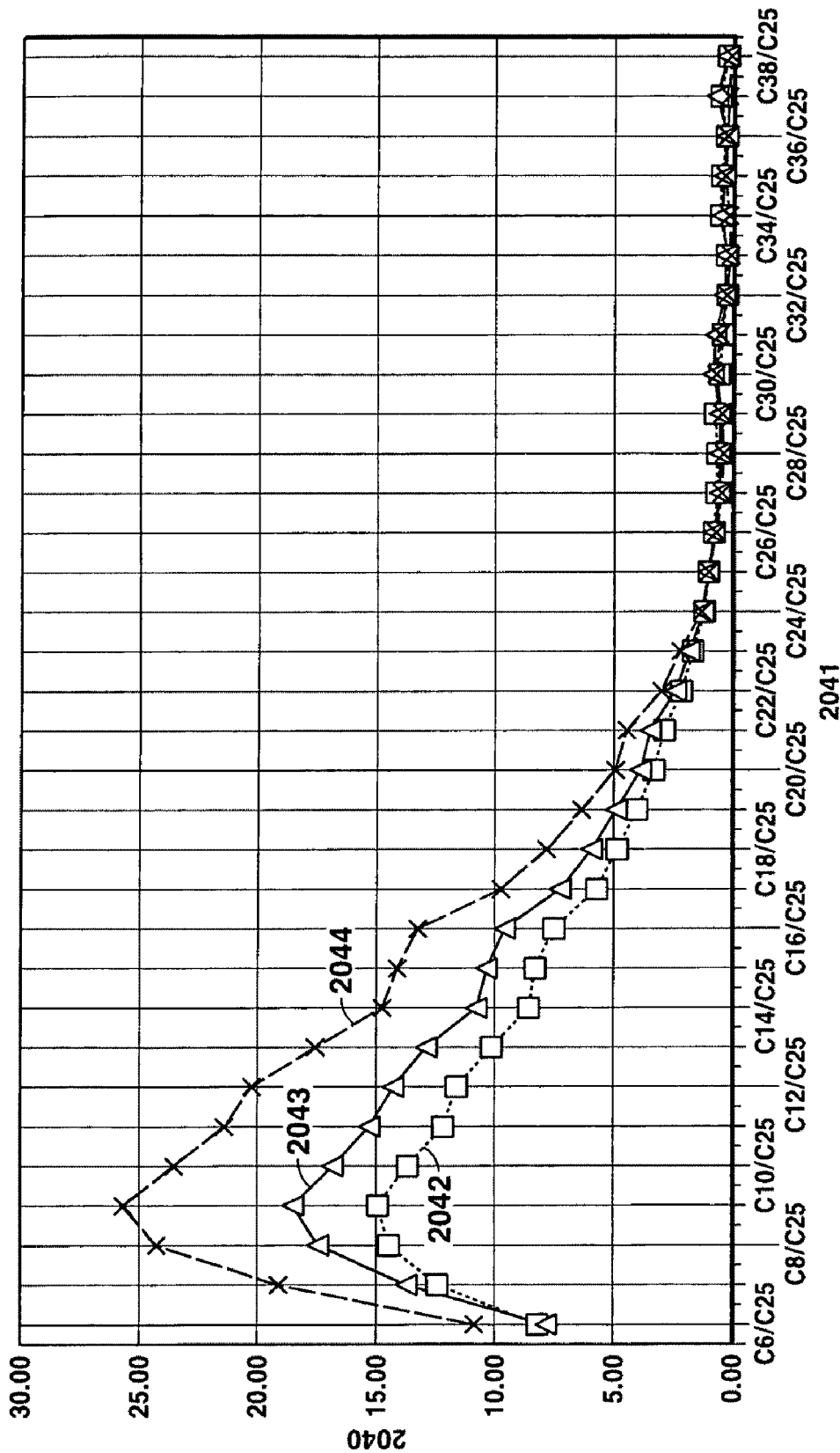
FIG. 9 is a graph of the weight percent ratios of each carbon number pseudo component occurring from C6 to C38 as compared to the C25 pseudo component for laboratory experiments conducted at three different stress levels.

FIG. 9 is a graph of the weight percent ratios of each carbon number pseudo component occurring from C6 to C38 as compared to the C25 pseudo component for each of the three stress levels tested and analyzed in the laboratory experiments discussed herein. The pseudo component weight percentages were obtained as described for FIG. 7. The y-axis 2040 represents the weight ratio of each C6 to C38 pseudo component compared to the C25 pseudo component in the liquid phase. The x-axis 2041 contains the identity of each hydrocarbon pseudo component ratio from C6/C25 to C38/C25. The data points occurring on line 2042 represent the weight ratio of each C6 to C38 pseudo component to C25 pseudo component for the unstressed experiment of Example 1. The data points occurring on line 2043 represent the weight ratio of each C6 to C38 pseudo component to C25 pseudo component for the 400 psi stressed experiment of Example 3. While the data points occurring on line 2044 represent the weight ratio of each C6 to C38 pseudo component to C25 pseudo component for the 1,000 psi stressed experiment of Example 4. From FIG. 9 it can be seen that the hydrocarbon liquid produced in the unstressed experiment, represented by data points on line 2042, contains a lower weight percentage of lighter hydrocarbon components in the C7 to C24 pseudo component range as compared to the C25 pseudo component and a greater weight percentage of heavier hydrocarbon components in the C26 to C29 pseudo component range as compared to the C25 pseudo component, both as compared to the 400 psi stress experiment hydrocarbon liquid and the 1,000 psi stress experiment hydrocarbon liquid. Looking now at the data points occurring on line 2043, it is apparent that the intermediate level 400 psi stress experiment produced a hydrocarbon liquid having C7 to C24 pseudo component concentrations as compared to the C25 pseudo component between the unstressed experiment represented by line 2042 and the 1,000 psi stressed experiment represented by line 2044. Further, it is apparent that the weight percentage of heavier hydrocarbon components in the C26 to C29 pseudo component range as compared to the C25 pseudo component for the intermediate stress level experiment represented by line 2043 falls between the unstressed experiment (Line 2042) hydrocarbon liquid and the 1,000 psi stress experiment (Line 2044) hydrocarbon liquid. Lastly, it is apparent that the high level 1,000 psi stress experiment produced a hydrocarbon liquid having C7 to C24 pseudo component concentrations as compared to the C25 pseudo component greater than both the unstressed experiment represented by line 2042 and the 400 psi stressed experiment represented by line 2043. Further, it is apparent that the weight percentage of heavier hydrocarbon components in the C26 to C29 pseudo component range as compared to the C25 pseudo component for the high level stress experiment represented by line 2044 are less than both the unstressed experiment (Line 2042) hydrocarbon liquid and the 400 psi stress experiment (Line 2043) hydrocarbon liquid. This analysis further supports the relationship that pyrolyzing oil shale under increasing levels of lithostatic stress produces hydrocarbon liquids having increasingly lighter carbon number distributions.

Figure 10:
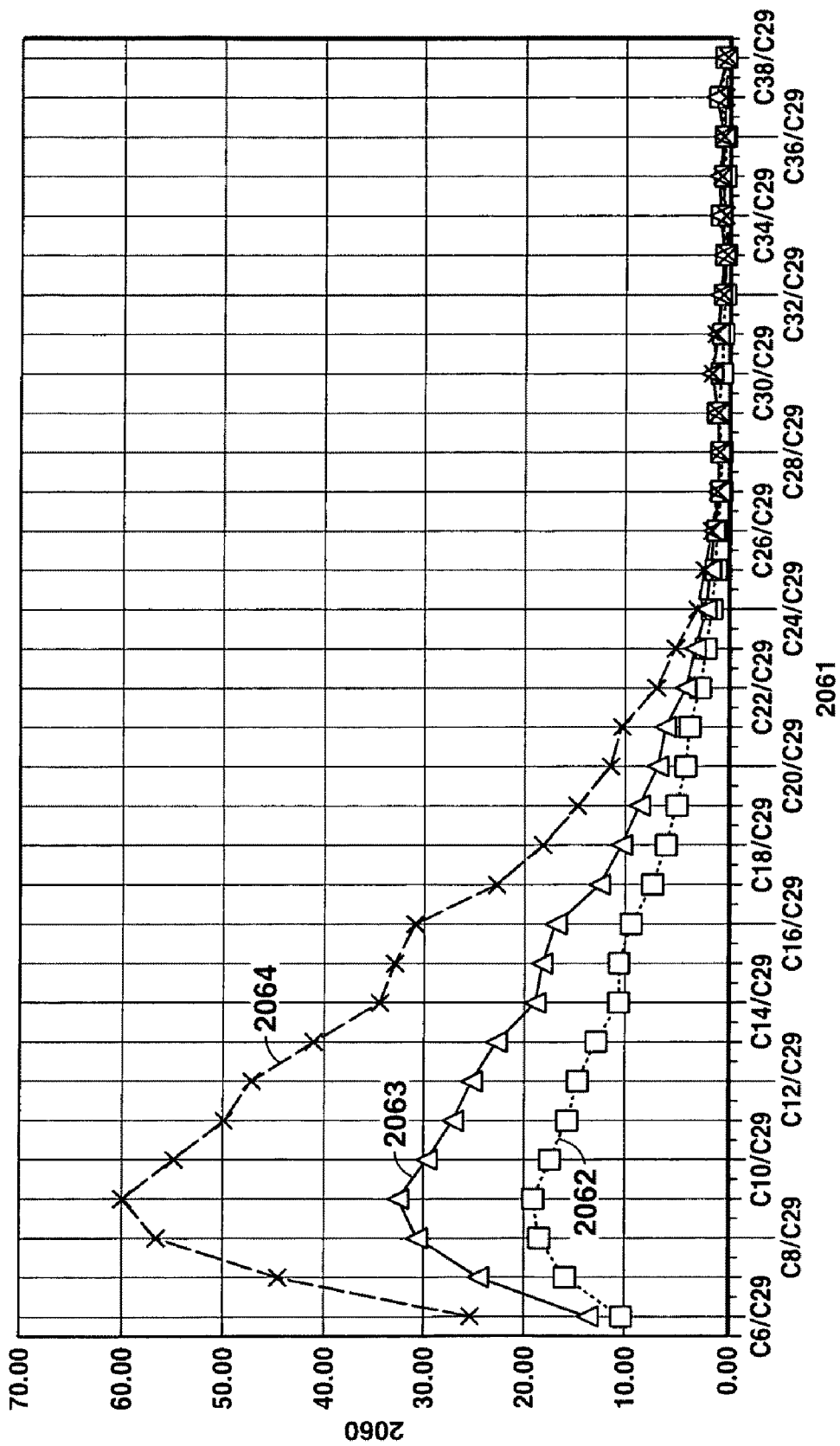
FIG. 10 is a graph of the weight percent ratios of each carbon number pseudo component occurring from C6 to C38 as compared to the C29 pseudo component for laboratory experiments conducted at three different stress levels.

FIG. 10 is a graph of the weight percent ratios of each carbon number pseudo component occurring from C6 to C38 as compared to the C29 pseudo component for each of the three stress levels tested and analyzed in the laboratory experiments discussed herein. The pseudo component weight percentages were obtained as described for FIG. 7. The y-axis 2060 represents the weight ratio of each C6 to C38 pseudo component compared to the C29 pseudo component in the liquid phase. The x-axis 2061 contains the identity of each hydrocarbon pseudo component ratio from C6/C29 to C38/C29. The data points occurring on line 2062 represent the weight ratio of each C6 to C38 pseudo component to C29 pseudo component for the unstressed experiment of Example 1. The data points occurring on line 2063 represent the weight ratio of each C6 to C38 pseudo component to C29 pseudo component for the 400 psi stressed experiment of Example 3. While the data points occurring on line 2064 represent the weight ratio of each C6 to C38 pseudo component to C29 pseudo component for the 1,000 psi stressed experiment of Example 4. From FIG. 10 it can be seen that the hydrocarbon liquid produced in the unstressed experiment, represented by data points on line 2062, contains a lower weight percentage of lighter hydrocarbon components in the C6 to C28 pseudo component range as compared to the C29 pseudo component, both as compared to the 400 psi stress experiment hydrocarbon liquid and the 1,000 psi stress experiment hydrocarbon liquid. Looking now at the data points occurring on line 2063, it is apparent that the intermediate level 400 psi stress experiment produced a hydrocarbon liquid having C6 to C28 pseudo component concentrations as compared to the C29 pseudo component between the unstressed experiment represented by line 2062 and the 1,000 psi stressed experiment represented by line 2064. Lastly, it is apparent that the high level 1,000 psi stress experiment produced a hydrocarbon liquid having C6 to C28 pseudo component concentrations as compared to the C29 pseudo component greater than both the unstressed experiment represented by line 2062 and the 400 psi stressed experiment represented by line 2063. This analysis further supports the relationship that pyrolyzing oil shale under increasing levels of lithostatic stress produces hydrocarbon liquids having increasingly lighter carbon number distributions.

Figure 11:
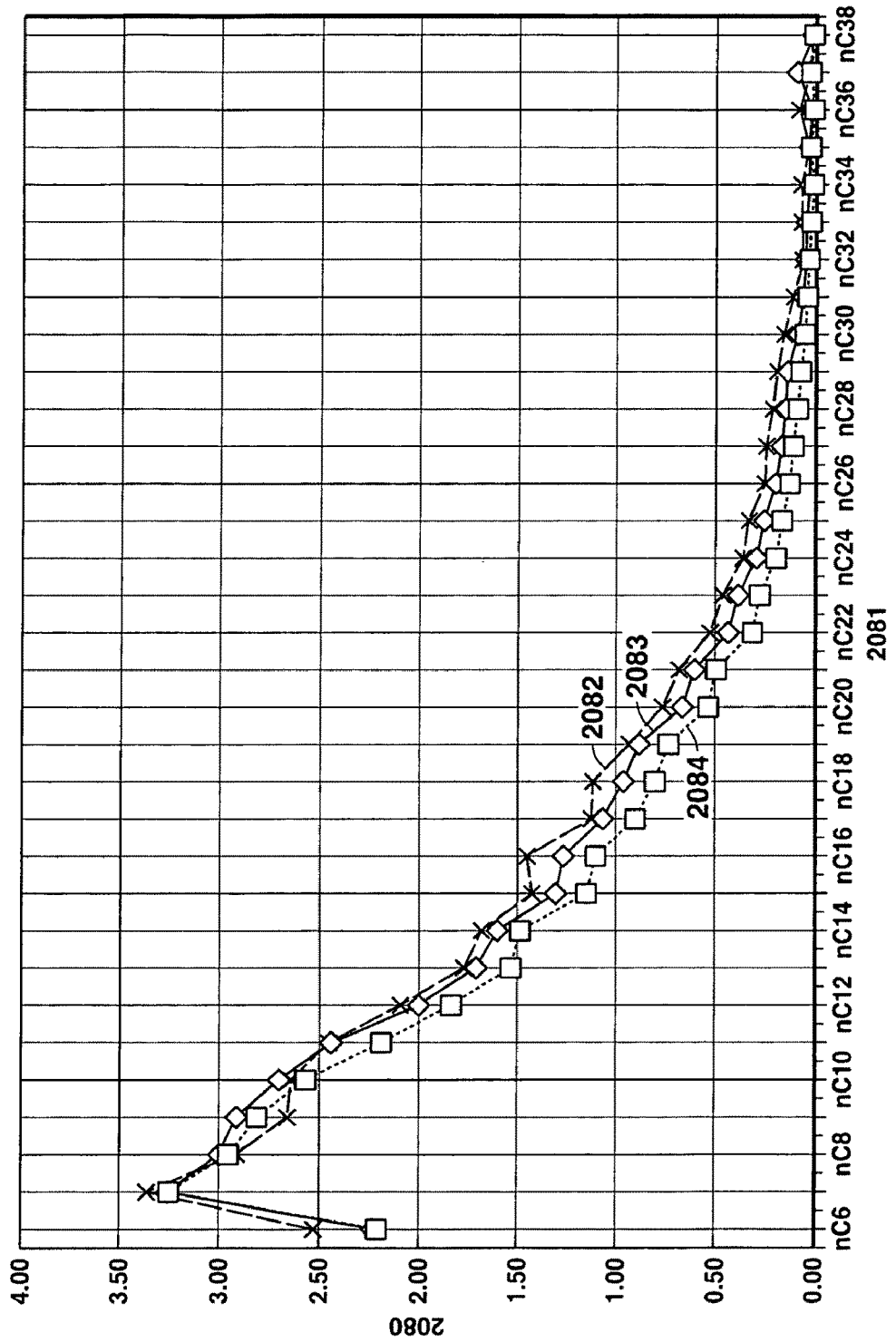
FIG. 11 is a graph of the weight percent of normal alkane hydrocarbon compounds occurring from normal-C6 to normal-C38 for laboratory experiments conducted at three different stress levels.

FIG. 11 is a graph of the weight percent of normal alkane hydrocarbon compounds occurring from the normal-C6 alkane to the normal-C38 alkane for each of the three stress levels tested and analyzed in the laboratory experiments discussed herein. The normal alkane compound weight percentages were obtained as described for FIG. 7, except that each individual normal alkane compound peak area integration was used to determine each respective normal alkane compound weight percentage. For clarity, the normal alkane hydrocarbon weight percentages are taken as a percentage of the entire C3 to pseudo C38 whole oil gas chromatography areas and calculated weights as used in the pseudo compound data presented in FIG. 7. The y-axis 2080 represents the concentration in terms of weight percent of each normal-C6 to normal-C38 compound found in the liquid phase. The x-axis 2081 contains the identity of each normal alkane hydrocarbon compound from normal-C6 to normal-C38. The data points occurring on line 2082 represent the weight percent of each normal-C6 to normal-C38 hydrocarbon compound for the unstressed experiment of Example 1. The data points occurring on line 2083 represent the weight percent of each normal-C6 to normal-C38 hydrocarbon compound for the 400 psi stressed experiment of Example 3. While the data points occurring on line 2084 represent the weight percent of each normal-C6 to normal-C38 hydrocarbon compound for the 1,000 psi stressed experiment of Example 4. From FIG. 11 it can be seen that the hydrocarbon liquid produced in the unstressed experiment, represented by data points on line 2082, contains a greater weight percentage of hydrocarbon compounds in the normal-C12 to normal-C30 compound range, both as compared to the 400 psi stress experiment hydrocarbon liquid and the 1,000 psi stress experiment hydrocarbon liquid. Looking now at the data points occurring on line 2083, it is apparent that the intermediate level 400 psi stress experiment produced a hydrocarbon liquid having normal-C12 to normal-C30 compound concentrations between the unstressed experiment represented by line 2082 and the 1,000 psi stressed experiment represented by line 2084. Lastly, it is apparent that the high level 1,000 psi stress experiment produced a hydrocarbon liquid having normal-C12 to normal-C30 compound concentrations less than both the unstressed experiment represented by line 2082 and the 400 psi stressed experiment represented by line 2083. Thus pyrolyzing oil shale under increasing levels of lithostatic stress appears to produce hydrocarbon liquids having lower concentrations of normal alkane hydrocarbons.

Figure 12:
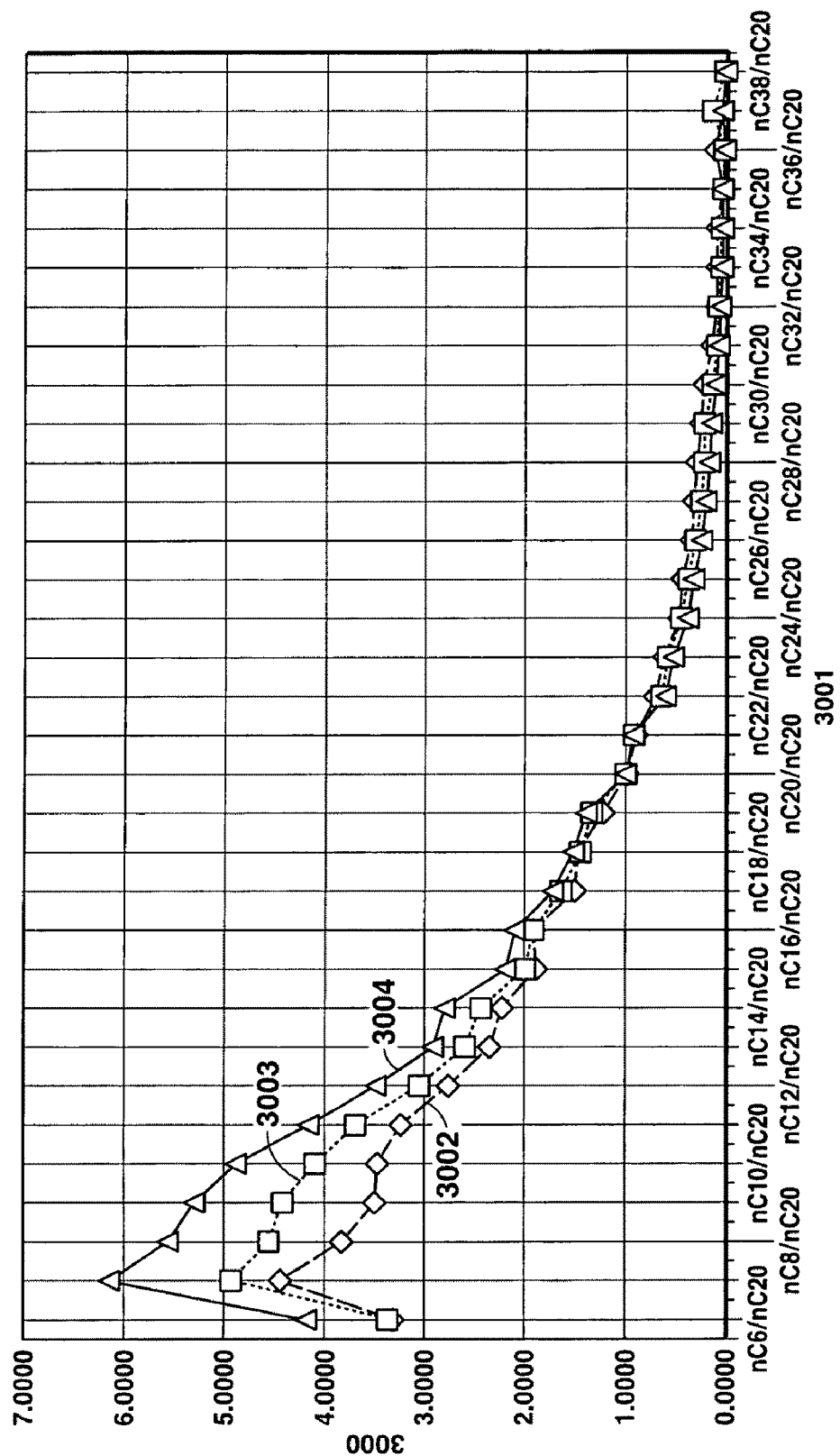
FIG. 12 is a graph of the weight percent of normal alkane hydrocarbon compounds occurring from normal-C6 to normal-C38 as compared to the normal-C20 hydrocarbon compound for laboratory experiments conducted at three different stress levels.

FIG. 12 is a graph of the weight percent of normal alkane hydrocarbon compounds occurring from normal-C6 to normal-C38 as compared to the normal-C20 hydrocarbon compound for each of the three stress levels tested and analyzed in the laboratory experiments discussed herein. The normal compound weight percentages were obtained as described for FIG. 11. The y-axis 3000 represents the concentration in terms of weight ratio of each normal-C6 to normal-C38 compound as compared to the normal-C20 compound found in the liquid phase. The x-axis 3001 contains the identity of each normal alkane hydrocarbon compound ratio from normal-C6/normal-C20 to normal-C38/normal-C20. The data points occurring on line 3002 represent the weight ratio of each normal-C6 to normal-C38 hydrocarbon compound as compared to the normal-C20 compound for the unstressed experiment of Example 1. The data points occurring on line 3003 represent the weight ratio of each normal-C6 to normal-C38 hydrocarbon compound as compared to the normal-C20 compound for the 400 psi stressed experiment of Example 3. While the data points occurring on line 3004 represent the weight ratio of each normal-C6 to normal-C38 hydrocarbon compound as compared to the normal-C20 compound for the 1,000 psi stressed experiment of Example 4. From FIG. 12 it can be seen that the hydrocarbon liquid produced in the unstressed experiment, represented by data points on line 3002, contains a lower weight percentage of lighter normal alkane hydrocarbon components in the normal-C6 to normal-C17 compound range as compared to the normal-C20 compound and a greater weight percentage of heavier hydrocarbon components in the normal-C22 to normal-C34 compound range as compared to the normal-C20 compound, both as compared to the 400 psi stress experiment hydrocarbon liquid and the 1,000 psi stress experiment hydrocarbon liquid. Looking now at the data points occurring on line 3003, it is apparent that the intermediate level 400 psi stress experiment produced a hydrocarbon liquid having normal-C6 to normal-C17 compound concentrations as compared to the normal-C20 compound between the unstressed experiment represented by line 3002 and the 1,000 psi stressed experiment represented by line 3004. Further, it is apparent that the weight percentage of heavier hydrocarbon components in the normal-C22 to normal-C34 compound range as compared to the normal-C20 compound for the intermediate stress level experiment represented by line 3003 falls between the unstressed experiment (Line 3002) hydrocarbon liquid and the 1,000 psi stress experiment (Line 3004) hydrocarbon liquid. Lastly, it is apparent that the high level 1,000 psi stress experiment produced a hydrocarbon liquid having normal-C6 to normal-C17 compound concentrations as compared to the normal-C20 compound greater than both the unstressed experiment represented by line 3002 and the 400 psi stressed experiment represented by line 3003. Further, it is apparent that the weight percentage of heavier hydrocarbon components in the normal-C22 to normal-C34 compound range as compared to the normal-C20 compound for the high level stress experiment represented by line 3004 are less than both the unstressed experiment (Line 3002) hydrocarbon liquid and the 400 psi stress experiment (Line 3003) hydrocarbon liquid. This analysis further supports the relationship that pyrolyzing oil shale under increasing levels of lithostatic stress produces hydrocarbon liquids having lower concentrations of normal alkane hydrocarbons.

Figure 13:
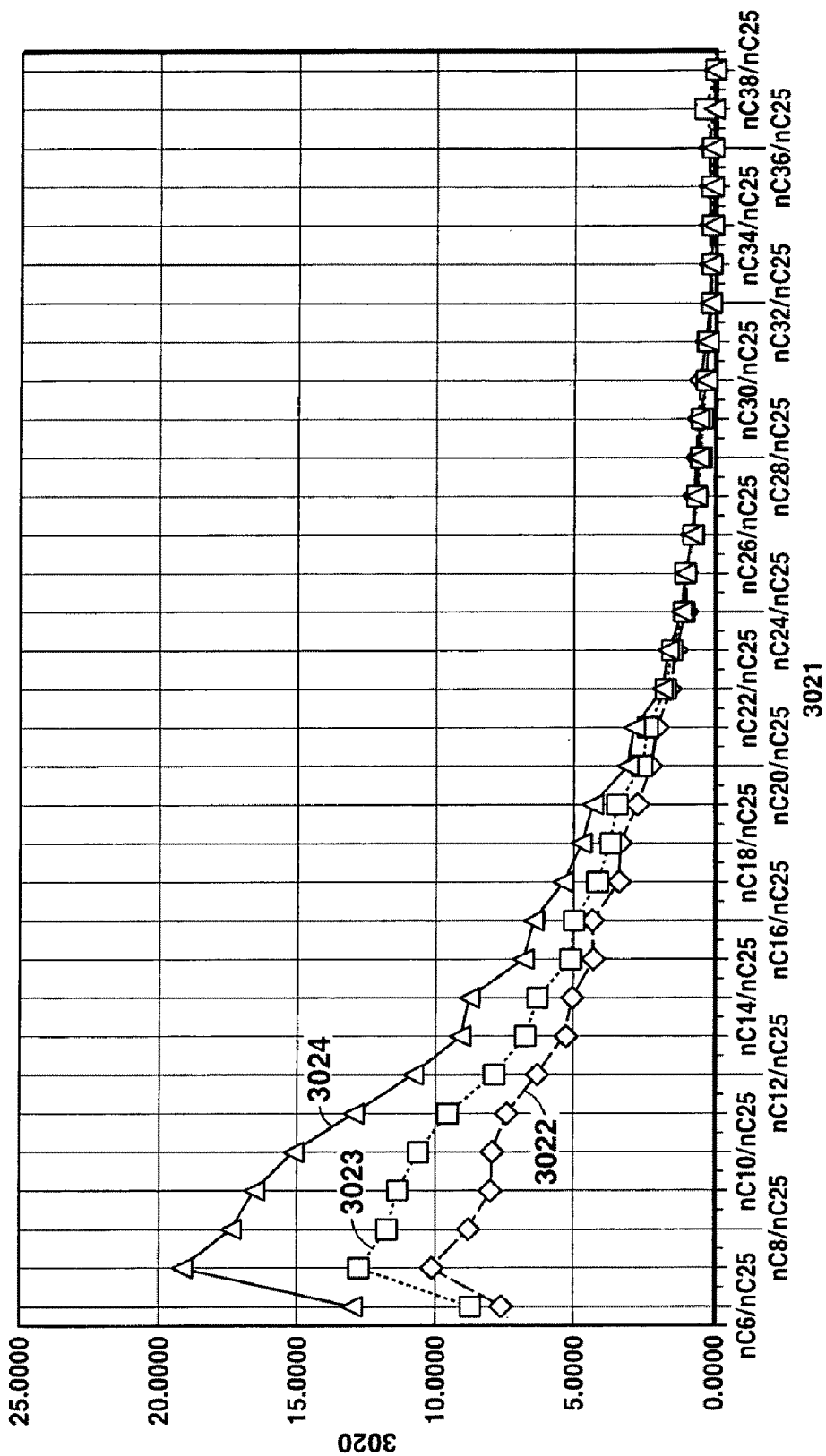
FIG. 13 is a graph of the weight percent of normal alkane hydrocarbon compounds occurring from normal-C6 to normal-C38 as compared to the normal-C25 hydrocarbon compound for laboratory experiments conducted at three different stress levels.

FIG. 13 is a graph of the weight percent of normal alkane hydrocarbon compounds occurring from normal-C6 to normal-C38 as compared to the normal-C25 hydrocarbon compound for each of the three stress levels tested and analyzed in the laboratory experiments discussed herein. The normal compound weight percentages were obtained as described for FIG. 11. The y-axis 3020 represents the concentration in terms of weight ratio of each normal-C6 to normal-C38 compound as compared to the normal-C25 compound found in the liquid phase. The x-axis 3021 contains the identity of each normal alkane hydrocarbon compound ratio from normal-C6/normal-C25 to normal-C38/normal-C25. The data points occurring on line 3022 represent the weight ratio of each normal-C6 to normal-C38 hydrocarbon compound as compared to the normal-C25 compound for the unstressed experiment of Example 1. The data points occurring on line 3023 represent the weight ratio of each normal-C6 to normal-C38 hydrocarbon compound as compared to the normal-C25 compound for the 400 psi stressed experiment of Example 3. While the data points occurring on line 3024 represent the weight ratio of each normal-C6 to normal-C38 hydrocarbon compound as compared to the normal-C25 compound for the 1,000 psi stressed experiment of Example 4. From FIG. 13 it can be seen that the hydrocarbon liquid produced in the unstressed experiment, represented by data points on line 3022, contains a lower weight percentage of lighter normal alkane hydrocarbon components in the normal-C6 to normal-C24 compound range as compared to the normal-C25 compound and a greater weight percentage of heavier hydrocarbon components in the normal-C26 to normal-C30 compound range as compared to the normal-C25 compound, both as compared to the 400 psi stress experiment hydrocarbon liquid and the 1,000 psi stress experiment hydrocarbon liquid. Looking now at the data points occurring on line 3023, it is apparent that the intermediate level 400 psi stress experiment produced a hydrocarbon liquid having normal-C6 to normal-C24 compound concentrations as compared to the normal-C25 compound between the unstressed experiment represented by line 3022 and the 1,000 psi stressed experiment represented by line 3024. Further, it is apparent that the weight percentage of heavier hydrocarbon components in the normal-C26 to normal-C30 compound range as compared to the normal-C25 compound for the intermediate stress level experiment represented by line 3023 falls between the unstressed experiment (Line 3022) hydrocarbon liquid and the 1,000 psi stress experiment (Line 3024) hydrocarbon liquid. Lastly, it is apparent that the high level 1,000 psi stress experiment produced a hydrocarbon liquid having normal-C6 to normal-C24 compound concentrations as compared to the normal-C25 compound greater than both the unstressed experiment represented by line 3022 and the 400 psi stressed experiment represented by line 3023. Further, it is apparent that the weight percentage of heavier hydrocarbon components in the normal-C26 to normal-C30 compound range as compared to the normal-C25 compound for the high level stress experiment represented by line 3024 are less than both the unstressed experiment (Line 3022) hydrocarbon liquid and the 400 psi stress experiment (Line 3023) hydrocarbon liquid. This analysis further supports the relationship that pyrolyzing oil shale under increasing levels of lithostatic stress produces hydrocarbon liquids having lower concentrations of normal alkane hydrocarbons.

Figure 14:
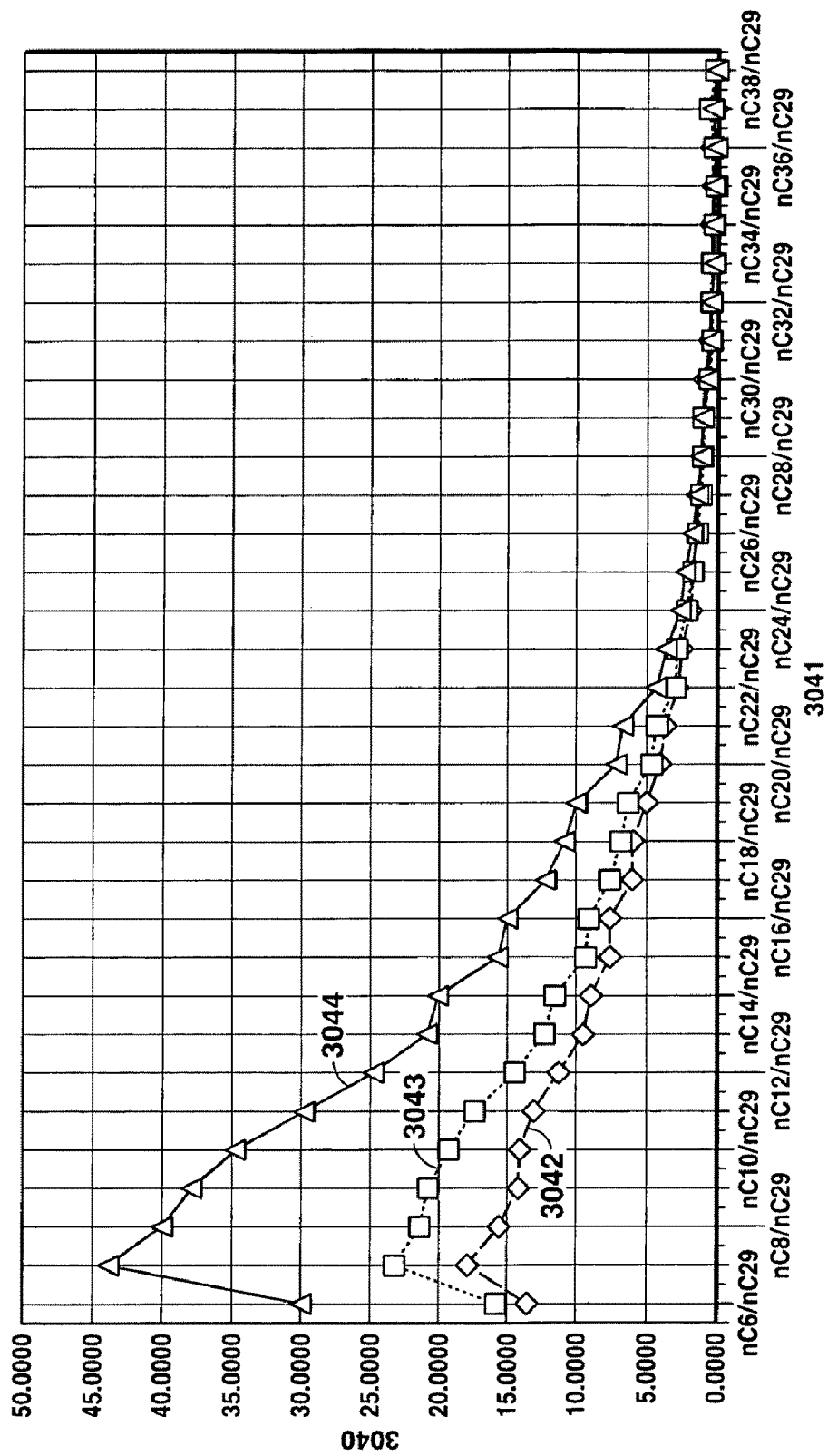
FIG. 14 is a graph of the weight percent of normal alkane hydrocarbon compounds occurring from normal-C6 to normal-C38 as compared to the normal-C29 hydrocarbon compound for laboratory experiments conducted at three different stress levels.

FIG. 14 is a graph of the weight percent of normal alkane hydrocarbon compounds occurring from normal-C6 to normal-C38 as compared to the normal-C29 hydrocarbon compound for each of the three stress levels tested and analyzed in the laboratory experiments discussed herein. The normal compound weight percentages were obtained as described for FIG. 11. The y-axis 3040 represents the concentration in terms of weight ratio of each normal-C6 to normal-C38 compound as compared to the normal-C29 compound found in the liquid phase. The x-axis 3041 contains the identity of each normal alkane hydrocarbon compound ratio from normal-C6/normal-C29 to normal-C38/normal-C29. The data points occurring on line 3042 represent the weight ratio of each normal-C6 to normal-C38 hydrocarbon compound as compared to the normal-C29 compound for the unstressed experiment of Example 1. The data points occurring on line 3043 represent the weight ratio of each normal-C6 to normal-C38 hydrocarbon compound as compared to the normal-C29 compound for the 400 psi stressed experiment of Example 3. While the data points occurring on line 3044 represent the weight ratio of each normal-C6 to normal-C38 hydrocarbon compound as compared to the normal-C29 compound for the 1,000 psi stressed experiment of Example 4. From FIG. 14 it can be seen that the hydrocarbon liquid produced in the unstressed experiment, represented by data points on line 3042, contains a lower weight percentage of lighter normal alkane hydrocarbon components in the normal-C6 to normal-C26 compound range as compared to the normal-C29 compound, both as compared to the 400 psi stress experiment hydrocarbon liquid and the 1,000 psi stress experiment hydrocarbon liquid. Looking now at the data points occurring on line 3043, it is apparent that the intermediate level 400 psi stress experiment produced a hydrocarbon liquid having normal-C6 to normal-C26 compound concentrations as compared to the normal-C29 compound between the unstressed experiment represented by line 3042 and the 1,000 psi stressed experiment represented by line 3044. Lastly, it is apparent that the high level 1,000 psi stress experiment produced a hydrocarbon liquid having normal-C6 to normal-C26 compound concentrations as compared to the normal-C29 compound greater than both the unstressed experiment represented by line 3042 and the 400 psi stressed experiment represented by line 3043. This analysis further supports the relationship that pyrolyzing oil shale under increasing levels of lithostatic stress produces hydrocarbon liquids having lower concentrations of normal alkane hydrocarbons.

Figure 15:
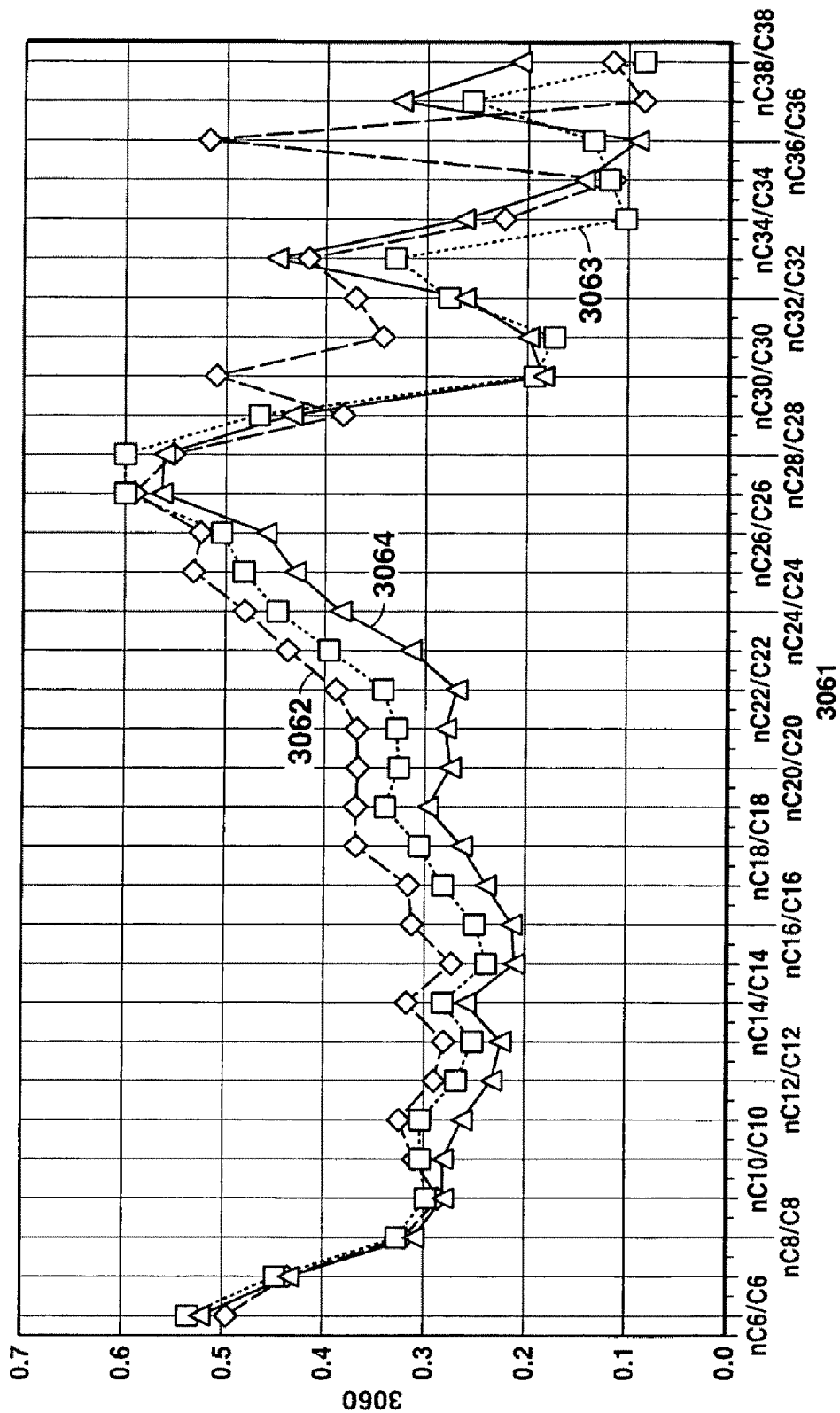
FIG. 15 is a graph of the weight ratio of normal alkane hydrocarbon compounds to pseudo components for each carbon number from C6 to C38 for laboratory experiments conducted at three different stress levels.

FIG. 15 is a graph of the weight ratio of normal alkane hydrocarbon compounds to pseudo components for each carbon number from C6 to C38 for each of the three stress levels tested and analyzed in the laboratory experiments discussed herein. The normal compound and pseudo component weight percentages were obtained as described for FIGS. 7 & 11. For clarity, the normal alkane hydrocarbon and pseudo component weight percentages are taken as a percentage of the entire C3 to pseudo C38 whole oil gas chromatography areas and calculated weights as used in the pseudo compound data presented in FIG. 7. The y-axis 3060 represents the concentration in terms of weight ratio of each normal-C6/pseudo C6 to normal-C38/pseudo C38 compound found in the liquid phase. The x-axis 3061 contains the identity of each normal alkane hydrocarbon compound to pseudo component ratio from normal-C6/pseudo C6 to normal-C38/pseudo C38. The data points occurring on line 3062 represent the weight ratio of each normal-C6/pseudo C6 to normal-C38/pseudo C38 ratio for the unstressed experiment of Example 1. The data points occurring on line 3063 represent the weight ratio of each normal-C6/pseudo C6 to normal-C38/pseudo C38 ratio for the 400 psi stressed experiment of Example 3. While the data points occurring on line 3064 represent the weight ratio of each normal-C6/pseudo C6 to normal-C38/pseudo C38 ratio for the 1,000 psi stressed experiment of Example 4. From FIG. 15 it can be seen that the hydrocarbon liquid produced in the unstressed experiment, represented by data points on line 3062, contains a greater weight percentage of normal alkane hydrocarbon compounds to pseudo components in the C10 to C26 range, both as compared to the 400 psi stress experiment hydrocarbon liquid and the 1,000 psi stress experiment hydrocarbon liquid. Looking now at the data points occurring on line 3063, it is apparent that the intermediate level 400 psi stress experiment produced a hydrocarbon liquid having normal alkane hydrocarbon compound to pseudo component ratios in the C10 to C26 range between the unstressed experiment represented by line 3062 and the 1,000 psi stressed experiment represented by line 3064. Lastly, it is apparent that the high level 1,000 psi stress experiment produced a hydrocarbon liquid having normal alkane hydrocarbon compound to pseudo component ratios in the C10 to C26 range less than both the unstressed experiment represented by line 3062 and the 400 psi stressed experiment represented by line 3063. Thus pyrolyzing oil shale under increasing levels of lithostatic stress appears to produce hydrocarbon liquids having lower concentrations of normal alkane hydrocarbons as compared to the total hydrocarbons for a given carbon number occurring between C10 and C26.

From the above-described data, it can be seen that heating and pyrolysis of oil shale under increasing levels of stress results in a condensable hydrocarbon fluid product that is lighter (i.e., greater proportion of lower carbon number compounds or components relative to higher carbon number compounds or components) and contains a lower concentration of normal alkane hydrocarbon compounds. Such a product may be suitable for refining into gasoline and distillate products. Further, such a product, either before or after further fractionation, may have utility as a feed stock for certain chemical processes.

In some embodiments, the produced hydrocarbon fluid includes a condensable hydrocarbon portion. In some embodiments the condensable hydrocarbon portion may have one or more of a total C7 to total C20 weight ratio greater than 0.8, a total C8 to total C20 weight ratio greater than 1.7, a total C9 to total C20 weight ratio greater than 2.5, a total C10 to total C20 weight ratio greater than 2.8, a total C11 to total C20 weight ratio greater than 2.3, a total C12 to total C20 weight ratio greater than 2.3, a total C13 to total C20 weight ratio greater than 2.9, a total C14 to total C20 weight ratio greater than 2.2, a total C15 to total C20 weight ratio greater than 2.2, and a total C16 to total C20 weight ratio greater than 1.6. In alternative embodiments the condensable hydrocarbon portion has one or more of a total C7 to total C20 weight ratio greater than 2.5, a total C8 to total C20 weight ratio greater than 3.0, a total C9 to total C20 weight ratio greater than 3.5, a total C10 to total C20 weight ratio greater than 3.5, a total C11 to total C20 weight ratio greater than 3.0, and a total C12 to total C20 weight ratio greater than 3.0. In alternative embodiments the condensable hydrocarbon portion has one or more of a total C7 to total C20 weight ratio greater than 3.5, a total C8 to total C20 weight ratio greater than 4.3, a total C9 to total C20 weight ratio greater than 4.5, a total C10 to total C20 weight ratio greater than 4.2, a total C11 to total C20 weight ratio greater than 3.7, and a total C12 to total C20 weight ratio greater than 3.5. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total C7 to total C20 weight ratio greater than 0.8. Alternatively, the condensable hydrocarbon portion may have a total C7 to total C20 weight ratio greater than 1.0, greater than 1.5, greater than 2.0, greater than 2.5, greater than 3.5 or greater than 3.7. In alternative embodiments, the condensable hydrocarbon portion may have a total C7 to total C20 weight ratio less than 10.0, less than 7.0, less than 5.0 or less than 4.0. In some embodiments the condensable hydrocarbon portion has a total C8 to total C20 weight ratio greater than 1.7. Alternatively, the condensable hydrocarbon portion may have a total C8 to total C20 weight ratio greater than 2.0, greater than 2.5, greater than 3.0, greater than 4.0, greater than 4.4, or greater than 4.6. In alternative embodiments, the condensable hydrocarbon portion may have a total C8 to total C20 weight ratio less than 7.0 or less than 6.0. In some embodiments the condensable hydrocarbon portion has a total C9 to total C20 weight ratio greater than 2.5. Alternatively, the condensable hydrocarbon portion may have a total C9 to total C20 weight ratio greater than 3.0, greater than 4.0, greater than 4.5, or greater than 4.7. In alternative embodiments, the condensable hydrocarbon portion may have a total C9 to total C20 weight ratio less than 7.0 or less than 6.0. In some embodiments the condensable hydrocarbon portion has a total C10 to total C20 weight ratio greater than 2.8. Alternatively, the condensable hydrocarbon portion may have a total C10 to total C20 weight ratio greater than 3.0, greater than 3.5, greater than 4.0, or greater than 4.3. In alternative embodiments, the condensable hydrocarbon portion may have a total C10 to total C20 weight ratio less than 7.0 or less than 6.0. In some embodiments the condensable hydrocarbon portion has a total C11 to total C20 weight ratio greater than 2.3. Alternatively, the condensable hydrocarbon portion may have a total C11 to total C20 weight ratio greater than 2.5, greater than 3.5, greater than 3.7, greater than 4.0. In alternative embodiments, the condensable hydrocarbon portion may have a total C11 to total C20 weight ratio less than 7.0 or less than 6.0. In some embodiments the condensable hydrocarbon portion has a total C12 to total C20 weight ratio greater than 2.3. Alternatively, the condensable hydrocarbon portion may have a total C12 to total C20 weight ratio greater than 2.5, greater than 3.0, greater than 3.5, or greater than 3.7. In alternative embodiments, the condensable hydrocarbon portion may have a total C12 to total C20 weight ratio less than 7.0 or less than 6.0. In some embodiments the condensable hydrocarbon portion has a total C13 to total C20 weight ratio greater than 2.9. Alternatively, the condensable hydrocarbon portion may have a total C13 to total C20 weight ratio greater than 3.0, greater than 3.1, or greater than 3.2. In alternative embodiments, the condensable hydrocarbon portion may have a total C13 to total C20 weight ratio less than 6.0 or less than 5.0. In some embodiments the condensable hydrocarbon portion has a total C14 to total C20 weight ratio greater than 2.2. Alternatively, the condensable hydrocarbon portion may have a total C14 to total C20 weight ratio greater than 2.5, greater than 2.6, or greater than 2.7. In alternative embodiments, the condensable hydrocarbon portion may have a total C14 to total C20 weight ratio less than 6.0 or less than 4.0. In some embodiments the condensable hydrocarbon portion has a total C15 to total C20 weight ratio greater than 2.2. Alternatively, the condensable hydrocarbon portion may have a total C15 to total C20 weight ratio greater than 2.3, greater than 2.4, or greater than 2.6. In alternative embodiments, the condensable hydrocarbon portion may have a total C15 to total C20 weight ratio less than 6.0 or less than 4.0. In some embodiments the condensable hydrocarbon portion has a total C16 to total C20 weight ratio greater than 1.6. Alternatively, the condensable hydrocarbon portion may have a total C16 to total C20 weight ratio greater than 1.8, greater than 2.3, or greater than 2.5. In alternative embodiments, the condensable hydrocarbon portion may have a total C16 to total C20 weight ratio less than 5.0 or less than 4.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have the one or more of a total C7 to total C25 weight ratio greater than 2.0, a total C8 to total C25 weight ratio greater than 4.5, a total C9 to total C25 weight ratio greater than 6.5, a total C10 to total C25 weight ratio greater than 7.5, a total C11 to total C25 weight ratio greater than 6.5, a total C12 to total C25 weight ratio greater than 6.5, a total C13 to total C25 weight ratio greater than 8.0, a total C14 to total C25 weight ratio greater than 6.0, a total C15 to total C25 weight ratio greater than 6.0, a total C16 to total C25 weight ratio greater than 4.5, a total C17 to total C25 weight ratio greater than 4.8, and a total C18 to total C25 weight ratio greater than 4.5. In alternative embodiments the condensable hydrocarbon portion has one or more of a total C7 to total C25 weight ratio greater than 7.0, a total C8 to total C25 weight ratio greater than 10.0, a total C9 to total C25 weight ratio greater than 10.0, a total C10 to total C25 weight ratio greater than 10.0, a total C11 to total C25 weight ratio greater than 8.0, and a total C12 to total C25 weight ratio greater than 8.0. In alternative embodiments the condensable hydrocarbon portion has one or more of a total C7 to total C25 weight ratio greater than 13.0, a total C8 to total C25 weight ratio greater than 17.0, a total C9 to total C25 weight ratio greater than 17.0, a total C10 to total C25 weight ratio greater than 15.0, a total C11 to total C25 weight ratio greater than 14.0, and a total C12 to total C25 weight ratio greater than 13.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total C7 to total C25 weight ratio greater than 2.0. Alternatively, the condensable hydrocarbon portion may have a total C7 to total C25 weight ratio greater than 3.0, greater than 5.0, greater than 10.0, greater than 13.0, or greater than 15.0. In alternative embodiments, the condensable hydrocarbon portion may have a total C7 to total C25 weight ratio less than 30.0 or less than 25.0. In some embodiments the condensable hydrocarbon portion has a total C8 to total C25 weight ratio greater than 4.5. Alternatively, the condensable hydrocarbon portion may have a total C8 to total C25 weight ratio greater than 5.0, greater than 7.0, greater than 10.0, greater than 15.0, or greater than 17.0. In alternative embodiments, the condensable hydrocarbon portion may have a total C8 to total C25 weight ratio less than 35.0, or less than 30.0. In some embodiments the condensable hydrocarbon portion has a total C9 to total C25 weight ratio greater than 6.5. Alternatively, the condensable hydrocarbon portion may have a total C9 to total C25 weight ratio greater than 8.0, greater than 10.0, greater than 15.0, greater than 17.0, or greater than 19.0. In alternative embodiments, the condensable hydrocarbon portion may have a total C9 to total C25 weight ratio less than 40.0 or less than 35.0. In some embodiments the condensable hydrocarbon portion has a total C10 to total C25 weight ratio greater than 7.5. Alternatively, the condensable hydrocarbon portion may have a total C10 to total C25 weight ratio greater than 10.0, greater than 14.0, or greater than 17.0. In alternative embodiments, the condensable hydrocarbon portion may have a total C10 to total C25 weight ratio less than 35.0 or less than 30.0. In some embodiments the condensable hydrocarbon portion has a total C11 to total C25 weight ratio greater than 6.5. Alternatively, the condensable hydrocarbon portion may have a total C11 to total C25 weight ratio greater than 8.5, greater than 10.0, greater than 12.0, or greater than 14.0. In alternative embodiments, the condensable hydrocarbon portion may have a total C11 to total C25 weight ratio less than 35.0 or less than 30.0. In some embodiments the condensable hydrocarbon portion has a total C12 to total C25 weight ratio greater than 6.5. Alternatively, the condensable hydrocarbon portion may have a total C12 to total C25 weight ratio greater than 8.5, a total C12 to total C25 weight ratio greater than 10.0, greater than 12.0, or greater than 14.0. In alternative embodiments, the condensable hydrocarbon portion may have a total C12 to total C25 weight ratio less than 30.0 or less than 25.0. In some embodiments the condensable hydrocarbon portion has a total C13 to total C25 weight ratio greater than 8.0. Alternatively, the condensable hydrocarbon portion may have a total C13 to total C25 weight ratio greater than 10.0, greater than 12.0, or greater than 14.0. In alternative embodiments, the condensable hydrocarbon portion may have a total C13 to total C25 weight ratio less than 25.0 or less than 20.0. In some embodiments the condensable hydrocarbon portion has a total C14 to total C25 weight ratio greater than 6.0. Alternatively, the condensable hydrocarbon portion may have a total C14 to total C25 weight ratio greater than 8.0, greater than 10.0, or greater than 12.0. In alternative embodiments, the condensable hydrocarbon portion may have a total C14 to total C25 weight ratio less than 25.0 or less than 20.0. In some embodiments the condensable hydrocarbon portion has a total C15 to total C25 weight ratio greater than 6.0. Alternatively, the condensable hydrocarbon portion may have a total C15 to total C25 weight ratio greater than 8.0, or greater than 10.0. In alternative embodiments, the condensable hydrocarbon portion may have a total C15 to total C25 weight ratio less than 25.0 or less than 20.0. In some embodiments the condensable hydrocarbon portion has a total C16 to total C25 weight ratio greater than 4.5. Alternatively, the condensable hydrocarbon portion may have a total C16 to total C25 weight ratio greater than 6.0, greater than 8.0, or greater than 10.0. In alternative embodiments, the condensable hydrocarbon portion may have a total C16 to total C25 weight ratio less than 20.0 or less than 15.0. In some embodiments the condensable hydrocarbon portion has a total C17 to total C25 weight ratio greater than 4.8. Alternatively, the condensable hydrocarbon portion may have a total C17 to total C25 weight ratio greater than 5.5 or greater than 7.0. In alternative embodiments, the condensable hydrocarbon portion may have a total C17 to total C25 weight ratio less than 20.0. In some embodiments the condensable hydrocarbon portion has a total C18 to total C25 weight ratio greater than 4.5. Alternatively, the condensable hydrocarbon portion may have a total C18 to total C25 weight ratio greater than 5.0 or greater than 5.5. In alternative embodiments, the condensable hydrocarbon portion may have a total C18 to total C25 weight ratio less than 15.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have the one or more of a total C7 to total C29 weight ratio greater than 3.5, a total C8 to total C29 weight ratio greater than 9.0, a total C9 to total C29 weight ratio greater than 12.0, a total C10 to total C29 weight ratio greater than 15.0, a total C11 to total C29 weight ratio greater than 13.0, a total C12 to total C29 weight ratio greater than 12.5, and a total C13 to total C29 weight ratio greater than 16.0, a total C14 to total C29 weight ratio greater than 12.0, a total C15 to total C29 weight ratio greater than 12.0, a total C16 to total C29 weight ratio greater than 9.0, a total C17 to total C29 weight ratio greater than 10.0, a total C18 to total C29 weight ratio greater than 8.8, a total C19 to total C29 weight ratio greater than 7.0, a total C20 to total C29 weight ratio greater than 6.0, a total C21 to total C29 weight ratio greater than 5.5, and a total C22 to total C29 weight ratio greater than 4.2. In alternative embodiments the condensable hydrocarbon portion has one or more of a total C7 to total C29 weight ratio greater than 16.0, a total C8 to total C29 weight ratio greater than 19.0, a total C9 to total C29 weight ratio greater than 20.0, a total C10 to total C29 weight ratio greater than 18.0, a total C11 to total C29 weight ratio greater than 16.0, a total C12 to total C29 weight ratio greater than 15.0, and a total C13 to total C29 weight ratio greater than 17.0, a total C14 to total C29 weight ratio greater than 13.0, a total C15 to total C29 weight ratio greater than 13.0, a total C16 to total C29 weight ratio greater than 10.0, a total C17 to total C29 weight ratio greater than 11.0, a total C18 to total C29 weight ratio greater than 9.0, a total C19 to total C29 weight ratio greater than 8.0, a total C20 to total C29 weight ratio greater than 6.5, and a total C21 to total C29 weight ratio greater than 6.0. In alternative embodiments the condensable hydrocarbon portion has one or more of a total C7 to total C29 weight ratio greater than 24.0, a total C8 to total C29 weight ratio greater than 30.0, a total C9 to total C29 weight ratio greater than 32.0, a total C10 to total C29 weight ratio greater than 30.0, a total C11 to total C29 weight ratio greater than 27.0, a total C12 to total C29 weight ratio greater than 25.0, and a total C13 to total C29 weight ratio greater than 22.0, a total C14 to total C29 weight ratio greater than 18.0, a total C15 to total C29 weight ratio greater than 18.0, a total C16 to total C29 weight ratio greater than 16.0, a total C17 to total C29 weight ratio greater than 13.0, a total C18 to total C29 weight ratio greater than 10.0, a total C19 to total C29 weight ratio greater than 9.0, and a total C20 to total C29 weight ratio greater than 7.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total C7 to total C29 weight ratio greater than 3.5. Alternatively, the condensable hydrocarbon portion may have a total C7 to total C29 weight ratio greater than 5.0, greater than 10.0, greater than 18.0, greater than 20.0, or greater than 24.0. In alternative embodiments, the condensable hydrocarbon portion may have a total C7 to total C29 weight ratio less than 60.0 or less than 50.0. In some embodiments the condensable hydrocarbon portion has a total C8 to total C29 weight ratio greater than 9.0. Alternatively, the condensable hydrocarbon portion may have a total C8 to total C29 weight ratio greater than 10.0, greater than 18.0, greater than 20.0, greater than 25.0, or greater than 30.0. In alternative embodiments, the condensable hydrocarbon portion may have a total C8 to total C29 weight ratio less than 85.0 or less than 75.0. In some embodiments the condensable hydrocarbon portion has a total C9 to total C29 weight ratio greater than 12.0. Alternatively, the condensable hydrocarbon portion may have a total C9 to total C29 weight ratio greater than 15.0, greater than 20.0, greater than 23.0, greater than 27.0, or greater than 32.0. In alternative embodiments, the condensable hydrocarbon portion may have a total C9 to total C29 weight ratio less than 85.0 or less than 75.0. In some embodiments the condensable hydrocarbon portion has a total C10 to total C29 weight ratio greater than 15.0. Alternatively, the condensable hydrocarbon portion may have a total C10 to total C29 weight ratio greater than 18.0, greater than 22.0, or greater than 28.0. In alternative embodiments, the condensable hydrocarbon portion may have a total C10 to total C29 weight ratio less than 80.0 or less than 70.0. In some embodiments the condensable hydrocarbon portion has a total C11 to total C29 weight ratio greater than 13.0. Alternatively, the condensable hydrocarbon portion may have a total C11 to total C29 weight ratio greater than 16.0, greater than 18.0, greater than 24.0, or greater than 27.0. In alternative embodiments, the condensable hydrocarbon portion may have a total C11 to total C29 weight ratio less than 75.0 or less than 65.0. In some embodiments the condensable hydrocarbon portion has a total C12 to total C29 weight ratio greater than 12.5. Alternatively, the condensable hydrocarbon portion may have a total C12 to total C29 weight ratio greater than 14.5, greater than 18.0, greater than 22.0, or greater than 25.0. In alternative embodiments, the condensable hydrocarbon portion may have a total C12 to total C29 weight ratio less than 75.0 or less than 65.0. In some embodiments the condensable hydrocarbon portion has a total C13 to total C29 weight ratio greater than 16.0. Alternatively, the condensable hydrocarbon portion may have a total C13 to total C29 weight ratio greater than 18.0, greater than 20.0, or greater than 22.0. In alternative embodiments, the condensable hydrocarbon portion may have a total C13 to total C29 weight ratio less than 70.0 or less than 60.0. In some embodiments the condensable hydrocarbon portion has a total C14 to total C29 weight ratio greater than 12.0. Alternatively, the condensable hydrocarbon portion may have a total C14 to total C29 weight ratio greater than 14.0, greater than 16.0, or greater than 18.0. In alternative embodiments, the condensable hydrocarbon portion may have a total C14 to total C29 weight ratio less than 60.0 or less than 50.0. In some embodiments the condensable hydrocarbon portion has a total C15 to total C29 weight ratio greater than 12.0. Alternatively, the condensable hydrocarbon portion may have a total C15 to total C29 weight ratio greater than 15.0 or greater than 18.0. In alternative embodiments, the condensable hydrocarbon portion may have a total C15 to total C29 weight ratio less than 60.0 or less than 50.0. In some embodiments the condensable hydrocarbon portion has a total C16 to total C29 weight ratio greater than 9.0. Alternatively, the condensable hydrocarbon portion may have a total C16 to total C29 weight ratio greater than 10.0, greater than 13.0, or greater than 16.0. In alternative embodiments, the condensable hydrocarbon portion may have a total C16 to total C29 weight ratio less than 55.0 or less than 45.0. In some embodiments the condensable hydrocarbon portion has a total C17 to total C29 weight ratio greater than 10.0. Alternatively, the condensable hydrocarbon portion may have a total C17 to total C29 weight ratio greater than 11.0 or greater than 12.0. In alternative embodiments, the condensable hydrocarbon portion may have a total C17 to total C29 weight ratio less than 45.0. In some embodiments the condensable hydrocarbon portion has a total C18 to total C29 weight ratio greater than 8.8. Alternatively, the condensable hydrocarbon portion may have a total C18 to total C29 weight ratio greater than 9.0 or greater than 10.0. In alternative embodiments, the condensable hydrocarbon portion may have a total C18 to total C29 weight ratio less than 35.0. In some embodiments the condensable hydrocarbon portion has a total C19 to total C29 weight ratio greater than 7.0. Alternatively, the condensable hydrocarbon portion may have a total C19 to total C29 weight ratio greater than 8.0 or greater than 9.0. In alternative embodiments, the condensable hydrocarbon portion may have a total C19 to total C29 weight ratio less than 30.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have the one or more of a total C9 to total C20 weight ratio between 2.5 and 6.0, a total C10 to total C20 weight ratio between 2.8 and 7.3, a total C11 to total C20 weight ratio between 2.6 and 6.5, a total C12 to total C20 weight ratio between 2.6 and 6.4 and a total C13 to total C20 weight ratio between 3.2 and 8.0. In alternative embodiments the condensable hydrocarbon portion has one or more of a total C9 to total C20 weight ratio between 3.0 and 5.5, a total C10 to total C20 weight ratio between 3.2 and 7.0, a total C11 to total C20 weight ratio between 3.0 and 6.0, a total C12 to total C20 weight ratio between 3.0 and 6.0, and a total C13 to total C20 weight ratio between 3.3 and 7.0. In alternative embodiments the condensable hydrocarbon portion has one or more of a total C9 to total C20 weight ratio between 4.6 and 5.5, a total C10 to total C20 weight ratio between 4.2 and 7.0, a total C11 to total C20 weight ratio between 3.7 and 6.0, a total C12 to total C20 weight ratio between 3.6 and 6.0, and a total C13 to total C20 weight ratio between 3.4 and 7.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total C9 to total C20 weight ratio between 2.5 and 6.0. Alternatively, the condensable hydrocarbon portion may have a total C9 to total C20 weight ratio between 3.0 and 5.8, between 3.5 and 5.8, between 4.0 and 5.8, between 4.5 and 5.8, between 4.6 and 5.8, or between 4.7 and 5.8. In some embodiments the condensable hydrocarbon portion has a total C10 to total C20 weight ratio between 2.8 and 7.3. Alternatively, the condensable hydrocarbon portion may have a total C10 to total C20 weight ratio between 3.0 and 7.2, between 3.5 and 7.0, between 4.0 and 7.0, between 4.2 and 7.0, between 4.3 and 7.0, or between 4.4 and 7.0. In some embodiments the condensable hydrocarbon portion has a total C11 to total C20 weight ratio between 2.6 and 6.5. Alternatively, the condensable hydrocarbon portion may have a total C11 to total C20 weight ratio between 2.8 and 6.3, between 3.5 and 6.3, between 3.7 and 6.3, between 3.8 and 6.3, between 3.9 and 6.2, or between 4.0 and 6.2. In some embodiments the condensable hydrocarbon portion has a total C12 to total C20 weight ratio between 2.6 and 6.4. Alternatively, the condensable hydrocarbon portion may have a total C12 to total C20 weight ratio between 2.8 and 6.2, between 3.2 and 6.2, between 3.5 and 6.2, between 3.6 and 6.2, between 3.7 and 6.0, or between 3.8 and 6.0. In some embodiments the condensable hydrocarbon portion has a total C13 to total C20 weight ratio between 3.2 and 8.0. Alternatively, the condensable hydrocarbon portion may have a total C13 to total C20 weight ratio between 3.3 and 7.8, between 3.3 and 7.0, between 3.4 and 7.0, between 3.5 and 6.5, or between 3.6 and 6.0. The embodiments described in this paragraph may be combined with any of the other aspects of the invention discussed herein.

In some embodiments the condensable hydrocarbon portion may have one or more of a total C10 to total C25 weight ratio between 7.1 and 24.5, a total C11 to total C25 weight ratio between 6.5 and 22.0, a total C12 to total C25 weight ratio between 6.5 and 22.0, and a total C13 to total C25 weight ratio between 8.0 and 27.0. In alternative embodiments the condensable hydrocarbon portion has one or more of a total C10 to total C25 weight ratio between 10.0 and 24.0, a total C11 to total C25 weight ratio between 10.0 and 21.5, a total C12 to total C25 weight ratio between 10.0 and 21.5, and a total C13 to total C25 weight ratio between 9.0 and 25.0. In alternative embodiments the condensable hydrocarbon portion has one or more of a total C10 to total C25 weight ratio between 14.0 and 24.0, a total C11 to total C25 weight ratio between 12.5 and 21.5, a total C12 to total C25 weight ratio between 12.0 and 21.5, and a total C13 to total C25 weight ratio between 10.5 and 25.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total C10 to total C25 weight ratio between 7.1 and 24.5. Alternatively, the condensable hydrocarbon portion may have a total C10 to total C25 weight ratio between 7.5 and 24.5, between 12.0 and 24.5, between 13.8 and 24.5, between 14.0 and 24.5, or between 15.0 and 24.5. In some embodiments the condensable hydrocarbon portion has a total C11 to total C25 weight ratio between 6.5 and 22.0. Alternatively, the condensable hydrocarbon portion may have a total C11 to total C25 weight ratio between 7.0 and 21.5, between 10.0 and 21.5, between 12.5 and 21.5, between 13.0 and 21.5, between 13.7 and 21.5, or between 14.5 and 21.5. In some embodiments the condensable hydrocarbon portion has a total C12 to total C25 weight ratio between 10.0 and 21.5. Alternatively, the condensable hydrocarbon portion may have a total C12 to total C25 weight ratio between 10.5 and 21.0, between 11.0 and 21.0, between 12.0 and 21.0, between 12.5 and 21.0, between 13.0 and 21.0, or between 13.5 and 21.0. In some embodiments the condensable hydrocarbon portion has a total C13 to total C25 weight ratio between 8.0 and 27.0. Alternatively, the condensable hydrocarbon portion may have a total C13 to total C25 weight ratio between 9.0 and 26.0, between 10.0 and 25.0, between 10.5 and 25.0, between 11.0 and 25.0, or between 11.5 and 25.0. The embodiments described in this paragraph may be combined with any of the other aspects of the invention discussed herein.

In some embodiments the condensable hydrocarbon portion may have one or more of a total C10 to total C29 weight ratio between 15.0 and 60.0, a total C11 to total C29 weight ratio between 13.0 and 54.0, a total C12 to total C29 weight ratio between 12.5 and 53.0, and a total C13 to total C29 weight ratio between 16.0 and 65.0. In alternative embodiments the condensable hydrocarbon portion has one or more of a total C10 to total C29 weight ratio between 17.0 and 58.0, a total C11 to total C29 weight ratio between 15.0 and 52.0, a total C12 to total C29 weight ratio between 14.0 and 50.0, and a total C13 to total C29 weight ratio between 17.0 and 60.0. In alternative embodiments the condensable hydrocarbon portion has one or more of a total C10 to total C29 weight ratio between 20.0 and 58.0, a total C11 to total C29 weight ratio between 18.0 and 52.0, a total C12 to total C29 weight ratio between 18.0 and 50.0, and a total C13 to total C29 weight ratio between 18.0 and 50.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a total C10 to total C29 weight ratio between 15.0 and 60.0. Alternatively, the condensable hydrocarbon portion may have a total C10 to total C29 weight ratio between 18.0 and 58.0, between 20.0 and 58.0, between 24.0 and 58.0, between 27.0 and 58.0, or between 30.0 and 58.0. In some embodiments the condensable hydrocarbon portion has a total C11 to total C29 weight ratio between 13.0 and 54.0. Alternatively, the condensable hydrocarbon portion may have a total C11 to total C29 weight ratio between 15.0 and 53.0, between 18.0 and 53.0, between 20.0 and 53.0, between 22.0 and 53.0, between 25.0 and 53.0, or between 27.0 and 53.0. In some embodiments the condensable hydrocarbon portion has a total C12 to total C29 weight ratio between 12.5 and 53.0. Alternatively, the condensable hydrocarbon portion may have a total C12 to total C29 weight ratio between 14.5 and 51.0, between 16.0 and 51.0, between 18.0 and 51.0, between 20.0 and 51.0, between 23.0 and 51.0, or between 25.0 and 51.0. In some embodiments the condensable hydrocarbon portion has a total C13 to total C29 weight ratio between 16.0 and 65.0. Alternatively, the condensable hydrocarbon portion may have a total C13 to total C29 weight ratio between 17.0 and 60.0, between 18.0 and 60.0, between 20.0 and 60.0, between 22.0 and 60.0, or between 25.0 and 60.0. The embodiments described in this paragraph may be combined with any of the other aspects of the invention discussed herein.

In some embodiments the condensable hydrocarbon portion may have one or more of a normal-C7 to normal-C20 weight ratio greater than 0.9, a normal-C8 to normal-C20 weight ratio greater than 2.0, a normal-C9 to normal-C20 weight ratio greater than 1.9, a normal-C10 to normal-C20 weight ratio greater than 2.2, a normal-C11 to normal-C20 weight ratio greater than 1.9, a normal-C12 to normal-C20 weight ratio greater than 1.9, a normal-C13 to normal-C20 weight ratio greater than 2.3, a normal-C14 to normal-C20 weight ratio greater than 1.8, a normal-C15 to normal-C20 weight ratio greater than 1.8, and normal-C16 to normal-C20 weight ratio greater than 1.3. In alternative embodiments the condensable hydrocarbon portion has one or more of a normal-C7 to normal-C20 weight ratio greater than 4.4, a normal-C8 to normal-C20 weight ratio greater than 3.7, a normal-C9 to normal-C20 weight ratio greater than 3.5, a normal-C10 to normal-C20 weight ratio greater than 3.4, a normal-C11 to normal-C20 weight ratio greater than 3.0, and a normal-C12 to normal-C20 weight ratio greater than 2.7. In alternative embodiments the condensable hydrocarbon portion has one or more of a normal-C7 to normal-C20 weight ratio greater than 4.9, a normal-C8 to normal-C20 weight ratio greater than 4.5, a normal-C9 to normal-C20 weight ratio greater than 4.4, a normal-C10 to normal-C20 weight ratio greater than 4.1, a normal-C11 to normal-C20 weight ratio greater than 3.7, and a normal-C12 to normal-C20 weight ratio greater than 3.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a normal-C7 to normal-C20 weight ratio greater than 0.9. Alternatively, the condensable hydrocarbon portion may have a normal-C7 to normal-C20 weight ratio greater than 1.0, than 2.0, greater than 3.0, greater than 4.0, greater than 4.5, or greater than 5.0. In alternative embodiments, the condensable hydrocarbon portion may have a normal-C7 to normal-C20 weight ratio less than 8.0 or less than 7.0. In some embodiments the condensable hydrocarbon portion has a normal-C8 to normal-C20 weight ratio greater than 1.7. Alternatively, the condensable hydrocarbon portion may have a normal-C8 to normal-C20 weight ratio greater than 2.0, greater than 2.5, greater than 3.0, greater than 3.5, greater than 4.0, or greater than 4.4. In alternative embodiments, the condensable hydrocarbon portion may have a normal-C8 to normal-C20 weight ratio less than 8.0 or less than 7.0. In some embodiments the condensable hydrocarbon portion has a normal-C9 to normal-C20 weight ratio greater than 1.9. Alternatively, the condensable hydrocarbon portion may have a normal-C9 to normal-C20 weight ratio greater than 2.0, greater than 3.0, greater than 4.0, or greater than 4.5. In alternative embodiments, the condensable hydrocarbon portion may have a normal-C9 to normal-C20 weight ratio less than 7.0 or less than 6.0. In some embodiments the condensable hydrocarbon portion has a normal-C10 to normal-C20 weight ratio greater than 2.2. Alternatively, the condensable hydrocarbon portion may have a normal-C10 to normal-C20 weight ratio greater than 2.8, greater than 3.3, greater than 3.5, or greater than 4.0. In alternative embodiments, the condensable hydrocarbon portion may have a normal-C10 to normal-C20 weight ratio less than 7.0 or less than 6.0. In some embodiments the condensable hydrocarbon portion has a normal-C11 to normal-C20 weight ratio greater than 1.9. Alternatively, the condensable hydrocarbon portion may have a normal-C11 to normal-C20 weight ratio greater than 2.5, greater than 3.0, greater than 3.5, or greater than 3.7. In alternative embodiments, the condensable hydrocarbon portion may have a normal-C11 to normal-C20 weight ratio less than 7.0 or less than 6.0. In some embodiments the condensable hydrocarbon portion has a normal-C12 to normal-C20 weight ratio greater than 1.9. Alternatively, the condensable hydrocarbon portion may have a normal-C12 to normal-C20 weight ratio greater than 2.0, greater than 2.2, greater than 2.6, or greater than 3.0. In alternative embodiments, the condensable hydrocarbon portion may have a normal-C12 to normal-C20 weight ratio less than 7.0 or less than 6.0. In some embodiments the condensable hydrocarbon portion has a normal-C13 to normal-C20 weight ratio greater than 2.3. Alternatively, the condensable hydrocarbon portion may have a normal-C13 to normal-C20 weight ratio greater than 2.5, greater than 2.7, or greater than 3.0. In alternative embodiments, the condensable hydrocarbon portion may have a normal-C13 to normal-C20 weight ratio less than 6.0 or less than 5.0. In some embodiments the condensable hydrocarbon portion has a normal-C14 to normal-C20 weight ratio greater than 1.8. Alternatively, the condensable hydrocarbon portion may have a normal-C14 to normal-C20 weight ratio greater than 2.0, greater than 2.2, or greater than 2.5. In alternative embodiments, the condensable hydrocarbon portion may have a normal-C14 to normal-C20 weight ratio less than 6.0 or less than 4.0. In some embodiments the condensable hydrocarbon portion has a normal-C15 to normal-C20 weight ratio greater than 1.8. Alternatively, the condensable hydrocarbon portion may have a normal-C15 to normal-C20 weight ratio greater than 2.0, greater than 2.2, or greater than 2.4. In alternative embodiments, the condensable hydrocarbon portion may have a normal-C15 to normal-C20 weight ratio less than 6.0 or less than 4.0. In some embodiments the condensable hydrocarbon portion has a normal-C16 to normal-C20 weight ratio greater than 1.3. Alternatively, the condensable hydrocarbon portion may have a normal-C16 to normal-C20 weight ratio greater than 1.5, greater than 1.7, or greater than 2.0. In alternative embodiments, the condensable hydrocarbon portion may have a normal-C16 to normal-C20 weight ratio less than 5.0 or less than 4.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have one or more of a normal-C7 to normal-C25 weight ratio greater than 1.9, a normal-C8 to normal-C25 weight ratio greater than 3.9, a normal-C9 to normal-C25 weight ratio greater than 3.7, a normal-C10 to normal-C25 weight ratio greater than 4.4, a normal-C11 to normal-C25 weight ratio greater than 3.8, a normal-C12 to normal-C25 weight ratio greater than 3.7, a normal-C13 to normal-C25 weight ratio greater than 4.7, a normal-C14 to normal-C25 weight ratio greater than 3.7, a normal-C15 to normal-C25 weight ratio greater than 3.7, a normal-C16 to normal-C25 weight ratio greater than 2.5, a normal-C17 to normal-C25 weight ratio greater than 3.0, and a normal-C18 to normal-C25 weight ratio greater than 3.4. In alternative embodiments the condensable hydrocarbon portion has one or more of a normal-C7 to normal-C25 weight ratio greater than 10, a normal-C8 to normal-C25 weight ratio greater than 8.0, a normal-C9 to normal-C25 weight ratio greater than 7.0, a normal-C10 to normal-C25 weight ratio greater than 7.0, a normal-C11 to normal-C25 weight ratio greater than 7.0, and a normal-C12 to normal-C25 weight ratio greater than 6.0. In alternative embodiments the condensable hydrocarbon portion has one or more of a normal-C7 to normal-C25 weight ratio greater than 10.0, a normal-C8 to normal-C25 weight ratio greater than 12.0, a normal-C9 to normal-C25 weight ratio greater than 11.0, a normal-C10 to normal-C25 weight ratio greater than 11.0, a normal-C11 to normal-C25 weight ratio greater than 9.0, and a normal-C12 to normal-C25 weight ratio greater than 8.0. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a normal-C7 to normal-C25 weight ratio greater than 1.9. Alternatively, the condensable hydrocarbon portion may have a normal-C7 to normal-C25 weight ratio greater than 3.0, greater than 5.0, greater than 8.0, greater than 10.0, or greater than 13.0. In alternative embodiments, the condensable hydrocarbon portion may have a normal-C7 to normal-C25 weight ratio less than 35.0 or less than 25.0. In some embodiments the condensable hydrocarbon portion has a normal-C8 to normal-C25 weight ratio greater than 3.9. Alternatively, the condensable hydrocarbon portion may have a normal-C8 to normal-C25 weight ratio greater than 4.5, greater than 6.0, greater than 8.0, greater than 10.0, or greater than 13.0. In alternative embodiments, the condensable hydrocarbon portion may have a normal-C8 to normal-C25 weight ratio less than 35.0 or less than 25.0. In some embodiments the condensable hydrocarbon portion has a normal-C9 to normal-C25 weight ratio greater than 3.7. Alternatively, the condensable hydrocarbon portion may have a normal-C9 to normal-C25 weight ratio greater than 4.5, greater than 7.0, greater than 10.0, greater than 12.0, or greater than 13.0. In alternative embodiments, the condensable hydrocarbon portion may have a normal-C9 to normal-C25 weight ratio less than 35.0 or less than 25.0. In some embodiments the condensable hydrocarbon portion has a normal-C10 to normal-C25 weight ratio greater than 4.4. Alternatively, the condensable hydrocarbon portion may have a normal-C10 to normal-C25 weight ratio greater than 6.0, greater than 8.0, or greater than 11.0. In alternative embodiments, the condensable hydrocarbon portion may have a normal-C10 to normal-C25 weight ratio less than 35.0 or less than 25.0. In some embodiments the condensable hydrocarbon portion has a normal-C11 to normal-C25 weight ratio greater than 3.8. Alternatively, the condensable hydrocarbon portion may have a normal-C11 to normal-C25 weight ratio greater than 4.5, greater than 7.0, greater than 8.0, or greater than 10.0. In alternative embodiments, the condensable hydrocarbon portion may have a normal-C11 to normal-C25 weight ratio less than 35.0 or less than 25.0. In some embodiments the condensable hydrocarbon portion has a normal-C12 to normal-C25 weight ratio greater than 3.7. Alternatively, the condensable hydrocarbon portion may have a normal-C12 to normal-C25 weight ratio greater than 4.5, greater than 6.0, greater than 7.0, or greater than 8.0. In alternative embodiments, the condensable hydrocarbon portion may have a normal-C12 to normal-C25 weight ratio less than 30.0 or less than 20.0. In some embodiments the condensable hydrocarbon portion has a normal-C13 to normal-C25 weight ratio greater than 4.7. Alternatively, the condensable hydrocarbon portion may have a normal-C13 to normal-C25 weight ratio greater than 5.0, greater than 6.0, or greater than 7.5. In alternative embodiments, the condensable hydrocarbon portion may have a normal-C13 to normal-C25 weight ratio less than 25.0 or less than 20.0. In some embodiments the condensable hydrocarbon portion has a normal-C14 to normal-C25 weight ratio greater than 3.7. Alternatively, the condensable hydrocarbon portion may have a normal-C14 to normal-C25 weight ratio greater than 4.5, greater than 5.5, or greater than 7.0. In alternative embodiments, the condensable hydrocarbon portion may have a normal-C14 to normal-C25 weight ratio less than 25.0 or less than 20.0. In some embodiments the condensable hydrocarbon portion has a normal-C15 to normal-C25 weight ratio greater than 3.7. Alternatively, the condensable hydrocarbon portion may have a normal-C15 to normal-C25 weight ratio greater than 4.2 or greater than 5.0. In alternative embodiments, the condensable hydrocarbon portion may have a normal-C15 to normal-C25 weight ratio less than 25.0 or less than 20.0. In some embodiments the condensable hydrocarbon portion has a normal-C16 to normal-C25 weight ratio greater than 2.5. Alternatively, the condensable hydrocarbon portion may have a normal-C16 to normal-C25 weight ratio greater than 3.0, greater than 4.0, or greater than 5.0. In alternative embodiments, the condensable hydrocarbon portion may have a normal-C16 to normal-C25 weight ratio less than 20.0 or less than 15.0. In some embodiments the condensable hydrocarbon portion has a normal-C17 to normal-C25 weight ratio greater than 3.0. Alternatively, the condensable hydrocarbon portion may have a normal-C17 to normal-C25 weight ratio greater than 3.5 or greater than 4.0. In alternative embodiments, the condensable hydrocarbon portion may have a normal-C17 to normal-C25 weight ratio less than 20.0. In some embodiments the condensable hydrocarbon portion has a normal-C18 to normal-C25 weight ratio greater than 3.4. Alternatively, the condensable hydrocarbon portion may have a normal-C18 to normal-C25 weight ratio greater than 3.6 or greater than 4.0. In alternative embodiments, the condensable hydrocarbon portion may have a normal-C18 to normal-C25 weight ratio less than 15.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have one or more of a normal-C7 to normal-C29 weight ratio greater than 18.0, a normal-C8 to normal-C29 weight ratio greater than 16.0, a normal-C9 to normal-C29 weight ratio greater than 14.0, a normal-C10 to normal-C29 weight ratio greater than 14.0, a normal-C11 to normal-C29 weight ratio greater than 13.0, a normal-C12 to normal-C29 weight ratio greater than 11.0, a normal-C13 to normal-C29 weight ratio greater than 10.0, a normal-C14 to normal-C29 weight ratio greater than 9.0, a normal-C15 to normal-C29 weight ratio greater than 8.0, a normal-C16 to normal-C29 weight ratio greater than 8.0, a normal-C17 to normal-C29 weight ratio greater than 6.0, a normal-C18 to normal-C29 weight ratio greater than 6.0, a normal-C19 to normal-C29 weight ratio greater than 5.0, a normal-C20 to normal-C29 weight ratio greater than 4.0, a normal-C21 to normal-C29 weight ratio greater than 3.6, and a normal-C22 to normal-C29 weight ratio greater than 2.8. In alternative embodiments the condensable hydrocarbon portion has one or more of a normal-C7 to normal-C29 weight ratio greater than 20.0, a normal-C8 to normal-C29 weight ratio greater than 18.0, a normal-C9 to normal-C29 weight ratio greater than 17.0, a normal-C10 to normal-C29 weight ratio greater than 16.0, a normal-C11 to normal-C29 weight ratio greater than 15.0, a normal-C12 to normal-C29 weight ratio greater than 12.5, a normal-C13 to normal-C29 weight ratio greater than 11.0, a normal-C14 to normal-C29 weight ratio greater than 10.0, a normal-C15 to normal-C29 weight ratio greater than 8.0, a normal-C16 to normal-C29 weight ratio greater than 8.0, a normal-C17 to normal-C29 weight ratio greater than 7.0, a normal-C18 to normal-C29 weight ratio greater than 6.5, a normal-C19 to normal-C29 weight ratio greater than 5.5, a normal-C20 to normal-C29 weight ratio greater than 4.5, and a normal-C21 to normal-C29 weight ratio greater than 4.0. In alternative embodiments the condensable hydrocarbon portion has one or more of a normal-C7 to normal-C29 weight ratio greater than 23.0, a normal-C8 to normal-C29 weight ratio greater than 21.0, a normal-C9 to normal-C29 weight ratio greater than 20.0, a normal-C10 to normal-C29 weight ratio greater than 19.0, a normal-C11 to normal-C29 weight ratio greater than 17.0, a normal-C12 to normal-C29 weight ratio greater than 14.0, a normal-C13 to normal-C29 weight ratio greater than 12.0, a normal-C14 to normal-C29 weight ratio greater than 11.0, a normal-C15 to normal-C29 weight ratio greater than 9.0, a normal-C16 to normal-C29 weight ratio greater than 9.0, a normal-C17 to normal-C29 weight ratio greater than 7.5, a normal-C18 to normal-C29 weight ratio greater than 7.0, a normal-C19 to normal-C29 weight ratio greater than 6.5, a normal-C20 to normal-C29 weight ratio greater than 4.8, and a normal-C21 to normal-C29 weight ratio greater than 4.5. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a normal-C7 to normal-C29 weight ratio greater than 18.0. Alternatively, the condensable hydrocarbon portion may have a normal-C7 to normal-C29 weight ratio greater than 20.0, greater than 22.0, greater than 25.0, greater than 30.0, or greater than 35.0. In alternative embodiments, the condensable hydrocarbon portion may have a normal-C7 to normal-C29 weight ratio less than 70.0 or less than 60.0. In some embodiments the condensable hydrocarbon portion has a normal-C8 to normal-C29 weight ratio greater than 16.0. Alternatively, the condensable hydrocarbon portion may have a normal-C8 to normal-C29 weight ratio greater than 18.0, greater than 22.0, greater than 25.0, greater than 27.0, or greater than 30.0. In alternative embodiments, the condensable hydrocarbon portion may have a normal-C8 to normal-C29 weight ratio less than 85.0 or less than 75.0. In some embodiments the condensable hydrocarbon portion has a normal-C9 to normal-C29 weight ratio greater than 14.0. Alternatively, the condensable hydrocarbon portion may have a normal-C9 to normal-C29 weight ratio greater than 18.0, greater than 20.0, greater than 23.0, greater than 27.0, or greater than 30.0. In alternative embodiments, the condensable hydrocarbon portion may have a normal-C9 to normal-C29 weight ratio less than 85.0 or less than 75.0. In some embodiments the condensable hydrocarbon portion has a normal-C10 to normal-C29 weight ratio greater than 14.0. Alternatively, the condensable hydrocarbon portion may have a normal-C10 to normal-C29 weight ratio greater than 20.0, greater than 25.0, or greater than 30.0. In alternative embodiments, the condensable hydrocarbon portion may have a normal-C10 to normal-C29 weight ratio less than 80.0 or less than 70.0. In some embodiments the condensable hydrocarbon portion has a normal-C11 to normal-C29 weight ratio greater than 13.0. Alternatively, the condensable hydrocarbon portion may have a normal-C11 to normal-C29 weight ratio greater than 16.0, greater than 18.0, greater than 24.0, or greater than 27.0. In alternative embodiments, the condensable hydrocarbon portion may have a normal-C11 to normal-C29 weight ratio less than 75.0 or less than 65.0. In some embodiments the condensable hydrocarbon portion has a normal-C12 to normal-C29 weight ratio greater than 11.0. Alternatively, the condensable hydrocarbon portion may have a normal-C12 to normal-C29 weight ratio greater than 14.5, greater than 18.0, greater than 22.0, or greater than 25.0. In alternative embodiments, the condensable hydrocarbon portion may have a normal-C12 to normal-C29 weight ratio less than 75.0 or less than 65.0. In some embodiments the condensable hydrocarbon portion has a normal-C13 to normal-C29 weight ratio greater than 10.0. Alternatively, the condensable hydrocarbon portion may have a normal-C13 to normal-C29 weight ratio greater than 18.0, greater than 20.0, or greater than 22.0. In alternative embodiments, the condensable hydrocarbon portion may have a normal-C13 to normal-C29 weight ratio less than 70.0 or less than 60.0. In some embodiments the condensable hydrocarbon portion has a normal-C14 to normal-C29 weight ratio greater than 9.0. Alternatively, the condensable hydrocarbon portion may have a normal-C14 to normal-C29 weight ratio greater than 14.0, greater than 16.0, or greater than 18.0. In alternative embodiments, the condensable hydrocarbon portion may have a normal-C14 to normal-C29 weight ratio less than 60.0 or less than 50.0. In some embodiments the condensable hydrocarbon portion has a normal-C15 to normal-C29 weight ratio greater than 8.0. Alternatively, the condensable hydrocarbon portion may have a normal-C15 to normal-C29 weight ratio greater than 12.0 or greater than 16.0. In alternative embodiments, the condensable hydrocarbon portion may have a normal-C15 to normal-C29 weight ratio less than 60.0 or less than 50.0. In some embodiments the condensable hydrocarbon portion has a normal-C16 to normal-C29 weight ratio greater than 8.0. Alternatively, the condensable hydrocarbon portion may have a normal-C16 to normal-C29 weight ratio greater than 10.0, greater than 13.0, or greater than 15.0. In alternative embodiments, the condensable hydrocarbon portion may have a normal-C16 to normal-C29 weight ratio less than 55.0 or less than 45.0. In some embodiments the condensable hydrocarbon portion has a normal-C17 to normal-C29 weight ratio greater than 6.0. Alternatively, the condensable hydrocarbon portion may have a normal-C17 to normal-C29 weight ratio greater than 8.0 or greater than 12.0. In alternative embodiments, the condensable hydrocarbon portion may have a normal-C17 to normal-C29 weight ratio less than 45.0. In some embodiments the condensable hydrocarbon portion has a normal-C18 to normal-C29 weight ratio greater than 6.0. Alternatively, the condensable hydrocarbon portion may have a normal-C18 to normal-C29 weight ratio greater than 8.0 or greater than 10.0. In alternative embodiments, the condensable hydrocarbon portion may have a normal-C18 to normal-C29 weight ratio less than 35.0. In some embodiments the condensable hydrocarbon portion has a normal-C19 to normal-C29 weight ratio greater than 5.0. Alternatively, the condensable hydrocarbon portion may have a normal-C19 to normal-C29 weight ratio greater than 7.0 or greater than 9.0. In alternative embodiments, the condensable hydrocarbon portion may have a normal-C19 to normal-C29 weight ratio less than 30.0. In some embodiments the condensable hydrocarbon portion has a normal-C20 to normal-C29 weight ratio greater than 4.0. Alternatively, the condensable hydrocarbon portion may have a normal-C20 to normal-C29 weight ratio greater than 6.0 or greater than 8.0. In alternative embodiments, the condensable hydrocarbon portion may have a normal-C20 to normal-C29 weight ratio less than 30.0. In some embodiments the condensable hydrocarbon portion has a normal-C21 to normal-C29 weight ratio greater than 3.6. Alternatively, the condensable hydrocarbon portion may have a normal-C21 to normal-C29 weight ratio greater than 4.0 or greater than 6.0. In alternative embodiments, the condensable hydrocarbon portion may have a normal-C21 to normal-C29 weight ratio less than 30.0. In some embodiments the condensable hydrocarbon portion has a normal-C22 to normal-C29 weight ratio greater than 2.8. Alternatively, the condensable hydrocarbon portion may have a normal-C22 to normal-C29 weight ratio greater than 3.0. In alternative embodiments, the condensable hydrocarbon portion may have a normal-C22 to normal-C29 weight ratio less than 30.0. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

In some embodiments the condensable hydrocarbon portion may have one or more of a normal-C10 to total C10 weight ratio less than 0.31, a normal-C11 to total C11 weight ratio less than 0.32, a normal-C12 to total C12 weight ratio less than 0.29, a normal-C13 to total C13 weight ratio less than 0.28, a normal-C14 to total C14 weight ratio less than 0.31, a normal-C15 to total C15 weight ratio less than 0.27, a normal-C16 to total C16 weight ratio less than 0.31, a normal-C17 to total C17 weight ratio less than 0.31, a normal-C18 to total C18 weight ratio less than 0.37, normal-C19 to total C19 weight ratio less than 0.37, a normal-C20 to total C20 weight ratio less than 0.37, a normal-C21 to total C21 weight ratio less than 0.37, a normal-C22 to total C22 weight ratio less than 0.38, normal-C23 to total C23 weight ratio less than 0.43, a normal-C24 to total C24 weight ratio less than 0.48, and a normal-C25 to total C25 weight ratio less than 0.53. In alternative embodiments the condensable hydrocarbon portion has one or more of a normal-C11 to total C11 weight ratio less than 0.30, a normal-C12 to total C12 weight ratio less than 0.27, a normal-C13 to total C13 weight ratio less than 0.26, a normal-C14 to total C14 weight ratio less than 0.29, a normal-C15 to total C15 weight ratio less than 0.24, a normal-C16 to total C16 weight ratio less than 0.25, a normal-C17 to total C17 weight ratio less than 0.29, a normal-C18 to total C18 weight ratio less than 0.31, normal-C19 to total C19 weight ratio less than 0.35, a normal-C20 to total C20 weight ratio less than 0.33, a normal-C21 to total C21 weight ratio less than 0.33, a normal-C22 to total C22 weight ratio less than 0.35, normal-C23 to total C23 weight ratio less than 0.40, a normal-C24 to total C24 weight ratio less than 0.45, and a normal-C25 to total C25 weight ratio less than 0.49. In alternative embodiments the condensable hydrocarbon portion has one or more of a normal-C11 to total C11 weight ratio less than 0.28, a normal-C12 to total C12 weight ratio less than 0.25, a normal-C13 to total C13 weight ratio less than 0.24, a normal-C14 to total C14 weight ratio less than 0.27, a normal-C15 to total C15 weight ratio less than 0.22, a normal-C16 to total C16 weight ratio less than 0.23, a normal-C17 to total C17 weight ratio less than 0.25, a normal-C18 to total C18 weight ratio less than 0.28, normal-C19 to total C19 weight ratio less than 0.31, a normal-C20 to total C20 weight ratio less than 0.29, a normal-C21 to total C21 weight ratio less than 0.30, a normal-C22 to total C22 weight ratio less than 0.28, normal-C23 to total C23 weight ratio less than 0.33, a normal-C24 to total C24 weight ratio less than 0.40, and a normal-C25 to total C25 weight ratio less than 0.45. As used in this paragraph and in the claims, the phrase "one or more" followed by a listing of different compound or component ratios with the last ratio introduced by the conjunction "and" is meant to include a condensable hydrocarbon portion that has at least one of the listed ratios or that has two or more, or three or more, or four or more, etc., or all of the listed ratios. Further, a particular condensable hydrocarbon portion may also have additional ratios of different compounds or components that are not included in a particular sentence or claim and still fall within the scope of such a sentence or claim. The embodiments described in this paragraph may be combined with any of the other aspects of the invention discussed herein.

In some embodiments the condensable hydrocarbon portion has a normal-C10 to total C10 weight ratio less than 0.31. Alternatively, the condensable hydrocarbon portion may have a normal-C10 to total C10 weight ratio less than 0.30 or less than 0.29. In alternative embodiments, the condensable hydrocarbon portion may have a normal-C10 to total C10 weight ratio greater than 0.15 or greater than 0.20. In some embodiments the condensable hydrocarbon portion has a normal-C11 to total C11 weight ratio less than 0.32. Alternatively, the condensable hydrocarbon portion may have a normal-C11 to total C11 weight ratio less than 0.31, less than 0.30, or less than 0.29. In alternative embodiments, the condensable hydrocarbon portion may have a normal-C11 to total C11 weight ratio greater than 0.15 or greater than 0.20. In some embodiments the condensable hydrocarbon portion has a normal-C12 to total C12 weight ratio less than 0.29. Alternatively, the condensable hydrocarbon portion may have a normal-C12 to total C12 weight ratio less than 0.26, or less than 0.24. In alternative embodiments, the condensable hydrocarbon portion may have a normal-C12 to total C12 weight ratio greater than 0.10 or greater than 0.15. In some embodiments the condensable hydrocarbon portion has a normal-C13 to total C13 weight ratio less than 0.28. Alternatively, the condensable hydrocarbon portion may have a normal-C13 to total C13 weight ratio less than 0.27, less than 0.25, or less than 0.23. In alternative embodiments, the condensable hydrocarbon portion may have a normal-C13 to total C13 weight ratio greater than 0.10 or greater than 0.15. In some embodiments the condensable hydrocarbon portion has a normal-C14 to total C14 weight ratio less than 0.31. Alternatively, the condensable hydrocarbon portion may have a normal-C14 to total C14 weight ratio less than 0.30, less than 0.28, or less than 0.26. In alternative embodiments, the condensable hydrocarbon portion may have a normal-C14 to total C14 weight ratio greater than 0.10 or greater than 0.15. In some embodiments the condensable hydrocarbon portion has a normal-C15 to total C15 weight ratio less than 0.2.7. Alternatively, the condensable hydrocarbon portion may have a normal-C15 to total C15 weight ratio less than 0.26, less than 0.24, or less than 0.22. In alternative embodiments, the condensable hydrocarbon portion may have a normal-C15 to total C15 weight ratio greater than 0.10 or greater than 0.15. In some embodiments the condensable hydrocarbon portion has a normal-C16 to total C16 weight ratio less than 0.31. Alternatively, the condensable hydrocarbon portion may have a normal-C16 to total C16 weight ratio less than 0.29, less than 0.26, or less than 0.24. In alternative embodiments, the condensable hydrocarbon portion may have a normal-C16 to total C16 weight ratio greater than 0.10 or greater than 0.15. In some embodiments the condensable hydrocarbon portion has a normal-C17 to total C17 weight ratio less than 0.31. Alternatively, the condensable hydrocarbon portion may have a normal-C17 to total C17 weight ratio less than 0.29, less than 0.27, or less than 0.25. In alternative embodiments, the condensable hydrocarbon portion may have a normal-C17 to total C17 weight ratio greater than 0.10 or greater than 0.15. In some embodiments the condensable hydrocarbon portion has a normal-C18 to total C18 weight ratio less than 0.37. Alternatively, the condensable hydrocarbon portion may have a normal-C18 to total C18 weight ratio less than 0.35, less than 0.31, or less than 0.28. In alternative embodiments, the condensable hydrocarbon portion may have a normal-C18 to total C18 weight ratio greater than 0.10 or greater than 0.15. In some embodiments the condensable hydrocarbon portion has a normal-C19 to total C19 weight ratio less than 0.37. Alternatively, the condensable hydrocarbon portion may have a normal-C19 to total C19 weight ratio less than 0.36, less than 0.34, or less than 0.31. In alternative embodiments, the condensable hydrocarbon portion may have a normal-C19 to total C19 weight ratio greater than 0.10 or greater than 0.15. In some embodiments the condensable hydrocarbon portion has a normal-C20 to total C20 weight ratio less than 0.37. Alternatively, the condensable hydrocarbon portion may have a normal-C20 to total C20 weight ratio less than 0.35, less than 0.32, or less than 0.29. In alternative embodiments, the condensable hydrocarbon portion may have a normal-C20 to total C20 weight ratio greater than 0.10 or greater than 0.15. In some embodiments the condensable hydrocarbon portion has a normal-C21 to total C21 weight ratio less than 0.37. Alternatively, the condensable hydrocarbon portion may have a normal-C21 to total C21 weight ratio less than 0.35, less than 0.32, or less than 0.30. In alternative embodiments, the condensable hydrocarbon portion may have a normal-C21 to total C21 weight ratio greater than 0.10 or greater than 0.15. In some embodiments the condensable hydrocarbon portion has a normal-C22 to total C22 weight ratio less than 0.38. Alternatively, the condensable hydrocarbon portion may have a normal-C22 to total C22 weight ratio less than 0.36, less than 0.34, or less than 0.30. In alternative embodiments, the condensable hydrocarbon portion may have a normal-C22 to total C22 weight ratio greater than 0.10 or greater than 0.15. In some embodiments the condensable hydrocarbon portion has a normal-C23 to total C23 weight ratio less than 0.43. Alternatively, the condensable hydrocarbon portion may have a normal-C23 to total C23 weight ratio less than 0.40, less than 0.35, or less than 0.29. In alternative embodiments, the condensable hydrocarbon portion may have a normal-C23 to total C23 weight ratio greater than 0.15 or greater than 0.20. In some embodiments the condensable hydrocarbon portion has a normal-C24 to total C24 weight ratio less than 0.48. Alternatively, the condensable hydrocarbon portion may have a normal-C24 to total C24 weight ratio less than 0.46, less than 0.42, or less than 0.40. In alternative embodiments, the condensable hydrocarbon portion may have a normal-C24 to total C24 weight ratio greater than 0.15 or greater than 0.20. In some embodiments the condensable hydrocarbon portion has a normal-C25 to total C25 weight ratio less than 0.48. Alternatively, the condensable hydrocarbon portion may have a normal-C25 to total C25 weight ratio less than 0.46, less than 0.42, or less than 0.40. In alternative embodiments, the condensable hydrocarbon portion may have a normal-C25 to total C25 weight ratio greater than 0.20 or greater than 0.25. Certain features of the present invention are described in terms of a set of numerical upper limits (e.g. "less than") and a set of numerical lower limits (e.g. "greater than") in the preceding paragraph. It should be appreciated that ranges formed by any combination of these limits are within the scope of the invention unless otherwise indicated. The embodiments described in this paragraph may be combined with any of the other aspects of the invention discussed herein.

The use of "total C_" (e.g., total C10) herein and in the claims is meant to refer to the amount of a particular pseudo component found in a condensable hydrocarbon fluid determined as described herein, particularly as described in the section labeled "Experiments" herein. That is "total C_" is determined using the whole oil gas chromatography (WOGC) analysis methodology according to the procedure described in the Experiments section of this application. Further, "total C_" is determined from the whole oil gas chromatography (WOGC) peak integration methodology and peak identification methodology used for identifying and quantifying each pseudo-component as described in the Experiments section herein. Further, "total C_" weight percent and mole percent values for the pseudo components were obtained using the pseudo component analysis methodology involving correlations developed by Katz and Firoozabadi (Katz, D. L., and A. Firoozabadi, 1978. Predicting phase behavior of condensate/crude-oil systems using methane interaction coefficients, J. Petroleum Technology (November 1978), 1649-1655) as described in the Experiments section, including the exemplary molar and weight percentage determinations.

The use of "normal-C_" (e.g., normal-C10) herein and in the claims is meant to refer to the amount of a particular normal alkane hydrocarbon compound found in a condensable hydrocarbon fluid determined as described herein, particularly in the section labeled "Experiments" herein. That is "normal-C_" is determined from the GC peak areas determined using the whole oil gas chromatography (WOGC) analysis methodology according to the procedure described in the Experiments section of this application. Further, "total C_" is determined from the whole oil gas chromatography (WOGC) peak identification and integration methodology used for identifying and quantifying individual compound peaks as described in the Experiments section herein. Further, "normal-C_" weight percent and mole percent values for the normal alkane compounds were obtained using methodology analogous to the pseudo component exemplary molar and weight percentage determinations explained in the Experiments section, except that the densities and molecular weights for the particular normal alkane compound of interest were used and then compared to the totals obtained in the pseudo component methodology to obtain weight and molar percentages.

Figure 16:
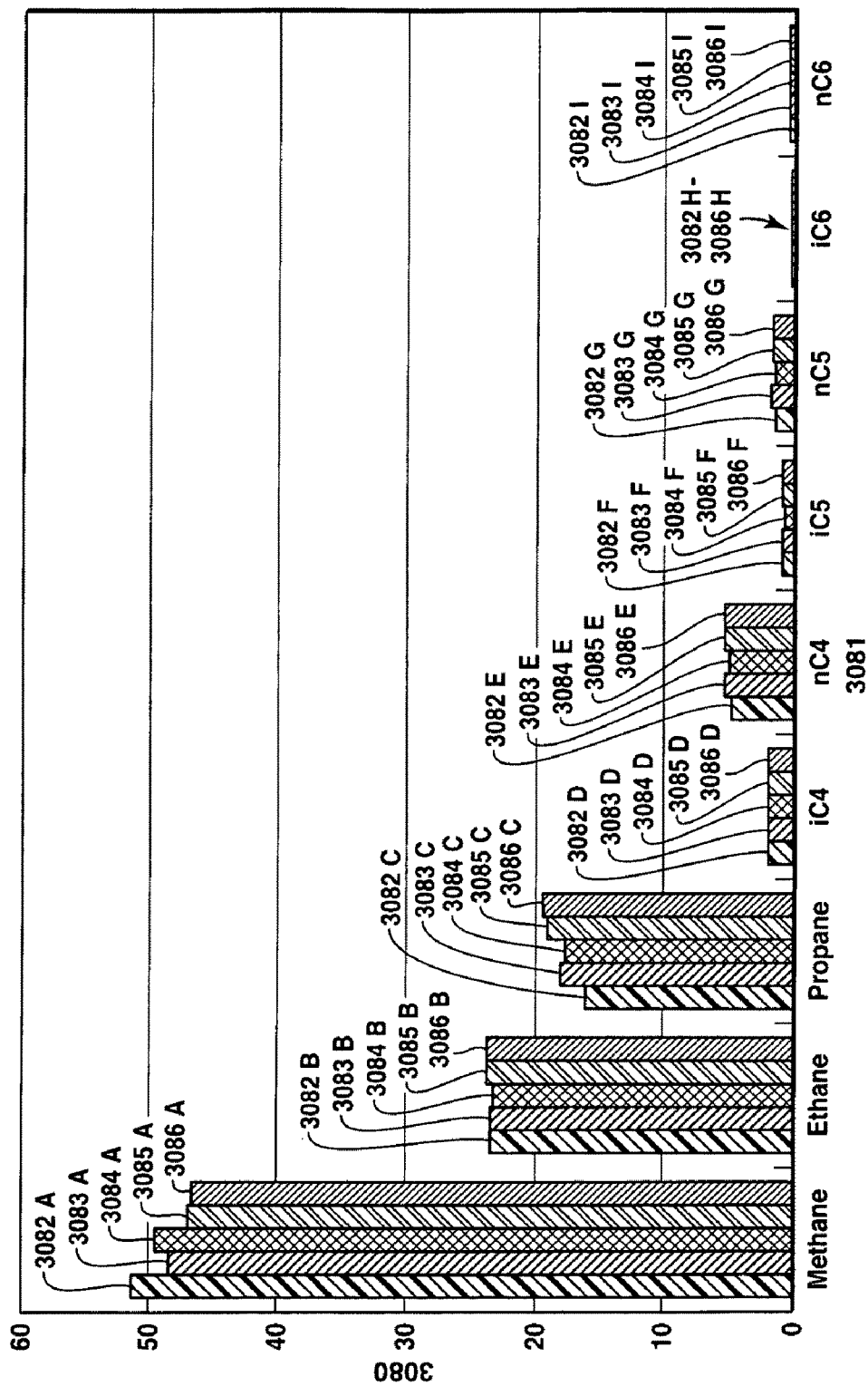
FIG. 16 is a bar graph showing the concentration, in molar percentage, of the hydrocarbon species present in the gas samples taken from duplicate laboratory experiments conducted at three different stress levels.

The following discussion of FIG. 16 concerns data obtained in Examples 1-5 which are discussed in the section labeled "Experiments". The data was obtained through the experimental procedures, gas sample collection procedures, hydrocarbon gas sample gas chromatography (GC) analysis methodology, and gas sample GC peak identification and integration methodology discussed in the Experiments section. For clarity, when referring to gas chromatograms of gaseous hydrocarbon samples, graphical data is provided for one unstressed experiment through Example 1, two 400 psi stressed experiments through Examples 2 and 3, and two 1,000 psi stressed experiments through Examples 4 and 5.

FIG. 16 is a bar graph showing the concentration, in molar percentage, of the hydrocarbon species present in the gas samples taken from each of the three stress levels tested and analyzed in the laboratory experiments discussed herein. The gas compound molar percentages were obtained through the experimental procedures, gas sample collection procedures, hydrocarbon gas sample gas chromatography (GC) analysis methodology, gas sample GC peak integration methodology and molar concentration determination procedures described herein. For clarity, the hydrocarbon molar percentages are taken as a percentage of the total of all identified hydrocarbon gas GC areas (i.e., methane, ethane, propane, iso-butane, n-butane, iso-pentane, n-pentane, 2-methyl pentane, and n-hexane) and calculated molar concentrations. Thus the graphed methane to normal C6 molar percentages for all of the experiments do not include the molar contribution of any associated non-hydrocarbon gas phase product (e.g., hydrogen, $CO_2$ or $H_2S$), any of the unidentified hydrocarbon gas species listed in Tables 2, 4, 5, 7, or 9 (e.g., peak numbers 2, 6, 8-11, 13, 15-22, 24-26, and 28-78 in Table 2) or any of the gas species dissolved in the liquid phase which were separately treated in the liquid GC's. The y-axis 3080 represents the concentration in terms of molar percent of each gaseous compound in the gas phase. The x-axis 3081 contains the identity of each hydrocarbon compound from methane to normal hexane. The bars 3082A-I represent the molar percentage of each gaseous compound for the unstressed experiment of Example 1. That is 3082A represents methane, 3082B represents ethane, 3082C represents propane, 3082D represents iso-butane, 3082E represents normal butane, 3082F represents iso-pentane, 3082G represents normal pentane, 3082H represents 2-methyl pentane, and 3082I represents normal hexane. The bars 3083A-I and 3084A-I represent the molar percent of each gaseous compound for samples from the duplicate 400 psi stressed experiments of Examples 2 and 3, with the letters assigned in the manner described for the unstressed experiment. While the bars 3085A-I and 3086A-I represent the molar percent of each gaseous compound for the duplicate 1,000 psi stressed experiments of Examples 4 and 5, with the letters assigned in the manner described for the unstressed experiment. From FIG. 16 it can be seen that the hydrocarbon gas produced in all the experiments is primarily methane, ethane and propane on a molar basis. It is further apparent that the unstressed experiment, represented by bars 3082A-I, contains the most methane 3082A and least propane 3082C, both as compared to the 400 psi stress experiments hydrocarbon gases and the 1,000 psi stress experiments hydrocarbon gases. Looking now at bars 3083A-I and 3084A-I, it is apparent that the intermediate level 400 psi stress experiments produced a hydrocarbon gas having methane 3083A & 3084A and propane 3083C & 3084C concentrations between the unstressed experiment represented by bars 3082A & 3082C and the 1,000 psi stressed experiment represented by bars 3085A & 3085C and 3086A & 3086C. Lastly, it is apparent that the high level 1,000 psi stress experiments produced hydrocarbon gases having the lowest methane 3085A & 3086A concentration and the highest propane concentrations 3085C & 3086C, as compared to both the unstressed experiments represented by bars 3082A & 3082C and the 400 psi stressed experiment represented by bars 3083A & 3084A and 3083C & 3084C. Thus pyrolyzing oil shale under increasing levels of lithostatic stress appears to produce hydrocarbon gases having decreasing concentrations of methane and increasing concentrations of propane.

The hydrocarbon fluid produced from the organic-rich rock formation may include both a condensable hydrocarbon portion (e.g. liquid) and a non-condensable hydrocarbon portion (e.g. gas). In some embodiments the non-condensable hydrocarbon portion includes methane and propane. In some embodiments the molar ratio of propane to methane in the non-condensable hydrocarbon portion is greater than 0.32. In alternative embodiments, the molar ratio of propane to methane in the non-condensable hydrocarbon portion is greater than 0.34, 0.36 or 0.38. As used herein "molar ratio of propane to methane" is the molar ratio that may be determined as described herein, particularly as described in the section labeled "Experiments" herein. That is "molar ratio of propane to methane" is determined using the hydrocarbon gas sample gas chromatography (GC) analysis methodology, gas sample GC peak identification and integration methodology and molar concentration determination procedures described in the Experiments section of this application.

In some embodiments the condensable hydrocarbon portion of the hydrocarbon fluid includes benzene. In some embodiments the condensable hydrocarbon portion has a benzene content between 0.1 and 0.8 weight percent. Alternatively, the condensable hydrocarbon portion may have a benzene content between 0.15 and 0.6 weight percent, a benzene content between 0.15 and 0.5, or a benzene content between 0.15 and 0.5.

In some embodiments the condensable hydrocarbon portion of the hydrocarbon fluid includes cyclohexane. In some embodiments the condensable hydrocarbon portion has a cyclohexane content less than 0.8 weight percent. Alternatively, the condensable hydrocarbon portion may have a cyclohexane content less than 0.6 weight percent or less than 0.43 weight percent. Alternatively, the condensable hydrocarbon portion may have a cyclohexane content greater than 0.1 weight percent or greater than 0.2 weight percent.

In some embodiments the condensable hydrocarbon portion of the hydrocarbon fluid includes methyl-cyclohexane. In some embodiments the condensable hydrocarbon portion has a methyl-cyclohexane content greater than 0.5 weight percent. Alternatively, the condensable hydrocarbon portion may have a methyl-cyclohexane content greater than 0.7 weight percent or greater than 0.75 weight percent. Alternatively, the condensable hydrocarbon portion may have a methyl-cyclohexane content less than 1.2 or 1.0 weight percent.

The use of weight percentage contents of benzene, cyclohexane, and methyl-cyclohexane herein and in the claims is meant to refer to the amount of benzene, cyclohexane, and methyl-cyclohexane found in a condensable hydrocarbon fluid determined as described herein, particularly as described in the section labeled "Experiments" herein. That is, respective compound weight percentages are determined from the whole oil gas chromatography (WOGC) analysis methodology and whole oil gas chromatography (WOGC) peak identification and integration methodology discussed in the Experiments section herein. Further, the respective compound weight percentages were obtained as described for FIG. 11, except that each individual respective compound peak area integration was used to determine each respective compound weight percentage. For clarity, the compound weight percentages are taken as a percentage of the entire C3 to pseudo C38 whole oil gas chromatography areas and calculated weights as used in the pseudo compound data presented in FIG. 7.

In some embodiments the condensable hydrocarbon portion of the hydrocarbon fluid has an API gravity greater than 30. Alternatively, the condensable hydrocarbon portion may have an API gravity greater than 30, 32, 34, 36, 40, 42 or 44. As used herein and in the claims, API gravity may be determined by any generally accepted method for determining API gravity.

In some embodiments the condensable hydrocarbon portion of the hydrocarbon fluid has a basic nitrogen to total nitrogen ratio between 0.1 and 0.50. Alternatively, the condensable hydrocarbon portion may have a basic nitrogen to total nitrogen ratio between 0.15 and 0.40. As used herein and in the claims, basic nitrogen and total nitrogen may be determined by any generally accepted method for determining basic nitrogen and total nitrogen. Where results conflict, the generally accepted more accurate methodology shall control.

The discovery that lithostatic stress can affect the composition of produced fluids generated within an organic-rich rock via heating and pyrolysis implies that the composition of the produced hydrocarbon fluid can also be influenced by altering the lithostatic stress of the organic-rich rock formation. For example, the lithostatic stress of the organic-rich rock formation may be altered by choice of pillar geometries and/or locations and/or by choice of heating and pyrolysis formation region thickness and/or heating sequencing.

Pillars are regions within the organic-rich rock formation left unpyrolized at a given time to lessen or mitigate surface subsidence. Pillars may be regions within a formation surrounded by pyrolysis regions within the same formation. Alternatively, pillars may be part of or connected to the unheated regions outside the general development area. Certain regions that act as pillars early in the life of a producing field may be converted to producing regions later in the life of the field.

Typically in its natural state, the weight of a formation's overburden is fairly uniformly distributed over the formation. In this state the lithostatic stress existing at particular point within a formation is largely controlled by the thickness and density of the overburden. A desired lithostatic stress may be selected by analyzing overburden geology and choosing a position with an appropriate depth and position.

Although lithostatic stresses are commonly assumed to be set by nature and not changeable short of removing all or part of the overburden, lithostatic stress at a specific location within a formation can be adjusted by redistributing the overburden weight so it is not uniformly supported by the formation. For example, this redistribution of overburden weight may be accomplished by two exemplary methods. One or both of these methods may be used within a single formation. In certain cases, one method may be primarily used earlier in time whereas the other may be primarily used at a later time. Favorably altering the lithostatic stress experienced by a formation region may be performed prior to instigating significant pyrolysis within the formation region and also before generating significant hydrocarbon fluids. Alternately, favorably altering the lithostatic stress may be performed simultaneously with the pyrolysis.

A first method of altering lithostatic stress involves making a region of a subsurface formation less stiff than its neighboring regions. Neighboring regions thus increasingly act as pillars supporting the overburden as a particular region becomes less stiff. These pillar regions experience increased lithostatic stress whereas the less stiff regions experience reduced lithostatic stress. The amount of change in lithostatic stress depends upon a number of factors including, for example, the change in stiffness of the treated region, the size of the treated region, the pillar size, the pillar spacing, the rock compressibility, and the rock strength. In an organic-rich rock formation, a region within a formation may be made to experience mechanical weakening by pyrolyzing the region and creating void space within the region by removing produced fluids. In this way a region within a formation may be made less stiff than neighboring regions that have not experienced pyrolysis or have experienced a lesser degree of pyrolysis or production.

A second method of altering lithostatic stress involves causing a region of a subsurface formation to expand and push against the overburden with greater force than neighboring regions. This expansion may remove a portion of the overburden weight from the neighboring regions thus increasing the lithostatic stress experienced by the heated region(s) and reducing the lithostatic stress experienced by neighboring regions. If the expansion is sufficient, horizontal fractures will form in the neighboring regions and the contribution of these regions to supporting the overburden will decrease. The amount of change in lithostatic stress depends upon a number of factors including, for example, the amount of expansion in the treated region, the size of the treated region, the pillar size, the pillar spacing, the rock compressibility, and the rock strength. A region within a formation may be made to expand by heating it so to cause thermal expansion of the rock. Fluid expansion or fluid generation can also contribute to expansion if the fluids are largely trapped within the region. The total expansion amount may be proportional to the thickness of the heated region. It is noted that if pyrolysis occurs in the heated region and sufficient fluids are removed, the heated region may mechanically weaken and thus may alter the lithostatic stresses experienced by the neighboring regions as described in the first exemplary method.

Embodiments of the method may include controlling the composition of produced hydrocarbon fluids generated by heating and pyrolysis from a first region within an organic-rich rock formation by increasing the lithostatic stresses within the first region by first heating and pyrolyzing formation hydrocarbons present in the organic-rich rock formation and producing fluids from a second neighboring region within the organic-rich rock formation such that the Young's modulus (i.e., stiffness) of the second region is reduced.

Embodiments of the method may include controlling the composition of produced hydrocarbon fluids generated by heating and pyrolysis from a first region within an organic-rich rock formation by increasing the lithostatic stresses within the first region by heating the first region prior to or to a greater degree than neighboring regions within the organic-rich rock formation such that the thermal expansion within the first region is greater than that within the neighboring regions of the organic-rich rock formation.

Embodiments of the method may include controlling the composition of produced hydrocarbon fluids generated by heating and pyrolysis from a first region within an organic-rich rock formation by decreasing the lithostatic stresses within the first region by heating one or more neighboring regions of the organic-rich rock formation prior to or to a greater degree than the first region such that the thermal expansion within the neighboring regions is greater than that within the first region.

Embodiments of the method may include locating, sizing, and/or timing the heating of heated regions within an organic-rich rock formation so as to alter the in situ lithostatic stresses of current or future heating and pyrolysis regions within the organic-rich rock formation so as to control the composition of produced hydrocarbon fluids.

Some production procedures include in situ heating of an organic-rich rock formation that contains both formation hydrocarbons and formation water-soluble minerals prior to substantial removal of the formation water-soluble minerals from the organic-rich rock formation. In some embodiments of the invention there is no need to partially, substantially or completely remove the water-soluble minerals prior to in situ heating. For example, in an oil shale formation that contains naturally occurring nahcolite, the oil shale may be heated prior to substantial removal of the nahcolite by solution mining. Substantial removal of a water-soluble mineral may represent the degree of removal of a water-soluble mineral that occurs from any commercial solution mining operation as known in the art. Substantial removal of a water-soluble mineral may be approximated as removal of greater than 5 weight percent of the total amount of a particular water-soluble mineral present in the zone targeted for hydrocarbon fluid production in the organic-rich rock formation. In alternative embodiments, in situ heating of the organic-rich rock formation to pyrolyze formation hydrocarbons may be commenced prior to removal of greater than 3 weight percent, alternatively 7 weight percent, 10 weight percent or 13 weight percent of the formation water-soluble minerals from the organic-rich rock formation.

The impact of heating oil shale to produce oil and gas prior to producing nahcolite is to convert the nahcolite to a more recoverable form (soda ash), and provide permeability facilitating its subsequent recovery. Water-soluble mineral recovery may take place as soon as the retorted oil is produced, or it may be left for a period of years for later recovery. If desired, the soda ash can be readily converted back to nahcolite on the surface. The ease with which this conversion can be accomplished makes the two minerals effectively interchangeable.

In some production processes, heating the organic-rich rock formation includes generating soda ash by decomposition of nahcolite. The method may include processing an aqueous solution containing water-soluble minerals in a surface facility to remove a portion of the water-soluble minerals. The processing step may include removing the water-soluble minerals by precipitation caused by altering the temperature of the aqueous solution.

The water-soluble minerals may include sodium. The water-soluble minerals may also include nahcolite (sodium bicarbonate), soda ash (sodium carbonate), dawsonite (NaAl$(CO_3)(OH)_2$), or combinations thereof. The surface processing may further include converting the soda ash back to sodium bicarbonate (nahcolite) in the surface facility by reaction with $CO_2$. After partial or complete removal of the water-soluble minerals, the aqueous solution may be reinjected into a subsurface formation where it may be sequestered. The subsurface formation may be the same as or different from the original organic-rich rock formation.

In some production processes, heating of the organic-rich rock formation both pyrolyzes at least a portion of the formation hydrocarbons to create hydrocarbon fluids and makes available migratory contaminant species previously bound in the organic-rich rock formation. The migratory contaminant species may be formed through pyrolysis of the formation hydrocarbons, may be liberated from the formation itself upon heating, or may be made accessible through the creation of increased permeability upon heating of the formation. The migratory contaminant species may be soluble in water or other aqueous fluids present in or injected into the organic-rich rock formation.

Producing hydrocarbons from pyrolyzed oil shale will generally leave behind some migratory contaminant species which are at least partially water-soluble. Depending on the hydrological connectivity of the pyrolyzed shale oil to shallower zones, these components may eventually migrate into ground water in concentrations which are environmentally unacceptable. The types of potential migratory contaminant species depend on the nature of the oil shale pyrolysis and the composition of the oil shale being converted. If the pyrolysis is performed in the absence of oxygen or air, the contaminant species may include aromatic hydrocarbons (e.g. benzene, toluene, ethylbenzene, xylenes), polyaromatic hydrocarbons (e.g. anthracene, pyrene, naphthalene, chrysene), metal contaminants (e.g. As, Co, Pb, Mo, Ni, and Zn), and other species such as sulfates, ammonia, Al, K, Mg, chlorides, fluorides and phenols. If oxygen or air is employed, contaminant species may also include ketones, alcohols, and cyanides. Further, the specific migratory contaminant species present may include any subset or combination of the above-described species.

It may be desirable for a field developer to assess the connectivity of the organic-rich rock formation to aquifers. This may be done to determine if, or to what extent, in situ pyrolysis of formation hydrocarbons in the organic-rich rock formation may create migratory species with the propensity to migrate into an aquifer. If the organic-rich rock formation is hydrologically connected to an aquifer, precautions may be taken to reduce or prevent species generated or liberated during pyrolysis from entering the aquifer. Alternatively, the organic-rich rock formation may be flushed with water or an aqueous fluid after pyrolysis as described herein to remove water-soluble minerals and/or migratory contaminant species. In other embodiments, the organic-rich rock formation may be substantially hydrologically unconnected to any source of ground water. In such a case, flushing the organic-rich rock formation may not be desirable for removal of migratory contaminant species but may nevertheless be desirable for recovery of water-soluble minerals.

Following production of hydrocarbons from an organic-rich formation, some migratory contaminant species may remain in the rock formation. In such case, it may be desirable to inject an aqueous fluid into the organic-rich rock formation and have the injected aqueous fluid dissolve at least a portion of the water-soluble minerals and/or the migratory contaminant species to form an aqueous solution. The aqueous solution may then be produced from the organic-rich rock formation through, for example, solution production wells. The aqueous fluid may be adjusted to increase the solubility of the migratory contaminant species and/or the water-soluble minerals. The adjustment may include the addition of an acid or base to adjust the pH of the solution. The resulting aqueous solution may then be produced from the organic-rich rock formation to the surface for processing.

After initial aqueous fluid production, it may further be desirable to flush the matured organic-rich rock zone and the unmatured organic-rich rock zone with an aqueous fluid. The aqueous fluid may be used to further dissolve water-soluble minerals and migratory contaminant species. The flushing may optionally be completed after a substantial portion of the hydrocarbon fluids have been produced from the matured organic-rich rock zone. In some embodiments, the flushing step may be delayed after the hydrocarbon fluid production step. The flushing may be delayed to allow heat generated from the heating step to migrate deeper into surrounding unmatured organic-rich rock zones to convert nahcolite within the surrounding unmatured organic-rich rock zones to soda ash. Alternatively, the flushing may be delayed to allow heat generated from the heating step to generate permeability within the surrounding unmatured organic-rich rock zones. Further, the flushing may be delayed based on current and/or forecast market prices of sodium bicarbonate, soda ash, or both as further discussed herein. This method may be combined with any of the other aspects of the invention as discussed herein Upon flushing of an aqueous solution, it may be desirable to process the aqueous solution in a surface facility to remove at least some of the migratory contaminant species. The migratory contaminant species may be removed through use of, for example, an adsorbent material, reverse osmosis, chemical oxidation, bio-oxidation, and/or ion exchange. Examples of these processes are individually known in the art. Exemplary adsorbent materials may include activated carbon, clay, or fuller's earth.

In certain areas with oil shale resources, additional oil shale resources or other hydrocarbon resources may exist at lower depths. Other hydrocarbon resources may include natural gas in low permeability formations (so-called "tight gas") or natural gas trapped in and adsorbed on coal (so called "coal-bed methane"). In some embodiments with multiple shale oil resources it may be advantageous to develop deeper zones first and then sequentially shallower zones. In this way, wells need not cross hot zones or zones of weakened rock. In other embodiments in may be advantageous to develop deeper zones by drilling wells through regions being utilized as pillars for shale oil development at a shallower depth.

Simultaneous development of shale oil resources and natural gas resources in the same area can synergistically utilize certain facility and logistic operations. For example, gas treating may be performed at a single plant. Likewise personnel may be shared among the developments.

Figure 6:
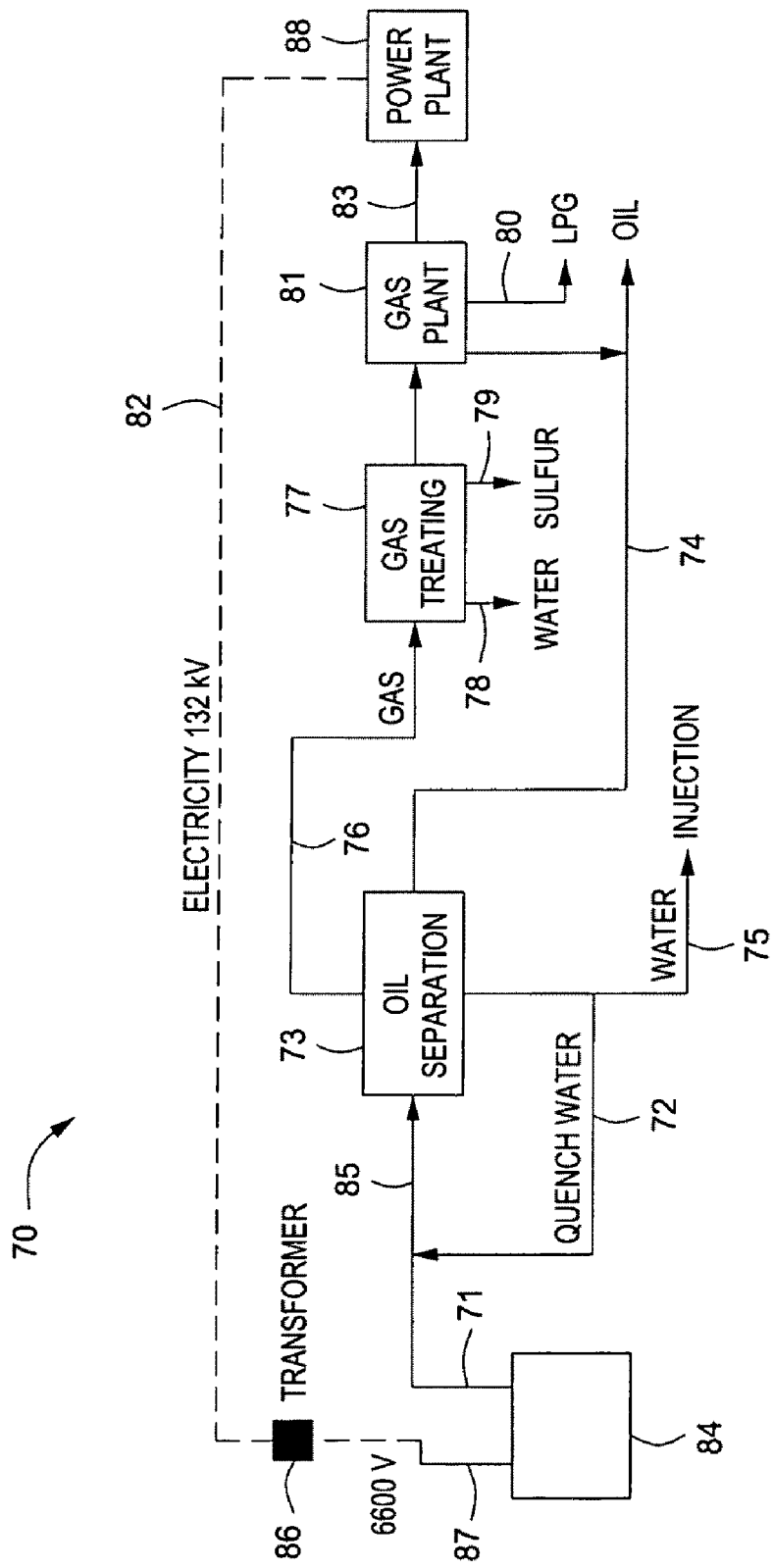
FIG. 6 is a process flow diagram of exemplary surface processing facilities for a subsurface formation development.

FIG. 6 illustrates a schematic diagram of an embodiment of surface facilities 70 that may be configured to treat a produced fluid. The produced fluid 85 may be produced from the subsurface formation 84 though a production well 71 as described herein. The produced fluid may include any of the produced fluids produced by any of the methods as described herein. The subsurface formation 84 may be any subsurface formation, including, for example, an organic-rich rock formation containing any of oil shale, coal, or tar sands for example. A production scheme may involve quenching 72 produced fluids to a temperature below 300° F., 200° F., or even 100° F., separating out condensable components (i.e., oil 74 and water 75) in an oil separator 73, treating the noncondensable components 76 (i.e. gas) in a gas treating unit 77 to remove water 78 and sulfur species 79, removing the heavier components from the gas (e.g., propane and butanes) in a gas plant 81 to form liquid petroleum gas (LPG) 80 for sale, and generating electrical power 82 in a power plant 88 from the remaining gas 83. The electrical power 82 may be used as an energy source for heating the subsurface formation 84 through any of the methods described herein. For example, the electrical power 82 may be feed at a high voltage, for example 132 kV, to a transformer 86 and let down to a lower voltage, for example 6600 V, before being fed to an electrical resistance heater element located in a heater well 87 located in the subsurface formation 84. In this way all or a portion of the power required to heat the subsurface formation 84 may be generated from the non-condensable portion of the produced fluids 85. Excess gas, if available, may be exported for sale.

Produced fluids from in situ oil shale production contain a number of components which may be separated in surface facilities. The produced fluids typically contain water, non-condensable hydrocarbon alkane species (e.g., methane, ethane, propane, n-butane, isobutane), noncondensable hydrocarbon alkene species (e.g., ethene, propene), condensable hydrocarbon species composed of (alkanes, olefins, aromatics, and polyaromatics among others), $CO_2$, $CO$, $H_2$, $H_2S$, and $NH_3$.

In a surface facility, condensable components may be separated from non-condensable components by reducing temperature and/or increasing pressure. Temperature reduction may be accomplished using heat exchangers cooled by ambient air or available water. Alternatively, the hot produced fluids may be cooled via heat exchange with produced hydrocarbon fluids previously cooled. The pressure may be increased via centrifugal or reciprocating compressors. Alternatively, or in conjunction, a diffuser-expander apparatus may be used to condense out liquids from gaseous flows. Separations may involve several stages of cooling and/or pressure changes.

Water in addition to condensable hydrocarbons may be dropped out of the gas when reducing temperature or increasing pressure. Liquid water may be separated from condensable hydrocarbons via gravity settling vessels or centrifugal separators. Demulsifiers may be used to aid in water separation.

Methods to remove $CO_2$, as well as other so-called acid gases (such as $H_2S$), from produced hydrocarbon gas include the use of chemical reaction processes and of physical solvent processes. Chemical reaction processes typically involve contacting the gas stream with an aqueous amine solution at high pressure and/or low temperature. This causes the acid gas species to chemically react with the amines and go into solution. By raising the temperature and/or lowering the pressure, the chemical reaction can be reversed and a concentrated stream of acid gases can be recovered. An alternative chemical reaction process involves hot carbonate solutions, typically potassium carbonate. The hot carbonate solution is regenerated and the concentrated stream of acid gases is recovered by contacting the solution with steam. Physical solvent processes typically involve contacting the gas stream with a glycol at high pressure and/or low temperature. Like the amine processes, reducing the pressure or raising the temperature allows regeneration of the solvent and recovery of the acid gases. Certain amines or glycols may be more or less selective in the types of acid gas species removed. Sizing of any of these processes requires determining the amount of chemical to circulate, the rate of circulation, the energy input for regeneration, and the size and type of gas-chemical contacting equipment. Contacting equipment may include packed or multi-tray countercurrent towers. Optimal sizing for each of these aspects is highly dependent on the rate at which gas is being produced from the formation and the concentration of the acid gases in the gas stream.

Acid gas removal may also be effectuated through the use of distillation towers. Such towers may include an intermediate freezing section wherein frozen $CO_2$ and $H_2S$ particles are allowed to form. A mixture of frozen particles and liquids fall downward into a stripping section, where the lighter hydrocarbon gasses break out and rise within the tower. A rectification section may be provided at an upper end of the tower to further facilitate the cleaning of the overhead gas stream.

The hydrogen content of a gas stream may be adjusted by either removing all or a portion of the hydrogen or by removing all or a portion of the non-hydrogen species (e.g., $CO_2$, $CH_4$, etc.) Separations may be accomplished using cryogenic condensation, pressure-swing or temperature-swing adsorption, or selective diffusion membranes. If additional hydrogen is needed, hydrogen may be made by reforming methane via the classic water-shift reaction.

EXPERIMENTS

Figure 18:
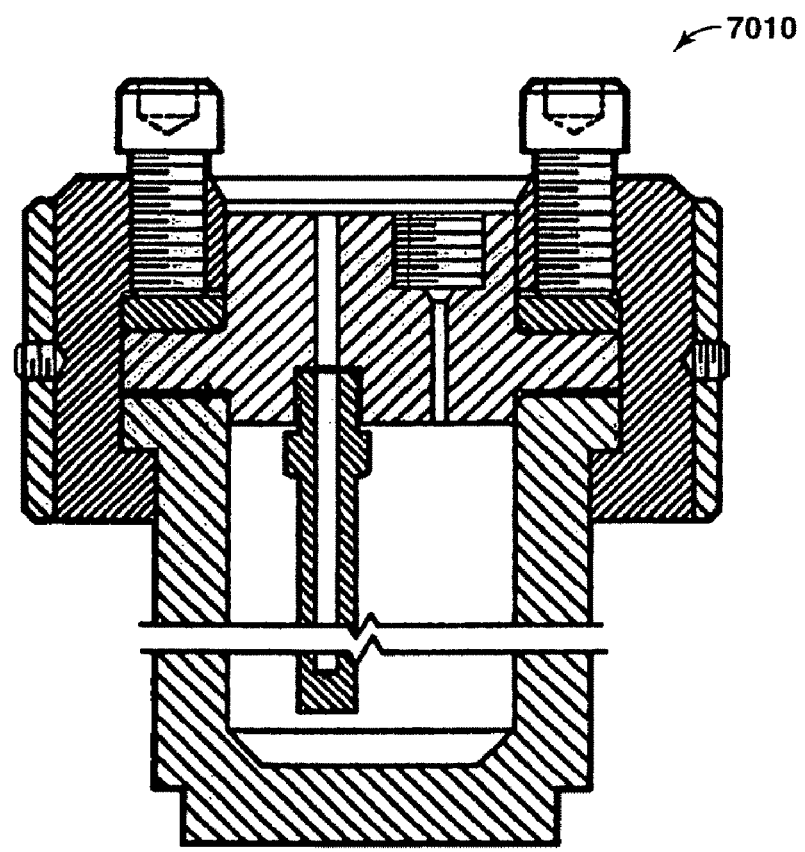
FIG. 18 is a cross-sectional view of the Parr vessel used in Examples 1-5, described below.

Heating experiments were conducted on several different oil shale specimens and the liquids and gases released from the heated oil shale examined in detail. An oil shale sample from the Mahogany formation in the Piceance Basin in Colorado was collected. A solid, continuous block of the oil shale formation, approximately 1 cubic foot in size, was collected from the pilot mine at the Colony mine site on the eastern side of Parachute Creek. The oil shale block was designated CM-1B. The core specimens taken from this block, as described in the following examples, were all taken from the same stratigraphic interval. The heating tests were conducted using a Parr vessel, model number 243HC5, which is shown in FIG. 18 and is available from Parr Instrument Company.

Example 1

Figure 17:
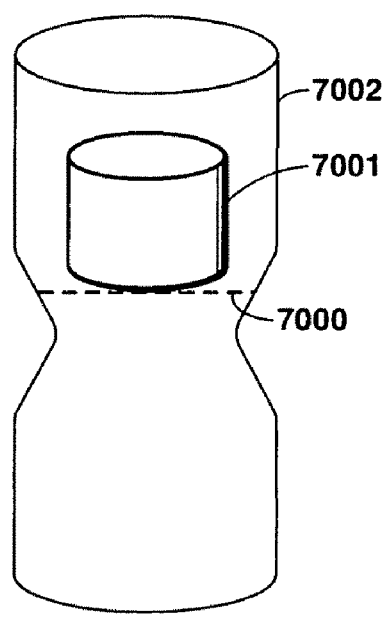
FIG. 17 is an exemplary view of the gold tube apparatus used in the unstressed Parr heating test described below in Example 1.

Oil shale block CM-1B was cored across the bedding planes to produce a cylinder 1.391 inches in diameter and approximately 2 inches long. A gold tube 7002 approximately 2 inches in diameter and 5 inches long was crimped and a screen 7000 inserted to serve as a support for the core specimen 7001 (FIG. 17). The oil shale core specimen 7001, 82.46 grams in weight, was placed on the screen 7000 in the gold tube 7002 and the entire assembly placed into a Parr heating vessel. The Parr vessel 7010, shown in FIG. 18, had an internal volume of 565 milliliters. Argon was used to flush the Parr vessel 7010 several times to remove air present in the chamber and the vessel pressurized to 500 psi with argon. The Parr vessel was then placed in a furnace which was designed to fit the Parr vessel. The furnace was initially at room temperature and was heated to 400° C. after the Parr vessel was placed in the furnace. The temperature of the Parr vessel achieved 400° C. after about 3 hours and remained in the 400° C. furnace for 24 hours. The Parr vessel was then removed from the furnace and allowed to cool to room temperature over a period of approximately 16 hours.

Figure 19:
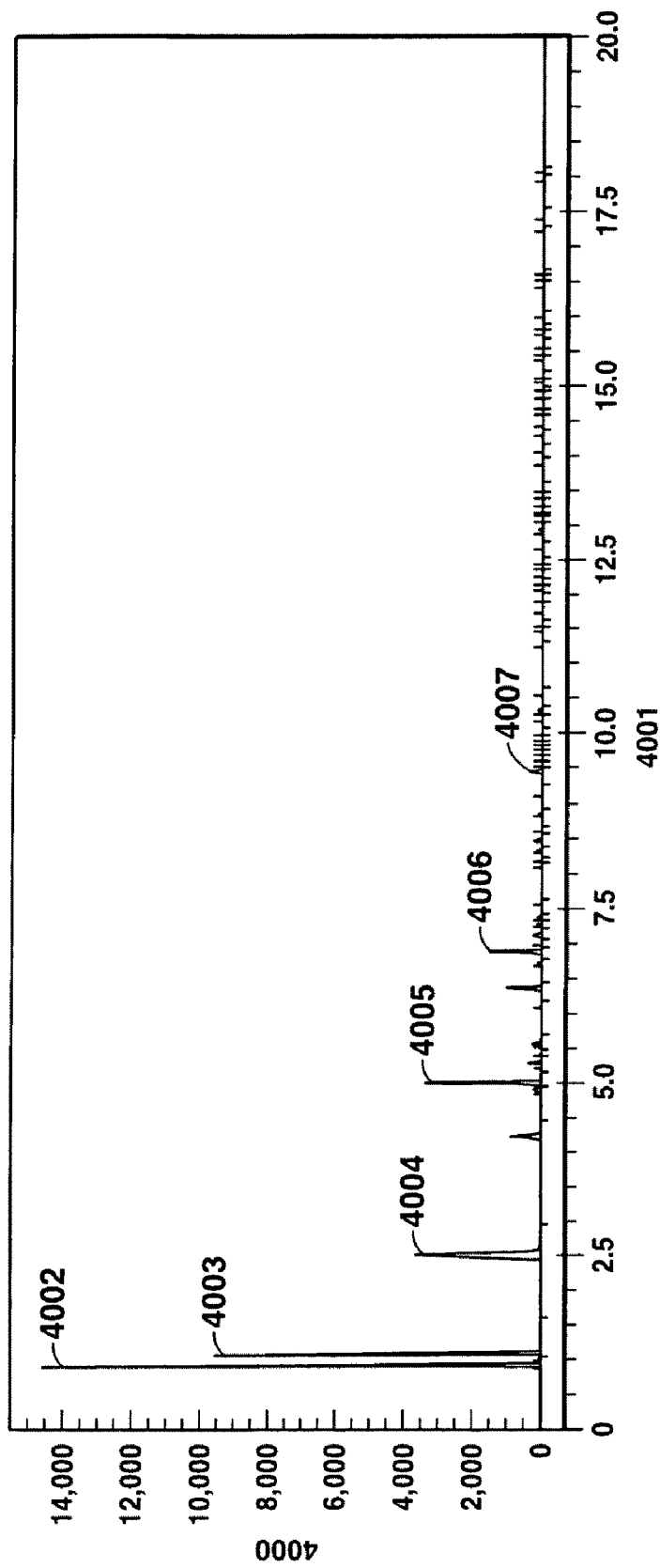
FIG. 19 is gas chromatogram of gas sampled from Example 1.

The room temperature Parr vessel was sampled to obtain a representative portion of the gas remaining in the vessel following the heating experiment. A small gas sampling cylinder 150 milliliters in volume was evacuated, attached to the Parr vessel and the pressure allowed to equilibrate. Gas chromatography (GC) analysis testing and non-hydrocarbon gas sample gas chromatography (GC) (GC not shown) of this gas sample yielded the results shown in FIG. 19, Table 2 and Table 1. In FIG. 19 the y-axis 4000 represents the detector response in pico-amperes (pA) while the x-axis 4001 represents the retention time in minutes. In FIG. 19 peak 4002 represents the response for methane, peak 4003 represents the response for ethane, peak 4004 represents the response for propane, peak 4005 represents the response for butane, peak 4006 represents the response for pentane and peak 4007 represents the response for hexane. From the GC results and the known volumes and pressures involved the total hydrocarbon content of the gas (2.09 grams), $CO_2$ content of the gas (3.35 grams), and H2S content of the gas (0.06 gram) were obtained.

TABLE 2

Peak and area details for FIG. 19 - Example 1 - 0 stress - gas GC

| Peak Number | Ret Time [min] | Area [pA * s] | Name |
|---|---|---|---|
| 1 | 0.910 | 1.46868e4 | Methane |
| 2 | 0.999 | 148.12119 | ? |
| 3 | 1.077 | 1.26473e4 | Ethane |
| 4 | 2.528 | 1.29459e4 | Propane |
| 5 | 4.243 | 2162.93066 | iC4 |
| 6 | 4.922 | 563.11804 | ? |
| 7 | 5.022 | 5090.54150 | n-Butane |
| 8 | 5.301 | 437.92255 | ? |
| 9 | 5.446 | 4.67394 | ? |
| 10 | 5.582 | 283.92194 | ? |
| 11 | 6.135 | 15.47334 | ? |
| 12 | 6.375 | 1159.83130 | iC5 |
| 13 | 6.742 | 114.83960 | ? |
| 14 | 6.899 | 1922.98450 | n-Pentane |
| 15 | 7.023 | 2.44915 | ? |
| 16 | 7.136 | 264.34424 | ? |
| 17 | 7.296 | 127.60601 | ? |
| 18 | 7.383 | 118.79453 | ? |
| 19 | 7.603 | 3.99227 | ? |
| 20 | 8.138 | 13.15432 | ? |
| 21 | 8.223 | 13.01887 | ? |
| 22 | 8.345 | 103.15615 | ? |
| 23 | 8.495 | 291.26767 | 2-methyl pentane |
| 24 | 8.651 | 15.64066 | ? |
| 25 | 8.884 | 91.85989 | ? |
| 26 | 9.165 | 40.09448 | ? |
| 27 | 9.444 | 534.44507 | n-Hexane |
| 28 | 9.557 | 2.64731 | ? |
| 29 | 9.650 | 32.28295 | ? |
| 30 | 9.714 | 52.42796 | ? |
| 31 | 9.793 | 42.05001 | ? |
| 32 | 9.852 | 8.93775 | ? |
| 33 | 9.914 | 4.43648 | ? |
| 34 | 10.013 | 24.74299 | ? |
| 35 | 10.229 | 13.34387 | ? |
| 36 | 10.302 | 133.95892 | ? |
| 37 | 10.577 | 2.67224 | ? |
| 38 | 11.252 | 27.57400 | ? |
| 39 | 11.490 | 23.41665 | ? |
| 40 | 11.567 | 8.13992 | ? |
| 41 | 11.820 | 32.80781 | ? |

TABLE 2-continued

Peak and area details for FIG. 19 - Example 1 - 0 stress - gas GC

| Peak Number | Ret Time [min] | Area [pA * s] | Name |
|---|---|---|---|
| 42 | 11.945 | 4.61821 | ? |
| 43 | 12.107 | 30.67044 | ? |
| 44 | 12.178 | 2.58269 | ? |
| 45 | 12.308 | 13.57769 | ? |
| 46 | 12.403 | 12.43018 | ? |
| 47 | 12.492 | 34.29918 | ? |
| 48 | 12.685 | 4.71311 | ? |
| 49 | 12.937 | 183.31729 | ? |
| 50 | 13.071 | 7.18510 | ? |
| 51 | 13.155 | 2.01699 | ? |
| 52 | 13.204 | 7.77467 | ? |
| 53 | 13.317 | 7.21400 | ? |
| 54 | 13.443 | 4.22721 | ? |
| 55 | 13.525 | 35.08374 | ? |
| 56 | 13.903 | 18.48654 | ? |
| 57 | 14.095 | 6.39745 | ? |
| 58 | 14.322 | 3.19935 | ? |
| 59 | 14.553 | 8.48772 | ? |
| 60 | 14.613 | 3.34738 | ? |
| 61 | 14.730 | 5.44062 | ? |
| 62 | 14.874 | 40.17010 | ? |
| 63 | 14.955 | 3.41596 | ? |
| 64 | 15.082 | 3.04766 | ? |
| 65 | 15.138 | 7.33028 | ? |
| 66 | 15.428 | 2.71734 | ? |
| 67 | 15.518 | 11.00256 | ? |
| 68 | 15.644 | 5.16752 | ? |
| 69 | 15.778 | 45.12025 | ? |
| 70 | 15.855 | 3.26920 | ? |
| 71 | 16.018 | 3.77424 | ? |
| 72 | 16.484 | 4.66657 | ? |
| 73 | 16.559 | 5.54783 | ? |
| 74 | 16.643 | 10.57255 | ? |
| 75 | 17.261 | 2.19534 | ? |
| 76 | 17.439 | 10.26123 | ? |
| 77 | 17.971 | 1.85618 | ? |
| 78 | 18.097 | 11.42077 | ? |

Figure 20:
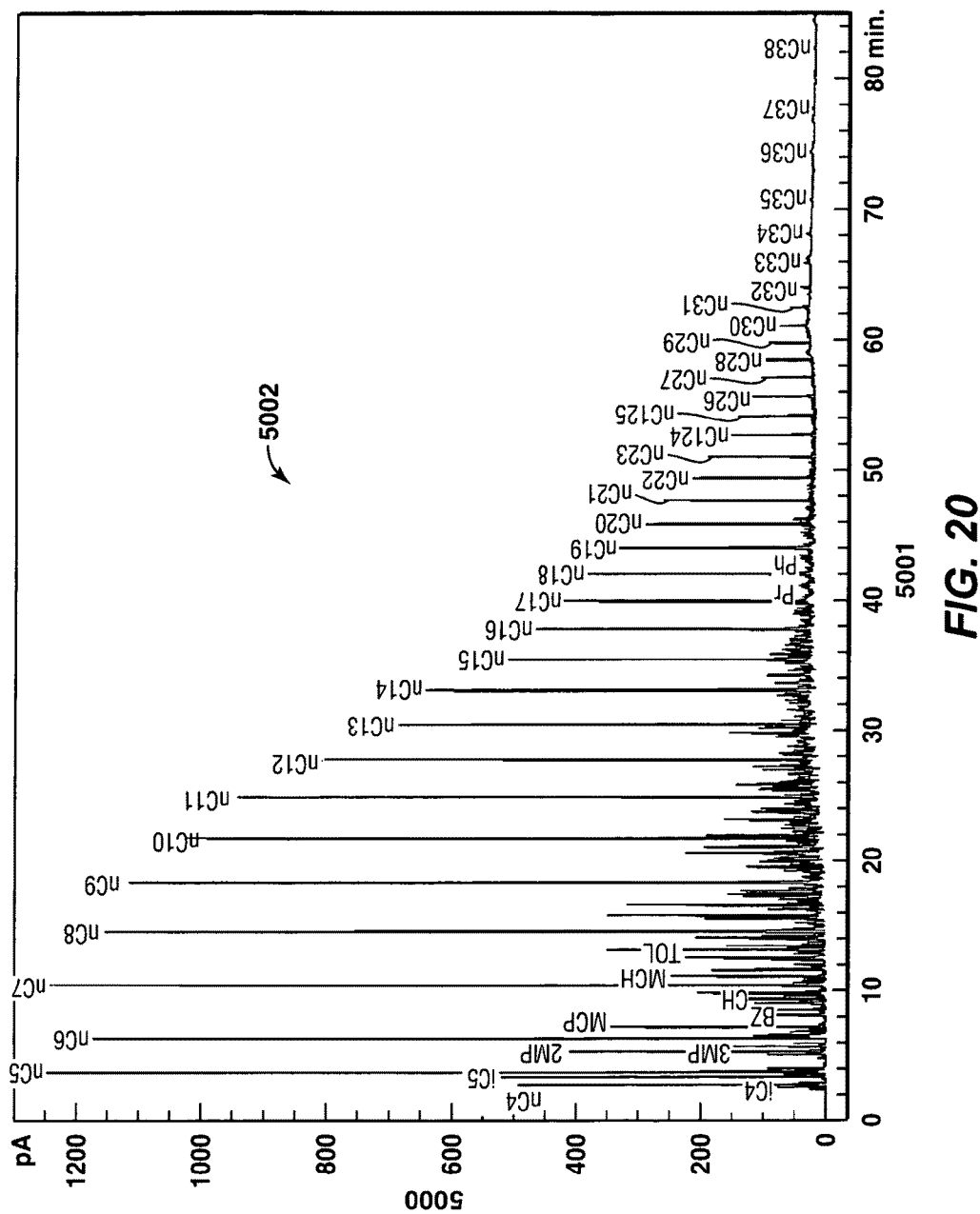
FIG. 20 is a whole oil gas chromatogram of liquid sampled from Example 1.

The Parr vessel was then vented to achieve atmospheric pressure, the vessel opened, and liquids collected from both inside the gold tube and in the bottom of the Parr vessel. Water was separated from the hydrocarbon layer and weighed. The amount collected is noted in Table 1. The collected hydrocarbon liquids were placed in a small vial, sealed and stored in the absence of light. No solids were observed on the walls of the gold tube or the walls of the Parr vessel. The solid core specimen was weighed and determined to have lost 19.21 grams as a result of heating. Whole oil gas chromatography (WOGC) testing of the liquid yielded the results shown in FIG. 20, Table 3, and Table 1. In FIG. 20 the y-axis 5000 represents the detector response in pico-amperes (pA) while the x-axis 5001 represents the retention time in minutes. The GC chromatogram is shown generally by label 5002 with individual identified peaks labeled with abbreviations.

TABLE 3

Peak and area details for FIG. 20 - Example 1 - 0 stress - liquid GC

| Peak # | Ret. Time [min] | Peak Area [pA * s] | Compound Name |
|---|---|---|---|
| 1 | 2.660 | 119.95327 | iC4 |
| 2 | 2.819 | 803.25989 | nC4 |
| 3 | 3.433 | 1091.80298 | iC5 |
| 4 | 3.788 | 2799.32520 | nC5 |
| 5 | 5.363 | 1332.67871 | 2-methyl pentane (2MP) |
| 6 | 5.798 | 466.35703 | 3-methyl pentane (3MP) |
| 7 | 6.413 | 3666.46240 | nC6 |
| 8 | 7.314 | 1161.70435 | Methyl cyclopentane (MCP) |
| 9 | 8.577 | 287.05969 | Benzene (BZ) |
| 10 | 9.072 | 530.19781 | Cyclohexane (CH) |
| 11 | 10.488 | 4700.48291 | nC7 |
| 12 | 11.174 | 937.38757 | Methyl cyclohexane (MCH) |
| 13 | 12.616 | 882.17358 | Toluene (TOL) |
| 14 | 14.621 | 3954.29687 | nC8 |
| 15 | 18.379 | 3544.52905 | nC9 |
| 16 | 21.793 | 3452.04199 | nC10 |
| 17 | 24.929 | 3179.11841 | nC11 |
| 18 | 27.843 | 2680.95459 | nC12 |
| 19 | 30.571 | 2238.89600 | nC13 |
| 20 | 33.138 | 2122.53540 | nC14 |
| 21 | 35.561 | 1773.59973 | nC15 |
| 22 | 37.852 | 1792.89526 | nC16 |
| 23 | 40.027 | 1394.61707 | nC17 |
| 24 | 40.252 | 116.81663 | Pristane (Pr) |
| 25 | 42.099 | 1368.02734 | nC18 |
| 26 | 42.322 | 146.96437 | Phytane (Ph) |
| 27 | 44.071 | 1130.63342 | nC19 |
| 28 | 45.956 | 920.52136 | nC20 |
| 29 | 47.759 | 819.92810 | nC21 |
| 30 | 49.483 | 635.42065 | nC22 |
| 31 | 51.141 | 563.24316 | nC23 |
| 32 | 52.731 | 432.74606 | nC24 |
| 33 | 54.261 | 397.36270 | nC25 |
| 34 | 55.738 | 307.56073 | nC26 |
| 35 | 57.161 | 298.70926 | nC27 |
| 36 | 58.536 | 252.60083 | nC28 |
| 37 | 59.867 | 221.84540 | nC29 |
| 38 | 61.154 | 190.29596 | nC30 |
| 39 | 62.539 | 123.65781 | nC31 |
| 40 | 64.133 | 72.47668 | nC32 |
| 41 | 66.003 | 76.84142 | nC33 |
| 42 | 68.208 | 84.35004 | nC34 |
| 43 | 70.847 | 36.68131 | nC35 |
| 44 | 74.567 | 87.62341 | nC36 |
| 45 | 77.798 | 33.30892 | nC37 |
| 46 | 82.361 | 21.99784 | nC38 |
| Totals: | | 5.32519e4 | |

Example 2

Figure 21:
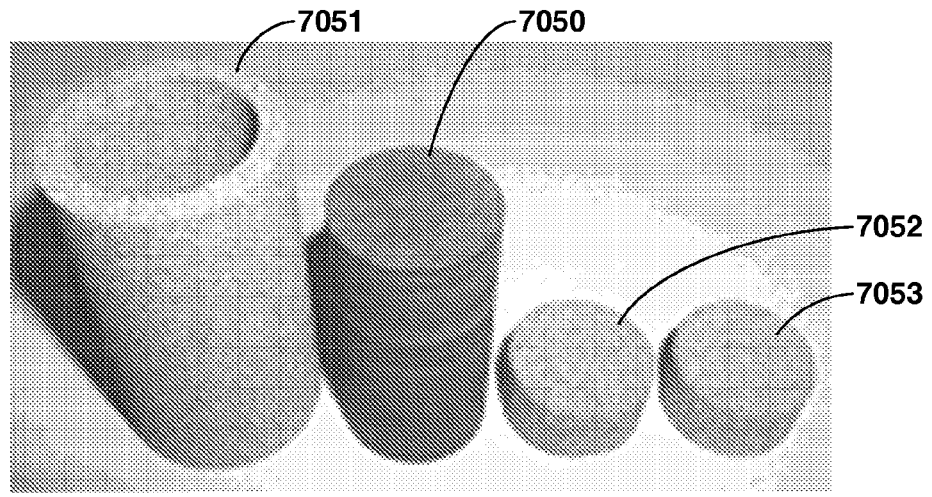
FIG. 21 is an exemplary view of a Berea cylinder, Berea plugs, and an oil shale core specimen as used in Examples 2-5.
Figure 22:
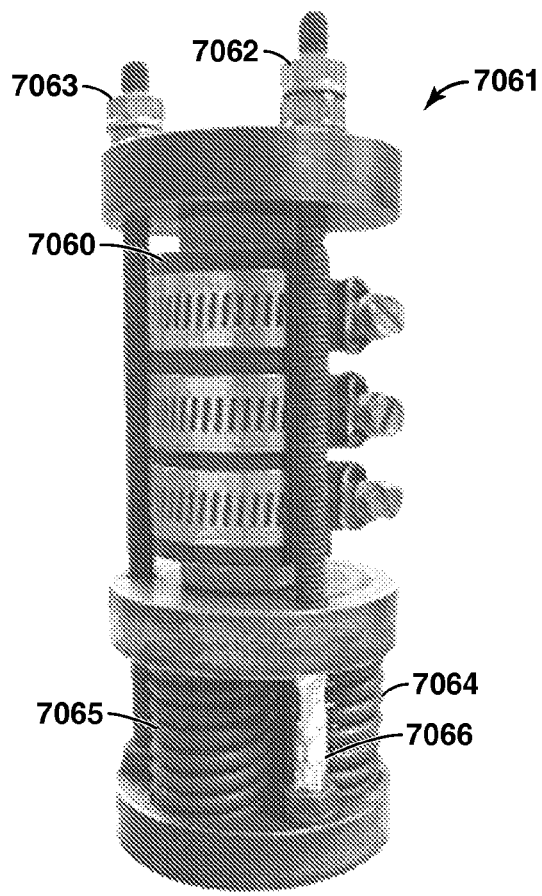
FIG. 22 is an exemplary view of the mini load frame and sample assembly used in Examples 2-5.

Oil shale block CM-1B was cored in a manner similar to that of Example 1 except that a 1 inch diameter core was created. With reference to FIG. 21, the core specimen 7050 was approximately 2 inches in length and weighed 42.47 grams. This core specimen 7050 was placed in a Berea sandstone cylinder 7051 with a 1-inch inner diameter and a 1.39 inch outer diameter. Berea plugs 7052 and 7053 were placed at each end of this assembly, so that the core specimen was completely surrounded by Berea. The Berea cylinder 7051 along with the core specimen 7050 and the Berea end plugs 7052 and 7053 were placed in a slotted stainless steel sleeve and clamped into place. The sample assembly 7060 was placed in a spring-loaded mini-load-frame 7061 as shown in FIG. 22. Load was applied by tightening the nuts 7062 and 7063 at the top of the load frame 7061 to compress the springs 7064 and 7065. The springs 7064 and 7065 were high temperature, Inconel springs, which delivered 400 psi effective stress to the oil shale specimen 7060 when compressed. Sufficient travel of the springs 7064 and 7065 remained in order to accommodate any expansion of the core specimen 7060 during the course of heating. In order to ensure that this was the case, gold foil 7066 was placed on one of the legs of the apparatus to gauge the extent of travel. The entire spring loaded apparatus 7061 was placed in the Parr vessel (FIG. 18) and the heating experiment conducted as described in Example 1.

Figure 23:
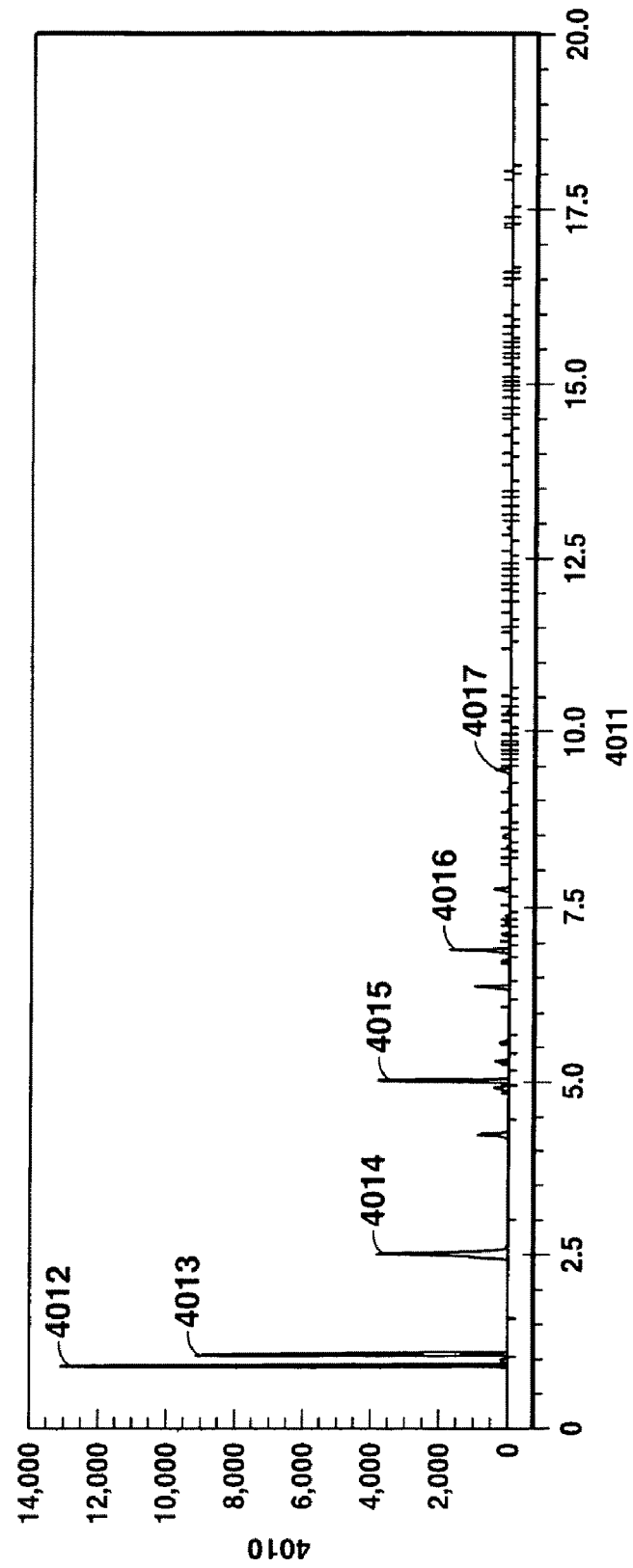
FIG. 23 is gas chromatogram of gas sampled from Example 2.

As described in Example 1, the room temperature Parr vessel was then sampled to obtain a representative portion of the gas remaining in the vessel following the heating experiment. Gas sampling, hydrocarbon gas sample gas chromatography (GC) testing, and non-hydrocarbon gas sample gas chromatography (GC) was conducted as in Example 1. Results are shown in FIG. 23, Table 4 and Table 1. In FIG. 23 the y-axis 4010 represents the detector response in pico-amperes (pA) while the x-axis 4011 represents the retention time in minutes. In FIG. 23 peak 4012 represents the response for methane, peak 4013 represents the response for ethane, peak 4014 represents the response for propane, peak 4015 represents the response for butane, peak 4016 represents the response for pentane and peak 4017 represents the response for hexane. From the gas chromatographic results and the known volumes and pressures involved the total hydrocarbon content of the gas was determined to be 1.33 grams and $CO_2$ content of the gas was 1.70 grams.

TABLE 4

Peak and area details for FIG. 23 - Example 2 - 400 psi stress - gas GC

| Peak Number | Ret Time [min] | Area [pA * s] | Name |
|---|---|---|---|
| 1 | 0.910 | 1.36178e4 | Methane |
| 2 | 0.999 | 309.65613 | ? |
| 3 | 1.077 | 1.24143e4 | Ethane |
| 4 | 2.528 | 1.41685e4 | Propane |
| 5 | 4.240 | 2103.01929 | iC4 |
| 6 | 4.917 | 1035.25513 | ? |
| 7 | 5.022 | 5689.08887 | n-Butane |
| 8 | 5.298 | 450.26572 | ? |
| 9 | 5.578 | 302.56229 | ? |
| 10 | 6.125 | 33.82201 | ? |
| 11 | 6.372 | 1136.37097 | iC5 |
| 12 | 6.736 | 263.35754 | ? |
| 13 | 6.898 | 2254.86621 | n-Pentane |
| 14 | 7.066 | 7.12101 | ? |
| 15 | 7.133 | 258.31876 | ? |
| 16 | 7.293 | 126.54671 | ? |
| 17 | 7.378 | 155.60977 | ? |
| 18 | 7.598 | 6.73467 | ? |
| 19 | 7.758 | 679.95312 | ? |
| 20 | 8.133 | 27.13466 | ? |
| 21 | 8.216 | 24.77329 | ? |
| 22 | 8.339 | 124.70064 | ? |
| 23 | 8.489 | 289.12952 | 2-methyl pentane |
| 24 | 8.644 | 19.83309 | ? |
| 25 | 8.878 | 92.18938 | ? |
| 26 | 9.184 | 102.25701 | ? |
| 27 | 9.438 | 664.42584 | n-Hexane |
| 28 | 9.549 | 2.91525 | ? |
| 29 | 9.642 | 26.86672 | ? |
| 30 | 9.705 | 49.83235 | ? |
| 31 | 9.784 | 52.11239 | ? |
| 32 | 9.843 | 9.03158 | ? |
| 33 | 9.904 | 6.18217 | ? |
| 34 | 10.004 | 24.84150 | ? |
| 35 | 10.219 | 13.21182 | ? |
| 36 | 10.292 | 158.67511 | ? |
| 37 | 10.411 | 2.49094 | ? |
| 38 | 10.566 | 3.25252 | ? |
| 39 | 11.240 | 46.79988 | ? |
| 40 | 11.478 | 29.59438 | ? |
| 41 | 11.555 | 12.84377 | ? |
| 42 | 11.809 | 38.67433 | ? |
| 43 | 11.935 | 5.68525 | ? |
| 44 | 12.096 | 31.29068 | ? |
| 45 | 12.167 | 5.84513 | ? |
| 46 | 12.297 | 15.52042 | ? |
| 47 | 12.393 | 13.54158 | ? |
| 48 | 12.483 | 30.95983 | ? |
| 49 | 12.669 | 20.21915 | ? |
| 50 | 12.929 | 229.00655 | ? |
| 51 | 13.063 | 6.38678 | ? |
| 52 | 13.196 | 10.89876 | ? |
| 53 | 13.306 | 7.91553 | ? |
| 54 | 13.435 | 5.05444 | ? |
| 55 | 13.516 | 44.42806 | ? |
| 56 | 13.894 | 20.61910 | ? |
| 57 | 14.086 | 8.32365 | ? |
| 58 | 14.313 | 2.80677 | ? |
| 59 | 14.545 | 9.18198 | ? |
| 60 | 14.605 | 4.93703 | ? |
| 61 | 14.722 | 5.06628 | ? |
| 62 | 14.865 | 46.53282 | ? |
| 63 | 14.946 | 6.55945 | ? |
| 64 | 15.010 | 2.85594 | ? |
| 65 | 15.075 | 4.05371 | ? |
| 66 | 15.131 | 9.15954 | ? |
| 67 | 15.331 | 2.16523 | ? |
| 68 | 15.421 | 3.03294 | ? |
| 69 | 15.511 | 9.73797 | ? |
| 70 | 15.562 | 5.22962 | ? |
| 71 | 15.636 | 3.73105 | ? |
| 72 | 15.771 | 54.64651 | ? |
| 73 | 15.848 | 3.95764 | ? |
| 74 | 16.010 | 3.39639 | ? |
| 75 | 16.477 | 5.49586 | ? |
| 76 | 16.552 | 6.21470 | ? |
| 77 | 16.635 | 11.08140 | ? |
| 78 | 17.257 | 2.28673 | ? |
| 79 | 17.318 | 2.82284 | ? |
| 80 | 17.433 | 11.11376 | ? |
| 81 | 17.966 | 2.54065 | ? |
| 82 | 18.090 | 14.28333 | ? |

At this point, the Parr vessel was vented to achieve atmospheric pressure, the vessel opened, and liquids collected from inside the Parr vessel. Water was separated from the hydrocarbon layer and weighed. The amount collected is noted in Table 1. The collected hydrocarbon liquids were placed in a small vial, sealed and stored in the absence of light. Any additional liquid coating the surface of the apparatus or sides of the Parr vessel was collected with a paper towel and the weight of this collected liquid added to the total liquid collected. Any liquid remaining in the Berea sandstone was extracted with methylene chloride and the weight accounted for in the liquid total reported in Table 1. The Berea sandstone cylinder and end caps were clearly blackened with organic material as a result of the heating. The organic material in the Berea was not extractable with either toluene or methylene chloride, and was therefore determined to be coke formed from the cracking of hydrocarbon liquids. After the heating experiment, the Berea was crushed and its total organic carbon (TOC) was measured. This measurement was used to estimate the amount of coke in the Berea and subsequently how much liquid must have cracked in the Berea. A constant factor of 2.283 was used to convert the TOC measured to an estimate of the amount of liquid, which must have been present to produce the carbon found in the Berea. This liquid estimated is the "inferred oil" value shown in Table 1. The solid core specimen was weighed and determined to have lost 10.29 grams as a result of heating.

Example 3

Figure 24:
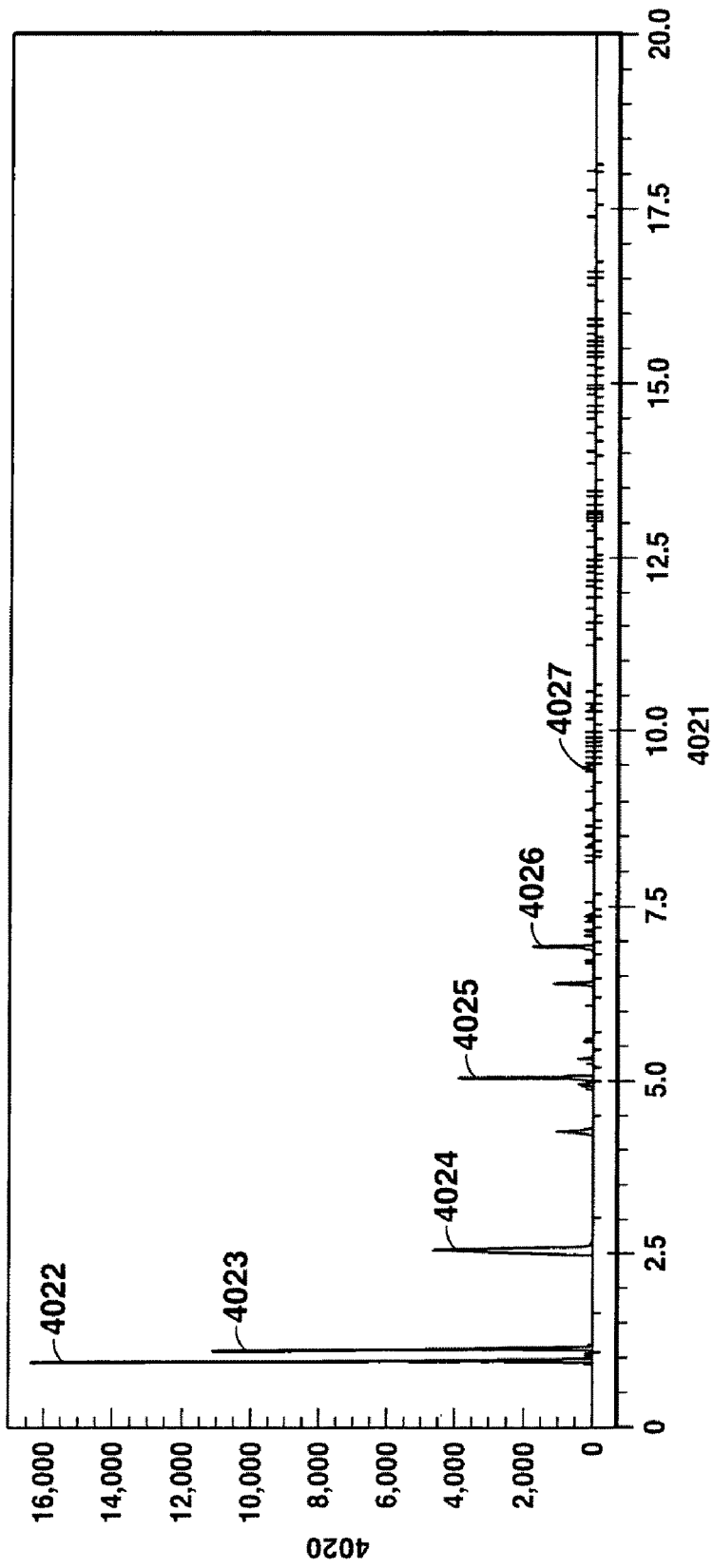
FIG. 24 is gas chromatogram of gas sampled from Example 3.
Figure 25:
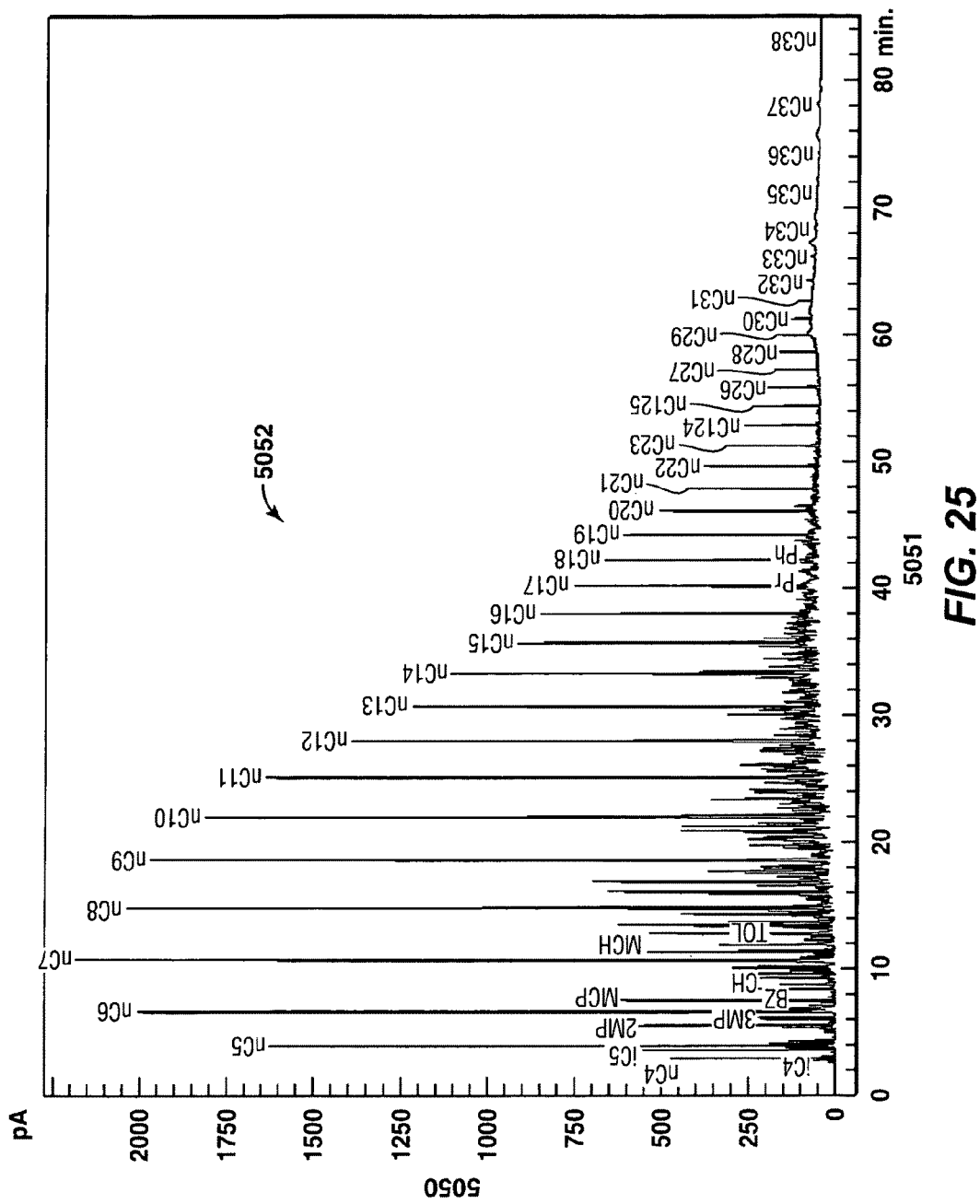
FIG. 25 is a whole oil gas chromatogram of liquid sampled from Example 3.

Conducted in a manner similar to that of Example 2 on a core specimen from oil shale block CM-1B, where the effective stress applied was 400 psi. Results for the gas sample collected and analyzed by hydrocarbon gas sample gas chromatography (GC) and non-hydrocarbon gas sample gas chromatography (GC) (GC not shown) are shown in FIG. 24, Table 5 and Table 1. In FIG. 24 the y-axis 4020 represents the detector response in pico-amperes (pA) while the x-axis 4021 represents the retention time in minutes. In FIG. 24 peak 4022 represents the response for methane, peak 4023 represents the response for ethane, peak 4024 represents the response for propane, peak 4025 represents the response for butane, peak 4026 represents the response for pentane and peak 4027 represents the response for hexane. Results for the liquid collected and analyzed by whole oil gas chromatography (WOGC) analysis are shown in FIG. 25, Table 6 and Table 1. In FIG. 25 the y-axis 5050 represents the detector response in pico-amperes (pA) while the x-axis 5051 represents the retention time in minutes. The GC chromatogram is shown generally by label 5052 with individual identified peaks labeled with abbreviations.

TABLE 5

Peak and area details for FIG. 24 - Example 3 - 400 psi stress - gas GC

| Peak Number | Ret Time [min] | Area [pA * s] | Name |
|---|---|---|---|
| 1 | 0.910 | 1.71356e4 | Methane |
| 2 | 0.998 | 341.71646 | ? |
| 3 | 1.076 | 1.52621e4 | Ethane |
| 4 | 2.534 | 1.72319e4 | Propane |
| 5 | 4.242 | 2564.04077 | iC4 |
| 6 | 4.919 | 1066.90942 | ? |
| 7 | 5.026 | 6553.25244 | n-Butane |
| 8 | 5.299 | 467.88803 | ? |
| 9 | 5.579 | 311.65158 | ? |
| 10 | 6.126 | 33.61063 | ? |
| 11 | 6.374 | 1280.77869 | iC5 |
| 12 | 6.737 | 250.05510 | ? |
| 13 | 6.900 | 2412.40918 | n-Pentane |
| 14 | 7.134 | 249.80679 | ? |
| 15 | 7.294 | 122.60424 | ? |
| 16 | 7.379 | 154.40988 | ? |
| 17 | 7.599 | 6.87471 | ? |
| 18 | 8.132 | 25.50270 | ? |
| 19 | 8.216 | 22.33015 | ? |
| 20 | 8.339 | 129.17023 | ? |
| 21 | 8.490 | 304.97903 | 2-methyl pentane |
| 22 | 8.645 | 18.48411 | ? |
| 23 | 8.879 | 98.23043 | ? |
| 24 | 9.187 | 89.71329 | ? |
| 25 | 9.440 | 656.02161 | n-Hexane |
| 26 | 9.551 | 3.05892 | ? |
| 27 | 9.645 | 25.34058 | ? |
| 28 | 9.708 | 45.14915 | ? |
| 29 | 9.786 | 48.62077 | ? |
| 30 | 9.845 | 10.03335 | ? |
| 31 | 9.906 | 5.43165 | ? |
| 32 | 10.007 | 22.33582 | ? |
| 33 | 10.219 | 16.02756 | ? |
| 34 | 10.295 | 196.43715 | ? |
| 35 | 10.413 | 2.98115 | ? |
| 36 | 10.569 | 3.88067 | ? |
| 37 | 11.243 | 41.63386 | ? |
| 38 | 11.482 | 28.44063 | ? |
| 39 | 11.558 | 12.05196 | ? |
| 40 | 11.812 | 37.83630 | ? |
| 41 | 11.938 | 5.45990 | ? |
| 42 | 12.100 | 31.03111 | ? |
| 43 | 12.170 | 4.91053 | ? |
| 44 | 12.301 | 15.75041 | ? |
| 45 | 12.397 | 13.75454 | ? |
| 46 | 12.486 | 30.26099 | ? |
| 47 | 12.672 | 15.14775 | ? |
| 48 | 12.931 | 207.50433 | ? |
| 49 | 13.064 | 3.35393 | ? |
| 50 | 13.103 | 3.04880 | ? |
| 51 | 13.149 | 1.62203 | ? |
| 52 | 13.198 | 7.97665 | ? |
| 53 | 13.310 | 7.49605 | ? |
| 54 | 13.437 | 4.64921 | ? |
| 55 | 13.519 | 41.82572 | ? |
| 56 | 13.898 | 19.01739 | ? |
| 57 | 14.089 | 7.34498 | ? |
| 58 | 14.316 | 2.68912 | ? |
| 59 | 14.548 | 8.29593 | ? |
| 60 | 14.608 | 3.93147 | ? |
| 61 | 14.725 | 4.75483 | ? |
| 62 | 14.869 | 40.93447 | ? |
| 63 | 14.949 | 5.30140 | ? |
| 64 | 15.078 | 5.79979 | ? |
| 65 | 15.134 | 7.95179 | ? |
| 66 | 15.335 | 1.91589 | ? |
| 67 | 15.423 | 2.75893 | ? |
| 68 | 15.515 | 8.64343 | ? |
| 69 | 15.565 | 3.76481 | ? |
| 70 | 15.639 | 3.41854 | ? |
| 71 | 15.774 | 45.59035 | ? |
| 72 | 15.850 | 3.73501 | ? |
| 73 | 16.014 | 5.84199 | ? |
| 74 | 16.480 | 4.87036 | ? |
| 75 | 16.555 | 5.12607 | ? |
| 76 | 16.639 | 9.97469 | ? |
| 77 | 17.436 | 8.00434 | ? |
| 78 | 17.969 | 3.86749 | ? |
| 79 | 18.093 | 9.71661 | ? |

TABLE 6

Peak and area details from FIG. 25 - Example 3 - 400 psi stress - liquid GC.

| Peak # | Ret Time [min] | Peak Area [pA * s] | Compound Name |
|---|---|---|---|
| 1 | 2.744 | 102.90978 | iC4 |
| 2 | 2.907 | 817.57861 | nC4 |
| 3 | 3.538 | 1187.01831 | iC5 |
| 4 | 3.903 | 3752.84326 | nC5 |
| 5 | 5.512 | 1866.25342 | 2MP |
| 6 | 5.950 | 692.18964 | 3MP |
| 7 | 6.580 | 6646.48242 | nC6 |
| 8 | 7.475 | 2117.66919 | MCP |
| 9 | 8.739 | 603.21204 | BZ |
| 10 | 9.230 | 1049.96240 | CH |
| 11 | 10.668 | 9354.29590 | nC7 |
| 12 | 11.340 | 2059.10303 | MCH |
| 13 | 12.669 | 689.82861 | TOL |
| 14 | 14.788 | 8378.59375 | nC8 |
| 15 | 18.534 | 7974.54883 | nC9 |
| 16 | 21.938 | 7276.47705 | nC10 |
| 17 | 25.063 | 6486.47998 | nC11 |
| 18 | 27.970 | 5279.17187 | nC12 |
| 19 | 30.690 | 4451.49902 | nC13 |
| 20 | 33.254 | 4156.73389 | nC14 |
| 21 | 35.672 | 3345.80273 | nC15 |
| 22 | 37.959 | 3219.63745 | nC16 |
| 23 | 40.137 | 2708.28003 | nC17 |
| 24 | 40.227 | 219.38252 | Pr |
| 25 | 42.203 | 2413.01929 | nC18 |
| 26 | 42.455 | 317.17825 | Ph |
| 27 | 44.173 | 2206.65405 | nC19 |
| 28 | 46.056 | 1646.56616 | nC20 |
| 29 | 47.858 | 1504.49097 | nC21 |
| 30 | 49.579 | 1069.23608 | nC22 |
| 31 | 51.234 | 949.49316 | nC23 |
| 32 | 52.823 | 719.34735 | nC24 |
| 33 | 54.355 | 627.46436 | nC25 |
| 34 | 55.829 | 483.81885 | nC26 |

TABLE 6-continued

Peak and area details from FIG. 25 - Example 3 - 400 psi stress - liquid GC.

| Peak # | Ret Time [min] | Peak Area [pA * s] | Compound Name |
|---|---|---|---|
| 35 | 57.253 | 407.86371 | nC27 |
| 36 | 58.628 | 358.52216 | nC28 |
| 37 | 59.956 | 341.01791 | nC29 |
| 38 | 61.245 | 214.87863 | nC30 |
| 39 | 62.647 | 146.06461 | nC31 |
| 40 | 64.259 | 127.66831 | nC32 |
| 41 | 66.155 | 85.17574 | nC33 |
| 42 | 68.403 | 64.29253 | nC34 |
| 43 | 71.066 | 56.55088 | nC35 |
| 44 | 74.282 | 28.61854 | nC36 |
| 45 | 78.140 | 220.95929 | nC37 |
| 46 | 83.075 | 26.95426 | nC38 |
| Totals: | | 9.84518e4 | |

Example 4

Figure 26:
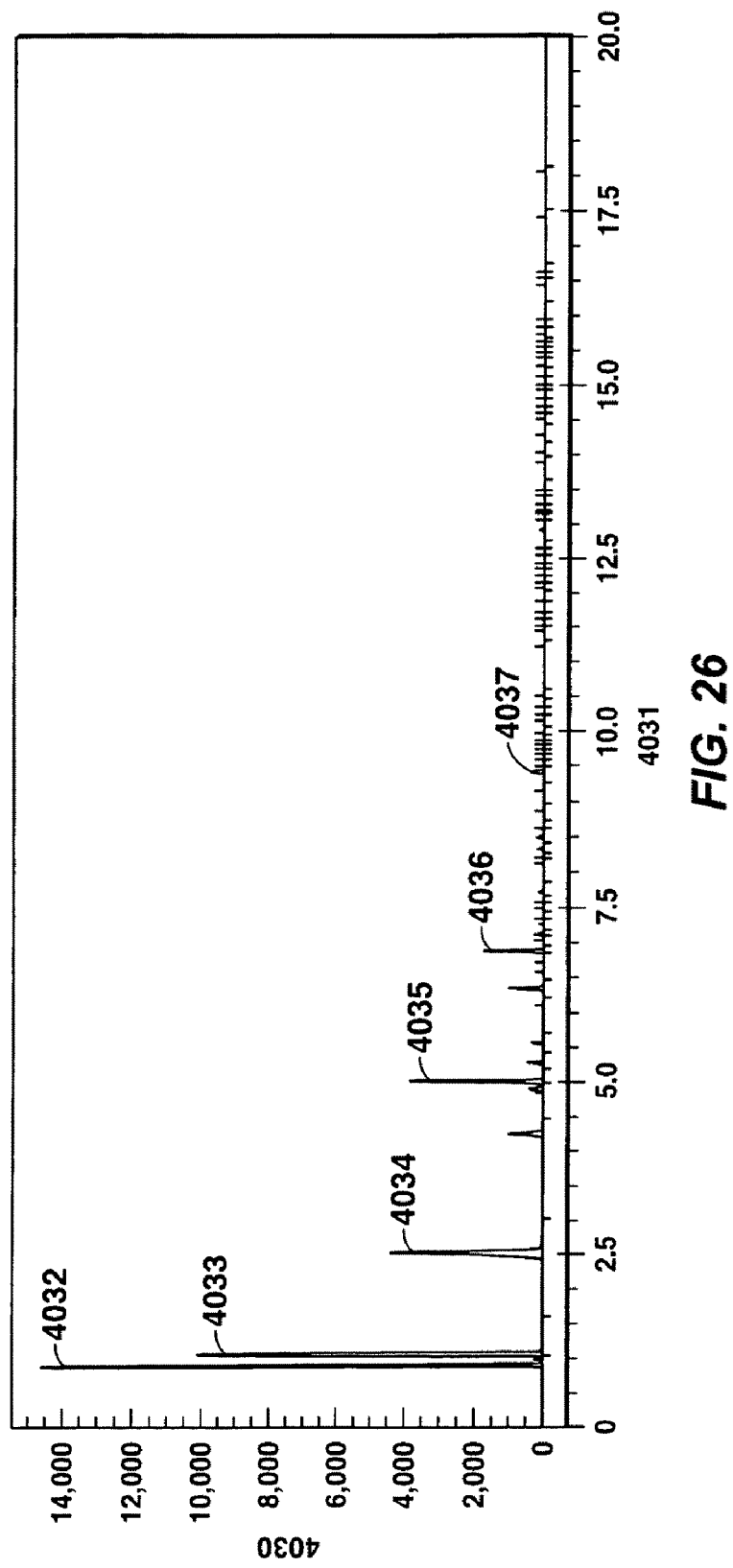
FIG. 26 is gas chromatogram of gas sampled from Example 4.
Figure 27:
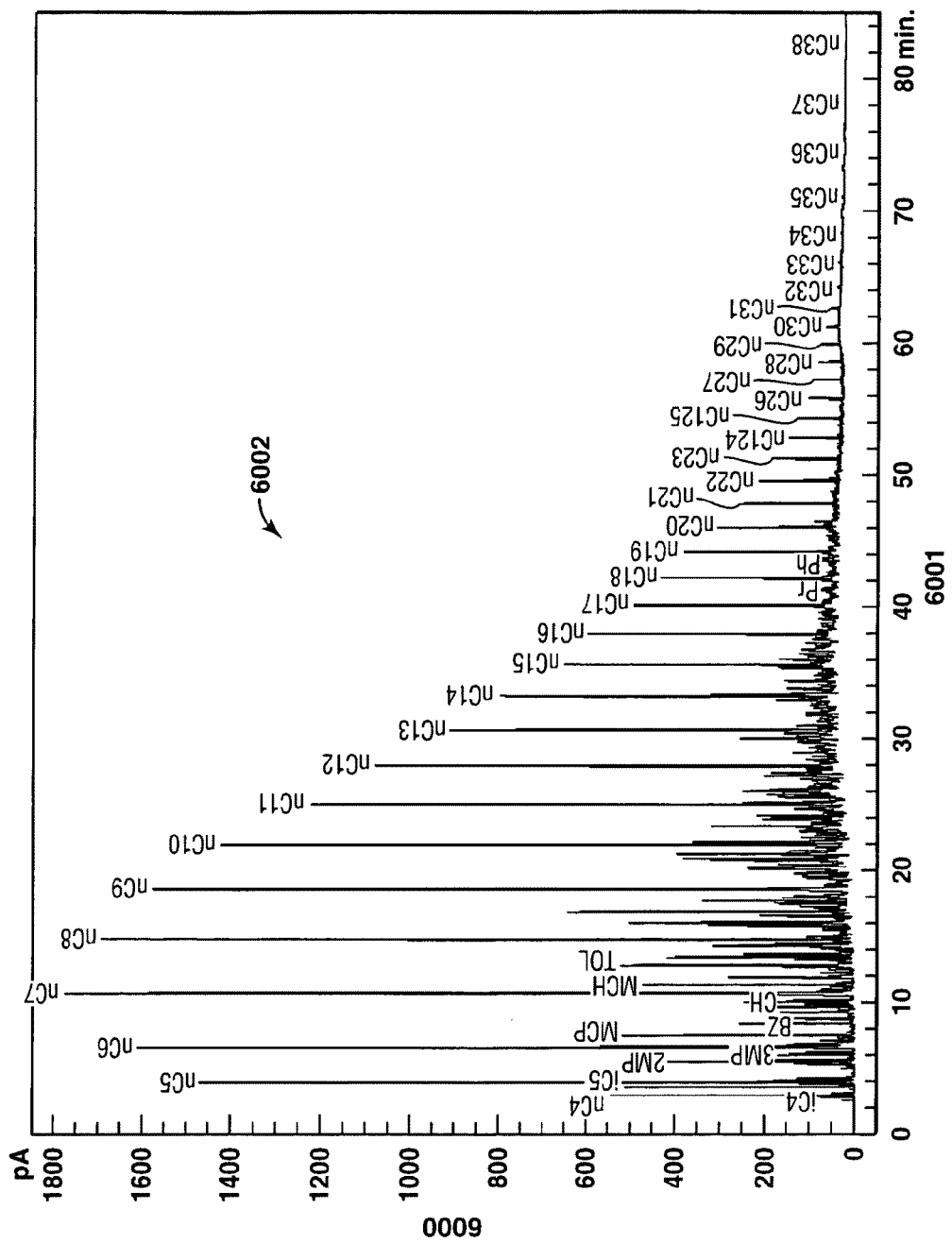
FIG. 27 is a whole oil gas chromatogram of liquid sampled from Example 4.

Conducted in a manner similar to that of Example 2 on a core specimen from oil shale block CM-1B; however, in this example the applied effective stress was 1,000 psi. Results for the gas collected and analyzed by hydrocarbon gas sample gas chromatography (GC) and non-hydrocarbon gas sample gas chromatography (GC) (GC not shown) are shown in FIG. 26, Table 7 and Table 1. In FIG. 26 the y-axis 4030 represents the detector response in pico-amperes (pA) while the x-axis 4031 represents the retention time in minutes. In FIG. 26 peak 4032 represents the response for methane, peak 4033 represents the response for ethane, peak 4034 represents the response for propane, peak 4035 represents the response for butane, peak 4036 represents the response for pentane and peak 4037 represents the response for hexane. Results for the liquid collected and analyzed by whole oil gas chromatography (WOGC) are shown in FIG. 27, Table 8 and Table 1. In FIG. 27 the y-axis 6000 represents the detector response in pico-amperes (pA) while the x-axis 6001 represents the retention time in minutes. The GC chromatogram is shown generally by label 6002 with individual identified peaks labeled with abbreviations.

TABLE 7

Peak and area details for FIG. 26 - Example 4 - 1000 psi stress - gas GC

| Peak Number | Ret Time [min] | Area [pA * s] | Name |
|---|---|---|---|
| 1 | 0.910 | 1.43817e4 | Methane |
| 2 | 1.000 | 301.69287 | ? |
| 3 | 1.078 | 1.37821e4 | Ethane |
| 4 | 2.541 | 1.64047e4 | Propane |
| 5 | 4.249 | 2286.08032 | iC4 |
| 6 | 4.924 | 992.04395 | ? |
| 7 | 5.030 | 6167.50000 | n-Butane |
| 8 | 5.303 | 534.37000 | ? |
| 9 | 5.583 | 358.96567 | ? |
| 10 | 6.131 | 27.44937 | ? |
| 11 | 6.376 | 1174.68872 | iC5 |
| 12 | 6.740 | 223.61662 | ? |
| 13 | 6.902 | 2340.79248 | n-Pentane |
| 14 | 7.071 | 5.29245 | ? |
| 15 | 7.136 | 309.94775 | ? |
| 16 | 7.295 | 154.59171 | ? |
| 17 | 7.381 | 169.53279 | ? |
| 18 | 7.555 | 2.80458 | ? |
| 19 | 7.601 | 5.22537 | ? |
| 20 | 7.751 | 117.69164 | ? |

TABLE 7-continued

Peak and area details for FIG. 26 - Example 4 - 1000 psi stress - gas GC

| Peak Number | Ret Time [min] | Area [pA * s] | Name |
|---|---|---|---|
| 21 | 8.134 | 29.41086 | ? |
| 22 | 8.219 | 19.39338 | ? |
| 23 | 8.342 | 133.52739 | ? |
| 24 | 8.492 | 281.61343 | 2-methyl pentane |
| 25 | 8.647 | 22.19704 | ? |
| 26 | 8.882 | 99.56919 | ? |
| 27 | 9.190 | 86.65676 | ? |
| 28 | 9.443 | 657.28754 | n-Hexane |
| 29 | 9.552 | 4.12572 | ? |
| 30 | 9.646 | 34.33701 | ? |
| 31 | 9.710 | 59.12064 | ? |
| 32 | 9.788 | 62.97972 | ? |
| 33 | 9.847 | 15.13559 | ? |
| 34 | 9.909 | 6.88310 | ? |
| 35 | 10.009 | 29.11555 | ? |
| 36 | 10.223 | 23.65434 | ? |
| 37 | 10.298 | 173.95422 | ? |
| 38 | 10.416 | 3.37255 | ? |
| 39 | 10.569 | 7.64592 | ? |
| 40 | 11.246 | 47.30062 | ? |
| 41 | 11.485 | 32.04262 | ? |
| 42 | 11.560 | 13.74583 | ? |
| 43 | 11.702 | 2.68917 | ? |
| 44 | 11.815 | 36.51670 | ? |
| 45 | 11.941 | 6.45255 | ? |
| 46 | 12.103 | 28.44484 | ? |
| 47 | 12.172 | 5.96475 | ? |
| 48 | 12.304 | 17.59856 | ? |
| 49 | 12.399 | 15.17446 | ? |
| 50 | 12.490 | 31.96492 | ? |
| 51 | 12.584 | 3.27834 | ? |
| 52 | 12.675 | 14.08259 | ? |
| 53 | 12.934 | 207.21574 | ? |
| 54 | 13.105 | 8.29743 | ? |
| 55 | 13.151 | 2.25476 | ? |
| 56 | 13.201 | 8.36965 | ? |
| 57 | 13.312 | 9.49917 | ? |
| 58 | 13.436 | 6.09893 | ? |
| 59 | 13.521 | 46.34579 | ? |
| 60 | 13.900 | 20.53506 | ? |
| 61 | 14.090 | 8.41120 | ? |
| 62 | 14.318 | 4.36870 | ? |
| 63 | 14.550 | 8.68951 | ? |
| 64 | 14.610 | 4.39150 | ? |
| 65 | 14.727 | 4.35713 | ? |
| 66 | 14.870 | 37.17881 | ? |
| 67 | 14.951 | 5.78219 | ? |
| 68 | 15.080 | 5.54470 | ? |
| 69 | 15.136 | 8.07308 | ? |
| 70 | 15.336 | 2.07075 | ? |
| 71 | 15.425 | 2.67118 | ? |
| 72 | 15.516 | 8.47004 | ? |
| 73 | 15.569 | 3.89987 | ? |
| 74 | 15.641 | 3.96979 | ? |
| 75 | 15.776 | 40.75155 | ? |
| 76 | 16.558 | 5.06379 | ? |
| 77 | 16.641 | 8.43767 | ? |
| 78 | 17.437 | 6.00180 | ? |
| 79 | 18.095 | 7.66881 | ? |
| 80 | 15.853 | 3.97375 | ? |
| 81 | 16.016 | 5.68997 | ? |
| 82 | 16.482 | 3.27234 | ? |

TABLE 8

Peak and area details from FIG. 27 - Example 4 - 1000 psi stress - liquid GC

| Peak Number | Ret Time [min] | Peak Area [pA * s] | Compound Name |
|---|---|---|---|
| 1 | 2.737 | 117.78948 | iC4 |
| 2 | 2.901 | 923.40125 | nC4 |
| 3 | 3.528 | 1079.83325 | iC5 |
| 4 | 3.891 | 3341.44604 | nC5 |
| 5 | 5.493 | 1364.53186 | 2MP |
| 6 | 5.930 | 533.68530 | 3MP |
| 7 | 6.552 | 5160.12207 | nC6 |
| 8 | 7.452 | 1770.29932 | MCP |
| 9 | 8.717 | 487.04718 | BZ |
| 10 | 9.206 | 712.61566 | CH |
| 11 | 10.634 | 7302.51123 | nC7 |
| 12 | 11. | 1755.92236 | MCH |
| 13 | 12.760 | 2145.57666 | TOL |
| 14 | 14.755 | 6434.40430 | nC8 |
| 15 | 18.503 | 6007.12891 | nC9 |
| 16 | 21.906 | 5417.67480 | nC10 |
| 17 | 25.030 | 4565.11084 | nC11 |
| 18 | 27.936 | 3773.91943 | nC12 |
| 19 | 30.656 | 3112.23950 | nC13 |
| 20 | 33.220 | 2998.37720 | nC14 |
| 21 | 35.639 | 2304.97632 | nC15 |
| 22 | 37.927 | 2197.88892 | nC16 |
| 23 | 40.102 | 1791.11877 | nC17 |
| 24 | 40.257 | 278.39423 | Pr |
| 25 | 42.171 | 1589.64233 | nC18 |
| 26 | 42.428 | 241.65131 | Ph |
| 27 | 44.141 | 1442.51843 | nC19 |
| 28 | 46.025 | 1031.68481 | nC20 |
| 29 | 47.825 | 957.65479 | nC21 |
| 30 | 49.551 | 609.59943 | nC22 |
| 31 | 51.208 | 526.53339 | nC23 |
| 32 | 52.798 | 383.01022 | nC24 |
| 33 | 54.329 | 325.93640 | nC25 |
| 34 | 55.806 | 248.12935 | nC26 |
| 35 | 57.230 | 203.21725 | nC27 |
| 36 | 58.603 | 168.78055 | nC28 |
| 37 | 59.934 | 140.40034 | nC29 |
| 38 | 61.222 | 95.47594 | nC30 |
| 39 | 62.622 | 77.49546 | nC31 |
| 40 | 64.234 | 49.08135 | nC32 |
| 41 | 66.114 | 33.61663 | nC33 |
| 42 | 68.350 | 27.46170 | nC34 |
| 43 | 71.030 | 35.89277 | nC35 |
| 44 | 74.162 | 16.87499 | nC36 |
| 45 | 78.055 | 29.21477 | nC37 |
| 46 | 82.653 | 9.88631 | nC38 |
| Totals: | | 7.38198e4 | |

TABLE 9

Figure 28:
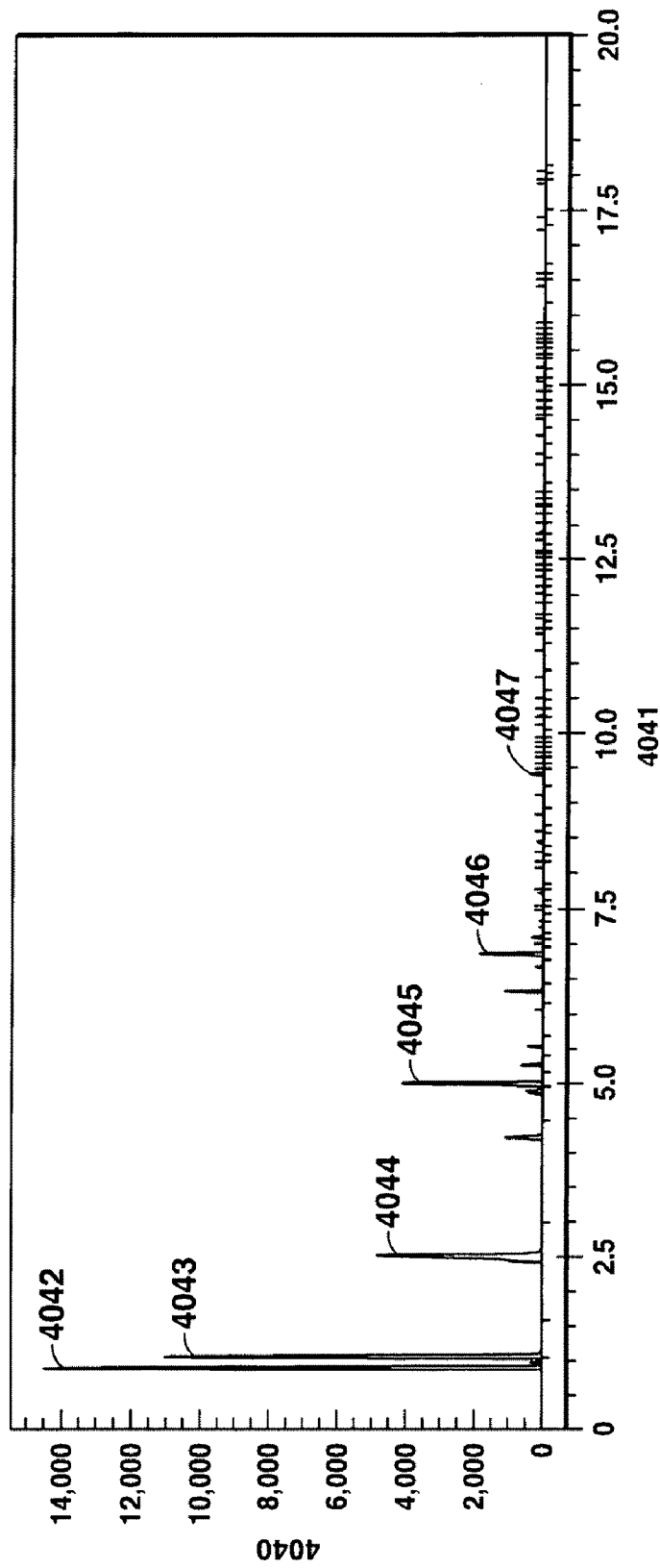
FIG. 28 is gas chromatogram of gas sampled from Example 5.

Peak and area details for FIG. 28 - Example 5 - 1000 psi stress - gas GC

| Peak Number | Ret Time [min] | Area [pA * s] | Name |
|---|---|---|---|
| 1 | 0.910 | 1.59035e4 | Methane |
| 2 | 0.999 | 434.21375 | ? |
| 3 | 1.077 | 1.53391e4 | Ethane |
| 4 | 2.537 | 1.86530e4 | Propane |
| 5 | 4.235 | 2545.45850 | iC4 |
| 6 | 4.907 | 1192.68970 | ? |
| 7 | 5.015 | 6814.44678 | n-Butane |
| 8 | 5.285 | 687.83679 | ? |
| 9 | 5.564 | 463.25885 | ? |
| 10 | 6.106 | 30.02624 | ? |
| 11 | 6.351 | 1295.13477 | iC5 |
| 12 | 6.712 | 245.26985 | ? |
| 13 | 6.876 | 2561.11792 | n-Pentane |
| 14 | 7.039 | 4.50998 | ? |
| 15 | 7.109 | 408.32999 | ? |
| 16 | 7.268 | 204.45311 | ? |
| 17 | 7.354 | 207.92183 | ? |
| 18 | 7.527 | 4.02397 | ? |
| 19 | 7.574 | 5.65699 | ? |
| 20 | 7.755 | 2.35952 | ? |
| 21 | 7.818 | 2.00382 | ? |
| 22 | 8.107 | 38.23093 | ? |
| 23 | 8.193 | 20.54333 | ? |
| 24 | 8.317 | 148.54445 | ? |
| 25 | 8.468 | 300.31586 | 2-methyl pentane |
| 26 | 8.622 | 26.06131 | ? |
| 27 | 8.858 | 113.70123 | ? |
| 28 | 9.168 | 90.37163 | ? |
| 29 | 9.422 | 694.74438 | n-Hexane |
| 30 | 9.531 | 4.88323 | ? |
| 31 | 9.625 | 45.91505 | ? |
| 32 | 9.689 | 76.32931 | ? |
| 33 | 9.767 | 77.63214 | ? |
| 34 | 9.826 | 19.23768 | ? |
| 35 | 9.889 | 8.54605 | ? |
| 36 | 9.989 | 37.74959 | ? |
| 37 | 10.204 | 30.83943 | ? |
| 38 | 10.280 | 184.58420 | ? |
| 39 | 10.397 | 4.43609 | ? |
| 40 | 10.551 | 10.59880 | ? |
| 41 | 10.843 | 2.30370 | ? |
| 42 | 11.231 | 55.64666 | ? |
| 43 | 11.472 | 35.46931 | ? |
| 44 | 11.547 | 17.16440 | ? |
| 45 | 11.691 | 3.30460 | ? |
| 46 | 11.804 | 39.46368 | ? |
| 47 | 11.931 | 7.32969 | ? |
| 48 | 12.094 | 30.59748 | ? |
| 49 | 12.163 | 6.93754 | ? |
| 50 | 12.295 | 18.69523 | ? |
| 51 | 12.391 | 15.96837 | ? |
| 52 | 12.482 | 33.66422 | ? |
| 53 | 12.577 | 2.02121 | ? |
| 54 | 12.618 | 2.32440 | ? |
| 55 | 12.670 | 12.83803 | ? |
| 56 | 12.851 | 2.22731 | ? |
| 57 | 12.929 | 218.23195 | ? |
| 58 | 13.100 | 14.33166 | ? |
| 59 | 13.198 | 10.20244 | ? |
| 60 | 13.310 | 12.02551 | ? |
| 61 | 13.432 | 8.23884 | ? |
| 62 | 13.519 | 47.64641 | ? |
| 63 | 13.898 | 22.63760 | ? |
| 64 | 14.090 | 9.29738 | ? |
| 65 | 14.319 | 3.88012 | ? |
| 66 | 14.551 | 9.26884 | ? |
| 67 | 14.612 | 4.34914 | ? |
| 68 | 14.729 | 4.07543 | ? |
| 69 | 14.872 | 46.24465 | ? |
| 70 | 14.954 | 6.62461 | ? |
| 71 | 15.084 | 3.92423 | ? |
| 72 | 15.139 | 8.60328 | ? |
| 73 | 15.340 | 2.17899 | ? |
| 74 | 15.430 | 2.96646 | ? |

Example 5

Conducted in a manner similar to that of Example 2 on a core specimen from oil shale block CM-1B; however, in this example the applied effective stress was 1,000 psi. Results for the gas collected and analyzed by hydrocarbon gas sample gas chromatography (GC) and non-hydrocarbon gas sample gas chromatography (GC) (GC not shown) are shown in FIG. 28, Table 9 and Table 1. In FIG. 28 the y-axis 4040 represents the detector response in pico-amperes (pA) while the x-axis 4041 represents the retention time in minutes. In FIG. 28 peak 4042 represents the response for methane, peak 4043 represents the response for ethane, peak 4044 represents the response for propane, peak 4045 represents the response for butane, peak 4046 represents the response for pentane and peak 4047 represents the response for hexane.

TABLE 9-continued

Peak and area details for FIG. 28 - Example 5 - 1000 psi stress - gas GC

| Peak Number | Ret Time [min] | Area [pA * s] | Name |
|---|---|---|---|
| 75 | 15.521 | 9.66407 | ? |
| 76 | 15.578 | 4.27190 | ? |
| 77 | 15.645 | 4.37904 | ? |
| 78 | 15.703 | 2.68909 | ? |
| 79 | 15.782 | 46.97895 | ? |
| 80 | 15.859 | 4.69475 | ? |
| 81 | 16.022 | 7.36509 | ? |
| 82 | 16.489 | 3.91073 | ? |
| 83 | 16.564 | 6.22445 | ? |
| 84 | 16.648 | 10.24660 | ? |
| 85 | 17.269 | 2.69753 | ? |
| 86 | 17.445 | 10.16989 | ? |
| 87 | 17.925 | 2.28341 | ? |
| 88 | 17.979 | 2.71101 | ? |
| 89 | 18.104 | 11.19730 | ? |

TABLE 1

Summary data for Examples 1-5

| | Example 1 | Example 2 | Example 3 | Example 4 | Example 5 |
|---|---|---|---|---|---|
| Effective Stress (psi) | 0 | 400 | 400 | 1000 | 1000 |
| Sample weight (g) | 82.46 | 42.57 | 48.34 | 43.61 | 43.73 |
| Sample weight loss (g) | 19.21 | 10.29 | 11.41 | 10.20 | 9.17 |
| Fluids Recovered: | | | | | |
| Oil (g) | 10.91 | 3.63 | 3.77 | 3.02 | 2.10 |
| | 36.2 gal/ton | 23.4 gal/ton | 21.0 gal/ton | 19.3 gal/ton | 13/1 gal/ton |
| Water (g) | 0.90 | 0.30 | 0.34 | 0.39 | 0.28 |
| | 2.6 gal/ton | 1.7 gal/ton | 1.7 gal/ton | 2.1 gal/ton | 1.5 gal/ton |
| HC gas (g) | 2.09 | 1.33 | 1.58 | 1.53 | 1.66 |
| | 683 scf/ton | 811 scf/ton | 862 scf/ton | 905 scf/ton | 974 scf/ton |
| $CO_2$ (g) | 3.35 | 1.70 | 1.64 | 1.74 | 1.71 |
| | 700 scf/ton | 690 scf/ton | 586 scf/ton | 690 scf/ton | 673 scf/ton |
| $H_2S$ (g) | 0.06 | 0.0 | 0.0 | 0.0 | 0.0 |
| Coke Recovered: | 0.0 | 0.73 | 0.79 | .47 | 0.53 |
| Inferred Oil (g) | 0.0 | 1.67 | 1.81 | 1.07 | 1.21 |
| | 0 gal/ton | 10.8 gal/ton | 10.0 gal/ton | 6.8 gal/ton | 7.6 gal/ton |
| Total Oil (g) | 10.91 | 5.31 | 5.58 | 4.09 | 3.30 |
| | 36.2 gal/ton | 34.1 gal/ton | 31.0 gal/ton | 26.1 gal/ton | 20.7 gal/ton |
| Balance (g) | 1.91 | 2.59 | 3.29 | 3.05 | 2.91 |

Analysis

The gas and liquid samples obtained through the experimental procedures and gas and liquid sample collection procedures described for Examples 1-5, were analyzed by the following hydrocarbon gas sample gas chromatography (GC) analysis methodology, non-hydrocarbon gas sample gas chromatography (GC) analysis methodology, gas sample GC peak identification and integration methodology, whole oil gas chromatography (WOGC) analysis methodology, and whole oil gas chromatography (WOGC) peak identification and integration methodology.

Gas samples collected during the heating tests as described in Examples 1-5 were analyzed for both hydrocarbon and non-hydrocarbon gases, using an Agilent Model 6890 Gas Chromatograph coupled to an Agilent Model 5973 quadrapole mass selective detector. The 6890 GC was configured with two inlets (front and back) and two detectors (front and back) with two fixed volume sample loops for sample introduction. Peak identifications and integrations were performed using the Chemstation software (Revision A.03.01) supplied with the GC instrument. For hydrocarbon gases, the GC configuration consisted of the following:

a) split/splitless inlet (back position of the GC)
b) FID (Flame ionization detector) back position of the GC
c) HP Ultra-2 (5% Phenyl Methyl Siloxane) capillary columns (two) (25 meters×200 μm ID) one directed to the FID detector, the other to an Agilent 5973 Mass Selective Detector
d) 500 μl fixed volume sample loop
e) six-port gas sampling valve
f) cryogenic (liquid nitrogen) oven cooling capability
g) Oven program −80° C. for 2 mins., 20° C./min. to 0° C., then 4° C./min to 20° C., then 10° C./min. to 100° C., hold for 1 min.
h) Helium carrier gas flow rate of 2.2 ml/min
i) Inlet temperature 100° C.
j) Inlet pressure 19.35 psi
k) Split ratio 25:1
l) FID temperature 310° C.

For non-hydrocarbon gases (e.g., argon, carbon dioxide and hydrogen sulfide) the GC configuration consisted of the following:

a) PTV (programmable temperature vaporization) inlet (front position of the GC)
b) TCD (Thermal conductivity detector) front position of the GC
c) GS-GasPro capillary column (30 meters×0.32 mm ID)
d) 100 μl fixed volume sample loop
e) six port gas sampling valve
f) Oven program: 25° C. hold for 2 min., then 10° C./min to 200° C., hold 1 min.
g) Helium carrier gas flow rate of 4.1 ml/min.
h) Inlet temperature 200° C.
i) Inlet pressure 14.9 psi
j) Splitless mode
k) TCD temperature 250° C.

For Examples 1-5, a stainless steel sample cylinder containing gas collected from the Parr vessel (FIG. 18) was fitted with a two stage gas regulator (designed for lecture bottle use) to reduce gas pressure to approximately twenty pounds per square inch. A septum fitting was positioned at the outlet port of the regulator to allow withdrawal of gas by means of a Hamilton model 1005 gas-tight syringe. Both the septum fitting and the syringe were purged with gas from the stainless steel sample cylinder to ensure that a representative gas sample was collected. The gas sample was then transferred to a stainless steel cell (septum cell) equipped with a pressure transducer and a septum fitting. The septum cell was connected to the fixed volume sample loop mounted on the GC by stainless steel capillary tubing. The septum cell and sample loop were evacuated for approximately 5 minutes. The evacuated septum cell was then isolated from the evacuated sample loop by closure of a needle valve positioned at the outlet of the septum cell. The gas sample was introduced into the septum cell from the gas-tight syringe through the septum fitting and a pressure recorded. The evacuated sample loop was then opened to the pressurized septum cell and the gas sample allowed to equilibrate between the sample loop and the septum cell for one minute. The equilibrium pressure was then recorded, to allow calculation of the total moles of gas present in the sample loop before injection into the GC inlet. The sample loop contents were then swept into the inlet by Helium carrier gas and components separated by retention time in the capillary column, based upon the GC oven temperature program and carrier gas flow rates.

Calibration curves, correlating integrated peak areas with concentration, were generated for quantification of gas compositions using certified gas standards. For hydrocarbon gases, standards containing a mixture of methane, ethane, propane, butane, pentane and hexane in a helium matrix in varying concentrations (parts per million, mole basis) were injected into the GC through the fixed volume sample loop at atmospheric pressure. For non-hydrocarbon gases, standards containing individual components, i.e., carbon dioxide in helium and hydrogen sulfide in natural gas, were injected into the GC at varying pressures in the sample loop to generate calibration curves.

The hydrocarbon gas sample molar percentages reported in FIG. 16 were obtained using the following procedure. Gas standards for methane, ethane, propane, butane, pentane and hexane of at least three varying concentrations were run on the gas chromatograph to obtain peak area responses for such standard concentrations. The known concentrations were then correlated to the respective peak area responses within the Chemstation software to generate calibration curves for methane, ethane, propane, butane, pentane and hexane. The calibration curves were plotted in Chemstation to ensure good linearity (R2>0.98) between concentration and peak intensity. A linear fit was used for each calibrated compound, so that the response factor between peak area and molar concentration was a function of the slope of the line as determined by the Chemstation software. The Chemstation software program then determined a response factor relating GC peak area intensity to the amount of moles for each calibrated compound. The software then determined the number of moles of each calibrated compound from the response factor and the peak area. The peak areas used in Examples 1-5 are reported in Tables 2, 4, 5, 7, and 9. The number of moles of each identified compound for which a calibration curve was not determined (i.e., iso-butane, iso-pentane, and 2-methyl pentane) was then estimated using the response factor for the closest calibrated compound (i.e., butane for iso-butane; pentane for iso-pentane; and hexane for 2-methyl pentane) multiplied by the ratio of the peak area for the identified compound for which a calibration curve was not determined to the peak area of the calibrated compound. The values reported in FIG. 16 were then taken as a percentage of the total of all identified hydrocarbon gas GC areas (i.e., methane, ethane, propane, iso-butane, n-butane, iso-pentane, n-pentane, 2-methyl pentane, and n-hexane) and calculated molar concentrations. Thus the graphed methane to normal C6 molar percentages for all of the experiments do not include the molar contribution of the unidentified hydrocarbon gas species listed in Tables 2, 4, 5, 7, or 9 (e.g., peak numbers 2, 6, 8-11, 13, 15-22, 24-26, and 28-78 in Table 2).

Liquid samples collected during the heating tests as described in Examples 1, 3 and 4 were analyzed by whole oil gas chromatography (WOGC) according to the following procedure. Samples, QA/QC standards and blanks (carbon disulfide) were analyzed using an Ultra 1 Methyl Siloxane column (25 m length, 0.32 μm diameter, 0.52 μm film thickness) in an Agilent 6890 GC equipped with a split/splitless injector, autosampler and flame ionization detector (FID). Samples were injected onto the capillary column in split mode with a split ratio of 80:1. The GC oven temperature was kept constant at 20° C. for 5 min, programmed from 20° C. to 300° C. at a rate of 5° C.·min$^{-1}$, and then maintained at 300° C. for 30 min (total run time=90 min.). The injector temperature was maintained at 300° C. and the FID temperature set at 310° C. Helium was used as carrier gas at a flow of 2.1 mL min$^{-1}$. Peak identifications and integrations were performed using Chemstation software Rev.A.10.02 [1757] (Agilent Tech. 1990-2003) supplied with the Agilent instrument.

Standard mixtures of hydrocarbons were analyzed in parallel by the WOGC method described above and by an Agilent 6890 GC equipped with a split/splitless injector, autosampler and mass selective detector (MS) under the same conditions. Identification of the hydrocarbon compounds was conducted by analysis of the mass spectrum of each peak from the GC-MS. Since conditions were identical for both instruments, peak identification conducted on the GC-MS could be transferred to the peaks obtained on the GC-FID. Using these data, a compound table relating retention time and peak identification was set up in the GC-FID Chemstation. This table was used for peak identification.

The gas chromatograms obtained on the liquid samples (FIGS. 4, 9 and 11) were analyzed using a pseudo-component technique. The convention used for identifying each pseudo-component was to integrate all contributions from normal alkane to next occurring normal alkane with the pseudo-component being named by the late eluting n-alkane. For example, the C-10 pseudo-component would be obtained from integration beginning just past normal-C9 and continue just through normal-C10. The carbon number weight % and mole % values for the pseudo-components obtained in this manner were assigned using correlations developed by Katz and Firoozabadi (Katz, D. L., and A. Firoozabadi, 1978. Predicting phase behavior of condensate/crude-oil systems using methane interaction coefficients, J. Petroleum Technology (November 1978), 1649-1655). Results of the pseudo-component analyses for Examples 1, 3 and 4 are shown in Tables 10, 11 and 12.

An exemplary pseudo component weight percent calculation is presented below with reference to Table 10 for the C10 pseudo component for Example 1 in order to illustrate the technique. First, the C-10 pseudo-component total area is obtained from integration of the area beginning just past normal-C9 and continued just through normal-C10 as described above. The total integration area for the C10 pseudo component is 10551.700 pico-ampere-seconds (pAs). The total C10 pseudo component integration area (10551.700 pAs) is then multiplied by the C10 pseudo component density (0.7780 g/ml) to yield an "area X density" of 8209.22 pAs g/ml. Similarly, the peak integration areas for each pseudo component and all lighter listed compounds (i.e., nC3, iC4, nC4, iC5 & nC5) are determined and multiplied by their respective densities to yield "area X density" numbers for each respective pseudo component and listed compound. The respective determined "area X density" numbers for each pseudo component and listed compound is then summed to determine a "total area X density" number. The "total area X density" number for Example 1 is 96266.96 pAs g/ml. The C10 pseudo component weight percentage is then obtained by dividing the C10 pseudo component "area X density" number (8209.22 pAs g/ml) by the "total area X density" number (96266.96 pAs g/ml) to obtain the C10 pseudo component weight percentage of 8.53 weight percent.

An exemplary pseudo component molar percent calculation is presented below with reference to Table 10 for the C10 pseudo component for Example 1 in order to further illustrate the pseudo component technique. First, the C-10 pseudo-component total area is obtained from integration of the area beginning just past normal-C9 and continued just through normal-C10 as described above. The total integration area for the C10 pseudo component is 10551.700 pico-ampere-seconds (pAs). The total C10 pseudo component integration area (10551.700 pAs) is then multiplied by the C10 pseudo component density (0.7780 g/ml) to yield an "area X density" of 8209.22 pAs g/ml. Similarly, the integration areas for each pseudo component and all lighter listed compounds (i.e., nC3, iC4, n4, iC5 & nC5) are determined and multiplied by their respective densities to yield "area X density" numbers for each respective pseudo component and listed compound. The C10 pseudo component "area X density" number (8209.22 pAs g/ml) is then divided by the C10 pseudo component molecular weight (134.00 g/mol) to yield a C10 pseudo component "area X density/molecular weight" number of 61.26 pAs mol/ml. Similarly, the "area X density" number for each pseudo component and listed compound is then divided by such components or compounds respective molecular weight to yield an "area×density/molecular weight" number for each respective pseudo component and listed compound. The respective determined "area×density/molecular weight" numbers for each pseudo component and listed compound is then summed to determine a "total area× density/molecular weight" number. The total "total area× density/molecular weight" number for Example 1 is 665.28 pAs mol/ml. The C10 pseudo component molar percentage is then obtained by dividing the C10 pseudo component "area× density/molecular weight" number (61.26 pAs mol/ml) by the "total area×density/molecular weight" number (665.28 pAs mol/ml) to obtain the C10 pseudo component molar percentage of 9.21 molar percent.

TABLE 10

| Pseudo-components for Example 1 - GC of liquid - 0 stress | | | | | | | |
|---|---|---|---|---|---|---|---|
| Component | Area (cts.) | Area % | Avg. Boiling Pt. (° F.) | Density (g/ml) | Molecular Wt. (g/mol) | Wt. % | Mol % |
| $nC_3$ | 41.881 | 0.03 | −43.73 | 0.5069 | 44.10 | 0.02 | 0.07 |
| $iC_4$ | 120.873 | 0.10 | 10.94 | 0.5628 | 58.12 | 0.07 | 0.18 |
| $nC_4$ | 805.690 | 0.66 | 31.10 | 0.5840 | 58.12 | 0.49 | 1.22 |
| $iC_5$ | 1092.699 | 0.89 | 82.13 | 0.6244 | 72.15 | 0.71 | 1.42 |
| $nC_5$ | 2801.815 | 2.29 | 96.93 | 0.6311 | 72.15 | 1.84 | 3.68 |
| Pseudo $C_6$ | 7150.533 | 5.84 | 147.00 | 0.6850 | 84.00 | 5.09 | 8.76 |
| Pseudo $C_7$ | 10372.800 | 8.47 | 197.50 | 0.7220 | 96.00 | 7.78 | 11.73 |
| Pseudo $C_8$ | 11703.500 | 9.56 | 242.00 | 0.7450 | 107.00 | 9.06 | 12.25 |
| Pseudo $C_9$ | 11776.200 | 9.61 | 288.00 | 0.7640 | 121.00 | 9.35 | 11.18 |
| Pseudo $C_{10}$ | 10551.700 | 8.61 | 330.50 | 0.7780 | 134.00 | 8.53 | 9.21 |
| Pseudo $C_{11}$ | 9274.333 | 7.57 | 369.00 | 0.7890 | 147.00 | 7.60 | 7.48 |
| Pseudo $C_{12}$ | 8709.231 | 7.11 | 407.00 | 0.8000 | 161.00 | 7.24 | 6.50 |
| Pseudo $C_{13}$ | 7494.549 | 6.12 | 441.00 | 0.8110 | 175.00 | 6.31 | 5.22 |
| Pseudo $C_{14}$ | 6223.394 | 5.08 | 475.50 | 0.8220 | 190.00 | 5.31 | 4.05 |
| Pseudo $C_{15}$ | 6000.179 | 4.90 | 511.00 | 0.8320 | 206.00 | 5.19 | 3.64 |
| Pseudo $C_{16}$ | 5345.791 | 4.36 | 542.00 | 0.8390 | 222.00 | 4.66 | 3.04 |
| Pseudo $C_{17}$ | 4051.886 | 3.31 | 572.00 | 0.8470 | 237.00 | 3.57 | 2.18 |
| Pseudo $C_{18}$ | 3398.586 | 2.77 | 595.00 | 0.8520 | 251.00 | 3.01 | 1.73 |
| Pseudo $C_{19}$ | 2812.101 | 2.30 | 617.00 | 0.8570 | 263.00 | 2.50 | 1.38 |
| Pseudo $C_{20}$ | 2304.651 | 1.88 | 640.50 | 0.8620 | 275.00 | 2.06 | 1.09 |
| Pseudo $C_{21}$ | 2038.925 | 1.66 | 664.00 | 0.8670 | 291.00 | 1.84 | 0.91 |
| Pseudo $C_{22}$ | 1497.726 | 1.22 | 686.00 | 0.8720 | 305.00 | 1.36 | 0.64 |
| Pseudo $C_{23}$ | 1173.834 | 0.96 | 707.00 | 0.8770 | 318.00 | 1.07 | 0.49 |
| Pseudo $C_{24}$ | 822.762 | 0.67 | 727.00 | 0.8810 | 331.00 | 0.75 | 0.33 |
| Pseudo $C_{25}$ | 677.938 | 0.55 | 747.00 | 0.8850 | 345.00 | 0.62 | 0.26 |
| Pseudo $C_{26}$ | 532.788 | 0.43 | 766.00 | 0.8890 | 359.00 | 0.49 | 0.20 |
| Pseudo $C_{27}$ | 459.465 | 0.38 | 784.00 | 0.8930 | 374.00 | 0.43 | 0.16 |
| Pseudo $C_{28}$ | 413.397 | 0.34 | 802.00 | 0.8960 | 388.00 | 0.38 | 0.14 |
| Pseudo $C_{29}$ | 522.898 | 0.43 | 817.00 | 0.8990 | 402.00 | 0.49 | 0.18 |
| Pseudo $C_{30}$ | 336.968 | 0.28 | 834.00 | 0.9020 | 416.00 | 0.32 | 0.11 |
| Pseudo $C_{31}$ | 322.495 | 0.26 | 850.00 | 0.9060 | 430.00 | 0.30 | 0.10 |
| Pseudo $C_{32}$ | 175.615 | 0.14 | 866.00 | 0.9090 | 444.00 | 0.17 | 0.05 |
| Pseudo $C_{33}$ | 165.912 | 0.14 | 881.00 | 0.9120 | 458.00 | 0.16 | 0.05 |
| Pseudo $C_{34}$ | 341.051 | 0.28 | 895.00 | 0.9140 | 472.00 | 0.32 | 0.10 |
| Pseudo $C_{35}$ | 286.861 | 0.23 | 908.00 | 0.9170 | 486.00 | 0.27 | 0.08 |
| Pseudo $C_{36}$ | 152.814 | 0.12 | 922.00 | 0.9190 | 500.00 | 0.15 | 0.04 |
| Pseudo $C_{37}$ | 356.947 | 0.29 | 934.00 | 0.9220 | 514.00 | 0.34 | 0.10 |
| Pseudo $C_{38}$ | 173.428 | 0.14 | 947.00 | 0.9240 | 528.00 | 0.17 | 0.05 |
| Totals | 122484.217 | 100.00 | | | | 100.00 | 100.00 |

TABLE 11

Pseudo-components for Example 3 - GC of liquid - 400 psi stress

| Component | Area | Area % | Avg. Boiling Pt. (° F.) | Density (g/ml) | Molecular Wt. (g/mol) | Wt. % | Mol % |
|---|---|---|---|---|---|---|---|
| $nC_3$ | 35.845 | 0.014 | −43.730 | 0.5069 | 44.10 | 0.01 | 0.03 |
| $iC_4$ | 103.065 | 0.041 | 10.940 | 0.5628 | 58.12 | 0.03 | 0.07 |
| $nC_4$ | 821.863 | 0.328 | 31.100 | 0.5840 | 58.12 | 0.24 | 0.62 |
| $iC_5$ | 1187.912 | 0.474 | 82.130 | 0.6244 | 72.15 | 0.37 | 0.77 |
| $nC_5$ | 3752.655 | 1.498 | 96.930 | 0.6311 | 72.15 | 1.20 | 2.45 |
| Pseudo $C_6$ | 12040.900 | 4.805 | 147.000 | 0.6850 | 84.00 | 4.17 | 7.34 |
| Pseudo $C_7$ | 20038.600 | 7.997 | 197.500 | 0.7220 | 96.00 | 7.31 | 11.26 |
| Pseudo $C_8$ | 24531.500 | 9.790 | 242.000 | 0.7450 | 107.00 | 9.23 | 12.76 |
| Pseudo $C_9$ | 25315.000 | 10.103 | 288.000 | 0.7640 | 121.00 | 9.77 | 11.94 |
| Pseudo $C_{10}$ | 22640.400 | 9.035 | 330.500 | 0.7780 | 134.00 | 8.90 | 9.82 |
| Pseudo $C_{11}$ | 20268.100 | 8.089 | 369.000 | 0.7890 | 147.00 | 8.08 | 8.13 |
| Pseudo $C_{12}$ | 18675.600 | 7.453 | 407.000 | 0.8000 | 161.00 | 7.55 | 6.93 |
| Pseudo $C_{13}$ | 16591.100 | 6.621 | 441.000 | 0.8110 | 175.00 | 6.80 | 5.74 |
| Pseudo $C_{14}$ | 13654.000 | 5.449 | 475.500 | 0.8220 | 190.00 | 5.67 | 4.41 |
| Pseudo $C_{15}$ | 13006.300 | 5.191 | 511.000 | 0.8320 | 206.00 | 5.47 | 3.92 |
| Pseudo $C_{16}$ | 11962.200 | 4.774 | 542.000 | 0.8390 | 222.00 | 5.07 | 3.38 |
| Pseudo $C_{17}$ | 8851.622 | 3.533 | 572.000 | 0.8470 | 237.00 | 3.79 | 2.36 |
| Pseudo $C_{18}$ | 7251.438 | 2.894 | 595.000 | 0.8520 | 251.00 | 3.12 | 1.84 |
| Pseudo $C_{19}$ | 5946.166 | 2.373 | 617.000 | 0.8570 | 263.00 | 2.57 | 1.45 |
| Pseudo $C_{20}$ | 4645.178 | 1.854 | 640.500 | 0.8620 | 275.00 | 2.02 | 1.09 |
| Pseudo $C_{21}$ | 4188.168 | 1.671 | 664.000 | 0.8670 | 291.00 | 1.83 | 0.93 |
| Pseudo $C_{22}$ | 2868.636 | 1.145 | 686.000 | 0.8720 | 305.00 | 1.26 | 0.61 |
| Pseudo $C_{23}$ | 2188.895 | 0.874 | 707.000 | 0.8770 | 318.00 | 0.97 | 0.45 |
| Pseudo $C_{24}$ | 1466.162 | 0.585 | 727.000 | 0.8810 | 331.00 | 0.65 | 0.29 |
| Pseudo $C_{25}$ | 1181.133 | 0.471 | 747.000 | 0.8850 | 345.00 | 0.53 | 0.23 |
| Pseudo $C_{26}$ | 875.812 | 0.350 | 766.000 | 0.8890 | 359.00 | 0.39 | 0.16 |
| Pseudo $C_{27}$ | 617.103 | 0.246 | 784.000 | 0.8930 | 374.00 | 0.28 | 0.11 |
| Pseudo $C_{28}$ | 538.147 | 0.215 | 802.000 | 0.8960 | 388.00 | 0.24 | 0.09 |
| Pseudo $C_{29}$ | 659.027 | 0.263 | 817.000 | 0.8990 | 402.00 | 0.30 | 0.11 |
| Pseudo $C_{30}$ | 1013.942 | 0.405 | 834.000 | 0.9020 | 416.00 | 0.46 | 0.16 |
| Pseudo $C_{31}$ | 761.259 | 0.304 | 850.000 | 0.9060 | 430.00 | 0.35 | 0.12 |
| Pseudo $C_{32}$ | 416.031 | 0.166 | 866.000 | 0.9090 | 444.00 | 0.19 | 0.06 |
| Pseudo $C_{33}$ | 231.207 | 0.092 | 881.000 | 0.9120 | 458.00 | 0.11 | 0.03 |
| Pseudo $C_{34}$ | 566.926 | 0.226 | 895.000 | 0.9140 | 472.00 | 0.26 | 0.08 |
| Pseudo $C_{35}$ | 426.697 | 0.170 | 908.000 | 0.9170 | 486.00 | 0.20 | 0.06 |
| Pseudo $C_{36}$ | 191.626 | 0.076 | 922.000 | 0.9190 | 500.00 | 0.09 | 0.03 |
| Pseudo $C_{37}$ | 778.713 | 0.311 | 934.000 | 0.9220 | 514.00 | 0.36 | 0.10 |
| Pseudo $C_{38}$ | 285.217 | 0.114 | 947.000 | 0.9240 | 528.00 | 0.13 | 0.04 |
| Totals | 250574.144 | 100.000 | | | | 100.00 | 100.00 |

TABLE 12

Pseudo-components for Example 4 - GC of liquid - 1000 psi stress

| Component | Area | Area % | Avg. Boiling Pt. (° F.) | Density (g/ml) | Molecular Wt. (g/mol) | Wt. % | Mol % |
|---|---|---|---|---|---|---|---|
| $nC_3$ | 44.761 | 0.023 | −43.730 | 0.5069 | 44.10 | 0.01 | 0.05 |
| $iC_4$ | 117.876 | 0.060 | 10.940 | 0.5628 | 58.12 | 0.04 | 0.11 |
| $nC_4$ | 927.866 | 0.472 | 31.100 | 0.5840 | 58.12 | 0.35 | 0.87 |
| $iC_5$ | 1082.570 | 0.550 | 82.130 | 0.6244 | 72.15 | 0.44 | 0.88 |
| $nC_5$ | 3346.533 | 1.701 | 96.930 | 0.6311 | 72.15 | 1.37 | 2.74 |
| Pseudo $C_6$ | 9579.443 | 4.870 | 147.000 | 0.6850 | 84.00 | 4.24 | 7.31 |
| Pseudo $C_7$ | 16046.200 | 8.158 | 197.500 | 0.7220 | 96.00 | 7.49 | 11.29 |
| Pseudo $C_8$ | 19693.300 | 10.012 | 242.000 | 0.7450 | 107.00 | 9.48 | 12.83 |
| Pseudo $C_9$ | 20326.300 | 10.334 | 288.000 | 0.7640 | 121.00 | 10.04 | 12.01 |
| Pseudo $C_{10}$ | 18297.600 | 9.302 | 330.500 | 0.7780 | 134.00 | 9.20 | 9.94 |
| Pseudo $C_{11}$ | 16385.600 | 8.330 | 369.000 | 0.7890 | 147.00 | 8.36 | 8.23 |
| Pseudo $C_{12}$ | 15349.000 | 7.803 | 407.000 | 0.8000 | 161.00 | 7.94 | 7.14 |
| Pseudo $C_{13}$ | 13116.500 | 6.668 | 441.000 | 0.8110 | 175.00 | 6.88 | 5.69 |
| Pseudo $C_{14}$ | 10816.100 | 5.499 | 475.500 | 0.8220 | 190.00 | 5.75 | 4.38 |
| Pseudo $C_{15}$ | 10276.900 | 5.225 | 511.000 | 0.8320 | 206.00 | 5.53 | 3.88 |
| Pseudo $C_{16}$ | 9537.818 | 4.849 | 542.000 | 0.8390 | 222.00 | 5.17 | 3.37 |
| Pseudo $C_{17}$ | 6930.611 | 3.523 | 572.000 | 0.8470 | 237.00 | 3.79 | 2.32 |
| Pseudo $C_{18}$ | 5549.802 | 2.821 | 595.000 | 0.8520 | 251.00 | 3.06 | 1.76 |
| Pseudo $C_{19}$ | 4440.457 | 2.257 | 617.000 | 0.8570 | 263.00 | 2.46 | 1.35 |
| Pseudo $C_{20}$ | 3451.250 | 1.755 | 640.500 | 0.8620 | 275.00 | 1.92 | 1.01 |
| Pseudo $C_{21}$ | 3133.251 | 1.593 | 664.000 | 0.8670 | 291.00 | 1.76 | 0.87 |
| Pseudo $C_{22}$ | 2088.036 | 1.062 | 686.000 | 0.8720 | 305.00 | 1.18 | 0.56 |
| Pseudo $C_{23}$ | 1519.460 | 0.772 | 707.000 | 0.8770 | 318.00 | 0.86 | 0.39 |
| Pseudo $C_{24}$ | 907.473 | 0.461 | 727.000 | 0.8810 | 331.00 | 0.52 | 0.23 |

TABLE 12-continued

Pseudo-components for Example 4 - GC of liquid - 1000 psi stress

| Component | Area | Area % | Avg. Boiling Pt. (° F.) | Density (g/ml) | Molecular Wt. (g/mol) | Wt. % | Mol % |
|---|---|---|---|---|---|---|---|
| Pseudo $C_{25}$ | 683.205 | 0.347 | 747.000 | 0.8850 | 345.00 | 0.39 | 0.16 |
| Pseudo $C_{26}$ | 493.413 | 0.251 | 766.000 | 0.8890 | 359.00 | 0.28 | 0.11 |
| Pseudo $C_{27}$ | 326.831 | 0.166 | 784.000 | 0.8930 | 374.00 | 0.19 | 0.07 |
| Pseudo $C_{28}$ | 272.527 | 0.139 | 802.000 | 0.8960 | 388.00 | 0.16 | 0.06 |
| Pseudo $C_{29}$ | 291.862 | 0.148 | 817.000 | 0.8990 | 402.00 | 0.17 | 0.06 |
| Pseudo $C_{30}$ | 462.840 | 0.235 | 834.000 | 0.9020 | 416.00 | 0.27 | 0.09 |
| Pseudo $C_{31}$ | 352.886 | 0.179 | 850.000 | 0.9060 | 430.00 | 0.21 | 0.07 |
| Pseudo $C_{32}$ | 168.635 | 0.086 | 866.000 | 0.9090 | 444.00 | 0.10 | 0.03 |
| Pseudo $C_{33}$ | 67.575 | 0.034 | 881.000 | 0.9120 | 458.00 | 0.04 | 0.01 |
| Pseudo $C_{34}$ | 95.207 | 0.048 | 895.000 | 0.9140 | 472.00 | 0.06 | 0.02 |
| Pseudo $C_{35}$ | 226.660 | 0.115 | 908.000 | 0.9170 | 486.00 | 0.13 | 0.04 |
| Pseudo $C_{36}$ | 169.729 | 0.086 | 922.000 | 0.9190 | 500.00 | 0.10 | 0.03 |
| Pseudo $C_{37}$ | 80.976 | 0.041 | 934.000 | 0.9220 | 514.00 | 0.05 | 0.01 |
| Pseudo $C_{38}$ | 42.940 | 0.022 | 947.000 | 0.9240 | 528.00 | 0.03 | 0.01 |
| Totals | 196699.994 | 100.000 | | | | 100.00 | 100.00 |

TOC and Rock-eval tests were performed on specimens from oil shale block CM-1B taken at the same stratigraphic interval as the specimens tested by the Parr heating method described in Examples 1-5. These tests resulted in a TOC of 21% and a Rock-eval Hydrogen Index of 872 mg/g-toc.

The TOC and rock-eval procedures described below were performed on the oil shale specimens remaining after the Parr heating tests described in Examples 1-5. Results are shown in Table 13.

The Rock-Eval pyrolysis analyses described above were performed using the following procedures. Rock-Eval pyrolysis analyses were performed on calibration rock standards (IFP standard #55000), blanks, and samples using a Delsi Rock-Eval II instrument. Rock samples were crushed, micronized, and air-dried before loading into Rock-Eval crucibles. Between 25 and 100 mg of powdered-rock samples were loaded into the crucibles depending on the total organic carbon (TOC) content of the sample. Two or three blanks were run at the beginning of each day to purge the system and stabilize the temperature. Two or three samples of IFP calibration standard #55000 with weight of 100+/−1 mg were run to calibrate the system. If the Rock-Eval $T_{max}$ parameter was 419° C.+/−2° C. on these standards, analyses proceeded with samples. The standard was also run before and after every 10 samples to monitor the instrument's performance.

The Rock-Eval pyrolysis technique involves the rate-programmed heating of a powdered rock sample to a high temperature in an inert (helium) atmosphere and the characterization of products generated from the thermal breakdown of chemical bonds. After introduction of the sample the pyrolysis oven was held isothermally at 300° C. for three minutes. Hydrocarbons generated during this stage are detected by a flame-ionization detector (FID) yielding the $S_1$ peak. The pyrolysis-oven temperature was then increased at a gradient of 25° C./minute up to 550° C., where the oven was held isothermally for one minute. Hydrocarbons generated during this step were detected by the FID and yielded the $S_2$ peak.

Hydrogen Index (HI) is calculated by normalizing the $S_2$ peak (expressed as $mg_{hydrocarbons}/g_{rock}$) to weight % TOC (Total Organic Carbon determined independently) as follows:

$$HI=(S_2/TOC)*100$$

where HI is expressed as $mg_{hydrocarbons}/g_{TOC}$

Total Organic Carbon (TOC) was determined by well known methods suitable for geological samples—i.e., any carbonate rock present was removed by acid treatment followed by combustion of the remaining material to produce and measure organic based carbon in the form of $CO_2$.

TABLE 13

TOC and Rock-eval results on oil shale specimens after the Parr heating tests

| | Example 1 | Example 2 | Example 3 | Example 4 | Example 5 |
|---|---|---|---|---|---|
| TOC (%) | 12.07 | 10.83 | 10.62 | 11.22 | 11.63 |
| HI (mg/g-toc) | 77 | 83 | 81 | 62 | 77 |

The API gravity of Examples 1-5 was estimated by estimating the room temperature specific gravity (SG) of the liquids collected and the results are reported in Table 14. The API gravity was estimated from the determined specific gravity by applying the following formula:

API gravity=(141.5/SG)−131.5

The specific gravity of each liquid sample was estimated using the following procedure. An empty 50 μl Hamilton Model 1705 gastight syringe was weighed on a Mettler AE 163 digital balance to determine the empty syringe weight. The syringe was then loaded by filling the syringe with a volume of liquid. The volume of liquid in the syringe was noted. The loaded syringe was then weighed. The liquid sample weight was then estimated by subtracting the loaded syringe measured weight from the measured empty syringe weight. The specific gravity was then estimated by dividing the liquid sample weight by the syringe volume occupied by the liquid sample.

TABLE 14

Estimated API Gravity of liquid samples from Examples 1-5

| | Example | | | | |
|---|---|---|---|---|---|
| | Example 1 | Example 2 | Example 3 | Example 4 | Example 5 |
| API Gravity | 29.92 | 30.00 | 27.13 | 32.70 | 30.00 |

The above-described processes may be of merit in connection with the recovery of hydrocarbons in the Piceance Basin of Colorado. Some have estimated that in some oil shale deposits of the Western United States, up to 1 million barrels of oil may be recoverable per surface acre. One study has estimated the oil shale resource within the nahcolite-bearing portions of the oil shale formations of the Piceance Basin to be 400 billion barrels of shale oil in place. Overall, up to 1 trillion barrels of shale oil may exist in the Piceance Basin alone.

Certain features of the present invention are described in terms of a set of numerical upper limits and a set of numerical lower limits. It should be appreciated that ranges formed by any combination of these limits are within the scope of the invention unless otherwise indicated. Although some of the dependent claims have single dependencies in accordance with U.S. practice, each of the features in any of such dependent claims can be combined with each of the features of one or more of the other dependent claims dependent upon the same independent claim or claims.

While it will be apparent that the invention herein described is well calculated to achieve the benefits and advantages set forth above, it will be appreciated that the invention is susceptible to modification, variation and change without departing from the spirit thereof.

What is claimed is:

1. A method for heating a subsurface formation using electrical resistance heating, comprising:
   creating by directionally drilling a first wellbore at least partially within the subsurface formation which intersects a second wellbore also located at least partially within the subsurface formation,
   wherein the first wellbore and the second wellbore each have a substantially vertical section and wherein the first wellbore has a section that is not substantially vertical;
   providing an electrically conductive granular material into at least the portion of the first wellbore that intersects the second wellbore to form a granular electrical connection, the granular electrical connection providing electrical communication between the first wellbore and the second wellbore, wherein the granular material has a geometry selected to increase the surface area contact of particles comprising the granular material;
   providing a first electrically conductive member in the first wellbore so that the first electrically conductive member is in electrical communication with the granular electrical connection and wherein a bottom end of the first electrically conductive member terminates within the substantially vertical section of the first wellbore;
   providing a second electrically conductive member in the second wellbore, so that the second electrically conductive member is in electrical communication with the granular electrical connection and wherein a bottom end of the second electrically conductive member terminates within the substantially vertical section of the second wellbore, thereby forming an electrically conductive flow path comprised of the first electrically conductive member, the granular electrical connection and the second electrically conductive member; and
   establishing an electrical current through the electrically conductive flow path, thereby generating heat within the electrically conductive flow path due to electrical resistive heating, with at least a portion of the generated heat thermally conducting into the subsurface formation, and wherein the generated heat is comprised of first heat generated at a first heat rate from the first electrically conductive member, second heat generated at a second heat rate from the second electrically conductive member, and third heat generated at a third heat rate from the electrically conductive granular material, with the first heat, the second heat, or both being substantially greater than the third heat.

2. The method of claim 1, wherein the subsurface formation is an organic-rich rock formation.

3. The method of claim 2, wherein the subsurface formation contains heavy hydrocarbons.

4. The method of claim 2, wherein the subsurface formation is an oil shale formation.

5. The method of claim 4, wherein the generated heat causes pyrolysis of solid hydrocarbons within at least a portion of the subsurface formation.

6. The method of claim 5, wherein the electrical resistance of the granular electrical connection is less than the resistance of the first electrically conductive member, the second electrically conductive member, or both.

7. The method of claim 6, wherein the resistivity of the material comprising the granular electrical connection is less than 0.0001 Ohm-meters.

8. The method of claim 5, wherein:
   the first electrically conductive member has a first heat rate, the second electrically conductive member has a second heat rate, and the granular electrical connection has a third heat rate; and
   the first heat rate, the second heat rate, or both is substantially greater than the third heat rate.

9. The method of claim 8, wherein the first heat rate, the second heat rate, or both is greater than 25,000 Watts.

10. The method of claim 9, wherein the first heat rate, the second heat rate, or both is greater than 100,000 Watts.

11. The method of claim 5, wherein:
    the first electrically conductive member has a first heat rate per length, the second electrically conductive member has a second heat rate per length, and the granular electrical connection has a third heat rate per length; and
    the first heat rate per length, the second heat rate per length, or both is substantially greater than the third heat rate per length.

12. The method of claim 11, wherein the first heat rate per length, the second heat rate per length, or both is greater than 100 Watts per meter.

13. The method of claim 12, wherein the first heat rate per length, the second heat rate per length, or both is greater than 400 Watts per meter.

14. The method of claim 5, wherein the electrical current is a direct current.

15. The method of claim 5, wherein at least a portion of the first wellbore within the subsurface formation is substantially horizontal.

16. The method of claim 5, wherein the material comprising at least a portion of the first electrically conductive member, the second electrically conductive member, or both has an electrical resistivity of less than 0.0001 Ohm-meters.

17. The method of claim 2, wherein the first wellbore is within the organic-rich rock formation.

18. The method of claim 17, wherein a bottom end of each of the first and second electrically conductive member terminates within the organic-rich rock formation.

* * * * *